United States Patent
Arasappan et al.

(10) Patent No.: US 12,516,046 B2
(45) Date of Patent: Jan. 6, 2026

(54) 2-OXO-OXAZOLIDINE-5-CARBOXAMIDES AS NAV1.8 INHIBITORS

(71) Applicant: Merck Sharp & Dohme LLC, Rahway, NJ (US)

(72) Inventors: Ashok Arasappan, Bridgewater, NJ (US); Ian M. Bell, Harleysville, PA (US); Christopher James Bungard, Lansdale, PA (US); Christopher S. Burgey, Ambler, PA (US); Jason Michael Cox, Rancho Santa Fe, CA (US); Deodial Guy Guiadeen, Chesterfield, NJ (US); Michael J. Kelly, III, Paoli, PA (US); Mark E. Layton, Harleysville, PA (US); Hong Liu, Hillsborough, NJ (US); Jian Liu, Edison, NJ (US); James T. Olsen, Lansdale, PA (US); James J. Perkins, Churchville, PA (US); Jeffrey William Schubert, North Wales, PA (US); Akshay A. Shah, Robbinsville, NJ (US); Shawn J. Stachel, Perkasie, PA (US); Michael David VanHeyst, Harleysville, PA (US); Zhe Wu, Blue Bell, PA (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 495 days.

(21) Appl. No.: 18/009,306

(22) PCT Filed: Jun. 14, 2021

(86) PCT No.: PCT/US2021/037157
§ 371 (c)(1),
(2) Date: Dec. 8, 2022

(87) PCT Pub. No.: WO2021/257418
PCT Pub. Date: Dec. 23, 2021

(65) Prior Publication Data
US 2023/0227441 A1 Jul. 20, 2023

Related U.S. Application Data

(60) Provisional application No. 63/040,463, filed on Jun. 17, 2020.

(51) Int. Cl.
C07D 413/12 (2006.01)
C07D 263/24 (2006.01)
C07D 417/12 (2006.01)

(52) U.S. Cl.
CPC ......... C07D 413/12 (2013.01); C07D 263/24 (2013.01); C07D 417/12 (2013.01)

(58) Field of Classification Search
CPC .................................................. C07D 413/12
See application file for complete search history.

(56) References Cited

U.S. PATENT DOCUMENTS

| 8,519,137 B2 | 8/2013 | Joshi et al. |
| 8,629,149 B2 | 1/2014 | Pajouhesh et al. |
| 9,051,270 B2 | 6/2015 | Hadida-Ruah et al. |
| 9,108,903 B2 | 8/2015 | Hadida-Ruah et al. |
| 9,163,042 B2 | 10/2015 | Anderson et al. |
| 9,783,501 B2 | 10/2017 | Hadida-Ruah et al. |
| 2012/0220605 A1 | 8/2012 | Pajouhesh et al. |

(Continued)

FOREIGN PATENT DOCUMENTS

| CN | 103906733 A | 7/2014 |
| EA | 004988 B1 | 10/2004 |
| EP | 3470404 A1 | 4/2019 |

(Continued)

OTHER PUBLICATIONS

De Vita, Elena et al., Synthesis and Structure-Activity Relationships of N-(4-Benzamidino)-Oxazolidinones: Potent and Selective Inhibitors of Kallikrein-Related Peptidase 6, ChemMedChem, 15, 79-95, 2020.

Piszel, Paige E. et al., Oxidative Amide Coupling from Functionally Diverse Alcohols and Amines Using Aerobic Copper/Nitroxyl Catalysis, Angew. Chem. Int. Ed., 58, 12211-12215, 2019.

Bastin, R.J.; et al., Salt Selection and Optimization Procedures for Pharmaceutical New Chemical Entities, Organic Process Research and Development, 4, pp. 427-435, 2000.

Belikov VG Pharmaceutical chemistry. Textbook. Edition Fourth. M.: "MEDpress-inform", 2007, 622 p. (p. 11).

(Continued)

*Primary Examiner* — Rei Tsang Shiao
(74) *Attorney, Agent, or Firm* — Baerbel R. Brown; Catherine D. Fitch

(57) ABSTRACT

Novel compounds of the structural formula (I), and the pharmaceutically acceptable salts thereof, are inhibitors of Na$_v$1.8 channel activity and may be useful in the treatment, prevention, management, amelioration, control and suppression of diseases mediated by Na$_v$1.8 channel activity. The compounds of the present invention may be useful in the treatment, prevention or management of pain disorders, cough disorders, acute itch disorders, and chronic itch disorders.

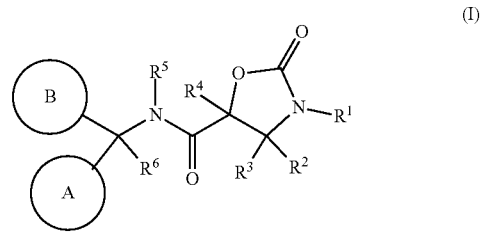

(I)

34 Claims, No Drawings

(56) References Cited

U.S. PATENT DOCUMENTS

2021/0403457 A1   12/2021   Arasappan et al.

FOREIGN PATENT DOCUMENTS

| | | |
|---|---|---|
| JP | 2023524167 A | 6/2023 |
| JP | 2023530320 A | 7/2023 |
| WO | 2000038680 A1 | 7/2000 |
| WO | 2001044230 A1 | 6/2001 |
| WO | 2007007057 A1 | 1/2007 |
| WO | 2009049180 A2 | 4/2009 |
| WO | 2009049181 A1 | 4/2009 |
| WO | 2009049183 A1 | 4/2009 |
| WO | 2011026240 A1 | 3/2011 |
| WO | 2012177893 A2 | 12/2012 |
| WO | 2014120808 A1 | 8/2014 |
| WO | 2014120815 A1 | 8/2014 |
| WO | 2014120820 A1 | 8/2014 |
| WO | 2014146111 A2 | 9/2014 |
| WO | 2015010065 A1 | 1/2015 |
| WO | 2015089361 A1 | 6/2015 |
| WO | 2017209322 A1 | 12/2017 |
| WO | 2018213426 A1 | 11/2018 |
| WO | 2019014352 A1 | 1/2019 |
| WO | 2020092667 A1 | 5/2020 |
| WO | WO 2020092667 * | 5/2020 |
| WO | 2020229768 A1 | 11/2020 |
| WO | 2021257420 A1 | 12/2021 |

OTHER PUBLICATIONS

Belikov, V.G., Pharmaceutical Chemistry, Moscow MEDpress-inform, 4th Edition, 27-29, 2007.

Belikov, V.G., Pharmaceutical chemistry. Textbook, Moscow: MEDpress-inform, 4th Edition, 11 (2 pages), 2007.

Fundamentals of Medical Prevention. Educational and Methodological Manual for Students and Cadets of Advanced Training Cycles of State Professional Educationalinstitutions. Novosibirsk, 2016, UDC 614.2-084, BBK 51.1(2)2, p. 13-21, Available onlinehttps://rcmp-nso.ru/profila/m_mater/docs/osnovi_med_pomoshi.pdf?ysclid=15wi7xgplo450927514 (11 pages).

Fundamentals of Medical Prevention. Educational and Methodological Manual for Students and Cadets of Advanced Training Cycles of State Professional Educational Institutions. Novosibirsk, 2016, UDC 614.2-084, BBK 51.1(2)2, p. 13-21 (208 pages).

Gavrilov A.S. Pharmaceutical technology. Producing the medicines. Textbook. M.: publishing group "GEOTAR-Media", 2010, 624 pp. (p. 20).

Gavrilov, A.S., Pharmaceutical technology. Manufacturing of medicinal products. Textbook, M.: publishing group, GEOTAR-Media, N/A, 20, 2010.

Kearns, Gregory L. et al., Developmental Pharmacology—Drug Disposition, Action, and Therapy in Infants and Children, N Engl J Med, 349, 1157-1167, 2003.

Kholodov, L.E. et al., Clinical Pharmacokinetics, Moscow, Medicine, N/A, 83-98, 134-138, 160, 378-380, 1985.

Kummerer, K., Pharmaceuticals in the environment, Annual Review of Environment and Resources, 35, 57-75, 2010.

PubChem CID: 131927238, create date Dec. 20, 2017, found [online], 7 pages.

PubChem CID: 17081319, create date Nov. 13, 2007, found [online], 7 pages.

Sergeev, P.V., Brief Course in Molecular Pharmacology, Moscow, N/A, 10, 1975.

Sergeeva, P.V. (Sergeev, P.V.), A short course in molecular pharmacology, Москва, N/A, 10, 1975.

Bagal, Sharan K. et al., Discovery and Optimization of Selective Nav1.8 Modulator Series That Demonstrate Efficacy in Preclinical Models of Pain, ACS Med. Chem. Lett., 2015, 650-654, 6.

Baker et al., Involvement of Na + Channels in Pain Pathways, TRENDS in Pharmacological Sciences, 2001, 27-31, 22, No. 1.

Belkouch, Mounir et al., Functional up-regulation of Nav1.8 sodium channel in AB afferent fibers subjected to chronic peripheral inflammation, Journal of Neuroinflammation, 2014, 1-17, 11:45.

Bennett, David L. et al., Painful and painless channelopathies, Lancet Neurol., 2014, 587-599, 13(6).

Black, Joel A. et a., Multiple Sodium Channel Isoforms and Mitogen-Activated Protein Kinases Are Present in Painful Human Neuromas, Ann Neurol, 2008, 644-653, 64(6).

Black, Joel A. et al., Sensory neuron-specific sodium channel SNS is abnormally expressed in the brains of mice with experimental allergic encephalomyelitis and humans with multiple sclerosis, Proc. Natl. Acad. Sci. USA, 2000, 11598-11602, 97(21).

Carter et al., Advances in the Management of Neuropathic Pain, Physical Medicine and Rehabilitation Clinics of North America, 2001, 447-459, 12(2).

Catterall, William A. et al., The chemical basis for electrical signaling, Nature Chemical Biology, 2017, 455-463, 13(5).

Colloca, Luana et al., Neuropathic pain, Nature Reviews Disease Primers, 2017, 1-19, 3:17002.

Coward, K et al., Immunolocalization of SNS/PN3 and NaN/SNS2 sodium channels in human pain states, Pain, 2000, 41-50, 85.

Denis, A. et al., 5-Aryl-β,γ butenolide, a new class of antibacterial derived from the N-aryl oxazolidinone DUP 721, Bioorganic & Medicinal Chemistry Letters, 1994, 1925-1930, 4 (16).

Emery, Edward C. et al., Novel SCN9A Mutations Underlying Extreme Pain Phenotypes: Unexpected Electrophysiological and Clinical Phenotype Correlations, Journal of Neuroscience, 2015, 7674-7681, 35(20).

Flaxman et al., Years Lived with Disability (YLDs) for 1160 Sequelae of 289 Diseases and Injuries 1990-2010: A Systematic Analysis for the Global Burden of Disease Study 2010, Lancet, 2012, 2163-2196, 380.

Goldin et al., Nomenclature of Voltage-Gated Sodium Channels, Neuron, 2000, 365-368, 28.

Goldin, Diveristy of Mammalian Voltage-Gated Sodium Channels, Ann NY Acad Sci., 1999, 38-50, 30, 868.

Han, Chongyang et al., The G1662S NaV1.8 mutation in small fibre neuropathy: impaired inactivation underlying DRG neuron hyperexcitability, J Neurol Neurosurg Psychiatry, 2014, 499-505, 85(5).

Han, Chongyang, et al., Sodium channel Nav1.8, Emerging links to human disease, Neurology, 2016, 473-483, 86.

Higuchi et al (Eds.), Pro Drugs as Novel Delivery Systems, ACS Symposium Series, 1975, 14.

Huang, Jianying et al., Small-Fiber Neuropathy Nav1.8 Mutation Shifts Activation to Hyperpolarized Potentials and Increases Excitability of Dorsal Root Ganglion Neurons, Journal of Neuroscience, 2013, 14087-14097, 33(35).

Ikoma et al., The Neurobiology of Itch, Nature Reviews, 2006, 535-547, 7.

Jarvis, Michael F. et al., A-803467, a potent and selective Nav1.8 sodium channel blocker, attenuates neuropathic and inflammatory pain in the rat, PNAS, 2007, 8520-8525, 104.

Kist, Andreas M. et al., SCN10A Mutation in a Patient with Erythromelalgia Enhances C-Fiber Activity Dependent Slowing, PLOS One, 2016, pp. 1-19, 11(9):e0161789.

Kort, Michael E. et al., Discovery and Biological Evaluation of 5-Aryl-2-furfuramides, Potent and Selective Blockers of the Nav1.8 Sodium Channel with Efficacy in Models of Neuropathic and Inflammatory Pain, J. Med. Chem., 2008, 407-416, 51.

Liu, Yang et al., VGLUT2-Dependent Glutamate Release from Nociceptors Is Required to Sense Pain and Suppress Itch, Neuron, 2010, 543-556, 68(3).

Luo, Jialie et al., Molecular and cellular mechanisms that initiate pain and itch, Cellular and Molecular Life Sciences, 2015, 3201-3223, 72.

Mcgaraughty, Steve et al., A Selective Nav1.8 Sodium Channel Blocker, A-803467 [5-(4-Chlorophenyl-N-(3,5-dimethoxyphenyl)furan-2-carboxamide], Attenuates Spinal Neuronal Activity in Neuropathic Rats, JPET, 2008, 1204-1211, 324.

Mcmahon et al., Itching for an Explanation, Trends Neuroscience, 1992, 497-501, 15.

(56) References Cited

OTHER PUBLICATIONS

Nair, Parameswaran et al., Airway Hyperresponsiveness in Asthma: Measurement and Clinical Relevance, J Allergy Clin Immunol Pract, 2017, 649-659, 5(3).
Payne, Claire Elizabeth et al., A novel selective and orally bioavailable NAv1.8 channel blocker, PF-01247324, attenuates nociception and sensory neuron excitability, British Journal of Pharmacology, 2015, 2654-2670, 172.
PubChem-SID-105546804, Modify Date: May 30, 2019 (May 30, 2019), p. 2, figure, this is a purchasable chemical, 7 pages.
PubChem-SID-350048168, Modify Date: Dec. 20, 2017 (Dec. 20, 2017), p. 2, figure, this is a purchasable chemical, 5 pages.
Riol-Blanco, Lorena et al., Nociceptive sensory neurons drive interleukin-23-mediated psoriasiform skin Inflammation, Nature, 2014, 157-161, 510.
Roche, E.B., Bioreversible Carriers in Drug Design, Theory and Application, Pergamon Press, 1987.
Roostaei, Tina et al., Channelopathy-related SCN10A gene variants predict cerebellar dysfunction in multiple sclerosis, Neurology, 2016, 410-417, 86(5).
Schmelz et al., Specific C-Receptors for Itch in Human Skin, J. of Neuroscience, 1997, 8003-8008, 17(20).
Schreiber, Anne K. et al., Diabetic neuropathic pain: Physiopathology and treatment, World Journal of Diabetes, 2015, 432-444, 6(3).
Shields, Shannon D. et al., A Channelopathy Contributes to Cerebellar Dysfunction in a Model of Multiple Sclerosis, Ann Neurol, 2012, 186-194, 71(2).
Shields, Shannon D. et al., Oral Administration of PF-01247324, a Subtype-Selective Nav1.8 Blocker, Reverses Cerebellar Deficits in a Mouse Model of Multiple Sclerosis, PLoS One, 2015, 1-8, 10(3).
Talbot, Sebastien et al., Silencing Nociceptor Neurons Reduces Allergic Airway Inflammation, Neuron, 2015, 341-354, 87(2).
Van Loey et al., Itching Following Burns: Epidemiology and Predictors, British J. Dermatology, 2008, 95-100, 158.
Wood, John N et al., Voltage-gated sodium channels, Current Opinion in Pharmacolgoy, 2001, 17-21, 1.
Yiangou, Y. et al., SNS/PN3 and SNS2/NaN sodium channel-like immunoreactivity in human adult and neonate injured sensory nerves, FEBS Letters, 2000, 249-252, 467.
Yu et al., Overview of the Voltage-Gated Sodium Channel Family, Genome Biology, 2003, 207, 4.
Zeng, Chao et al., Relative efficacy and safety of topical non-steroidal anti-inflammatory drugs for osteoarthritis: a systematic review and network meta-analysis of randomised controlled trials and observational studies, Br J Sports Med, 2018, 642-650, 52.
Zhang, Xu-Feng et al., A-887826 is a structurally novel, potent and voltage-dependent Nav1.8 sodium channel blocker that attenuates neuropathic tactile allodynia in rats, Neuropharmacology, 2010, 201-207, 59.
Zhou, Yuan et al., The Natural Flavonoid Naringenin Elicits Analgesia through Inhibition of NaV1.8 Voltage-Gated Sodium Channels, ACS Chemical Neuroscience, 2019, 4834-4846, 10.
Belikov, Relationship Between Molecular Structure of Substances and Their Effect on an Organism, Pharmaceutical chemistry, 1, pp. 43-47, 1993, RU.
Belikov, V.G., Relationship Between Molecular Structure of Substances and Their Effect on an Organism, Pharmaceutical Chemistry, Moscow, High School, 1, 43-47, 1993.
Dyson, G. and May, P., Chemistry of Synthetic Medicinal Substances, M: World, N/A, 12-19, 1964.

\* cited by examiner

2-OXO-OXAZOLIDINE-5-CARBOXAMIDES AS NAV1.8 INHIBITORS

CROSS-REFERENCE TO RELATED APPLICATIONS

This application is a U.S. National Phase application under 35 U.S.C. § 371 of PCT Application No. PCT/US2021/037157, filed 14 Jun. 2021, which claims priority from and the benefit of U.S. Provisional Application Ser. No. 63/040,463, filed 17 Jun. 2020.

BACKGROUND OF THE INVENTION

Voltage-gated sodium channels (VGSC) mediate the selective influx of sodium ions in excitable cells and play a central role in initiating and propagating action potentials (Yu et al., Genome Biology 4:207 (2003)). Voltage-gated sodium channels are ubiquitous in the central and peripheral nervous system where they play a central role in the initiation and propagation of action potentials, and also in skeletal and cardiac muscle where the action potential triggers cellular contraction (Goldin et al., Ann N Y Acad Sci. 1999 Apr. 30; 868:38-50). Alterations in VGSC function or their expression can profoundly affect normal cell excitability (Huang et al., J Neurosci. 2013 Aug. 28; 33 (35):14087-97; Emery et al., J Neurosci. 2015 May 20; 35(20):7674-81; Kist et al., PLoS One. 2016 Sep. 6; 11(9):e0161789; and Schreiber et al., World J Diabetes. 2015 Apr. 15; 6(3):432-44).

Voltage-gated sodium channels are multimeric complexes characterized by one α-subunit, which forms an ion-conducting aqueous pore, and at least one β-subunit that modifies the kinetics and voltage-dependence of the channel gating. Nine different α-subunits have been identified and characterized in mammalian voltage-gated sodium channels, including $Na_v1.8$, also known as SNS, PN3 or $Na_v1.8$ (Goldin et al., Neuron. 2000 November; 28 (2):365-8).

Expression of sodium channels can be tissue specific. $Na_v1.8$ voltage-gated sodium ion channels are expressed primarily in sensory neurons, which are responsible for conveying information from the periphery (e.g. skin, muscle and joints) to the central nervous system via the spinal cord. Sodium channels are integral to this process as sodium channel activity is required for initiation and propagation of action potentials triggered by noxious stimuli (thermal, mechanical and chemical) activating peripheral nociceptors (Catterall et al., Nat Chem Biol. 2017 Apr. 13; 13(5):455-463). An increase in VGSC protein level at the cell surface or an alteration in activity of the VGSC channels can result in disease states such as migraine, neurodegeneration following ischemia, epilepsies, and chronic neuropathic and inflammatory pain states. Gain of function mutations in Nav1.7, Nav1.8, and Nav1.9 manifest in a variety of pain syndromes where patients experience spontaneous pain without an external stimulus (Bennett et al., Lancet Neurol. 2014 June; 13(6):587-99; Huang et al., J Neurosci. 2013 Aug. 28; 33(35):14087-97; Kist et al., PLoS One. 2016 Sep. 6; 11(9):e0161789; Emery et al., J Neurosci. 2015 May 20; 35(20):7674-81; and Schreiber et al., World J Diabetes. 2015 Apr. 15; 6(3):432-44).

$Na_v1.8$ voltage-gated sodium ion channels are believed to play a role in various maladies, including neuropathic pain, chronic itch, and inflammatory pain perception (Belkouch et al., J Neuroinflammation. 2014 Mar. 7; 11:45; Coward et al., Pain. 2000 March; 85(1-2):41-50; Yiangou et al., FEBS Lett. 2000 Feb. 11; 467(2-3):249-52; Black et al., Ann Neurol. 2008 December; 64(6):644-53; Bird et al., Br J Pharmacol. 2015 May; 172(10):2654-70; Liu et al., Neuron. 2010 Nov. 4; 68(3):543-56; and Zhao et al., J Clin Invest. 2013).

Large portions of the voltage gated sodium ion channels are conserved among the various subtypes, therefore there is a potential for producing serious side effects when utilizing therapeutic agents that do not demonstrate subtype selectivity. Therefore, therapeutic agents suitable for use in addressing nociception, cough, or itch disorders, require specificity in their action, for example, discriminating between action upon $Na_v1.5$ sodium ion channels, thought to be important in regulation of cardiac function, and action upon $Na_v1.8$ sodium ion channels, thought to be central in inflammatory nociception, or itch and disorders arising from dysfunctional and/or upregulated $Na_v1.8$ sodium ion channels.

Accordingly, it is believed that inhibitors of $Na_v1.8$ voltage-gated sodium ion channel activity may useful to treat or prevent diseases, disorders and conditions involving $Na_v1.8$ receptors and/or stemming specifically from dysfunction of $Na_v1.8$ voltage-gated sodium ion channels (Han et al., J Neurol Neurosurg Psychiatry 2014 May; 85(5):499-505), including but not limited to, migraine, neurodegeneration following ischemia, epilepsy, inflammatory pain, spontaneous pain, acute pain, preoperative pain, perioperative pain, post-operative pain, neuropathic pain, chronic itch, and itch disorders.

There remains a need for potent $Na_v1.8$ sodium ion channel activity inhibitors with selective activity for $Na_v1.8$ sodium ion channels. As a result, the compounds of the present invention are useful for the treatment and prevention of diseases, disorders and conditions involving $Na_v1.8$ receptors and $Na_v1.8$ voltage-gated sodium ion channels.

The role of Nav1.8 sodium ion channels is discussed in: Bennett et al., Physical Medicine and Rehabilitation Clinics of North America, 2001, 12(2):447-459; Meissner et al., Br J Sports Med. 2018 May; 52(10):642-650; Legroux-Crespel et al., Neurology. 2016 Feb. 2; 86(5):473-83; and Flaxman et al., Lancet, 380:2163-2196 (2012).

Compounds useful to treat $Na_v1.8$ sodium ion channel related conditions are disclosed in: ACS Med. Chem. Lett. 2015, 6, 650; BJP 2015, 172, 2654; PNAS 2007, 104, 8520; J. Med. Chem. 2008, 51, 407; JPET 2008, 324, 1204; and Neuropharmacology 2010, 59, 201.

$Na_v1.8$ compounds are also disclosed in: WO 2009/049180, WO 2009/049181, WO 2009/049183, WO 2014/120808; WO 2014/120815; WO 2014/120820; WO 2015/010065; and WO 2015/089361; WO 2017/209322; U.S. Pat. Nos. 8,519,137; 9,051,270; 9,108,903; 9,163,042; 9,783,501; WO 2020/092667; WO2019/014352; WO2018/213426; U.S. Pat. No. 8,629,149; and WO2011/026240.

SUMMARY OF THE INVENTION

The present invention relates to novel compounds of structural formula I:

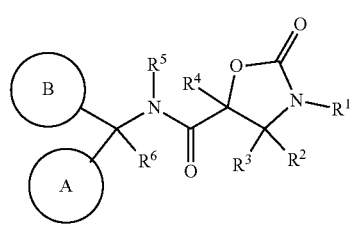

and pharmaceutically acceptable salts thereof. The compounds of structural formula I, and embodiments thereof, are inhibitors of $Na_v1.8$ sodium ion channel activity (or $Na_v1.8$ inhibitors) and may be useful in the treatment and prevention of diseases, disorders and conditions mediated by $Na_v1.8$ sodium ion channel activity, such as nociception, osteoarthritis, peripheral neuropathy, inherited erythromelalgia, multiple sclerosis, asthma, itch, atopy, allergic or contact dermatitis, renal failure, cholestasis, pruritus, acute itch, chronic itch, migraine, neurodegeneration following ischemia, epilepsy, pain, inflammatory pain, spontaneous pain, acute pain, acute pain due to fractures, musculoskeletal damage, pancreatitis and renal colic, peri-operative pain, post-operative pain, neuropathic pain, postherpetic neuralgia, trigeminal neuralgia, diabetic neuropathy, chronic lower back pain, phantom limb pain, sciatica, pain caused by 2° or 3° burn injury, optic neuritis, pain resulting from cancer and chemotherapy, chronic pelvic pain, pain syndromes, and complex regional pain syndromes. In one embodiment of the present invention, the condition, disease or disorder is a pain disorder, an acute pain disorder or chronic pain disorder. In another embodiment of the present invention, the condition, disease or disorder is an acute pain disorder.

The present invention also relates to pharmaceutical compositions comprising the compounds of the present invention and a pharmaceutically acceptable carrier.

The present invention also relates to methods for the treatment, management, prevention, alleviation, amelioration, suppression or control of disorders, diseases, and conditions that may be responsive to inhibition of $Na_v1.8$ sodium ion channel activity in a subject in need thereof by administering the compounds and pharmaceutical compositions of the present invention.

The present invention also relates to the use of compounds of the present invention for manufacture of a medicament useful in treating diseases, disorders and conditions that may be responsive to the inhibition of $Na_v1.8$ sodium ion channel activity.

The present invention is also concerned with treatment or prevention of these diseases, disorders and conditions by administering the compounds of the present invention in combination with a therapeutically effective amount of another agent that may be useful to treat the disease, disorder and condition. The invention is further concerned with processes for preparing the compounds of this invention.

DETAILED DESCRIPTION OF THE INVENTION

The present invention is concerned with novel compounds of structural Formula I:

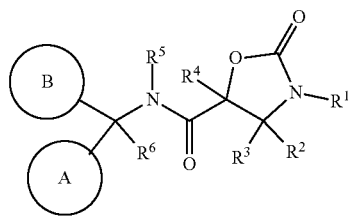

I or a pharmaceutically acceptable salt thereof, wherein one of A and B is selected from:
1) aryl, and
2) heteroaryl,
wherein aryl and heteroaryl are unsubstituted or substituted with one to five substituents selected from $R^a$,
and the other of A and B is selected from:
1) aryl,
2) heteroaryl,
3) $C_{1-6}$alkyl-aryl,
4) —$C_{3-8}$cycloalkyl-aryl,
5) —$C_{2-8}$cycloheteroalkyl-aryl,
6) —$C_{1-6}$alkyl-heteroaryl,
7) —$C_{3-8}$cycloalkyl-heteroaryl,
8) —$C_{2-8}$cycloheteroalkyl-heteroaryl,
9) —$C_{1-6}$alkyl-O-aryl,
10) —$C_{1-6}$alkyl-O-heteroaryl,
11) $C_{3-12}$cycloalkyl,
12) $C_{2-12}$cycloheteroalkyl,
13) —$C_{1-6}$alkyl-$C_{3-12}$cycloalkyl,
14) —$C_{1-6}$alkyl-$C_{2-12}$cycloheteroalkyl,
15) —$C_{1-6}$alkyl-O—$C_{3-12}$cycloalkyl,
16) —$C_{1-6}$alkyl-O—$C_{2-12}$cycloheteroalkyl,
17) —$C_{0-6}$alkyl-aryl fused to a $C_{4-6}$cycloalkyl or $C_{4-6}$cycloheteroalkyl containing 1-3 heteroatoms independently selected from O, S and $N(R^h)_2$,
18) —$C_{0-6}$alkyl-aryl fused to a $C_{4-6}$cycloalkenyl or $C_{4-6}$cycloheteroalkenyl containing 1-3 heteroatoms independently selected from O, S and $N(R^h)_2$,
19) —$C_{0-6}$alkyl-heteroaryl fused to $C_{4-6}$cycloalkyl or $C_{4-6}$cycloheteroalkyl containing 1-3 heteroatoms independently selected from O, S and $N(R^h)_2$, and
20) —$C_{0-6}$alkyl-heteroaryl fused to $C_{4-6}$cycloalkenyl or $C_{4-6}$cycloheteroalkenyl containing 1-3 heteroatoms independently selected from O, S and $N(R^h)_2$,
wherein alkyl, cycloalkyl, cycloheteroalkyl, cycloalkenyl, aryl and heteroaryl are unsubstituted or substituted with one to five substituents selected from $R^b$;
$R^1$ is selected from the group consisting of:
1) hydrogen,
2) —$C_{1-6}$alkyl,
3) —$C_{3-6}$alkenyl,
4) —$C_{3-6}$alkynyl,
5) —$C_{3-10}$cycloalkyl,
6) —$C_{2-10}$cycloheteroalkyl,
7) —$C_{1-6}$alkyl-O—$C_{1-6}$alkyl-,
8) —$(CH_2)_sC(O)R^j$,
9) —$(CH_2)_sC(O)NR^eR^j$,
10) —$(CH_2)_nNR^eC(O)R^j$,
11) —$(CH_2)_nNR^eC(O)OR^j$,
12) —$(CH_2)_nNR^eC(O)N(R^e)_2$,
13) —$(CH_2)_nNR^eC(O)NR^eR^j$,
14) —$(CH_2)_nNR^eS(O)_mR^j$,
15) —$(CH_2)_nNR^eS(O)_mN(R^e)_2$,
16) —$(CH_2)_nNR^eS(O)_mNR^eR^j$, and
17) —$(CH_2)_nNR^eR^j$,
wherein each $CH_2$, alkyl, alkenyl, alkynyl, cycloalkyl and cycloheteroalkyl is unsubstituted or substituted with one to five substituents selected from $R^c$;
$R^2$ is selected from the group consisting of:
1) hydrogen,
2) —$C_{1-6}$alkyl,
3) —$C_{2-6}$alkenyl,
4) —$C_{2-6}$alkynyl,
5) —$C_{3-10}$cycloalkyl,
6) —$C_{2-10}$cycloheteroalkyl,
7) —$C_{1-6}$alkyl-O—$C_{1-6}$alkyl-, 8) —(CH$_2$)$_s$C(O)R$^j$,
9) —(CH$_2$)$_s$C(O)NR$^e$R$^j$,
10) —(CH$_2$)$_s$NR$^e$C(O)R$^j$,
11) —(CH$_2$)$_s$NR$^e$C(O)OR$^j$,
12) —(CH$_2$)$_s$NR$^e$C(O)N(R$^e$)$_2$,
13) —(CH$_2$)$_s$NR$^e$C(O)NR$^e$R$^j$,
14) —(CH$_2$)$_s$NR$^e$S(O)$_m$R$^j$,
15) —(CH$_2$)$_s$NR$^e$S(O)$_m$N(R$^e$)$_2$,
16) —(CH$_2$)$_s$NR$^e$S(O)$_m$NR$^e$R$^j$, and
17) —(CH$_2$)$_s$NR$^e$R$^j$, wherein each CH$_2$, alkyl, alkenyl, alkynyl, cycloalkyl, and cycloheteroalkyl is unsubstituted or substituted with one to five substituents selected from R$^f$, and wherein R$^2$ and R$^3$ and the carbon atom they are connected to can form a —C$_{3-5}$cycloalkyl ring, or wherein R$^2$ and R$^4$ and the carbon atoms they are connected to can form a —C$_{3-5}$cycloalkyl ring;

R$^3$ is selected from the group consisting of:
1) hydrogen,
2) —C$_{1-6}$alkyl,
3) —C$_{2-6}$alkenyl,
4) —C$_{2-6}$alkynyl,
5) —C$_{3-10}$cycloalkyl,
6) —C$_{2-10}$cycloheteroalkyl,
7) —C$_{1-6}$alkyl-O—C$_{1-6}$alkyl-,
8) —(CH$_2$)$_s$C(O)R$^j$,
9) —(CH$_2$)$_s$C(O)NR$^e$R$^j$,
10) —(CH$_2$)$_s$NR$^e$C(O)R$^j$,
11) —(CH$_2$)$_s$NR$^e$C(O)OR$^j$,
12) —(CH$_2$)$_s$NR$^e$C(O)N(R$^e$)$_2$,
13) —(CH$_2$)$_s$NR$^e$C(O)NR$^e$R$^j$,
14) —(CH$_2$)$_s$NR$^e$S(O)$_m$R$^j$,
15) —(CH$_2$)$_s$NR$^e$S(O)$_m$N(R$^e$)$_2$,
16) —(CH$_2$)$_s$NR$^e$S(O)$_m$NR$^e$R$^j$, and
17) —(CH$_2$)$_s$NR$^e$R$^j$, wherein each CH$_2$, alkyl, alkenyl, alkynyl, cycloalkyl, and cycloheteroalkyl is unsubstituted or substituted with one to five substituents selected from R$^g$;

R$^4$ is selected from the group consisting of:
1) hydrogen, and
2) —C$_{1-6}$alkyl, wherein each alkyl is unsubstituted or substituted with one to five substituents selected from halogen;

R$^5$ is selected from the group consisting of:
1) hydrogen, and
2) —C$_{1-6}$alkyl;

R$^6$ is selected from the group consisting of:
1) hydrogen,
2) —C$_{1-6}$alkyl,
3) —C$_{2-6}$alkenyl, and
4) —C$_{2-6}$alkynyl, wherein each alkyl, alkenyl and alkynyl is unsubstituted or substituted with one to five substituents selected from halogen;

each R$^a$ is independently selected from the group consisting of:
1) —CF$_3$,
2) —OCF$_3$,
3) —CHF$_2$,
4) —OCHF$_2$,
5) —CH$_2$CF$_3$,
6) —OCH$_2$CF$_3$,
7) —CF$_2$CH$_3$;
8) CN,
9) oxo,
10) halogen,
11) —S(O)$_2$C$_{1-6}$alkyl,
12) —C$_{1-6}$alkyl,
13) —C$_{2-6}$alkenyl,
14) —C$_{2-6}$alkynyl,
15) —C$_{3-6}$cycloalkyl,
16) —C$_{2-6}$cycloheteroalkyl,
17) aryl,
18) heteroaryl,
19) —C$_{1-6}$alkyl-aryl,
20) —C$_{1-6}$alkyl-heteroaryl,
21) —C$_{1-6}$alkyl-C$_{3-6}$cycloalkyl,
22) —C$_{1-6}$alkyl-C$_{2-6}$cycloheteroalkyl,
23) —C$_{2-6}$alkenyl-C$_{3-6}$cycloalkyl,
24) —C$_{2-6}$alkenyl-C$_{2-6}$cycloheteroalkyl,
25) —C$_{2-6}$alkenyl-aryl,
26) —C$_{2-6}$alkenyl-heteroaryl,
27) —C$_{2-6}$alkynyl-C$_{3-6}$cycloalkyl,
28) —C$_{2-6}$alkynyl-C$_{2-6}$cycloheteroalkyl,
29) —C$_{2-6}$alkynyl-aryl,
30) —C$_{2-6}$alkynyl-heteroaryl,
31) —OH,
32) —(CH$_2$)$_p$—OC$_{1-6}$alkyl,
33) —(CH$_2$)$_p$—OC$_{2-6}$alkenyl,
34) —(CH$_2$)$_p$—OC$_{2-6}$alkynyl,
35) —(CH$_2$)$_p$—OC$_{3-6}$cycloalkyl,
36) —(CH$_2$)$_p$—OC$_{2-6}$heterocycloalkyl,
37) —(CH$_2$)$_p$—O-aryl,
38) —(CH$_2$)$_p$—O-heteroaryl,
39) —OC$_{1-6}$alkyl-C$_{3-6}$cycloalkyl,
40) —OC$_{1-6}$alkyl-C$_{2-6}$heterocycloalkyl,
41) —OC$_{1-6}$alkyl-aryl,
42) —OC$_{1-6}$alkyl-heteroaryl,
43) —S(O)$_m$R$^j$,
44) —C$_{1-6}$alkyl-S(O)$_m$R$^j$,
45) —N(R$^k$)$_2$, and
46) —NR$^k$R$^L$, wherein each R$^a$ is unsubstituted or substituted with one to six substituents selected from halogen, CF$_3$, OH, —C$_{1-6}$alkyl, and —OC$_{1-6}$alkyl;

each R$^b$ is independently selected from the group consisting of:
1) —CF$_3$,
2) —OCF$_3$,
3) —CHF$_2$,
4) —OCHF$_2$,
5) —CH$_2$CF$_3$,
6) —OCH$_2$CF$_3$,
7) —CF$_2$CH$_3$;
8) CN,
9) oxo,
10) halogen,
11) —S(O)$_2$C$_{1-6}$alkyl,
12) —C$_{1-6}$alkyl,
13) —C$_{2-6}$alkenyl,
14) —C$_{2-6}$alkynyl,
15) —O—C$_{1-6}$alkyl,
16) —C$_{3-6}$cycloalkyl,
17) —O—C$_{3-6}$cycloalkyl,
18) —C$_{2-6}$cycloheteroalkyl,
19) aryl,
20) heteroaryl,
21) —C$_{1-6}$alkyl-aryl,
22) —C$_{1-6}$alkyl-heteroaryl,
23) —C$_{1-6}$alkyl-C$_{3-6}$cycloalkyl,
24) —C$_{1-6}$alkyl-C$_{2-6}$cycloheteroalkyl,
25) —C$_{2-6}$alkenyl-C$_{3-6}$cycloalkyl,
26) —C$_{2-6}$alkenyl-C$_{2-6}$cycloheteroalkyl,
27) —C$_{2-6}$alkenyl-aryl, 28) —C$_{2-6}$alkenyl-heteroaryl,
29) —C$_{2-6}$alkynyl-C$_{3-6}$cycloalkyl,
30) —C$_{2-6}$alkynyl-C$_{2-6}$cycloheteroalkyl,
31) —C$_{2-6}$alkynyl-aryl,
32) —C$_{2-6}$alkynyl-heteroaryl,
33) —OH,
34) —(CH$_2$)$_q$—OC$_{1-6}$alkyl,
35) —(CH$_2$)$_q$—OC$_{2-6}$alkenyl,
36) —(CH$_2$)$_q$—OC$_{2-6}$alkynyl,
37) —(CH$_2$)$_q$—OC$_{3-6}$cycloalkyl,
38) —(CH$_2$)$_q$—OC$_{2-6}$heterocycloalkyl,
39) —(CH$_2$)$_q$—O-aryl,
40) —(CH$_2$)$_q$—O-heteroaryl,
41) —OC$_{1-6}$alkyl-C$_{3-6}$cycloalkyl,
42) —OC$_{1-6}$alkyl-C$_{2-6}$heterocycloalkyl,
43) —OC$_{1-6}$alkyl-aryl,
44) —OC$_{1-6}$alkyl-heteroaryl,
45) —S(O)$_m$R$^j$,
46) —C$_{1-6}$alkyl-S(O)$_m$R$^j$,
47) —C(O)R$^d$, and
48) —NR$^k$R$^L$,
wherein each R$^b$ is unsubstituted or substituted with one to six substituents selected from halogen, CF$_3$, OCF$_3$, CN, CH$_2$CF$_3$, CF$_2$CH$_3$, —C$_{1-6}$alkyl, and —OC$_{1-6}$alkyl;
R$^c$ is selected from:
 1) —C$_{1-6}$alkyl,
 2) OH,
 3) halogen, and
 4) —OC$_{1-6}$alkyl,
wherein alkyl can be unsubstituted or substituted with one to three halogens;
R$^d$ is selected from:
 1) hydrogen,
 2) C$_{1-6}$alkyl,
 3) C$_{3-6}$cycloalkyl,
 4) aryl, and
 5) heteroaryl;
R$^e$ is selected from:
 1) hydrogen, and
 2) C$_{1-6}$alkyl;
R$^f$ is selected from:
 1) —C$_{1-6}$alkyl,
 2) OH,
 3) halogen, and
 4) —OC$_{1-6}$alkyl,
wherein alkyl can be unsubstituted or substituted with one to three halogens;
R$^g$ is selected from:
 1) —C$_{1-6}$alkyl,
 2) OH,
 3) halogen, and
 4) —OC$_{1-6}$alkyl,
wherein alkyl can be unsubstituted or substituted with one to three halogens;
R$^h$ is selected from:
 1) hydrogen, and
 2) C$_{1-6}$alkyl;
R$^i$ is selected from:
 1) hydrogen,
 2) C$_{1-6}$alkyl,
 3) C$_{3-6}$cycloalkyl,
 4) aryl, and
 5) heteroaryl;
R$_j$ is selected from:
 1) hydrogen,
 2) C$_{1-6}$alkyl,
 3) C$_{3-6}$alkenyl,
 4) C$_{3-6}$alkynyl,
 5) C$_{3-6}$cycloalkyl,
 6) C$_{2-5}$cycloheteroalkyl,
 7) aryl, and
 8) heteroaryl;
R$^k$ is selected from:
 1) hydrogen, and
 2) C$_{1-6}$alkyl;
R$^L$ is selected from:
 1) hydrogen,
 2) C$_{1-6}$alkyl,
 3) C$_{3-6}$cycloalkyl,
 4) aryl, and
 5) heteroaryl;
m is independently selected from 0 to 2;
n is independently selected from 2 to 6;
p is independently selected from 0 to 3;
q is independently selected from 0 to 3;
r is independently selected from 0 to 2; and
s is independently selected from 0 to 6.

The invention has numerous embodiments, which are summarized below. The invention includes the compounds as shown, and also includes individual diastereoisomers, enantiomers, and epimers of the compounds, and mixtures of diastereoisomers and/or enantiomers thereof including racemic mixtures.

In one embodiment of the present invention, one of A and B is selected from: aryl, and heteroaryl, wherein aryl and heteroaryl are unsubstituted or substituted with one to five substituents selected from R$^a$, and the other of A and B is selected from: aryl, heteroaryl, —C$_{1-6}$alkyl-aryl, —C$_{3-8}$cycloalkyl-aryl, —C$_{2-8}$cycloheteroalkyl-aryl, —C$_{1-6}$alkyl-heteroaryl, —C$_{3-8}$cycloalkyl-heteroaryl, —C$_{2-8}$cycloheteroalkyl-heteroaryl, —C$_{1-6}$alkyl-O-aryl, —C$_{1-6}$alkyl-O-heteroaryl, C$_{3-12}$cycloalkyl, C$_{2-12}$cycloheteroalkyl, —C$_{1-6}$alkyl-C$_{3-12}$cycloalkyl, —C$_{1-6}$alkyl-C$_{2-12}$cycloheteroalkyl, —C$_{1-6}$alkyl-O—C$_{3-12}$cycloalkyl, —C$_{1-6}$alkyl-O—C$_{2-12}$cycloheteroalkyl, —C$_{0-6}$alkyl-aryl fused to a C$_{4-6}$cycloalkyl or C$_{4-6}$cycloheteroalkyl containing 1-3 heteroatoms independently selected from O, S and N(R$^h$)$_2$, —C$_{0-6}$alkyl-aryl fused to a C$_{4-6}$cycloalkenyl or C$_{4-6}$cycloheteroalkenyl containing 1-3 heteroatoms independently selected from O, S and N(R$^h$)$_2$, —C$_{0-6}$alkyl-heteroaryl fused to C$_{4-6}$cycloalkyl or C$_{4-6}$cycloheteroalkyl containing 1-3 heteroatoms independently selected from O, S and N(R$^h$)$_2$, and —C$_{0-6}$alkyl-heteroaryl fused to C$_{4-6}$cycloalkenyl or C$_{4-6}$cycloheteroalkenyl containing 1-3 heteroatoms independently selected from O, S and N(R$^h$)$_2$, wherein alkyl, cycloalkyl, cycloheteroalkyl, cycloalkenyl, aryl and heteroaryl are unsubstituted or substituted with one to five substituents selected from R$^b$.

In another embodiment, one of A and B is selected from: aryl, and heteroaryl, wherein aryl and heteroaryl are unsubstituted or substituted with one to five substituents selected from R$^a$, and the other of A and B is selected from: aryl, heteroaryl, —C$_{1-6}$alkyl-aryl, —C$_{1-6}$alkyl-heteroaryl, —C$_{1-6}$alkyl-O-aryl, —C$_{1-6}$alkyl-O-heteroaryl, C$_{3-12}$cycloalkyl, C$_{2-12}$cycloheteroalkyl, —C$_{1-6}$alkyl-C$_{3-12}$cycloalkyl, and —C$_{1-6}$alkyl-C$_{2-12}$cycloheteroalkyl, wherein alkyl, cycloalkyl, cycloheteroalkyl, cycloalkenyl, aryl and heteroaryl are unsubstituted or substituted with one to five substituents selected from R$^b$.

In another embodiment, one of A and B is selected from: aryl, and heteroaryl, wherein aryl and heteroaryl are unsubstituted or substituted with one to five substituents selected from R$^a$, and the other of A and B is selected from: aryl, heteroaryl, —C$_{1-6}$alkyl-aryl, —C$_{1-6}$alkyl-O-aryl, —C$_{1-6}$alkyl-O-heteroaryl, $C_{3-12}$cycloalkyl, $C_{2-12}$cycloheteroalkyl, and —$C_{1-6}$alkyl-$C_{3-12}$cycloalkyl, wherein alkyl, cycloalkyl, cycloheteroalkyl, aryl and heteroaryl are unsubstituted or substituted with one to five substituents selected from $R^b$.

In another embodiment, one of A and B is selected from: phenyl, and pyridine, wherein aryl and heteroaryl are unsubstituted or substituted with one to five substituents selected from $R^a$, and the other of A and B is selected from: phenyl, naphthalene, pyridine, pyrazole, thiazole, pyrimidine, pyridazine, imidazole, oxazole, indazole, thiophene, —$CH_2$-phenyl, —$(CH_2)_2$-phenyl, —$CH_2$—O-phenyl, —$CH_2$—O-pyridine, adamantane, cubane, cyclopropane, cyclobutane, cyclopentane, cyclohexane, cycloheptane, bicyclo[2.2.1]heptane, bicyclo[3.1.0]-hexane, bicyclo[1.1.1]pentane, piperidine, pyrrolidine, tetrahydropyran, and —$CH_2$-cyclohexane, wherein alkyl, cycloalkyl, cycloheteroalkyl, cycloalkenyl, aryl and heteroaryl are unsubstituted or substituted with one to five substituents selected from $R^b$.

In another embodiment, one of A and B is selected from: aryl, and heteroaryl, wherein aryl and heteroaryl are unsubstituted or substituted with one to five substituents selected from $R^a$, and the other of A and B is selected from: aryl, and heteroaryl, wherein aryl and heteroaryl are unsubstituted or substituted with one to five substituents selected from $R^b$.

In another embodiment, one of A and B is selected from: phenyl, and pyridine, wherein aryl and heteroaryl are unsubstituted or substituted with one to five substituents selected from $R^a$, and the other of A and B is selected from: phenyl, naphthalene, pyridine, pyrazole, thiazole, pyrimidine, pyridazine, imidazole, oxazole, indazole, and thiophene, wherein aryl and heteroaryl are unsubstituted or substituted with one to five substituents selected from $R^b$.

In another embodiment, one of A and B is selected from: phenyl, and pyridine, wherein each phenyl and pyridine is unsubstituted or substituted with one to five substituents selected from $R^a$, and the other of A and B is selected from: phenyl, pyridine, pyrazole, and thiazole, wherein each phenyl, pyridine, pyrazole and thiazole is unsubstituted or substituted with one to five substituents selected from $R^b$.

In one embodiment of the present invention, A is selected from the group consisting of: aryl, and heteroaryl, wherein each aryl and heteroaryl is unsubstituted or substituted with one to five substituents selected from $R^a$. In a class of this embodiment, A is substituted with 0-4 substituents selected from $R^a$. In another class of this embodiment, A is substituted with 0-3 substituents selected from $R^a$. In another class of this embodiment, A is substituted with 0-2 substituents selected from $R^a$.

In another embodiment, A is selected from the group consisting of: phenyl, and pyridine, wherein each phenyl and pyridine is unsubstituted or substituted with one to five substituents selected from $R^a$. In a class of this embodiment, A is substituted with 0-4 substituents selected from $R^a$. In another class of this embodiment, A is substituted with 0-3 substituents selected from $R^a$. In another class of this embodiment, A is substituted with 0-2 substituents selected from $R^a$.

In another embodiment, A is aryl, wherein each aryl is unsubstituted or substituted with one to five substituents selected from $R^a$. In a class of this embodiment, A is substituted with 0-4 substituents selected from $R^a$. In another class of this embodiment, A is substituted with 0-3 substituents selected from $R^a$. In another class of this embodiment, A is substituted with 0-2 substituents selected from $R^a$.

In another embodiment, A is phenyl, wherein each phenyl is unsubstituted or substituted with one to five substituents selected from $R^a$. In a class of this embodiment, A is substituted with 0-4 substituents selected from $R^a$. In another class of this embodiment, A is substituted with 0-3 substituents selected from $R^a$. In another class of this embodiment, A is substituted with 0-2 substituents selected from $R^a$.

In another embodiment, A is heteroaryl, wherein each heteroaryl is unsubstituted or substituted with one to five substituents selected from $R^a$. In a class of this embodiment, A is substituted with 0-4 substituents selected from $R^a$. In another class of this embodiment, A is substituted with 0-3 substituents selected from $R^a$. In another class of this embodiment, A is substituted with 0-2 substituents selected from $R^a$.

In another embodiment, A is pyridine, wherein each pyridine is unsubstituted or substituted with one to five substituents selected from $R^a$. In a class of this embodiment, A is substituted with 0-4 substituents selected from $R^a$. In another class of this embodiment, A is substituted with 0-3 substituents selected from $R^a$. In another class of this embodiment, A is substituted with 0-2 substituents selected from $R^a$.

In another embodiment, A is independently selected from the group consisting of: aryl, heteroaryl, —$C_{1-6}$alkyl-aryl, —$C_{3-8}$cycloalkyl-aryl, —$C_{2-8}$cycloheteroalkyl-aryl, —$C_{1-6}$alkyl-heteroaryl, —$C_{3-8}$cycloalkyl-heteroaryl, —$C_{2-8}$cycloheteroalkyl-heteroaryl, —$C_{1-6}$alkyl-O-aryl, —$C_{1-6}$alkyl-O-heteroaryl, $C_{3-12}$cycloalkyl, $C_{2-12}$cycloheteroalkyl, —$C_{1-6}$alkyl-$C_{3-12}$cycloalkyl, —$C_{1-6}$alkyl-$C_{2-12}$cycloheteroalkyl, —$C_{1-6}$alkyl-O—$C_{3-12}$cycloalkyl, —$C_{1-6}$alkyl-O—$C_{2-12}$cycloheteroalkyl, —$C_{0-6}$alkyl-aryl fused to a $C_{4-6}$cycloalkyl or $C_{4-6}$cycloheteroalkyl containing 1-3 heteroatoms independently selected from O, S and $N(R^h)_2$, —$C_{0-6}$alkyl-aryl fused to a $C_{4-6}$cycloalkenyl or $C_{4-6}$cycloheteroalkenyl containing 1-3 heteroatoms independently selected from O, S and $N(R^h)_2$, —$C_{0-6}$alkyl-heteroaryl fused to $C_{4-6}$cycloalkyl or $C_{4-6}$cycloheteroalkyl containing 1-3 heteroatoms independently selected from O, S and $N(R^h)_2$, and —$C_{0-6}$alkyl-heteroaryl fused to $C_{4-6}$cycloalkenyl or $C_{4-6}$cycloheteroalkenyl containing 1-3 heteroatoms independently selected from O, S and $N(R^h)_2$, wherein alkyl, cycloalkyl, cycloheteroalkyl, cycloalkenyl, aryl and heteroaryl are unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment of the present invention, A is independently selected from the group consisting of: aryl, heteroaryl, —$C_{1-6}$alkyl-aryl, —$C_{3-8}$cycloalkyl-aryl, —$C_{2-8}$cyclo-heteroalkyl-aryl, —$C_{1-6}$alkyl-heteroaryl, —$C_{3-8}$cycloalkyl-heteroaryl, —$C_{2-8}$cycloheteroalkyl-heteroaryl, —$C_{1-6}$alkyl-O-aryl, —$C_{1-6}$alkyl-O-heteroaryl, $C_{3-12}$cycloalkyl, $C_{2-12}$cycloheteroalkyl, —$C_{1-6}$alkyl-$C_{3-12}$cycloalkyl, —$C_{1-6}$alkyl-$C_{2-12}$cycloheteroalkyl, —$C_{1-6}$alkyl-O—$C_{3-12}$cycloalkyl, and —$C_{1-6}$alkyl-O—$C_{2-12}$cycloheteroalkyl, wherein alkyl, cycloalkyl, cycloheteroalkyl, aryl and heteroaryl are unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is independently selected from the group consisting of: aryl, heteroaryl, —$C_{1-6}$alkyl-aryl, —$C_{1-6}$alkyl-heteroaryl, —$C_{1-6}$alkyl-O-aryl, —$C_{1-6}$alkyl-O-heteroaryl, $C_{3-12}$cycloalkyl, $C_{2-12}$cycloheteroalkyl, —$C_{1-6}$alkyl-$C_{3-12}$cycloalkyl, and —$C_{1-6}$alkyl-$C_{2-12}$cycloheteroalkyl, wherein alkyl, cycloalkyl, cycloheteroalkyl, aryl and heteroaryl are unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is independently selected from the group consisting of: aryl, heteroaryl, —$C_{1-6}$alkyl-aryl, —$C_{1-6}$alkyl-O-aryl, —$C_{1-6}$alkyl-O-heteroaryl, $C_{3-12}$cycloalkyl, $C_{2-12}$cycloheteroalkyl, and —$C_{1-6}$alkyl-$C_{3-12}$cycloalkyl, wherein alkyl, cycloalkyl, cycloheteroalkyl, aryl and heteroaryl are unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is independently selected from the group consisting of: phenyl, naphthalene, pyridine, pyrazole, thiazole, pyrimidine, pyridazine, imidazole, oxazole, indazole, thiophene, —$CH_2$-phenyl, —$(CH_2)_2$-phenyl, —$CH_2$—O-phenyl, —$CH_2$—O-pyridine, adamantane, cubane, cyclopropane, cyclobutane, cyclopentane, cyclohexane, cycloheptane, bicyclo[2.2.1]-heptane, bicyclo[3.1.0]hexane, bicyclo[1.1.1]pentane, piperidine, pyrrolidine, tetrahydropyran, and —$CH_2$-cyclohexane, wherein alkyl, cycloalkyl, cycloheteroalkyl, aryl and heteroaryl are unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is independently selected from the group consisting of: aryl, and heteroaryl, wherein aryl and heteroaryl are unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is independently selected from the group consisting of: phenyl, naphthalene, pyridine, pyrazole, thiazole, pyrimidine, pyridazine, imidazole, oxazole, indazole, and thiophene, wherein aryl and heteroaryl are unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is independently selected from the group consisting of: phenyl, pyridine, pyrazole, and thiazole, wherein aryl and heteroaryl are unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is aryl, wherein aryl is unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is naphthalene, wherein naphthalene is unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is phenyl, wherein phenyl is unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is heteroaryl, wherein heteroaryl is unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is independently selected from the group consisting of: pyridine, pyrazole, thiazole, pyrimidine, pyridazine, imidazole, oxazole, indazole, and thiophene, wherein heteroaryl is unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is independently selected from the group consisting of: pyrimidine, pyridazine, imidazole, oxazole, indazole, and thiophene, wherein heteroaryl is unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment, A is independently selected from the group consisting of: pyrazole, and thiazole, wherein heteroaryl is unsubstituted or substituted with one to five substituents selected from $R^b$. In a class of this embodiment, A is independently substituted with 0-4 substituents selected from $R^b$. In another class of this embodiment, A is independently substituted with 0-3 substituents selected from $R^b$. In another class of this embodiment, A is independently substituted with 0-2 substituents selected from $R^b$.

In another embodiment of the present invention, B is independently selected from the group consisting of: aryl, heteroaryl, —$C_{1-6}$alkyl-aryl, —$C_{3-8}$cycloalkyl-aryl, —$C_{2-8}$cyclo-heteroalkyl-aryl, —$C_{1-6}$alkyl-heteroaryl, —$C_{3-8}$cycloalkyl-heteroaryl, —$C_{2-8}$cycloheteroalkyl-heteroaryl, —$C_{1-6}$alkyl-O-aryl, —$C_{1-6}$alkyl-O-heteroaryl, $C_{3-12}$cycloalkyl, $C_{2-12}$cycloheteroalkyl, —$C_{1-6}$alkyl-$C_{3-12}$cycloalkyl, —$C_{1-6}$alkyl-$C_{2-12}$cycloheteroalkyl, —$C_{1-6}$alkyl-O—$C_{3-12}$cycloalkyl, —$C_{1-6}$alkyl-O—$C_{2-12}$cycloheteroalkyl, —$C_{0-6}$alkyl-aryl fused to a $C_{4-6}$cycloalkyl or $C_{4-6}$cycloheteroalkyl containing 1-3 heteroatoms independently selected from O, S and N($R^h$)$_2$, —$C_{0-6}$alkyl-aryl fused to a $C_{4-6}$cycloalkenyl or $C_{4-6}$cycloheteroalkenyl containing 1-3 heteroatoms independently selected from O, S and N($R^h$)$_2$, —$C_{0-6}$alkyl-heteroaryl fused to $C_{4-6}$cycloalkyl or $C_{4-6}$cycloheteroalkyl containing 1-3 heteroatoms independently selected from O, S and N($R^h$)$_2$, and —$C_{0-6}$alkyl-heteroaryl fused to $C_{4-6}$cycloalkenyl or $C_{4-6}$cycloheteroalkenyl containing 1-3 heteroatoms independently selected from O, S and N($R^h$)$_2$, wherein alkyl, cycloalkyl, cycloheteroalkyl, cycloalkenyl, aryl and heteroaryl are unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment of the present invention, B is independently selected from the group consisting of: aryl, heteroaryl, —$C_{1-6}$alkyl-aryl, —$C_{3-8}$cycloalkyl-aryl, —$C_{2-8}$cyclo-heteroalkyl-aryl, —$C_{1-6}$alkyl-heteroaryl, —$C_{3-8}$cycloalkyl-heteroaryl, —$C_{2-8}$cycloheteroalkyl-heteroaryl, —$C_{1-6}$alkyl-O-aryl, —$C_{1-6}$alkyl-O-heteroaryl, $C_{3-12}$cycloalkyl, $C_{2-12}$cycloheteroalkyl, —$C_{1-6}$alkyl-$C_{3-12}$cycloalkyl, —$C_{1-6}$alkyl-$C_{2-12}$cycloheteroalkyl, —$C_{1-6}$alkyl-O—$C_{3-12}$cycloalkyl, and —$C_{1-6}$alkyl-O—$C_{2-12}$cycloheteroalkyl, wherein alkyl, cycloalkyl, cycloheteroalkyl, aryl and heteroaryl are unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is independently selected from the group consisting of: aryl, heteroaryl, —$C_{1-6}$alkyl-aryl, —$C_{1-6}$alkyl-heteroaryl, —$C_{1-6}$alkyl-O-aryl, —$C_{1-6}$alkyl-O-heteroaryl, $C_{3-12}$cycloalkyl, $C_{2-12}$cycloheteroalkyl, —$C_{1-6}$alkyl-$C_{3-12}$cycloalkyl, and —$C_{1-6}$alkyl-$C_{2-12}$cycloheteroalkyl, wherein alkyl, cycloalkyl, cycloheteroalkyl, aryl and heteroaryl are unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is independently selected from the group consisting of: aryl, heteroaryl, —$C_{1-6}$alkyl-aryl, —$C_{1-6}$alkyl-O-aryl, —$C_{1-6}$alkyl-O-heteroaryl, $C_{3-12}$cycloalkyl, $C_{2-12}$cycloheteroalkyl, and —$C_{1-6}$alkyl-$C_{3-12}$cycloalkyl, wherein alkyl, cycloalkyl, cycloheteroalkyl, aryl and heteroaryl are unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is independently selected from the group consisting of phenyl, naphthalene, pyridine, pyrazole, thiazole, pyrimidine, pyridazine, imidazole, oxazole, indazole, thiophene, —$CH_2$-phenyl, —$(CH_2)_2$-phenyl, —$CH_2$—O-phenyl, —$CH_2$—O-pyridine, adamantane, cubane, cyclopropane, cyclobutane, cyclopentane, cyclohexane, cycloheptane, bicyclo[2.2.1]-heptane, bicyclo[3.1.0]hexane, bicyclo[1.1.1]pentane, piperidine, pyrrolidine, tetrahydropyran, and —$CH_2$-cyclohexane, wherein alkyl, cycloalkyl, cycloheteroalkyl, aryl and heteroaryl are unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is independently selected from the group consisting of aryl, and heteroaryl, wherein aryl and heteroaryl are unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is independently selected from the group consisting of phenyl, naphthalene, pyridine, pyrazole, thiazole, pyrimidine, pyridazine, imidazole, oxazole, indazole, and thiophene, wherein aryl and heteroaryl are unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is independently selected from the group consisting of phenyl, pyridine, pyrazole, and thiazole, wherein aryl and heteroaryl are unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is aryl, wherein aryl is unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is naphthalene, wherein naphthalene is unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is phenyl, wherein phenyl is unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is heteroaryl, wherein heteroaryl is unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is independently selected from the group consisting of pyridine, pyrazole, thiazole, pyrimidine, pyridazine, imidazole, oxazole, indazole, and thiophene, wherein heteroaryl is unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is independently selected from the group consisting of pyrimidine, pyridazine, imidazole, oxazole, indazole, and thiophene, wherein heteroaryl is unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment, B is independently selected from the group consisting of: pyrazole, and thiazole, wherein heteroaryl is unsubstituted or substituted with one to five substituents selected from $R^b$. In a class of this embodiment, B is independently substituted with 0-4 substituents selected from $R^b$. In another class of this embodiment, B is independently substituted with 0-3 substituents selected from $R^b$. In another class of this embodiment, B is independently substituted with 0-2 substituents selected from $R^b$.

In another embodiment of the present invention, B is selected from the group consisting of: aryl, and heteroaryl, wherein each aryl and heteroaryl is unsubstituted or substituted with one to five substituents selected from $R^a$. In a class of this embodiment, B is substituted with 0-4 substituents selected from $R^a$. In another class of this embodiment, B is substituted with 0-3 substituents selected from $R^a$. In another class of this embodiment, B is substituted with 0-2 substituents selected from $R^a$.

In another embodiment, B is selected from the group consisting of phenyl, and pyridine, wherein each phenyl and pyridine is unsubstituted or substituted with one to five substituents selected from $R^a$. In a class of this embodiment, B is substituted with 0-4 substituents selected from $R^a$. In another class of this embodiment, B is substituted with 0-3 substituents selected from $R^a$. In another class of this embodiment, B is substituted with 0-2 substituents selected from $R^a$.

In another embodiment, B is aryl, wherein each aryl is unsubstituted or substituted with one to five substituents selected from $R^a$. In a class of this embodiment, B is substituted with 0-4 substituents selected from $R^a$. In another class of this embodiment, B is substituted with 0-3 substituents selected from $R^a$. In another class of this embodiment, B is substituted with 0-2 substituents selected from $R^a$.

In another embodiment, B is phenyl, wherein each phenyl is unsubstituted or substituted with one to five substituents selected from $R^a$. In a class of this embodiment, B is substituted with 0-4 substituents selected from $R^a$. In another class of this embodiment, B is substituted with 0-3 substituents selected from $R^a$. In another class of this embodiment, B is substituted with 0-2 substituents selected from $R^a$.

In another embodiment, B is heteroaryl, wherein each heteroaryl is unsubstituted or substituted with one to five substituents selected from $R^a$. In a class of this embodiment, B is substituted with 0-4 substituents selected from $R^a$. In another class of this embodiment, B is substituted with 0-3 substituents selected from $R^a$. In another class of this embodiment, B is substituted with 0-2 substituents selected from $R^a$.

In another embodiment, B is pyridine, wherein each pyridine is unsubstituted or substituted with one to five substituents selected from $R^a$. In a class of this embodiment, B is substituted with 0-4 substituents selected from $R^a$. In another class of this embodiment, B is substituted with 0-3 substituents selected from $R^a$. In another class of this embodiment, B is substituted with 0-2 substituents selected from $R^a$.

In one embodiment of the present invention, $R^1$ is selected from the group consisting of: hydrogen, $-C_{1-6}$alkyl, $-C_{3-6}$alkenyl, $-C_{3-6}$alkynyl, $-C_{3-10}$cycloalkyl, $-C_{2-10}$cycloheteroalkyl, $-C_{1-6}$alkyl-O—$C_{1-6}$alkyl-, $-(CH_2)_sC(O)R^j$, $-(CH_2)_sC(O)NR^eR^j$, $-(CH_2)_nNR^eC(O)R^j$, $-(CH_2)_nNR^eC(O)OR^j$, $-(CH_2)_nNR^eC(O)N(R^e)_2$, $-(CH_2)_nNR^eC(O)NR^eR^j$, $-(CH_2)_nNR^eS(O)_mR^j$, $-(CH_2)_nNR^eS(O)_mN(R^e)_2$, $-(CH_2)_nNR^eS(O)_mNR^eR^j$, and $-(CH_2)_nNR^eR^j$, wherein each $CH_2$, alkyl, alkenyl, alkynyl, cycloalkyl and cycloheteroalkyl is unsubstituted or substituted with one to five substituents selected from $R^c$.

In another embodiment, $R^1$ is selected from the group consisting of: hydrogen, $-C_{1-6}$alkyl, $-C_{3-6}$alkenyl, $-C_{3-6}$alkynyl, $-C_{3-10}$cycloalkyl, $-C_{2-10}$cycloheteroalkyl, and $-C_{1-6}$alkyl-O—$C_{1-6}$alkyl-, wherein each alkyl, alkenyl, alkynyl, cycloalkyl and cycloheteroalkyl is unsubstituted or substituted with one to five substituents selected from $R^c$.

In another embodiment, $R^1$ is selected from the group consisting of: hydrogen, $-C_{1-6}$alkyl, $-C_{3-6}$alkenyl, $-C_{3-6}$alkynyl, $-C_{3-10}$cycloalkyl, and $-C_{2-10}$cycloheteroalkyl, wherein each alkyl, alkenyl, alkynyl, cycloalkyl and cycloheteroalkyl is unsubstituted or substituted with one to five substituents selected from $R^c$.

In another embodiment, $R^1$ is selected from the group consisting of: hydrogen, $-C_{1-6}$alkyl, $-C_{3-10}$cycloalkyl, and $-C_{2-10}$cycloheteroalkyl, wherein each $CH_2$, alkyl, cycloalkyl and cycloheteroalkyl is unsubstituted or substituted with one to five substituents selected from $R^c$.

In another embodiment, $R^1$ is selected from the group consisting of: hydrogen, and $-C_{1-6}$alkyl, wherein each alkyl is unsubstituted or substituted with one to five substituents selected from $R^c$. In another embodiment, $R^1$ is selected from the group consisting of: $-C_{1-6}$alkyl, wherein each alkyl is unsubstituted or substituted with one to five substituents selected from $R^c$. In another embodiment, $R^1$ is hydrogen.

In one embodiment of the present invention, $R^2$ is selected from the group consisting of: hydrogen, —$C_{1-6}$alkyl, —$C_{2-6}$alkenyl, —$C_{2-6}$alkynyl, —$C_{3-10}$cycloalkyl, —$C_{2-10}$cycloheteroalkyl, —$C_{1-6}$alkyl-O—$C_{1-6}$alkyl-, —$(CH_2)_sC(O)R^j$, —$(CH_2)_sC(O)NR^eR^j$, —$(CH_2)_sNR^eC(O)R^j$, —$(CH_2)_sNR^eC(O)OR^j$, —$(CH_2)_sNR^eC(O)N(R^e)_2$, —$(CH_2)_sNR^eC(O)NR^eR^j$, —$(CH_2)_sNR^eS(O)_mR^j$, —$(CH_2)_sNR^eS(O)_mN(R^e)_2$, —$(CH_2)_sNR^eS(O)_mNR^eR^j$, and —$(CH_2)_sNR^eR^j$, wherein each $CH_2$, alkyl, alkenyl, alkynyl, cycloalkyl, and cycloheteroalkyl is unsubstituted or substituted with one to five substituents selected from $R^f$, and wherein $R^2$ and $R^3$ and the carbon atom they are connected to can form a —$C_{3-5}$cycloalkyl ring, or wherein $R^2$ and $R^4$ and the carbon atoms they are connected to can form a —$C_{3-5}$cycloalkyl ring.

In another embodiment, $R^2$ is selected from the group consisting of: hydrogen, —$C_{1-6}$alkyl, —$C_{2-6}$alkenyl, —$C_{2-6}$alkynyl, —$C_{3-10}$cycloalkyl, —$C_{2-10}$cycloheteroalkyl, —$C_{1-6}$alkyl-O—$C_{1-6}$alkyl-, —$(CH_2)_sC(O)R^j$, —$(CH_2)_sC(O)NR^eR^j$, —$(CH_2)_sNR^eC(O)R^j$, —$(CH_2)_sNR^eC(O)OR$, —$(CH_2)_sNR^eC(O)N(R^e)_2$, —$(CH_2)_sNR^eC(O)NR^eR^j$, —$(CH_2)_sNR^eS(O)_mR^j$, —$(CH_2)_sNR^eS(O)_mN(R^e)_2$, —$(CH_2)_sNR^eS(O)_mNR^eR^j$, and —$(CH_2)_sNR^eR^j$, wherein each $CH_2$, alkyl, alkenyl, alkynyl, cycloalkyl, and cycloheteroalkyl is unsubstituted or substituted with one to five substituents selected from $R^f$, and wherein $R^2$ and $R^3$ and the carbon atom they are connected to can form a —$C_{3-5}$cycloalkyl ring.

In another embodiment, $R^2$ is selected from the group consisting of: hydrogen, —$C_{1-6}$alkyl, —$C_{2-6}$alkenyl, —$C_{2-6}$alkynyl, —$C_{3-10}$cycloalkyl, —$C_{2-10}$cycloheteroalkyl, —$C_{1-6}$alkyl-O—$C_{1-6}$alkyl-, —$(CH_2)_sC(O)R^j$, —$(CH_2)_sC(O)NR^eR^j$, —$(CH_2)_sNR^eC(O)R^j$, —$(CH_2)_sNR^eC(O)OR$, —$(CH_2)_sNR^eC(O)N(R^e)_2$, —$(CH_2)_sNR^eC(O)NR^eR^j$, —$(CH_2)_sNR^eS(O)_mR^j$, —$(CH_2)_sNR^eS(O)_mN(R^e)_2$, —$(CH_2)_sNR^eS(O)_mNR^eR^j$, and —$(CH_2)_sNR^eR^j$, wherein each $CH_2$, alkyl, alkenyl, alkynyl, cycloalkyl, and cycloheteroalkyl is unsubstituted or substituted with one to five substituents selected from $R^f$, and wherein $R^2$ and $R^4$ and the carbon atoms they are connected to can form a —$C_{3-5}$cycloalkyl ring.

In another embodiment, $R^2$ is selected from the group consisting of: hydrogen, —$C_{1-6}$alkyl, —$C_{2-6}$alkenyl, —$C_{2-6}$alkynyl, —$C_{3-10}$cycloalkyl, —$C_{2-10}$cycloheteroalkyl, —$C_{1-6}$alkyl-O—$C_{1-6}$alkyl-, —$(CH_2)_sC(O)R^j$, —$(CH_2)_sC(O)NR^eR^j$, —$(CH_2)_sNR^eC(O)R^j$, —$(CH_2)_sNR^eC(O)OR$, —$(CH_2)_sNR^eC(O)N(R^e)_2$, —$(CH_2)_sNR^eC(O)NR^eR^j$, —$(CH_2)_sNR^eS(O)_mR^j$, —$(CH_2)_sNR^eS(O)_mN(R^e)_2$, —$(CH_2)_sNR^eS(O)_mNR^eR^j$, and —$(CH_2)_sNR^eR^j$, wherein each $CH_2$, alkyl, alkenyl, alkynyl, cycloalkyl, and cycloheteroalkyl is unsubstituted or substituted with one to five substituents selected from $R^f$.

In another embodiment, $R^2$ is selected from the group consisting of: hydrogen, —$C_{1-6}$alkyl, —$C_{2-6}$alkenyl, —$C_{2-6}$alkynyl, —$C_{3-10}$cycloalkyl, —$C_{2-10}$cycloheteroalkyl, and —$C_{1-6}$alkyl-O—$C_{1-6}$alkyl-, wherein each alkyl, alkenyl, alkynyl, cycloalkyl, and cycloheteroalkyl is unsubstituted or substituted with one to five substituents selected from $R^f$.

In another embodiment, $R^2$ is selected from the group consisting of: hydrogen, —$C_{1-6}$alkyl, —$C_{2-6}$alkenyl, —$C_{2-6}$alkynyl, —$C_{3-10}$cycloalkyl, and —$C_{2-10}$cycloheteroalkyl, wherein each alkyl, alkenyl, alkynyl, cycloalkyl, and cycloheteroalkyl is unsubstituted or substituted with one to five substituents selected from $R^f$.

In another embodiment, $R^2$ is selected from the group consisting of: hydrogen, —$C_{1-6}$alkyl, —$C_{3-10}$cycloalkyl, and —$C_{2-10}$cycloheteroalkyl, wherein each alkyl, cycloalkyl, and cycloheteroalkyl is unsubstituted or substituted with one to five substituents selected from $R^f$.

In another embodiment, $R^2$ is selected from the group consisting of: hydrogen, and —$C_{1-6}$alkyl, wherein each alkyl is unsubstituted or substituted with one to five substituents selected from $R^f$. In another embodiment, $R^2$ is selected from the group consisting of: hydrogen, and —$CH_3$. In another embodiment, $R^2$ is —$C_{1-6}$alkyl, wherein each alkyl is unsubstituted or substituted with one to five substituents selected from $R^f$ In another embodiment, $R^2$ is —$CH_3$. In another embodiment, $R^2$ is hydrogen.

In one embodiment of the present invention, $R^3$ is selected from the group consisting of: hydrogen, —$C_{1-6}$alkyl, —$C_{2-6}$alkenyl, —$C_{2-6}$alkynyl, —$C_{3-10}$cycloalkyl, —$C_{2-10}$cycloheteroalkyl, —$C_{1-6}$alkyl-O—$C_{1-6}$alkyl-, —$(CH_2)_sC(O)R^j$, —$(CH_2)_sC(O)NR^eR^j$, —$(CH_2)_sNR^eC(O)R^j$, —$(CH_2)_sNR^eC(O)OR^j$, —$(CH_2)_sNR^eC(O)N(R^e)_2$, —$(CH_2)_sNR^eC(O)NR^eR^j$, —$(CH_2)_sNR^eS(O)_mR^j$, —$(CH_2)_sNR^eS(O)_mN(R^e)_2$, —$(CH_2)_sNR^eS(O)_mNR^eR^j$, and —$(CH_2)_sNR^eR^j$, wherein each $CH_2$, alkyl, alkenyl, alkynyl, cycloalkyl, and cycloheteroalkyl is unsubstituted or substituted with one to five substituents selected from $R^g$.

In another embodiment, $R^3$ is selected from the group consisting of: hydrogen, —$C_{1-6}$alkyl, —$C_{2-6}$alkenyl, —$C_{2-6}$alkynyl, —$C_{3-10}$cycloalkyl, —$C_{2-10}$cycloheteroalkyl, and —$C_{1-6}$alkyl-O—$C_{1-6}$alkyl-, wherein each alkyl, alkenyl, alkynyl, cycloalkyl, and cycloheteroalkyl is unsubstituted or substituted with one to five substituents selected from $R^g$.

In another embodiment, $R^3$ is selected from the group consisting of: hydrogen, —$C_{1-6}$alkyl, —$C_{2-6}$alkenyl, —$C_{2-6}$alkynyl, —$C_{3-10}$cycloalkyl, and —$C_{2-10}$cycloheteroalkyl, wherein each alkyl, alkenyl, alkynyl, cycloalkyl, and cycloheteroalkyl is unsubstituted or substituted with one to five substituents selected from $R^g$. In another embodiment, $R^3$ is selected from the group consisting of: hydrogen, —$C_{1-6}$alkyl, —$C_{3-10}$cycloalkyl, and —$C_{2-10}$cycloheteroalkyl, wherein each alkyl, cycloalkyl, and cycloheteroalkyl is unsubstituted or substituted with one to five substituents selected from $R^g$.

In another embodiment, $R^3$ is selected from the group consisting of: hydrogen, and —$C_{1-6}$alkyl, wherein each alkyl is unsubstituted or substituted with one to five substituents selected from $R^g$. In another embodiment, $R^3$ is selected from the group consisting of: hydrogen, and —$CH_3$. In another embodiment, $R^3$ is —$C_{1-6}$alkyl, wherein each alkyl is unsubstituted or substituted with one to five substituents selected from $R^g$. In another embodiment, $R^2$ is —$CH_3$. In another embodiment, $R^3$ is hydrogen.

In one embodiment of the present invention, $R^4$ is selected from the group consisting of: hydrogen, and —$C_{1-6}$alkyl, wherein each alkyl is unsubstituted or substituted with one to five substituents selected from halogen. In another embodiment, $R^4$ is selected from the group consisting of: hydrogen, and —$CH_3$.

In another embodiment, $R^4$ is —$C_{1-6}$alkyl, wherein each alkyl is unsubstituted or substituted with one to five substituents selected from halogen. In another embodiment, $R^4$ is —$CH_3$. In another embodiment, $R^4$ is hydrogen.

In one embodiment of the present invention, $R^5$ is selected from the group consisting of: hydrogen, and —$C_{1-6}$alkyl. In another embodiment, $R^5$ is —$C_{1-6}$alkyl. In another embodiment, $R^5$ is hydrogen.

In one embodiment of the present invention, $R^6$ is selected from the group consisting of: hydrogen, —$C_{1-6}$alkyl, —$C_{2-}$ $_6$alkenyl, and —$C_{2-6}$alkynyl, wherein each alkyl, alkenyl and alkynyl is unsubstituted or substituted with one to five substituents selected from halogen.

In another embodiment, $R^6$ is selected from the group consisting of: hydrogen, and —$C_{1-6}$alkyl, wherein each alkyl is unsubstituted or substituted with one to five substituents selected from halogen. In another embodiment, $R^6$ is selected from the group consisting of: hydrogen, and —$CH_3$, wherein each alkyl is unsubstituted or substituted with one to five substituents selected from halogen.

In another embodiment, $R^6$ is selected from the group consisting of: —$C_{1-6}$alkyl, wherein each alkyl is unsubstituted or substituted with one to five substituents selected from halogen. In another embodiment, $R^6$ is —$CH_3$. In another embodiment, $R^6$ is hydrogen.

In one embodiment of the present invention, each $R^a$ is independently selected from the group consisting of: —$CF_3$, —$OCF_3$, —$CHF_2$, —$OCHF_2$, —$CH_2CF_3$, —$OCH_2CF_3$, —$CF_2CH_3$, CN, oxo, halogen, —$S(O)_2C_{1-6}$alkyl, —$C_{1-6}$alkyl, —$C_{2-6}$alkenyl, —$C_{2-6}$alkynyl, —O—$C_{1-6}$alkyl, —$C_{3-6}$cycloalkyl, —O—$C_{3-6}$cycloalkyl, —$C_{2-6}$cycloheteroalkyl, aryl, heteroaryl, —$C_{1-6}$alkyl-aryl, —$C_{1-6}$alkyl-heteroaryl, —$C_{1-6}$alkyl-$C_{3-6}$cycloalkyl, —$C_{1-6}$alkyl-$C_{2-6}$cycloheteroalkyl, —$C_{2-6}$alkenyl-$C_{3-6}$cycloalkyl, —$C_{2-6}$alkenyl-$C_{2-6}$cycloheteroalkyl, —$C_{2-6}$alkenyl-aryl, —$C_{2-6}$alkenyl-heteroaryl, —$C_{2-6}$alkynyl-$C_{3-6}$cycloalkyl, —$C_{2-6}$alkynyl-$C_{2-6}$cycloheteroalkyl, —$C_{2-6}$alkynyl-aryl, —$C_{2-6}$alkynyl-heteroaryl, —OH, —$(CH_2)_p$—$OC_{1-6}$alkyl, —$(CH_2)_p$—$OC_{2-6}$alkenyl, —$(CH_2)_p$—$OC_{2-6}$alkynyl, —$(CH_2)_p$—$OC_{3-6}$cycloalkyl, —$(CH_2)_p$—$OC_{2-6}$heterocycloalkyl, —$(CH_2)_p$—O-aryl, —$(CH_2)_p$—O-heteroaryl, —$OC_{1-6}$alkyl-$C_{3-6}$cycloalkyl, —$OC_{1-6}$alkyl-$C_{2-6}$heterocycloalkyl, —$OC_{1-6}$alkyl-aryl, —$OC_{1-6}$alkyl-heteroaryl, —$S(O)_mR^j$, —$C_{1-6}$alkyl-$S(O)_mR^j$, —$N(R^k)_2$, and —$NR^kR^L$, wherein each $R^a$ is unsubstituted or substituted with one to six substituents selected from halogen, $CF_3$, OH, —$C_{1-6}$alkyl, and —$OC_{1-6}$alkyl.

In another embodiment, each $R^a$ is independently selected from the group consisting of: —$CF_3$, —$OCF_3$, —$CHF_2$, —$OCHF_2$, —$CH_2CF_3$, —$OCH_2CF_3$, —$CF_2CH_3$, CN, oxo, halogen, —$S(O)_2C_{1-6}$alkyl, —$C_{1-6}$alkyl, —$C_{2-6}$alkenyl, —$C_{2-6}$alkynyl, —O—$C_{1-6}$alkyl, —$C_{3-6}$cycloalkyl, —O—$C_{3-6}$cycloalkyl, —$C_{2-6}$cycloheteroalkyl, aryl, heteroaryl, —$C_{1-6}$alkyl-aryl, —$C_{1-6}$alkyl-heteroaryl, —$C_{1-6}$alkyl-$C_{3-6}$cycloalkyl, —$C_{1-6}$alkyl-$C_{2-6}$cycloheteroalkyl, —$C_{2-6}$alkenyl-$C_{3-6}$cycloalkyl, —$C_{2-6}$alkenyl-$C_{2-6}$cycloheteroalkyl, —$C_{2-6}$alkenyl-aryl, —$C_{2-6}$alkenyl-heteroaryl, —$C_{2-6}$alkynyl-$C_{3-6}$cycloalkyl, —$C_{2-6}$alkynyl-$C_{2-6}$cycloheteroalkyl, —$C_{2-6}$alkynyl-aryl, —$C_{2-6}$alkynyl-heteroaryl, and —OH, wherein each $R^a$ is unsubstituted or substituted with one to six substituents selected from halogen, $CF_3$, OH, —$C_{1-6}$alkyl, and —$OC_{1-6}$alkyl.

In another embodiment, each $R^a$ is independently selected from the group consisting of: —$CF_3$, —$OCF_3$, —$CHF_2$, —$OCHF_2$, —$CH_2CF_3$, —$OCH_2CF_3$, —$CF_2CH_3$, CN, oxo, halogen, —$S(O)_2C_{1-6}$alkyl, —$C_{1-6}$alkyl, —$C_{2-6}$alkenyl, —$C_{2-6}$alkynyl, —O—$C_{1-6}$alkyl, —$C_{3-6}$cycloalkyl, —O—$C_{3-6}$cycloalkyl, —$C_{2-6}$cycloheteroalkyl, aryl, heteroaryl, and —OH, wherein each $R^a$ is unsubstituted or substituted with one to six substituents selected from halogen, $CF_3$, OH, —$C_{1-6}$alkyl, and —$OC_{1-6}$alkyl. In another embodiment, each $R^a$ is independently selected from the group consisting of: —$CF_3$, —$OCF_3$, —$CHF_2$, —$OCHF_2$, —$CH_2CF_3$, —$OCH_2CF_3$, —$CF_2CH_3$, CN, halogen, —$S(O)_2C_{1-6}$alkyl, —$C_{1-6}$alkyl, —$C_{2-6}$alkenyl, —$C_{2-6}$alkynyl, —O—$C_{1-6}$alkyl, —$C_{3-6}$cycloalkyl, —O—$C_{3-6}$cycloalkyl, —$C_{2-6}$cycloheteroalkyl, aryl, and heteroaryl, wherein each $R^a$ is unsubstituted or substituted with one to six substituents selected from halogen, $CF_3$, OH, —$C_{1-6}$alkyl, and —$OC_{1-6}$alkyl.

In another embodiment, each $R^a$ is independently selected from the group consisting of: —$CF_3$, —$OCF_3$, —$CHF_2$, —$OCHF_2$, —$CH_2CF_3$, —$OCH_2CF_3$, —$CF_2CH_3$, CN, halogen, —$S(O)_2C_{1-6}$alkyl, —$C_{1-6}$alkyl, —$C_{3-6}$cycloalkyl, —$C_{2-6}$cycloheteroalkyl, aryl, and heteroaryl, wherein each $R^a$ is unsubstituted or substituted with one to six substituents selected from halogen, $CF_3$, OH, —$C_{1-6}$alkyl, and —$OC_{1-6}$alkyl. In another embodiment, each $R^a$ is independently selected from the group consisting of: —$CF_3$, —$OCF_3$, —$CHF_2$, —$OCHF_2$, —$CH_2CF_3$, —$OCH_2CF_3$, —$CF_2CH_3$, CN, halogen, and —$C_{1-6}$alkyl, wherein each $R^a$ is unsubstituted or substituted with one to six substituents selected from halogen, $CF_3$, OH, —$C_{1-6}$alkyl, and —$OC_{1-6}$alkyl.

In another embodiment, each $R^a$ is independently selected from the group consisting of: —$CF_3$, —$OCF_3$, CN, and halogen. In another embodiment, each $R^a$ is independently selected from the group consisting of: —$CF_3$, —$OCF_3$, CN, F, and Cl. In another embodiment, each $R^a$ is halogen. In another embodiment, each $R^a$ is independently selected from the group consisting of: F, and Cl.

In one embodiment of the present invention, each $R^b$ is independently selected from the group consisting of: —$CF_3$, —$OCF_3$, —$CHF_2$, —$OCHF_2$, —$CH_2CF_3$, —$OCH_2CF_3$, —$CF_2CH_3$, CN, oxo, halogen, —$S(O)_2C_{1-6}$alkyl, —$C_{1-6}$alkyl, —$C_{2-6}$alkenyl, —$C_{2-6}$alkynyl, —O—$C_{1-6}$alkyl, —$C_{3-6}$cycloalkyl, —O—$C_{3-6}$cycloalkyl, —$C_{2-6}$cycloheteroalkyl, aryl, heteroaryl, —$C_{1-6}$alkyl-aryl, —$C_{1-6}$alkyl-heteroaryl, —$C_{1-6}$alkyl-$C_{3-6}$cycloalkyl, —$C_{1-6}$alkyl-$C_{2-6}$cycloheteroalkyl, —$C_{2-6}$alkenyl-$C_{3-6}$cycloalkyl, —$C_{2-6}$alkenyl-$C_{2-6}$cycloheteroalkyl, —$C_{2-6}$alkenyl-aryl, —$C_{2-6}$alkenyl-heteroaryl, —$C_{2-6}$alkynyl-$C_{3-6}$cycloalkyl, —$C_{2-6}$alkynyl-$C_{2-6}$cycloheteroalkyl, —$C_{2-6}$alkynyl-aryl, —$C_{2-6}$alkynyl-heteroaryl, —OH, —$(CH_2)_q$—$OC_{1-6}$alkyl, —$(CH_2)_q$—$OC_{2-6}$alkenyl, —$(CH_2)_q$—$OC_{2-6}$alkynyl, —$(CH_2)_q$—$OC_{3-6}$cycloalkyl, —$(CH_2)_q$—$OC_{2-6}$heterocycloalkyl, —$(CH_2)_q$—O-aryl, —$(CH_2)_q$—O-heteroaryl, —$OC_{1-6}$alkyl-$C_{3-6}$cycloalkyl, —$OC_{1-6}$alkyl-$C_{2-6}$heterocycloalkyl, —$OC_{1-6}$alkyl-aryl, —$OC_{1-6}$alkyl-heteroaryl, —$S(O)_mR^i$, —$C_{1-6}$alkyl-$S(O)_mR^i$, —$C(O)R^d$, and —$NR^kR^L$, wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl.

In another embodiment, each $R^b$ is independently selected from the group consisting of: —$CF_3$, —$OCF_3$, —$CHF_2$, —$OCHF_2$, —$CH_2CF_3$, —$OCH_2CF_3$, —$CF_2CH_3$, CN, oxo, halogen, —$S(O)_2C_{1-6}$alkyl, —$C_{1-6}$alkyl, —$C_{2-6}$alkenyl, —$C_{2-6}$alkynyl, —O—$C_{1-6}$alkyl, —$C_{3-6}$cycloalkyl, —O—$C_{3-6}$cycloalkyl, —$C_{2-6}$cycloheteroalkyl, aryl, heteroaryl, —$C_{1-6}$alkyl-aryl, —$C_{1-6}$alkyl-heteroaryl, —$C_{1-6}$alkyl-$C_{3-6}$cycloalkyl, —$C_{1-6}$alkyl-$C_{2-6}$cycloheteroalkyl, —$C_{2-6}$alkenyl-$C_{3-6}$cycloalkyl, —$C_{2-6}$alkenyl-$C_{2-6}$cycloheteroalkyl, —$C_{2-6}$alkenyl-aryl, —$C_{2-6}$alkenyl-heteroaryl, —$C_{2-6}$alkynyl-$C_{3-6}$cycloalkyl, —$C_{2-6}$alkynyl-$C_{2-6}$cycloheteroalkyl, —$C_{2-6}$alkynyl-aryl, —$C_{2-6}$alkynyl-heteroaryl, and —OH, wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl.

In another embodiment, each $R^b$ is independently selected from the group consisting of: —$CF_3$, —$OCF_3$, —$CHF_2$, —$OCHF_2$, —$CH_2CF_3$, —$OCH_2CF_3$, —$CF_2CH_3$, CN, oxo, halogen, —$S(O)_2C_{1-6}$alkyl, —$C_{1-6}$alkyl, —$C_{2-6}$alkenyl, —$C_{2-6}$alkynyl, —O—$C_{1-6}$alkyl, —$C_{3-6}$cycloalkyl, —O—$C_{3-6}$cycloalkyl, —$C_{2-6}$cycloheteroalkyl, aryl, heteroaryl, —$C_{1-6}$alkyl-aryl, —$C_{1-6}$alkyl-heteroaryl, —$C_{1-6}$alkyl-$C_{3-6}$cycloalkyl, —$C_{1-6}$alkyl-$C_{2-6}$cycloheteroalkyl, and —OH, wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl.

In another embodiment, each $R^b$ is independently selected from the group consisting of: —$CF_3$, —$OCF_3$, —$CHF_2$, —$OCHF_2$, —$CH_2CF_3$, —$OCH_2CF_3$, —$CF_2CH_3$, CN, halogen, —$S(O)_2C_{1-6}$alkyl, —$C_{1-6}$alkyl, —$C_{2-6}$alkenyl, —O—$C_{1-6}$alkyl, —$C_{3-6}$cycloalkyl, —$C_{2-6}$cycloheteroalkyl, aryl, and heteroaryl, wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl. In another embodiment, each $R^b$ is independently selected from the group consisting of: —$CF_3$, —$OCF_3$, —$CHF_2$, —$OCHF_2$, —$CH_2CF_3$, —$OCH_2CF_3$, CN, halogen, —$S(O)_2C_{1-6}$alkyl, —$C_{1-6}$alkyl, —O—$C_{1-6}$alkyl, —$C_{3-6}$cycloalkyl, and aryl, wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl. In another embodiment, each $R^b$ is independently selected from the group consisting of: —$CF_3$, —$OCF_3$, —$CHF_2$, —$OCHF_2$, —$CH_2CF_3$, —$OCH_2CF_3$, CN, F, Cl, —$S(O)_2CH_3$, —$CH_3$, —$CH(CH_3)_2$, —$C(CH_3)_3$, —$OCH_3$, cyclopropyl, and phenyl, wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl.

In another embodiment, each $R^b$ is independently selected from the group consisting of: —$CF_3$, —$OCH_2CF_3$, and halogen. In another embodiment, each $R^b$ is independently selected from the group consisting of —$CF_3$, —$OCH_2CF_3$, F, and Cl.

In one embodiment of the present invention, $R^c$ is selected from: —$C_{1-6}$alkyl, OH, halogen, and —$OC_{1-6}$alkyl, wherein alkyl can be unsubstituted or substituted with one to three halogens. In another embodiment, $R^c$ is selected from: —$C_{1-6}$alkyl, OH, and halogen, wherein alkyl can be unsubstituted or substituted with one to three halogens. In another embodiment, $R^c$ is selected from: OH, and halogen. In a class of this embodiment, $R^c$ is selected from: OH, and F. In another embodiment, $R^c$ is OH. In another embodiment, $R^c$ is halogen. In a class of this embodiment, $R^c$ is F.

In one embodiment of the present invention, $R^d$ is selected from: hydrogen, $C_{1-6}$alkyl, $C_{3-6}$cycloalkyl, aryl, and heteroaryl. In another embodiment, $R^d$ is selected from: hydrogen, $C_{1-6}$alkyl, and $C_{3-6}$cycloalkyl. In another embodiment, $R^d$ is selected from: hydrogen, and $C_{1-6}$alkyl. In another embodiment, $R^d$ is hydrogen. In another embodiment, $R^d$ is $C_{1-6}$alkyl.

In one embodiment of the present invention, $R^e$ is selected from: hydrogen and $C_{1-6}$alkyl. In another embodiment, $R^e$ is hydrogen. In another embodiment, $R^e$ is $C_{1-6}$alkyl.

In one embodiment of the present invention, $R^f$ is selected from: —$C_{1-6}$alkyl, OH, halogen, and —$OC_{1-6}$alkyl, wherein alkyl can be unsubstituted or substituted with one to three halogens. In another embodiment, $R^f$ is selected from: —$C_{1-6}$alkyl, OH, and halogen, wherein alkyl can be unsubstituted or substituted with one to three halogens. In another embodiment, $R^f$ is selected from: OH, and halogen. In a class of this embodiment, $R^f$ is selected from: OH, and F. In another embodiment, $R^f$ is OH. In another embodiment, $R^f$ is halogen. In a class of this embodiment, $R^f$ is F.

In one embodiment of the present invention, $R^g$ is selected from: —$C_{1-6}$alkyl, OH, halogen, and —$OC_{1-6}$alkyl, wherein alkyl can be unsubstituted or substituted with one to three halogens. In another embodiment, $R^g$ is selected from: —$C_{1-6}$alkyl, OH, and halogen, wherein alkyl can be unsubstituted or substituted with one to three halogens. In another embodiment, $R^g$ is selected from: OH, and halogen. In a class of this embodiment, $R^g$ is selected from: OH, and F. In another embodiment, $R^g$ is OH. In another embodiment, $R^g$ is halogen. In a class of this embodiment, $R^g$ is F.

In one embodiment of the present invention, $R^h$ is selected from: hydrogen and $C_{1-6}$alkyl. In another embodiment, $R^h$ is hydrogen. In another embodiment, $R^h$ is $C_{1-6}$alkyl.

In one embodiment of the present invention, $R^i$ is selected from: hydrogen, $C_{1-6}$alkyl, $C_{3-6}$cycloalkyl, aryl, and heteroaryl. In another embodiment, $R^i$ is selected from: hydrogen, $C_{1-6}$alkyl, and $C_{3-6}$cycloalkyl. In another embodiment, $R^i$ is selected from: hydrogen and $C_{1-6}$alkyl. In another embodiment, $R^i$ is hydrogen. In another embodiment, $R^i$ is $C_{1-6}$alkyl.

In one embodiment of the present invention, $R^j$ is selected from: hydrogen, $C_{1-6}$alkyl, $C_{3-6}$alkenyl, $C_{3-6}$alkynyl, $C_{3-6}$cycloalkyl, $C_{2-5}$cycloheteroalkyl, aryl, and heteroaryl. In another embodiment, $R^j$ is selected from: hydrogen, $C_{1-6}$alkyl, $C_{3-6}$alkenyl, $C_{3-6}$alkynyl, $C_{3-6}$cycloalkyl, and $C_{2-5}$cycloheteroalkyl. In another embodiment, $R^j$ is selected from: hydrogen, $C_{1-6}$alkyl, $C_{3-6}$alkenyl, $C_{3-6}$alkynyl, and $C_{3-6}$cycloalkyl. In another embodiment, $R^j$ is selected from: hydrogen, $C_{1-6}$alkyl, $C_{3-6}$alkenyl, and $C_{3-6}$alkynyl. In another embodiment, $R^j$ is selected from: hydrogen, $C_{1-6}$alkyl, and $C_{3-6}$alkenyl. In another embodiment, $R^j$ is selected from: hydrogen, and $C_{1-6}$alkyl. In another embodiment, $R^j$ is $C_{1-6}$alkyl. In another embodiment, $R^j$ is hydrogen.

In one embodiment of the present invention, $R^k$ is selected from: hydrogen and $C_{1-6}$alkyl. In another embodiment, $R^k$ is hydrogen. In another embodiment, $R^k$ is $C_{1-6}$alkyl.

In one embodiment of the present invention, $R^L$ is selected from: hydrogen, $C_{1-6}$alkyl, $C_{3-6}$cycloalkyl, aryl, and heteroaryl. In another embodiment, $R^L$ is selected from: hydrogen, $C_{1-6}$alkyl, and $C_{3-6}$cycloalkyl. In another embodiment, $R^L$ is selected from: hydrogen, and $C_{1-6}$alkyl. In another embodiment, $R^L$ is hydrogen. In another embodiment, $R^L$ is $C_{1-6}$alkyl.

In one embodiment of the present invention, m is 0, 1 or 2. In another embodiment, m is 0 or 1. In another embodiment, m is 0 or 2. In another embodiment, m is 0. In another embodiment, m is 1. In another embodiment, m is 2.

In one embodiment of the present invention, n is 2, 3, 4, 5 or 6. In another embodiment, n is 2, 3, 4, or 5. In another embodiment, n is 2, 3, or 4. In another embodiment, n is 2 or 3. In another embodiment, n is 2 or 4. In another embodiment, n is 2, 3, 4, or 5. In another embodiment, n is 3. In another embodiment, n is 4. In another embodiment, n is 5. In another embodiment, n is 6.

In one embodiment of the present invention, p is 0, 1, 2 or 3. In another embodiment, p is 0, 1 or 2. In another embodiment, p is 0, 1 or 3. In another embodiment, p is 1, 2 or 3. In another embodiment, p is 1 or 2. In another embodiment, p is 1 or 3. In another embodiment, p is 0 or 1. In another embodiment, p is 0 or 2. In another embodiment, p is 0 or 3. In another embodiment, p is 0. In another embodiment, p is 1. In another embodiment, p is 2. In another embodiment, p is 3.

In one embodiment of the present invention, q is 0, 1, 2 or 3. In another embodiment, q is 1, 2 or 3. In another embodiment, q is 0, 1 or 2. In another embodiment, q is 0, 1 or 3. In another embodiment, q is 0, or 1. In another embodiment, q is 0 or 2. In another embodiment, q is 0. In another embodiment, q is 1. In another embodiment, q is 2. In another embodiment, q is 3.

In one embodiment of the present invention, r is 0, 1 or 2. In another embodiment, r is 1 or 2. In another embodiment, r is 0 or 1. In another embodiment, r is 0 or 2. In another embodiment, r is 0. In another embodiment, r is 1. In another embodiment, r is 2.

In one embodiment of the present invention, s is 0, 1, 2, 3, 4, 5 or 6. In another embodiment, s is 0, 1, 2, 3, 4, or 5. In another embodiment, s is 1, 2, 3, 4, 5 or 6. In another embodiment, s is 1, 2, 3, 4 or 5. In another embodiment, s is 0, 1, 2, 3, or 4. In another embodiment, s is 1, 2, 3, or 4. In another embodiment, s is 0, 1, 2, or 3. In another embodiment, s is 1, 2, or 3. In another embodiment, s is 0, 1 or 2. In another embodiment, s is 1 or 2. In another embodiment, s is 0. In another embodiment, s is 1. In another embodiment, s is 2. In another embodiment, s is 3. In another embodiment, s is 4. In another embodiment, s is 5. In another embodiment, s is 6.

In another embodiment of the present invention, the invention relates to compounds of structural formula Ia:

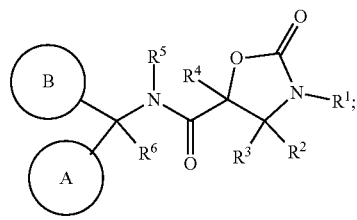

Ia wherein A is aryl; or a pharmaceutically acceptable salt thereof.

In another embodiment of the present invention, the invention relates to compounds of structural formula Ib:

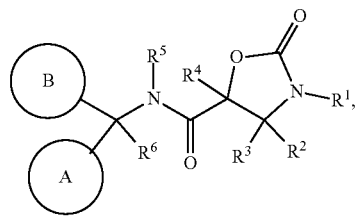

Ib wherein A is heteroaryl; or a pharmaceutically acceptable salt thereof.

In another embodiment of the present invention, the invention relates to compounds of structural formula Ic:

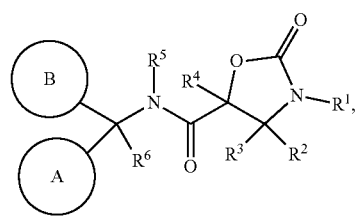

Ic wherein A is phenyl; or a pharmaceutically acceptable salt thereof.

In another embodiment of the present invention, the invention relates to compounds of structural formula Id:

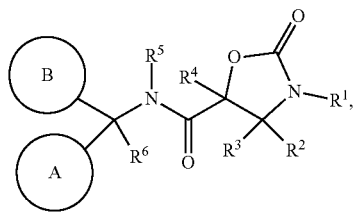

Id wherein A is pyridine; or a pharmaceutically acceptable salt thereof.

In another embodiment of the present invention, the invention relates to compounds of structural formula Ie:

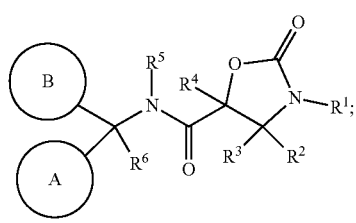

Ie wherein B is aryl; or a pharmaceutically acceptable salt thereof.

In another embodiment of the present invention, the invention relates to compounds of structural formula If:

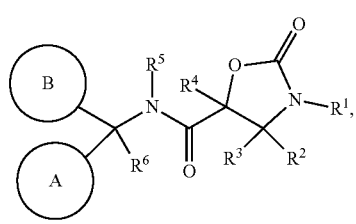

If wherein B is heteroaryl; or a pharmaceutically acceptable salt thereof.

In another embodiment of the present invention, the invention relates to compounds of structural formula Ig:

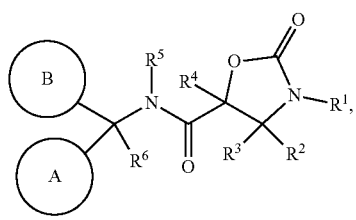

Ig wherein B is phenyl; or a pharmaceutically acceptable salt thereof.

In another embodiment of the present invention, the invention relates to compounds of structural formula Ih:

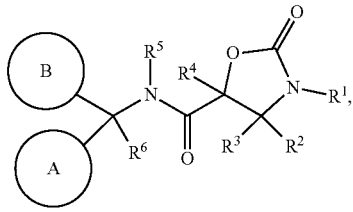

Ih wherein B is pyridine; or a pharmaceutically acceptable salt thereof.

The compound of structural formula I, includes the compounds of structural formulas Ia, Ib, Ic, Id, Ie, If, Ig, and Ih, and pharmaceutically acceptable salts, hydrates and solvates thereof.

Another embodiment of the present invention relates to compounds of structural formula I wherein:
A is selected from the group consisting of
  1) aryl, and
  2) heteroaryl,
  wherein each aryl and heteroaryl is unsubstituted or substituted with one to five substituents selected from $R^a$;
B is independently selected from the group consisting of
  1) aryl,
  2) heteroaryl,
  3) —$C_{1-6}$alkyl-aryl,
  4) —$C_{3-8}$cycloalkyl-aryl,
  5) —$C_{2-8}$cycloheteroalkyl-aryl,
  6) —$C_{1-6}$alkyl-heteroaryl,
  7) —$C_{3-8}$cycloalkyl-heteroaryl,
  8) —$C_{2-8}$cycloheteroalkyl-heteroaryl,
  9) —$C_{1-6}$alkyl-O-aryl,
  10) —$C_{1-6}$alkyl-O-heteroaryl,
  11) $C_{3-12}$cycloalkyl,
  12) $C_{2-12}$cycloheteroalkyl,
  13) —$C_{1-6}$alkyl-$C_{3-12}$cycloalkyl,
  14) —$C_{1-6}$alkyl-$C_{2-12}$cycloheteroalkyl,
  15) —$C_{1-6}$alkyl-O—$C_{3-12}$cycloalkyl,
  16) —$C_{1-6}$alkyl-O—$C_{2-12}$cycloheteroalkyl,
  17) —$C_{0-6}$alkyl-aryl fused to a $C_{4-6}$cycloalkyl or $C_{4-6}$cycloheteroalkyl containing 1-3 heteroatoms independently selected from O, S and $N(R^h)_2$,
  18) —$C_{0-6}$alkyl-aryl fused to a $C_{4-6}$cycloalkenyl or $C_{4-6}$cycloheteroalkenyl containing 1-3 heteroatoms independently selected from O, S and $N(R^h)_2$,
  19) —$C_{0-6}$alkyl-heteroaryl fused to $C_{4-6}$cycloalkyl or $C_{4-6}$cycloheteroalkyl containing 1-3 heteroatoms independently selected from O, S and $N(R^h)_2$, and
  20) —$C_{0-6}$alkyl-heteroaryl fused to $C_{4-6}$cycloalkenyl or $C_{4-6}$cycloheteroalkenyl containing 1-3 heteroatoms independently selected from O, S and $N(R^h)_2$,
  wherein alkyl, cycloalkyl, cycloheteroalkyl, cycloalkenyl, aryl and heteroaryl are unsubstituted or substituted with one to five substituents selected from $R^b$;
$R^1$ is selected from the group consisting of:
  1) hydrogen,
  2) —$C_{1-6}$alkyl,
  3) —$C_{3-6}$alkenyl,
  4) —$C_{3-6}$alkynyl,
  5) —$C_{3-10}$cycloalkyl,
  6) —$C_{2-10}$cycloheteroalkyl,
  7) —$C_{1-6}$alkyl-O—$C_{1-6}$alkyl-,
  8) —$(CH_2)_sC(O)R^j$,
  9) —$(CH_2)_sC(O)NR^eR^j$,
  10) —$(CH_2)_nNR^eC(O)R^j$,
  11) —$(CH_2)_nNR^eC(O)OR^j$,
  12) —$(CH_2)_nNR^eC(O)N(R^e)_2$,
  13) —$(CH_2)_nNR^eC(O)NR^eR^j$,
  14) —$(CH_2)_nNR^eS(O)_mR^j$,
  15) —$(CH_2)_nNR^eS(O)_mN(R^e)_2$,
  16) —$(CH_2)_nNR^eS(O)_mNR^eR^j$, and
  17) —$(CH_2)_nNR^eR^j$,
  wherein each $CH_2$, alkyl, alkenyl, alkynyl, cycloalkyl and cycloheteroalkyl is unsubstituted or substituted with one to five substituents selected from $R^c$;
$R^2$ is selected from the group consisting of:
  1) hydrogen,
  2) —$C_{1-6}$alkyl,
  3) —$C_{2-6}$alkenyl,
  4) —$C_{2-6}$alkynyl,
  5) —$C_{3-10}$cycloalkyl,
  6) —$C_{2-10}$cycloheteroalkyl,
  7) —$C_{1-6}$alkyl-O—$C_{1-6}$alkyl-,
  8) —$(CH_2)_sC(O)R^j$,
  9) —$(CH_2)_sC(O)NR^eR^j$,
  10) —$(CH_2)_sNR^eC(O)R^j$,
  11) —$(CH_2)_sNR^eC(O)OR^j$,
  12) —$(CH_2)_sNR^eC(O)N(R^e)_2$,
  13) —$(CH_2)_sNR^eC(O)NR^eR^j$,
  14) —$(CH_2)_sNR^eS(O)_mR^j$,
  15) —$(CH_2)_sNR^eS(O)_mN(R^e)_2$,
  16) —$(CH_2)_sNR^eS(O)_mNR^eR^j$, and
  17) —$(CH_2)_sNR^eR^j$,
  wherein each $CH_2$, alkyl, alkenyl, alkynyl, cycloalkyl, and cycloheteroalkyl is unsubstituted or substituted with one to five substituents selected from $R^f$;
$R^3$ is selected from the group consisting of:
  1) hydrogen,
  2) —$C_{1-6}$alkyl,
  3) —$C_{2-6}$alkenyl,
  4) —$C_{2-6}$alkynyl,
  5) —$C_{3-10}$cycloalkyl,
  6) —$C_{2-10}$cycloheteroalkyl,
  7) —$C_{1-6}$alkyl-O—$C_{1-6}$alkyl-,
  8) —$(CH_2)_sC(O)R^j$,
  9) —$(CH_2)_sC(O)NR^eR^j$,
  10) —$(CH_2)_sNR^eC(O)R^j$,
  11) —$(CH_2)_sNR^eC(O)OR^j$,
  12) —$(CH_2)_sNR^eC(O)N(R^e)_2$,
  13) —$(CH_2)_sNR^eC(O)NR^eR^j$,
  14) —$(CH_2)_sNR^eS(O)_mR^j$,
  15) —$(CH_2)_sNR^eS(O)_mN(R^e)_2$,
  16) —$(CH_2)_sNR^eS(O)_mNR^eR^j$, and
  17) —$(CH_2)_sNR^eR^j$,
  wherein each $CH_2$, alkyl, alkenyl, alkynyl, cycloalkyl, and cycloheteroalkyl is unsubstituted or substituted with one to five substituents selected from $R^g$;
$R^4$ is selected from the group consisting of:
  1) hydrogen, and
  2) —$C_{1-6}$alkyl,
  wherein each alkyl is unsubstituted or substituted with one to five substituents selected from halogen;
$R^5$ is selected from the group consisting of:
  1) hydrogen, and
  2) —$C_{1-6}$alkyl;

$R^6$ is selected from the group consisting of:
  1) hydrogen,
  2) —$C_{1-6}$alkyl,
  3) —$C_{2-6}$alkenyl, and
  4) —$C_{2-6}$alkynyl,
wherein each alkyl, alkenyl and alkynyl is unsubstituted or substituted with one to five substituents selected from halogen;
each $R^a$ is independently selected from the group consisting of:
  1) —$CF_3$,
  2) —$OCF_3$,
  3) —$CHF_2$,
  4) —$OCHF_2$,
  5) —$CH_2CF_3$,
  6) —$OCH_2CF_3$,
  7) —$CF_2CH_3$;
  8) CN,
  9) oxo,
  10) halogen,
  11) —$S(O)_2C_{1-6}$alkyl,
  12) —$C_{1-6}$alkyl,
  13) —$C_{2-6}$alkenyl,
  14) —$C_{2-6}$alkynyl,
  15) —$C_{3-6}$cycloalkyl,
  16) —$C_{2-6}$cycloheteroalkyl,
  17) aryl,
  18) heteroaryl,
  19) —$C_{1-6}$alkyl-aryl,
  20) —$C_{1-6}$alkyl-heteroaryl,
  21) —$C_{1-6}$alkyl-$C_{3-6}$cycloalkyl,
  22) —$C_{1-6}$alkyl-$C_{2-6}$cycloheteroalkyl,
  23) —$C_{2-6}$alkenyl-$C_{3-6}$cycloalkyl,
  24) —$C_{2-6}$alkenyl-$C_{2-6}$cycloheteroalkyl,
  25) —$C_{2-6}$alkenyl-aryl,
  26) —$C_{2-6}$alkenyl-heteroaryl,
  27) —$C_{2-6}$alkynyl-$C_{3-6}$cycloalkyl,
  28) —$C_{2-6}$alkynyl-$C_{2-6}$cycloheteroalkyl,
  29) —$C_{2-6}$alkynyl-aryl,
  30) —$C_{2-6}$alkynyl-heteroaryl,
  31) —OH,
  32) —$(CH_2)_p$—$OC_{1-6}$alkyl,
  33) —$(CH_2)_p$—$OC_{2-6}$alkenyl,
  34) —$(CH_2)_p$—$OC_{2-6}$alkynyl,
  35) —$(CH_2)_p$—$OC_{3-6}$cycloalkyl,
  36) —$(CH_2)_p$—$OC_{2-6}$heterocycloalkyl,
  37) —$(CH_2)_p$—O-aryl,
  38) —$(CH_2)_p$—O-heteroaryl,
  39) —$OC_{1-6}$alkyl-$C_{3-6}$cycloalkyl,
  40) —$OC_{1-6}$alkyl-$C_{2-6}$heterocycloalkyl,
  41) —$OC_{1-6}$alkyl-aryl,
  42) —$OC_{1-6}$alkyl-heteroaryl,
  43) —$S(O)_mR^j$,
  44) —$C_{1-6}$alkyl-$S(O)_mR^j$,
  45) —$N(R^k)_2$, and
  46) —$NR^kR^L$,
wherein each $R^a$ is unsubstituted or substituted with one to six substituents selected from halogen, $CF_3$, OH, —$C_{1-6}$alkyl, and —$OC_{1-6}$alkyl;
each $R^b$ is independently selected from the group consisting of:
  1) —$CF_3$,
  2) —$OCF_3$,
  3) —$CHF_2$,
  4) —$OCHF_2$,
  5) —$CH_2CF_3$,
  6) —$OCH_2CF_3$,
  7) —$CF_2CH_3$;
  8) CN,
  9) oxo,
  10) halogen,
  11) —$S(O)_2C_{1-6}$alkyl,
  12) —$C_{1-6}$alkyl,
  13) —$C_{2-6}$alkenyl,
  14) —$C_{2-6}$alkynyl,
  15) —O—$C_{1-6}$alkyl,
  16) —$C_{3-6}$cycloalkyl,
  17) —O—$C_{3-6}$cycloalkyl,
  18) —$C_{2-6}$cycloheteroalkyl,
  19) aryl,
  20) heteroaryl,
  21) —$C_{1-6}$alkyl-aryl,
  22) —$C_{1-6}$alkyl-heteroaryl,
  23) —$C_{1-6}$alkyl-$C_{3-6}$cycloalkyl,
  24) —$C_{1-6}$alkyl-$C_{2-6}$cycloheteroalkyl,
  25) —$C_{2-6}$alkenyl-$C_{3-6}$cycloalkyl,
  26) —$C_{2-6}$alkenyl-$C_{2-6}$cycloheteroalkyl,
  27) —$C_{2-6}$alkenyl-aryl,
  28) —$C_{2-6}$alkenyl-heteroaryl,
  29) —$C_{2-6}$alkynyl-$C_{3-6}$cycloalkyl,
  30) —$C_{2-6}$alkynyl-$C_{2-6}$cycloheteroalkyl,
  31) —$C_{2-6}$alkynyl-aryl,
  32) —$C_{2-6}$alkynyl-heteroaryl,
  33) —OH,
  34) —$(CH_2)_q$—$OC_{1-6}$alkyl,
  35) —$(CH_2)_q$—$OC_{2-6}$alkenyl,
  36) —$(CH_2)_q$—$OC_{2-6}$alkynyl,
  37) —$(CH_2)_q$—$OC_{3-6}$cycloalkyl,
  38) —$(CH_2)_q$—$OC_{2-6}$heterocycloalkyl,
  39) —$(CH_2)_q$—O-aryl,
  40) —$(CH_2)_q$—O-heteroaryl,
  41) —$OC_{1-6}$alkyl-$C_{3-6}$cycloalkyl,
  42) —$OC_{1-6}$alkyl-$C_{2-6}$heterocycloalkyl,
  43) —$OC_{1-6}$alkyl-aryl,
  44) —$OC_{1-6}$alkyl-heteroaryl,
  45) —$S(O)_mR^j$,
  46) —$C_{1-6}$alkyl-$S(O)_mR^j$,
  47) —$C(O)R^d$, and
  48) —$NR^kR^L$,
wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl;
$R^c$ is selected from:
  1) —$C_{1-6}$alkyl,
  2) OH,
  3) halogen, and
  4) —$OC_{1-6}$alkyl,
wherein alkyl can be unsubstituted or substituted with one to three halogens;
$R^d$ is selected from:
  1) hydrogen,
  2) $C_{1-6}$alkyl,
  3) $C_{3-6}$cycloalkyl,
  4) aryl, and
  5) heteroaryl;
$R^e$ is selected from:
  1) hydrogen, and
  2) $C_{1-6}$alkyl;
$R^f$ is selected from:
  1) —$C_{1-6}$alkyl,
  2) OH,
  3) halogen, and
  4) —$OC_{1-6}$alkyl, wherein alkyl can be unsubstituted or substituted with one to three halogens;
$R^g$ is selected from:
1) —$C_{1-6}$alkyl,
2) OH,
3) halogen, and
4) —$OC_{1-6}$alkyl,
wherein alkyl can be unsubstituted or substituted with one to three halogens;
$R^h$ is selected from:
1) hydrogen, and
2) $C_{1-6}$alkyl;
$R^i$ is selected from:
1) hydrogen,
2) $C_{1-6}$alkyl,
3) $C_{3-6}$cycloalkyl,
4) aryl, and
5) heteroaryl;
$R^j$ is selected from:
1) hydrogen,
2) $C_{1-6}$alkyl,
3) $C_{3-6}$alkenyl,
4) $C_{3-6}$alkynyl,
5) $C_{3-6}$cycloalkyl,
6) $C_{2-5}$cycloheteroalkyl,
7) aryl, and
8) heteroaryl;
$R^k$ is selected from:
1) hydrogen, and
2) $C_{1-6}$alkyl;
$R^L$ is selected from:
1) hydrogen,
2) $C_{1-6}$alkyl,
3) $C_{3-6}$cycloalkyl,
4) aryl, and
5) heteroaryl;
m is independently selected from 0 to 2;
n is independently selected from 2 to 6;
p is independently selected from 0 to 3;
q is independently selected from 0 to 3;
r is independently selected from 0 to 2; and
s is independently selected from 0 to 6;
or a pharmaceutically acceptable salt thereof.

Another embodiment of the present invention relates to compounds of structural formula I wherein:
A is selected from the group consisting of:
1) aryl, and
2) heteroaryl,
wherein each aryl and heteroaryl is unsubstituted or substituted with one to five substituents selected from $R^a$;
B is independently selected from the group consisting of:
1) aryl,
2) heteroaryl,
3) —$C_{1-6}$alkyl-aryl,
4) —$C_{1-6}$alkyl-O-aryl,
5) —$C_{1-6}$alkyl-O-heteroaryl,
6) $C_{3-12}$cycloalkyl,
7) $C_{2-12}$cycloheteroalkyl, and
8) —$C_{1-6}$alkyl-$C_{3-12}$cycloalkyl,
wherein alkyl, cycloalkyl, cycloheteroalkyl, aryl and heteroaryl are unsubstituted or substituted with one to five substituents selected from $R^b$;

$R^1$ is selected from the group consisting of:
1) hydrogen, and
2) —$C_{1-6}$alkyl,
wherein each alkyl is unsubstituted or substituted with one to five substituents selected from $R^c$;
$R^2$ is selected from the group consisting of:
1) hydrogen, and
2) —$C_{1-6}$alkyl,
wherein each alkyl is unsubstituted or substituted with one to five substituents selected from $R^f$;
$R^3$ is selected from the group consisting of:
1) hydrogen, and
2) —$C_{1-6}$alkyl,
wherein each alkyl is unsubstituted or substituted with one to five substituents selected from $R^g$;
$R^4$ is selected from the group consisting of:
1) hydrogen, and
2) —$C_{1-6}$alkyl,
wherein each alkyl is unsubstituted or substituted with one to five substituents selected from halogen;
$R^5$ is hydrogen;
$R^6$ is selected from the group consisting of:
1) hydrogen, and
2) —$C_{1-6}$alkyl,
wherein each alkyl is unsubstituted or substituted with one to five substituents selected from halogen;
each $R^a$ is independently selected from the group consisting of:
1) —$CF_3$,
2) —$OCF_3$,
3) —$CHF_2$,
4) —$OCHF_2$,
5) —$CH_2CF_3$,
6) —$OCH_2CF_3$,
7) —$CF_2CH_3$,
8) CN,
9) halogen, and
10) —$C_{1-6}$alkyl,
wherein each $R^a$ is unsubstituted or substituted with one to six substituents selected from halogen, $CF_3$, OH, —$C_{1-6}$alkyl, and —$OC_{1-6}$alkyl;
each $R^b$ is independently selected from the group consisting of:
1) —$CF_3$,
2) —$OCF_3$,
3) —$CHF_2$,
4) —$OCHF_2$,
5) —$CH_2CF_3$,
6) —$OCH_2CF_3$,
7) CN,
8) halogen,
9) —$S(O)_2C_{1-6}$alkyl,
10) —$C_{1-6}$alkyl,
11) —O—$C_{1-6}$alkyl,
12) —$C_{3-6}$cycloalkyl, and
13) aryl,
wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl;
or a pharmaceutically acceptable salt thereof.

Another embodiment of the present invention relates to compounds of structural formula I wherein:
A is selected from the group consisting of:
1) aryl, and
2) heteroaryl, wherein each aryl and heteroaryl is unsubstituted or substituted with one to five substituents selected from $R^a$;

B is independently selected from the group consisting of:
1) aryl, and
2) heteroaryl, wherein aryl and heteroaryl are unsubstituted or substituted with one to five substituents selected from $R^b$;

$R^1$, $R^2$, $R^3$, $R^4$, $R^5$, and $R^6$ are hydrogen; each $R^a$ is independently selected from the group consisting of:
1) —$CF_3$,
2) —$OCF_3$,
3) CN, and
4) halogen;

each $R^b$ is independently selected from the group consisting of:
1) —$CF_3$,
2) —$OCH_2CF_3$, and
3) halogen;

or a pharmaceutically acceptable salt thereof.

Illustrative, but non-limiting, examples of the compounds of the present invention that are useful as inhibitors of $Na_v1.8$ channel activity are the following compounds:

1) (S)—N—((R)-(3-chloro-4-fluorophenyl)(5-fluoro-6-(2,2,2-trifluoroethoxy)pyridin-2-yl)methyl)-2-oxooxazolidine-5-carboxamide;
2) (S)—N—((S)-(3-chloro-4-fluorophenyl)(5-fluoro-6-(2,2,2-trifluoroethoxy)pyridin-2-yl)methyl)-2-oxooxazolidine-5-carboxamide;
3) (S)—N—((R)-(5-chloro-6-(trifluoromethyl)pyridin-2-yl)(4-chlorophenyl)methyl)-2-oxooxazolidine-5-carboxamide;
4) (S)—N—((S)-(5-chloro-6-(trifluoromethyl)pyridin-2-yl)(4-chlorophenyl)methyl)-2-oxooxazolidine-5-carboxamide;
5) (S)—N—((R)-bicyclo[2.2.1]heptan-1-yl(4-chlorophenyl)methyl)-2-oxooxazolidine-5-carboxamide;
6) (S)—N—((S)-bicyclo[2.2.1]heptan-1-yl(4-chlorophenyl)methyl)-2-oxooxazolidine-5-carboxamide;
7) (S)—N—((R)-(4-chlorophenyl)(3-(trifluoromethyl)bicyclo[1.1.1]pentan-1-yl)methyl)-2-oxooxazolidine-5-carboxamide;
8) (S)—N—((S)-(4-chlorophenyl)(3-(trifluoromethyl)bicyclo[1.1.1]pentan-1-yl)methyl)-2-oxooxazolidine-5-carboxamide;
9) (S)—N—((R)-(3-chloro-4-fluorophenyl)(5-(trifluoromethyl)-1H-pyrazol-3-yl)methyl)-2-oxooxazolidine-5-carboxamide;
10) (S)—N—((S)-(3-chloro-4-fluorophenyl)(5-(trifluoromethyl)-1H-pyrazol-3-yl)methyl)-2-oxooxazolidine-5-carboxamide;
11) (cis)-N-(bis(4-chlorophenyl)methyl)-4-methyl-2-oxooxazolidine-5-carboxamide;
12) (trans)-N-(bis(4-chlorophenyl)methyl)-4-methyl-2-oxooxazolidine-5-carboxamide;
13) (R)—N-(bis(4-chlorophenyl)methyl)-5-methyl-2-oxooxazolidine-5-carboxamide;
14) (S)—N-(bis(4-chlorophenyl)methyl)-5-methyl-2-oxooxazolidine-5-carboxamide;
15) (S)—N—((R)-2-(3-chloro-4-fluorophenoxy)-1-(3-chloro-4-fluorophenyl)ethyl)-2-oxo-oxazolidine-5-carboxamide;
16) (S)—N—((S)-2-(3-chloro-4-fluorophenoxy)-1-(3-chloro-4-fluorophenyl)ethyl)-2-oxo-oxazolidine-5-carboxamide;
17) (S)—N—((R)-(3-chloro-2,4-difluorophenyl)((2S,5R)-5-(trifluoromethyl)tetrahydro-2H-pyran-2-yl)methyl)-2-oxooxazolidine-4-carboxamide;
18) (S)—N—((R)-(3-chloro-2,4-difluorophenyl)((2R,5S)-5-(trifluoromethyl)tetrahydro-2H-pyran-2-yl)methyl)-2-oxooxazolidine-4-carboxamide;
19) (S)—N—((S)-(3-chloro-2,4-difluorophenyl)((2S,5R)-5-(trifluoromethyl)tetrahydro-2H-pyran-2-yl)methyl)-2-oxooxazolidine-4-carboxamide;
20) (S)—N—((S)-(3-chloro-2,4-difluorophenyl)((2R,5S)-5-(trifluoromethyl)tetrahydro-2H-pyran-2-yl)methyl)-2-oxooxazolidine-4-carboxamide;
21) (S)—N-(bis(3-chloro-4-fluorophenyl)methyl)-2-oxooxazolidine-5-carboxamide;
22) (S)—N—((R)-(4-chlorophenyl)(2-(trifluoromethyl)pyrimidin-4-yl)methyl)-2-oxo-oxazolidine-5-carboxamide;
23) (S)—N—((S)-(4-chlorophenyl)(2-(trifluoromethyl)pyrimidin-4-yl)methyl)-2-oxo-oxazolidine-5-carboxamide;
24) (S)—N—((R)-(4-chlorophenyl)(4-(trifluoromethyl)thiazol-2-yl)methyl)-2-oxo-oxazolidine-5-carboxamide;
25) (S)—N—((S)-(4-chlorophenyl)(4-(trifluoromethyl)thiazol-2-yl)methyl)-2-oxo-oxazolidine-5-carboxamide;
26) (S)—N—((R)-(3-chloro-4-fluorophenyl)(5-chloropyridin-3-yl)methyl)-2-oxo-oxazolidine-5-carboxamide;
27) (S)—N—((S)-(3-chloro-4-fluorophenyl)(5-chloropyridin-3-yl)methyl)-2-oxo-oxazolidine-5-carboxamide;
28) (S)—N—((R)-(4-chlorophenyl)(1H-indazol-3-yl)methyl)-2-oxooxazolidine-5-carboxamide;
29) (S)—N—((S)-(4-chlorophenyl)(1H-indazol-3-yl)methyl)-2-oxooxazolidine-5-carboxamide;
30) (S)—N—((R)-(4-chlorophenyl)(6-(difluoromethyl)-5-fluoropyridin-2-yl)methyl)-2-oxooxazolidine-5-carboxamide;
31) (S)—N—((S)-(4-chlorophenyl)(6-(difluoromethyl)-5-fluoropyridin-2-yl)methyl)-2-oxooxazolidine-5-carboxamide;
32) (S)—N—((R)-(4-chlorophenyl)(2-(trifluoromethyl)-1H-imidazol-4-yl)methyl)-2-oxo-oxazolidine-5-carboxamide;
33) (S)—N—((S)-(4-chlorophenyl)(2-(trifluoromethyl)-1H-imidazol-4-yl)methyl)-2-oxo-oxazolidine-5-carboxamide;
34) (S)—N—((R)-(4-chlorophenyl)(2-(trifluoromethyl)oxazol-4-yl)methyl)-2-oxo-oxazolidine-5-carboxamide;
35) (S)—N—((S)-(4-chlorophenyl)(2-(trifluoromethyl)oxazol-4-yl)methyl)-2-oxo-oxazolidine-5-carboxamide;
36) (S)—N—((R)-(3-chloro-4-fluorophenyl)(4-chlorophenyl)methyl)-2-oxooxazolidine-5-carboxamide;
37) (S)—N—((S)-(3-chloro-4-fluorophenyl)(4-chlorophenyl)methyl)-2-oxooxazolidine-5-carboxamide;
38) (5S)—N-((3,5-dichlorophenyl)(phenyl)methyl)-2-oxooxazolidine-5-carboxamide;
39) (5S)—N-((adamantan-2-yl)(phenyl)methyl)-2-oxooxazolidine-5-carboxamide;
40) (S)—N—((R)-(4-chlorophenyl)(6-methoxypyridin-3-yl)methyl)-2-oxooxazolidine-5-carboxamide;
41) (S)—N—((S)-(4-chlorophenyl)(6-methoxypyridin-3-yl)methyl)-2-oxooxazolidine-5-carboxamide;
42) (S)—N—((R)-(4-chlorophenyl)(5-fluoropyridin-2-yl)methyl)-2-oxooxazolidine-5-carboxamide;
43) (S)—N—((S)-(4-chlorophenyl)(5-fluoropyridin-2-yl)methyl)-2-oxooxazolidine-5-carboxamide;
44) (5S)—N-((4-chlorophenyl)(thiophen-2-yl)methyl)-2-oxooxazolidine-5-carboxamide;
45) (S)—N—((R)-(3,4-dichlorophenyl)(phenyl)methyl)-2-oxooxazolidine-5-carboxamide;

46) (S)—N—((S)-(3,4-dichlorophenyl)(phenyl)methyl)-2-oxooxazolidine-5-carboxamide;
47) (5S)—N—((R)-(3-chlorophenyl)((cis)-2-phenylcyclopropyl)methyl)-2-oxooxazolidine-5-carboxamide;
48) (5S)—N—((R)-(3-chlorophenyl)((trans)-2-phenylcyclopropyl)methyl)-2-oxooxazolidine-5-carboxamide;
49) (5S)—N—((S)-(3-chlorophenyl)((cis)-2-phenylcyclopropyl)methyl)-2-oxooxazolidine-5-carboxamide;
50) (5S)—N—((S)-(3-chlorophenyl)((trans)-2-phenylcyclopropyl)methyl)-2-oxooxazolidine-5-carboxamide;
51) (5S)—N-((4-chlorophenyl)(3-(methylsulfonyl)phenyl)methyl)-2-oxooxazolidine-5-carboxamide;
52) (S)—N—((R)-(5-chloro-2-methoxyphenyl)(3-chlorophenyl)methyl)-2-oxooxazolidine-5-carboxamide;
53) (S)—N—((S)-(5-chloro-2-methoxyphenyl)(3-chlorophenyl)methyl)-2-oxooxazolidine-5-carboxamide;
54) (S)—N—((R)-(4-chlorophenyl)(2,3-difluorophenyl)methyl)-2-oxooxazolidine-5-carboxamide;
55) (S)—N—((S)-(4-chlorophenyl)(2,3-difluorophenyl)methyl)-2-oxooxazolidine-5-carboxamide;
56) (5S)—N-((4-chlorophenyl)(naphthalen-1-yl)methyl)-2-oxooxazolidine-5-carboxamide;
57) (5S)—N-((4-chlorophenyl)(naphthalen-2-yl)methyl)-2-oxooxazolidine-5-carboxamide;
58) (S)—N—((R)-(4-chlorophenyl)(3-isopropylphenyl)methyl)-2-oxooxazolidine-5-carboxamide;
59) (S)—N—((S)-(4-chlorophenyl)(3-isopropylphenyl)methyl)-2-oxooxazolidine-5-carboxamide;
60) (S)—N—((R)-(4-chlorophenyl)(3-cyclopropylphenyl)methyl)-2-oxooxazolidine-5-carboxamide;
61) (S)—N—((S)-(4-chlorophenyl)(3-cyclopropylphenyl)methyl)-2-oxooxazolidine-5-carboxamide;
62) (5S)—N-((4-chlorophenyl)(2-(trifluoromethyl)pyridin-4-yl)methyl)-2-oxooxazolidine-5-carboxamide;
63) (S)—N—((R)-(4-chloro-3-(trifluoromethyl)phenyl)(4-chlorophenyl)methyl)-2-oxooxazolidine-5-carboxamide;
64) (S)—N—((S)-(4-chloro-3-(trifluoromethyl)phenyl)(4-chlorophenyl)methyl)-2-oxooxazolidine-5-carboxamide;
65) (5S)—N-((4-chlorophenyl)(6-(difluoromethoxy)pyridin-3-yl)methyl)-2-oxooxazolidine-5-carboxamide;
66) (S)—N—((R)-(4-chlorophenyl)(5-(trifluoromethyl)pyridin-2-yl)methyl)-2-oxo-oxazolidine-5-carboxamide;
67) (S)—N—((S)-(4-chlorophenyl)(5-(trifluoromethyl)pyridin-2-yl)methyl)-2-oxo-oxazolidine-5-carboxamide;
68) (5S)—N-((3-chloro-4-fluorophenyl)(5-fluoro-6-(trifluoromethyl)pyridin-2-yl)methyl)-2-oxooxazolidine-5-carboxamide;
69) (S)—N—((R)-(4-(tert-butyl)thiazol-2-yl)(4-chlorophenyl)methyl)-2-oxooxazolidine-5-carboxamide;
70) (S)—N—((S)-(4-(tert-butyl)thiazol-2-yl)(4-chlorophenyl)methyl)-2-oxooxazolidine-5-carboxamide;
71) (5S)—N-((4-chlorophenyl)(4-(trifluoromethyl)-1H-imidazol-2-yl)methyl)-2-oxo-oxazolidine-5-carboxamide;
72) (S)—N-(1,1-bis(4-chlorophenyl)ethyl)-2-oxooxazolidine-5-carboxamide;
73) (S)—N—((R)-(4-chlorophenyl)(1-(2,2,2-trifluoroethyl)piperidin-4-yl)methyl)-2-oxooxazolidine-5-carboxamide;
74) (S)—N—((S)-(4-chlorophenyl)(1-(2,2,2-trifluoroethyl)piperidin-4-yl)methyl)-2-oxo-oxazolidine-5-carboxamide;
75) (S)—N—((R)-(3-chloro-4-fluorophenyl)((R)-1-(2,2,2-trifluoroethyl)pyrrolidin-3-yl)methyl)-2-oxooxazolidine-5-carboxamide;
76) (S)—N—((R)-(3-chloro-4-fluorophenyl)((S)-1-(2,2,2-trifluoroethyl)pyrrolidin-3-yl)methyl)-2-oxooxazolidine-5-carboxamide;
77) (S)—N—((S)-(3-chloro-4-fluorophenyl)((R)-1-(2,2,2-trifluoroethyl)pyrrolidin-3-yl)methyl)-2-oxooxazolidine-5-carboxamide;
78) (S)—N—((S)-(3-chloro-4-fluorophenyl)((S)-1-(2,2,2-trifluoroethyl)pyrrolidin-3-yl)methyl)-2-oxooxazolidine-5-carboxamide;
79) (S)—N—((R)-(3-chloro-4-fluorophenyl)(2-(trifluoromethyl)thiazol-4-yl)methyl)-2-oxooxazolidine-5-carboxamide;
80) (S)—N—((S)-(3-chloro-4-fluorophenyl)(2-(trifluoromethyl)thiazol-4-yl)methyl)-2-oxooxazolidine-5-carboxamide;
81) (5S)—N-((4-chlorophenyl)(cycloheptyl)methyl)-2-oxooxazolidine-5-carboxamide;
82) (S)—N—((R)-(4-chloro-3-methylphenyl)(4-chlorophenyl)methyl)-2-oxooxazolidine-5-carboxamide;
83) (S)—N—((S)-(4-chloro-3-methylphenyl)(4-chlorophenyl)methyl)-2-oxooxazolidine-5-carboxamide;
84) (S)—N—((R)-(4-chloro-2-(trifluoromethoxy)phenyl)(4-chlorophenyl)methyl)-2-oxooxazolidine-5-carboxamide;
85) (S)—N—((S)-(4-chloro-2-(trifluoromethoxy)phenyl)(4-chlorophenyl)methyl)-2-oxo-oxazolidine-5-carboxamide;
86) (S)—N—((R)-(3-chloro-4-fluorophenyl)(4-(difluoromethoxy)phenyl)methyl)-2-oxo-oxazolidine-5-carboxamide;
87) (S)—N—((S)-(3-chloro-4-fluorophenyl)(4-(difluoromethoxy)phenyl)methyl)-2-oxo-oxazolidine-5-carboxamide;
88) (S)—N—((R)-(3-chloro-4-fluorophenyl)(6-(trifluoromethyl)pyridin-2-yl)methyl)-2-oxooxazolidine-5-carboxamide;
89) (S)—N—((S)-(3-chloro-4-fluorophenyl)(6-(trifluoromethyl)pyridin-2-yl)methyl)-2-oxooxazolidine-5-carboxamide;
90) (S)—N—((R)-(3-chloro-2,4-difluorophenyl)(6-(2,2,2-trifluoroethoxy)pyridin-3-yl)methyl)-2-oxooxazolidine-5-carboxamide;
91) (S)—N—((S)-(3-chloro-2,4-difluorophenyl)(6-(2,2,2-trifluoroethoxy)pyridin-3-yl)methyl)-2-oxooxazolidine-5-carboxamide;
92) (S)—N—((R)-(3-chloro-4-(trifluoro-methoxy)phenyl)(2-(trifluoromethyl)oxazol-4-yl)methyl)-2-oxooxazolidine-5-carboxamide;
93) (S)—N—((S)-(3-chloro-4-(trifluoro-methoxy)phenyl)(2-(trifluoromethyl)oxazol-4-yl)methyl)-2-oxooxazolidine-5-carboxamide;
94) (S)—N—((R)-(3-chloro-4-(trifluoromethoxy)phenyl)(2-(trifluoro-methyl)pyrimidin-4-yl)methyl)-2-oxooxazolidine-5-carboxamide;
95) (S)—N—((S)-(3-chloro-4-(trifluoromethoxy)phenyl)(2-(trifluoro-methyl)pyrimidin-4-yl)methyl)-2-oxooxazolidine-5-carboxamide;
96) (S)—N—((R)-(3-chloro-4-(trifluoro-methoxy)phenyl)(1-(trifluoromethyl)-1H-pyrazol-4-yl)methyl)-2-oxooxazolidine-5-carboxamide;
97) (S)—N—((S)-(3-chloro-4-(trifluoro-methoxy)phenyl)(1-(trifluoromethyl)-1H-pyrazol-4-yl)methyl)-2-oxooxazolidine-5-carboxamide;
98) (S)—N—((R)-(3-chloro-4-cyano-phenyl)(5-chloro-6-(trifluoromethyl)pyridin-3-yl)methyl)-2-oxooxazolidine-5-carboxamide;
99) (S)—N—((S)-(3-chloro-4-cyano-phenyl)(5-chloro-6-(trifluoromethyl)pyridin-3-yl)methyl)-2-oxooxazolidine-5-carboxamide;
100) (S)—N—((R)-(4-chloro-2-methoxyphenyl)(4-fluorophenyl)methyl)-2-oxooxazolidine-5-carboxamide;

101) (S)—N—((S)-(4-chloro-2-methoxyphenyl)(4-fluorophenyl)methyl)-2-oxooxazolidine-5-carboxamide;
102) (S)—N—((R)-(4-chlorophenyl)(cuban-1-yl)methyl)-2-oxooxazolidine-5-carboxamide;
103) (S)—N—((S)-(4-chlorophenyl)(cuban-1-yl)methyl)-2-oxooxazolidine-5-carboxamide;
104) (S)—N—((R)-(4-chlorophenyl)((R)-3,3-difluorocyclopentyl)methyl)-2-oxo-oxazolidine-5-carboxamide;
105) (S)—N—((R)-(4-chlorophenyl)((S)-3,3-difluorocyclopentyl)methyl)-2-oxo-oxazolidine-5-carboxamide;
106) (S)—N—((S)-(4-chlorophenyl)((R)-3,3-difluorocyclopentyl)methyl)-2-oxo-oxazolidine-5-carboxamide;
107) (S)—N—((S)-(4-chlorophenyl)((S)-3,3-difluorocyclopentyl)methyl)-2-oxo-oxazolidine-5-carboxamide;
108) (S)—N—((R)-(3-chloro-4-fluorophenyl)(2-methoxypyridin-3-yl)methyl)-2-oxo-oxazolidine-5-carboxamide;
109) (S)—N—((S)-(3-chloro-4-fluorophenyl)(2-methoxypyridin-3-yl)methyl)-2-oxooxazolidine-5-carboxamide;
110) (S)—N—((R)-(3-chloro-4-fluorophenyl)(1-(2,2,2-trifluoroethyl)-1H-pyrazol-4-yl)methyl)-2-oxooxazolidine-5-carboxamide;
111) (S)—N—((S)-(3-chloro-4-fluorophenyl)(1-(2,2,2-trifluoroethyl)-1H-pyrazol-4-yl)methyl)-2-oxooxazolidine-5-carboxamide;
112) (S)—N—((R)-(3-chloro-4-fluorophenyl)(1-(difluoromethyl)-1H-pyrazol-3-yl)methyl)-2-oxooxazolidine-5-carboxamide;
113) (S)—N—((S)-(3-chloro-4-fluorophenyl)(1-(difluoromethyl)-1H-pyrazol-3-yl)methyl)-2-oxooxazolidine-5-carboxamide;
114) (S)—N—((R)-(3-chloro-4-fluorophenyl)(1-methyl-3-(trifluoromethyl)-1H-pyrazol-5-yl)methyl)-2-oxooxazolidine-5-carboxamide;
115) (S)—N—((S)-(3-chloro-4-fluorophenyl)(1-methyl-3-(trifluoromethyl)-1H-pyrazol-5-yl)methyl)-2-oxooxazolidine-5-carboxamide;
116) (S)—N—((R)-(3-chloro-4-fluorophenyl)(1-methyl-5-(trifluoromethyl)-1H-pyrazol-3-yl)methyl)-2-oxooxazolidine-5-carboxamide;
117) (S)—N—((S)-(3-chloro-4-fluorophenyl)(1-methyl-5-(trifluoromethyl)-1H-pyrazol-3-yl)methyl)-2-oxooxazolidine-5-carboxamide;
118) (S)—N—((R)-(5-chloro-6-(trifluoromethyl)pyridin-2-yl)(4,4-difluoro-cyclohexyl)-methyl)-2-oxooxazolidine-5-carboxamide;
119) (S)—N—((S)-(5-chloro-6-(trifluoromethyl)pyridin-2-yl)(4,4-difluoro-cyclohexyl)-methyl)-2-oxooxazolidine-5-carboxamide;
120) (5S)-2-oxo-N-((6-(trifluoromethyl)pyridin-3-yl)(2-(trifluoromethyl)thiazol-4-yl)methyl)-oxazolidine-5-carboxamide;
121) (S)—N—((R)-1-(3-chloro-2,4-difluorophenyl)-3-(4-chlorophenyl)propyl)-2-oxooxazolidine-5-carboxamide;
122) (S)—N—((S)-1-(3-chloro-2,4-difluorophenyl)-3-(4-chlorophenyl)propyl)-2-oxooxazolidine-5-carboxamide;
123) (5S)-N-(1-(3-chloro-4-fluorophenyl)-2-((6-(trifluoromethyl)pyridin-3-yl)oxy)ethyl)-2-oxooxazolidine-5-carboxamide;
124) (S)—N-(1-(3-chloro-2,4-difluorophenyl)-2-cyclohexylethyl)-2-oxooxazolidine-5-carboxamide;
125) (5S)—N-(2-(4-chlorophenyl)-1-(4-(trifluoromethoxy)phenyl)ethyl)-2-oxooxazolidine-5-carboxamide;
126) (S)—N—((R)-(3-chloro-4-fluorophenyl)(3-cyano-4-fluorophenyl)methyl)-2-oxo-oxazolidine-5-carboxamide;
127) (S)—N—((S)-(3-chloro-2,4-difluorophenyl)((trans)-3-(trifluoromethyl)-cyclobutyl)-methyl)-2-oxooxazolidine-5-carboxamide;
128) (S)—N—((R)-(3-chloro-2,4-difluorophenyl)(2-(2,2,2-trifluoroethoxy)thiazol-5-yl)methyl)-2-oxooxazolidine-5-carboxamide;
129) (S)—N—((S)-(3-chloro-2,4-difluorophenyl)(2-(2,2,2-trifluoroethoxy)thiazol-5-yl)methyl)-2-oxooxazolidine-5-carboxamide;
130) (S)—N—((R)-(3-chloro-4-fluorophenyl)((trans)-4-(trifluoromethyl)cyclohexyl)methyl)-2-oxooxazolidine-5-carboxamide;
131) (S)—N—((S)-(3-chloro-4-fluorophenyl)((trans)-4-(trifluoromethyl)cyclohexyl)methyl)-2-oxooxazolidine-5-carboxamide;
132) (S)—N—((R)-(4-chlorophenyl)(6-(2,2,2-trifluoroethoxy)pyridazin-3-yl)methyl)-2-oxooxazolidine-5-carboxamide;
133) (S)—N—((S)-(4-chlorophenyl)(6-(2,2,2-trifluoroethoxy)pyridazin-3-yl)methyl)-2-oxooxazolidine-5-carboxamide;
134) (S)—N—((R)-(3-chloro-2,4-difluorophenyl)((trans)-6,6-difluorobicyclo[3.1.0]hexan-3-yl)methyl)-2-oxooxazolidine-5-carboxamide; and
135) (S)—N—((S)-(3-chloro-2,4-difluorophenyl)((trans)-6,6-difluorobicyclo[3.1.0]hexan-3-yl)methyl)-2-oxooxazolidine-5-carboxamide;

or a pharmaceutically acceptable salt thereof.

Additional illustrative, but non-limiting, examples of the compounds of the present invention that are useful as inhibitors of $Na_v1.8$ channel activity are the following compounds:

1) (S)—N—((R)-(3-chloro-4-fluorophenyl)(5-(trifluoromethyl)-1H-pyrazol-3-yl)methyl)-2-oxooxazolidine-5-carboxamide;
2) (S)—N—((S)-(3-chloro-4-fluorophenyl)(5-(trifluoromethyl)-1H-pyrazol-3-yl)methyl)-2-oxooxazolidine-5-carboxamide;
3) (S)—N—((R)-(3-chloro-4-fluorophenyl)(4-chlorophenyl)methyl)-2-oxooxazolidine-5-carboxamide;
4) (S)—N—((S)-(3-chloro-4-fluorophenyl)(4-chlorophenyl)methyl)-2-oxooxazolidine-5-carboxamide;
5) (S)—N—((R)-(3-chloro-4-fluorophenyl)(2-(trifluoroethyl)thiazol-4-yl)methyl)-2-oxo-oxazolidine-5-carboxamide;
6) (S)—N—((S)-(3-chloro-4-fluorophenyl)(2-(trifluoroethyl)thiazol-4-yl)methyl)-2-oxooxazolidine-5-carboxamide;
7) (S)—N—((R)-(3-chloro-2,4-difluorophenyl)(6-(2,2,2-trifluoroethoxy)pyridin-3-yl)methyl)-2-oxooxazolidine-5-carboxamide;
8) (S)—N—((S)-(3-chloro-2,4-difluorophenyl)(6-(2,2,2-trifluoroethoxy)pyridin-3-yl)methyl)-2-oxooxazolidine-5-carboxamide;
9) (S)—N—((R)-(3-chloro-2,4-difluorophenyl)((trans)-3-(trifluoromethyl)-cyclobutyl)-methyl)-2-oxooxazolidine-5-carboxamide; and
10) (S)—N—((S)-(3-chloro-2,4-difluorophenyl)((trans)-3-(trifluoromethyl)-cyclobutyl)-methyl)-2-oxooxazolidine-5-carboxamide;

or a pharmaceutically acceptable salt thereof.

Although the specific stereochemistries described above are preferred, other stereoisomers, including diastereoisomers, enantiomers, epimers, and mixtures of these may also have utility in treating $Na_v1.8$ mediated diseases.

Synthetic methods for making the compounds are disclosed in the Examples shown below. Where synthetic details are not provided in the examples, the compounds are readily made by a person of ordinary skill in the art of medicinal chemistry or synthetic organic chemistry by applying the synthetic information provided herein. Where a stereochemical center is not defined, the structure represents a mixture of stereoisomers at that center. For such compounds, the individual stereoisomers, including enantiomers, diastereoisomers, and mixtures of these are also compounds of the invention.

Definitions

"Ac" is acetyl, which is $CH_3C(=O)—$.

"Alkyl" means saturated carbon chains which may be linear or branched or combinations thereof, unless the carbon chain is defined otherwise. Other groups having the prefix "alk", such as alkoxy and alkanoyl, also may be linear or branched, or combinations thereof, unless the carbon chain is defined otherwise. Examples of alkyl groups include methyl, ethyl, propyl, isopropyl, butyl, sec- and tert-butyl, pentyl, hexyl, heptyl, octyl, nonyl, and the like.

"Alkenyl" means carbon chains which contain at least one carbon-carbon double bond, and which may be linear or branched, or combinations thereof, unless otherwise defined. Examples of alkenyl include vinyl, allyl, isopropenyl, pentenyl, hexenyl, heptenyl, 1-propenyl, 2-butenyl, 2-methyl-2-butenyl, and the like.

"Alkynyl" means carbon chains which contain at least one carbon-carbon triple bond, and which may be linear or branched, or combinations thereof, unless otherwise defined. Examples of alkynyl include ethynyl, propargyl, 3-methyl-1-pentynyl, 2-heptynyl and the like.

"Cycloalkyl" means a saturated monocyclic, bicyclic, spirocyclic or bridged carbocyclic ring, having a specified number of carbon atoms. Examples of cycloalkyl include cyclopropyl, cyclobutyl, cyclopentyl, cyclohexyl, cycloheptyl, and the like. In one embodiment of the present invention, cycloalkyl is selected from: cyclopropane, cyclobutane and cyclohexane. In another embodiment, cycloalkyl is cyclopropane, cyclobutane or cyclopentane. In another embodiment, cycloalkyl is cyclopropane or cyclobutane. In another embodiment, cycloalkyl is cyclopropane. In another embodiment, cycloalkyl is cyclobutane. In another embodiment, cycloalkyl is cyclopentane. In another embodiment, cycloalkyl is cyclohexane. In another embodiment, cycloalkyl is cycloheptane. In another embodiment, cycloalkyl is adamantane, cubane, cyclopropane, cyclobutane, cyclopentane, cyclohexane, cycloheptane, bicyclo[2.2.1]heptane, bicyclo[3.1.0]hexane, and bicyclo[1.1.1]pentane. In another embodiment, cycloalkyl is cyclopropyl.

"Cycloalkenyl" means a monocyclic, bicyclic, spirocyclic or bridged carbocyclic ring, having a specified number of carbon atoms with at least one double bond. Examples of cycloalkenyl include cyclopropene, cyclobutene, cyclopentene, cyclohexene, cycloheptene, and the like. In one embodiment, cycloalkenyl is cyclobutene.

"Cycloheteroalkyl" means a saturated or partly unsaturated non-aromatic monocyclic, bicyclic, spirocyclic or bridged ring or ring system having a specified number of carbon atoms and containing at least one ring heteroatom selected from N, NH, S (including SO and $SO_2$) and O. The cycloheteroalkyl ring may be substituted on the ring carbons and/or the ring nitrogen or sulfur. Examples of cycloheteroalkyl include tetrahydrofuran, pyrrolidine, tetrahydrothiophene, azetidine, piperazine, piperidine, morpholine, oxetane and tetrahydropyran. In one embodiment of the present invention, cycloheteroalkyl is selected from: pyrrolidine, azetidine, piperidine, piperazine, azepane, azocane, morpholine, thiomorpholine, thiomorpholine dione, oxazepane, 1,4-thiazepane, isoindoline, dihydroisoquinoline, tetra-hydroisoquinoline, octahydro-isoindole, azabicyclo[2.2.1]heptane, oxa-azabicyclo[2.2.1]-heptane, azabicyclo[3.1.1]heptane, azabicyclo[4.1.0]heptane, azabicyclo[3.2.1]octane, diazabicyclo[3.2.1]octane, oxa-azabicyclo-[3.2.1]octane, azabicyclo[3.2.0]heptane, oxa-azabicyclo[3.2.0]heptane, azaspiro[2.5]octane, azaspiro[2.6]nonane, azaspiro[3.5]nonane, oxa-azaspiro[3.5]nonane, oxa-azaspiro[4.5]decane, dihydrothieno[3,2-c]pyridine, dihydro-thiazolo[4,5-c]pyridine, dihydrooxazolo[4,5-c]pyridine, dihydroimidazo[1,2-a]pyrazine, hexahydrofuro[3,2-b]pyrrole, hexahydrocyclopenta[c]pyrrole, octahydrocyclpenta[c]pyrrole, and azatricyclo[4.3.1.13,8]undecane. In another embodiment, cycloheteroalkyl is selected from: pyrrolidine, azetidine, piperidine, piperazine, azepane, morpholine, thiomorpholine, oxazepane, isoindoline, dihydroisoquinoline, azabicyclo[2.2.1]heptane, azabicyclo[3.1.1]-heptane, azabicyclo[4.1.0]heptane, azabicyclo[3.2.1]octane, azabicyclo[3.2.0]heptane, azaspiro[2.5]octane, dihydrothieno[3,2-c]pyridine, dihydroimidazo[1,2-a]pyrazine, and hexahydrofuro[3,2-b]pyrrole. In another embodiment, cycloheteroalkyl is selected from: azepane, morpholine and piperidine. In another embodiment, cycloheteroalkyl is azepane. In another embodiment, cycloheteroalkyl is morpholine. In another embodiment, cycloheteroalkyl is piperidine. In another embodiment, cycloheteroalkyl is piperidine, pyrrolidine, tetrahydropyran, and tetrahydrofuran. In another embodiment, cycloheteroalkyl is piperidine, pyrrolidine, and tetrahydropyran.

"Cycloheteroalkenyl" means a monocyclic, bicyclic, spirocyclic or bridged ring or ring system having a specified number of carbon atoms and containing at least one double bond and at least one heteroatom. Examples of cycloheteroalkenyl include dihydropyran and dihydrofuran, and the like.

"Aryl" means a monocyclic, bicyclic or tricyclic carbocyclic aromatic ring or ring system containing 6-14 carbon atoms, wherein at least one of the rings is aromatic. Examples of aryl include phenyl and naphthalene. In one embodiment of the present invention, aryl is phenyl.

"Heteroaryl" means a monocyclic, bicyclic or tricyclic ring or ring system containing 5-14 ring atoms and containing at least one ring heteroatom selected from N, NH, S (including SO and $SO_2$) and O, wherein at least one of the heteroatom containing rings is aromatic. Examples of heteroaryl include pyrrolyl, isoxazolyl, isothiazolyl, pyrazolyl, pyridyl, oxazolyl, oxadiazolyl, thiadiazolyl, thiazolyl, imidazolyl, triazolyl, tetrazolyl, furanyl, triazinyl, thienyl, pyrimidyl, pyridazinyl, pyrazinyl, benzisoxazolyl, benzoxazolyl, benzothiazolyl, benzimidazolyl, benzofuranyl, benzothiophenyl, quinolyl, indolyl, isoquinolyl, quinazolinyl, dibenzofuranyl, and the like. In one embodiment of the present invention, heteroaryl is a 5 or 6 membered heteroaryl ring. In another embodiment, heteroaryl is selected from: pyrazole, pyridyl, isoxazole and thiazole. In another embodiment of the present invention, heteroaryl is selected from: pyridine, pyrimidine, pyrazine, pyridazine, indazole, imidazo[1,2-a]pyridine, 1,3-dihydro-2H-imidazo[4,5-b]pyridin-2-one, 1H-[1,2,3]triazolo[4,5-b]pyridine, 1H-pyrazolo[4,3-b]pyridine, pyrrolo[3,2-c]pyridine, pyrrolo[2,3-b]pyridine, benzimidazole, imidazole, pyrazole, thiophene, furan,1,2,4-oxadiazole, 1,3,4-oxadiazole, oxazole, isoxazole, isothiazole, thiazole, 1,2,4-thiadiazole, 1,3,4-thiadiazole; 4H-pyrido[2,3-e][1,2,4]thiadiazine 1,1-dioxide, 2H-pyrido[2,3-e][1,2]thiazine 1,1-dioxide, 2,3-dihydroisothiazolo[4,5-b]pyridine 1,1-dioxide, and 3,4-dihydro-2H-pyrido[2,3-e][1,2]thiazine 1,1-dioxide. In another embodiment of the present invention, heteroaryl is selected from:

pyridine, pyrimidine, and pyridazine. In another embodiment, heteroaryl is pyridine, pyrazole, thiazole, pyrimidine, pyridazine, imidazole, oxazole, indazole, and thiophene. In another embodiment, heteroaryl is pyrimidine, pyridazine, imidazole, oxazole, indazole, and thiophene. In another embodiment, heteroaryl is pyridine, pyrazole, and thiazole. In another embodiment, heteroaryl is pyrazole, and thiazole. In another embodiment, heteroaryl is thiazole. In another embodiment, heteroaryl is pyridine.

"Halogen" includes fluorine, chlorine, bromine and iodine. In one embodiment, halogen is fluorine, chorine or bromine. In another embodiment, halogen is fluorine or chlorine. In another embodiment, halogen is fluorine or bromine. In another embodiment, halogen is fluorine. In another embodiment, halogen is chlorine. In another embodiment, halogen is bromine.

"Me" represents methyl.

"Oxo" represents =O.

"Saturated" means containing only single bonds.

"Unsaturated" means containing at least one double or triple bond. In one embodiment, unsaturated means containing at least one double bond. In another embodiment, unsaturated means containing at least one triple bond.

When any variable (e.g., $R^j$, $R^a$, etc.) occurs more than one time in any constituent or in formula I, its definition on each occurrence is independent of its definition at every other occurrence. Also, combinations of substituents and/or variables are permissible only if such combinations result in stable compounds. A squiggly line across a bond in a substituent variable represents the point of attachment.

Under standard nomenclature used throughout this disclosure, the terminal portion of the designated side chain is described first, followed by the adjacent functionality toward the point of attachment. For example, a $C_{1-5}$ alkylcarbonylamino $C_{1-6}$ alkyl substituent is equivalent to:

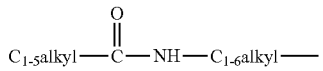

In choosing compounds of the present invention, one of ordinary skill in the art will recognize that the various substituents, i.e. $R^1$, $R^2$, etc., are to be chosen in conformity with well-known principles of chemical structure connectivity and stability.

The term "substituted" shall be deemed to include multiple degrees of substitution by a named substitutent. Where multiple substituent moieties are disclosed or claimed, the substituted compound can be independently substituted by one or more of the disclosed or claimed substituent moieties, singly or plurally. By independently substituted, it is meant that the (two or more) substituents can be the same or different.

The phrase "pharmaceutically acceptable" is employed herein to refer to those compounds, materials, compositions, salts and/or dosage forms which are, using sound medical judgment, and following all applicable government regulations, safe and suitable for administration to a human being or an animal.

Compounds of Formula I may contain one or more asymmetric centers and can thus occur as racemates and racemic mixtures, single enantiomers, diastereomeric mixtures and individual diastereomers. The present invention is meant to encompass all such isomeric forms of the compounds of Formula I.

The independent syntheses of optical isomers and diastereoisomers or their chromatographic separations may be achieved as known in the art by appropriate modification of the methodology disclosed herein. Their absolute stereochemistry may be determined by the X-ray crystallography of crystalline products or crystalline intermediates which are derivatized, if necessary, with a reagent containing an asymmetric center of known absolute configuration or sufficient heavy atoms to make an absolute assignment.

If desired, racemic mixtures of the compounds may be separated so that the individual enantiomers are isolated. The separation can be carried out by methods well-known in the art, such as the coupling of a racemic mixture of compounds to an enantiomerically pure compound to form a diastereoisomeric mixture, followed by separation of the individual diastereoisomers by standard methods, such as fractional crystallization or chromatography. The coupling reaction is often the formation of salts using an enantiomerically pure acid or base. The diasteromeric derivatives may then be converted to the pure enantiomers by cleavage of the added chiral residue. The racemic mixture of the compounds can also be separated directly by chromatographic methods utilizing chiral stationary phases, which methods are well known in the art.

Alternatively, any enantiomer of a compound may be obtained by stereoselective synthesis using optically pure starting materials or reagents of known configuration by methods well known in the art.

Some of the compounds described herein contain olefinic double bonds, and unless specified otherwise, are meant to include both E and Z geometric isomers.

Tautomers are defined as compounds that undergo rapid proton shifts from one atom of the compound to another atom of the compound. Some of the compounds described herein may exist as tautomers with different points of attachment of hydrogen. Such an example may be a ketone and its enol form known as keto-enol tautomers. The individual tautomers as well as mixture thereof are encompassed with compounds of Formula I.

In the compounds of general formula I, the atoms may exhibit their natural isotopic abundances, or one or more of the atoms may be artificially enriched in a particular isotope having the same atomic number, but an atomic mass or mass number different from the atomic mass or mass number predominately found in nature. The present invention is meant to include all suitable isotopic variations of the compounds of structural formula I. For example, different isotopic forms of hydrogen (H) include protium ($^1$H), deuterium ($^2$H), and tritium ($^3$H). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Tritium is radioactive and may therefore provide for a radiolabeled compound, useful as a tracer in metabolic or kinetic studies. Isotopically-enriched compounds within structural formula I, can be prepared without undue experimentation by conventional techniques well known to those skilled in the art or by processes analogous to those described in the Schemes and Examples herein using appropriate isotopically-enriched reagents and/or intermediates.

Furthermore, some of the crystalline forms for compounds of the present invention may exist as polymorphs and as such are intended to be included in the present invention. In addition, some of the compounds of the instant invention may form solvates with water or common organic solvents. Such solvates are encompassed within the scope of this invention.

It is generally preferable to administer compounds of the present invention as enantiomerically pure formulations. Racemic mixtures can be separated into their individual enantiomers by any of a number of conventional methods. These include chiral chromatography, derivatization with a chiral auxiliary followed by separation by chromatography or crystallization, and fractional crystallization of diastereomeric salts.

Salts

It will be understood that, as used herein, references to the compounds of the present invention are meant to also include the pharmaceutically acceptable salts, and also salts that are not pharmaceutically acceptable when they are used as precursors to the free compounds or their pharmaceutically acceptable salts or in other synthetic manipulations.

The compounds of the present invention may be administered in the form of a pharmaceutically acceptable salt. The term "pharmaceutically acceptable salt" refers to salts prepared from pharmaceutically acceptable non-toxic bases or acids including inorganic or organic bases and inorganic or organic acids. Salts of basic compounds encompassed within the term "pharmaceutically acceptable salt" refer to non-toxic salts of the compounds of this invention which are generally prepared by reacting the free base with a suitable organic or inorganic acid. Representative salts of basic compounds of the present invention include, but are not limited to, the following: acetate, benzenesulfonate, benzoate, bicarbonate, bisulfate, bitartrate, borate, bromide, camsylate, carbonate, chloride, clavulanate, citrate, dihydrochloride, edetate, edisylate, estolate, esylate, fumarate, gluceptate, gluconate, glutamate, glycollylarsanilate, hexylresorcinate, hydrabamine, hydrobromide, hydrochloride, hydroxynaphthoate, iodide, isothionate, lactate, lactobionate, laurate, malate, maleate, mandelate, mesylate, methylbromide, methylnitrate, methylsulfate, mucate, napsylate, nitrate, N-methylglucamine ammonium salt, oleate, oxalate, pamoate (embonate), palmitate, pantothenate, phosphate/diphosphate, polygalacturonate, salicylate, stearate, sulfate, subacetate, succinate, tannate, tartrate, teoclate, tosylate, triethiodide, trifuoroacetate, and valerate. Furthermore, where the compounds of the invention carry an acidic moiety, suitable pharmaceutically acceptable salts thereof include, but are not limited to, salts derived from inorganic bases including aluminum, ammonium, calcium, copper, ferric, ferrous, lithium, magnesium, manganic, mangamous, potassium, sodium, zinc, and the like. Particularly preferred are the ammonium, calcium, magnesium, potassium, and sodium salts. Salts derived from pharmaceutically acceptable organic non-toxic bases include salts of primary, secondary, and tertiary amines, cyclic amines, and basic ion-exchange resins, such as arginine, betaine, caffeine, choline, N,N-dibenzylethylenediamine, diethylamine, 2-diethylaminoethanol, 2-dimethylaminoethanol, ethanolamine, ethylenediamine, N-ethylmorpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine, tripropylamine, tromethamine, and the like.

Also, in the case of a carboxylic acid (—COOH) or alcohol group being present in the compounds of the present invention, pharmaceutically acceptable esters of carboxylic acid derivatives, such as methyl, ethyl, or pivaloyloxymethyl, or acyl derivatives of alcohols, such as O-acetyl, O-pivaloyl, O-benzoyl, and O-aminoacyl, can be employed. Included are those esters and acyl groups known in the art for modifying the solubility or hydrolysis characteristics for use as sustained-release or prodrug formulations.

The term "prodrug" means compounds that are rapidly transformed, for example, by hydrolysis in blood, in vivo to the parent compound, e.g., conversion of a prodrug of Formula I to a compound of Formula I, or to a salt thereof; a thorough discussion is provided in T. Higuchi and V. Stella, Pro-drugs as Novel Delivery Systems, Vol. 14 of the A.C.S. Symposium Series, and in Edward B. Roche, ed., Bioreversible Carriers in Drug Design, American Pharmaceutical Association and Pergamon Press, 1987, both of which are incorporated herein by reference. This invention includes prodrugs of the novel compounds of this invention.

Solvates, and in particular, the hydrates of the compounds of the present invention are included in the present invention as well.

Utilities

The compound of the present invention are selective inhibitors of $Na_v1.8$ sodium ion channel activity or have selective activity as $Na_v1.8$ sodium ion channel blockers. In one embodiment, the compounds of the present invention exhibit at least 10-fold selectivity for $Na_v1.8$ sodium channels over $Na_v1.5$ sodium channels, and in some embodiments exhibit at least 100-fold selectivity for $Na_v1.8$ sodium channels over $Na_v1.5$ sodium channels based on functional potency ($IC_{50}$ values) for each channel in Qube® assay system.

The compounds of the present invention are potent inhibitors of $Na_v1.8$ channel activity. The compounds, and pharmaceutically acceptable salts thereof, may be efficacious in the treatment of diseases, disorders and conditions that are mediated by the inhibition of $Na_v1.8$ sodium ion channel activity and/or $Na_v1.8$ receptors.

Diseases, disorders or conditions mediated by $Na_v1.8$ sodium ion channel activity and/or $Na_v1.8$ receptors, include but are not limited to nociception, osteoarthritis, peripheral neuropathy, inherited erythromelalgia, multiple sclerosis, asthma, pruritus, acute itch, chronic itch, migraine, neurodegeneration following ischemia, epilepsy, inflammatory pain, spontaneous pain, acute pain, pen-operative pain, post-operative pain, neuropathic pain, postherpetic neuralgia, trigeminal neuralgia, diabetic neuropathy, chronic lower back pain, phantom limb pain, pain resulting from cancer and chemotherapy, chronic pelvic pain, pain syndromes, and complex regional pain syndromes.

One or more of these conditions or diseases may be treated, managed, prevented, reduced, alleviated, ameliorated or controlled by the administration of a therapeutically effective amount of a compound of the present invention, or a pharmaceutically acceptable salt thereof, to a patient in need of treatment. Also, the compounds of the present invention may be used for the manufacture of a medicament which may be useful for treating, preventing, managing, alleviating, ameliorating or controlling one or more of these conditions, diseases or disorders: nociception, osteoarthritis, peripheral neuropathy, inherited erythromelalgia, multiple sclerosis, asthma, pruritus, acute itch, chronic itch, migraine, neurodegeneration following ischemia, epilepsy, inflammatory pain, spontaneous pain, acute pain, peri-operative pain, post-operative pain, neuropathic pain, postherpetic neuralgia, trigeminal neuralgia, diabetic neuropathy, chronic lower back pain, phantom limb pain, pain resulting from cancer and chemotherapy, chronic pelvic pain, pain syndromes, and complex regional pain syndromes.

Preferred uses of the compounds may be for the treatment of one or more of the following diseases by administering a therapeutically effective amount to a patient in need of treatment. The compounds may be used for manufacturing a medicament for the treatment of one or more of these diseases:

1) pain conditions,
2) pruritic conditions, and
3) cough conditions.

In one embodiment of the present invention, the pain condition is an acute pain or chronic pain disorder. In another embodiment of the present invention, the the pain condition is an acute pain disorder.

The compounds of the present invention may be effective in treating nociception. Nociception or pain is essential for survival and often serves a protective function. However, the pain associated with surgical procedures and current therapies to relieve that pain, can delay recovery after surgery and increase the length of hospital stays. As many as 80% of surgical patients experience post-operative pain due to tissue damage, and damage to peripheral nerves and subsequent inflammation. Approximately 10-50% of surgical patients will develop chronic pain after surgery often because the nerve damage results in lasting neuropathic pain once the wound has healed.

The compounds of the present invention may be effective in treating osteoarthritis. Osteoarthritis is type of arthritis caused by inflammation, breakdown, and eventual loss of cartilage in the joints. The standards of care for pain associated with osteoarthritis are non-steroidal anti-inflammatory drugs (NSAIDs), for example celecoxib and diclofenac (reviewed in Zeng et al., 2018). Patients that do not respond to NSAID therapies are typically treated with low dose opiates, such as hydrocodone. Patients that are refractory to the above therapies will usually opt for total joint replacement.

The compounds of the present invention may be effective in treating peripheral neuropathy. Peripheral neuropathy is nerve damage caused by chronically high blood sugar and diabetes. It leads to numbness, loss of sensation, and sometimes pain in distal limbs such as feet, legs, or hands. It is the most common complication of diabetes. The standards of care for the treatment of painful diabetic neuropathy are gabapentinoids, for example gabapentin and pregabalin. Some patients will respond well to tricyclic antidepressants such as amitriptyline, while other patients get significant relief using SRI/NRI drugs such as duloxetine (Schreiber et al., World J. Diabetes. 2015 Apr. 15; 6(3):432-44). Many options are available, however side-effects are common (e.g. dizziness, nausea) which limit their full potential.

The compounds of the present invention may be effective in treating inherited erythromelalgia. Inherited erythromelalgia (IEM) is a chronic pain syndrome which has been linked to mutations in several voltage-gated sodium channels, including Nav1.8 (Kist et al., PLoS One. 2016 Sep. 6; 11(9):e0161789). Patients present with the classic "gloves and stocking" flare pattern on distal regions such as hands and feet, typically brought on with warm temperatures and exercise. Some patients find relief from the burning pain associated with flares by cold water immersion. Although medications that affect voltage-gated sodium channels (e.g., lidocaine and mexiletine) show promise, there is no current standard of care to treat IEM.

The compounds of the present invention may be effective in treating neuropathic pain. Neuropathic pain is pain caused by damage or disease affecting the somatosensory nervous system. It has been demonstrated in human patients, as well as in animal models of neuropathic pain, that damage to primary afferent sensory neurons can lead to neuroma formation and spontaneous activity, as well as evoked activity in response to normally innocuous stimuli. (Colloca et al., Nat Rev Dis Primers. 2017 Feb. 16; 3:17002; Coward et al., Pain. 2000 March; 85(1-2):41-50; Yiangou et al., FEBS Lett. 2000 Feb. 11; 467(2-3):249-52; Carter et al., Phys Med Rehabil Clin N Am. 2001 May; 12(2):447-59). Some nerve injuries result in an increase in Nav1.8 expression, which is believed to be an underlying mechanism for pathological pain. (Black et al., Ann Neurol. 2008 December; 64(6):644-53; Bird et al., Br J Pharmacol. 2015 May; 172(10):2654-70). Injuries of the peripheral nervous system often result in neuropathic pain persisting long after an initial injury resolves. Examples of neuropathic pain include, but are not limited to, post herpetic neuralgia, trigeminal neuralgia, diabetic neuropathy, chronic lower back pain, lumbar radiculopathy, phantom limb pain, pain resulting from cancer and chemotherapy, chronic pelvic pain, complex regional pain syndrome and related neuralgias, and painful conditions that arise due to gain-of-function mutations in Nav1.8 (Huang et al., J Neurosci. 2013 Aug. 28; 33(35):14087-97; Kist et al., PLoS One. 2016 Sep. 6; 11(9):e0161789; Emery et al., J Neurosci. 2015 May 20; 35(20):7674-81; and Schreiber et al., World J Diabetes. 2015 Apr. 15; 6(3):432-44.

The ectopic activity of normally silent sensory neurons is thought to contribute to the generation and maintenance of neuropathic pain, which is generally assumed to be associated with an increase in sodium channel activity in the injured nerve. (Wood et al., Curr Opin Pharmacol. 2001 February; 1(1):17-21; Baker et al., TRENDS in Pharmacological Sciences, 2001, 22(1): 27-31). Standards of care for neuropathic pain vary considerably depending on the particular condition, but first line therapies are typically pregabalin, gabapentin, tricyclic antidepressants (e.g. amitriptyline), and SRI/NRI drugs (e.g. duloxetine). Patients refractory to these therapies are usually prescribed low dose opiates (e.g. hydrocodone).

The compounds of the present invention may be effective in treating multiple sclerosis. Recent evidence points to a potential role for Nav1.8 in multiple sclerosis. Nav1.8 expression in cerebellum has been identified in tissues taken from animal models of multiple sclerosis (EAE model) and in postmortem brains from patients suffering from multiple sclerosis (MS) (Shields et al., Ann Neurol. 2012 February; 71(2):186-94; Black et al., Proc Natl Acad Sci USA. 2000 Oct. 10; 97(21):11598-602). Also, two SCN10A polymorphisms showed significant association with MS (Roostaei et al., Neurology. 2016 Feb. 2; 86 (5):410-7). When Nav1.8 is overexpressed in cerebellum, mice develop ataxic-related motor deficits which are ameliorated with oral delivery of a selective small molecule Nav1.8 antagonist (Shields et al., PLoS One. 2015 Mar. 6; 10(3)). These studies suggest that a Nav1.8 antagonist may be a useful therapy to treat symptoms related to multiple sclerosis.

The compounds of the present invention may be effective in treating asthma. Asthma is caused by airway inflammation in which a person's airways become hyper-responsive, narrow and swollen, which makes it difficult to breathe. These symptoms are typically triggered through an allergic reaction (Nair P et al., J Allergy Clin Immunol Pract. 2017 May-June; 5(3):649-659). In a preclinical model of asthma, deletion of Nav1.8-containing neurons, or inhibition of nerve fibers via small molecules reduces airway inflammation and immune cell infiltration (Talbot et al., Neuron. 2015

Jul. 15; 87(2):341-54). Selective Nav1.8 antagonists may be a useful therapy to prevent airway hypersensitivity caused by immune cell infiltration.

The compounds of the present invention may be effective in treating pruritus. Pruritus, also commonly known as itch, affects approximately 4% of the global population is an unpleasant sensation that elicits the desire or reflex to scratch, and is regarded as closely related to pain (Luo et al., Cell Mol Life Sci. 2015 September; 72 (17): 3201-23). Theories on the origin of itch implicate the subtle, low-frequency activation of nociceptors (pain-sensing neurons); however, it has been described that some afferents preferentially respond to histamine, which induces itch (Schmelz et al., J Neurosci. 1997 Oct. 15; 17(20):8003-8). At the same time, it has been found that histamine-responding neurons also respond to capsaicin which produces pain (McMahon et al., Trends in Neuroscience 1992, 15:497-501). Members of the transient receptor potential (TRP) family, and nerve growth factor (NGF) are both known to play a role in itch and pain, and clinically, both maladies are treated with therapeutic agents such as gabapentin and antidepressants. Therefore, it continues to be accepted that the underlying mechanisms of pain and itch are highly interwoven and complex, and distinguishing pan-selective or itch-selective pathways remains ambiguous (Ikoma et al., Nat Rev Neurosci. 2006 July; 7(7):535-47). A role for Nav1.8 in pruritis was studied using a mouse transgenically expressing a constitutively active form of the serine/threonine kinase BRAF was expressed in Nav1.8-expressing neurons. This resulted in enhanced pruriceptor excitability, and heightened evoked and spontaneous scratching behavior (Zhao et al., 2013). In skin, pruritogens are released from keratinocytes, lymphocytes, mast cells, and eosinophils during inflammation. These molecules act directly on free nerve endings which express Nav1.8 to induce itch (Riol-Blanco et al., Nature. 2014 Jun. 5; 510 (7503):157-61). Chronic and acute itch can arise from many different insults, diseases and disorders, and may be classified as dermal or pruriceptive, neurogenic, neuropathic, or psychogenic: itch can arise from both systemic disorders, skin disorders, as well as physical or chemical insult to the dermis. Pathologically, conditions such as dry skin, eczema, psoriasis, varicella zoster, urticaria, scabies, renal failure, cirrhosis, lymphoma, iron deficiency, diabetes, menopause, polycythemia, uremia, and hyperthyroidism can cause itch, as can diseases of the nervous system such as tumors, multiple sclerosis, peripheral neuropathy, nerve compression, and delusions related to obsessive-compulsive disorders. Medicines such as opioids and chloroquine can also trigger itch (Ikoma et al., Nat Rev Neurosci. 2006 July; 7(7):535-47). Itching following burn is also an extremely serious clinical problem as it hampers the healing process, resulting in permanent scaring, and negatively impacting quality of life (Van Loey et al., Br J Dermatol. 2008 January; 158(1):95-100).

The invention also includes pharmaceutically acceptable salts of the compounds, and pharmaceutical compositions comprising the compounds and a pharmaceutically acceptable carrier.

The compounds, or pharmaceutically acceptable salts thereof, may be useful in treating pain conditions, pruritic conditions, and cough conditions.

A compound of the present invention, or a pharmaceutically acceptable salt thereof, may be used in the manufacture of a medicament for the treatment of pain conditions, pruritic conditions, and cough conditions in a human or other mammalian patient.

A method of treating a pain conditions comprises the administration of a therapeutically effective amount of a compound of the present invention, or a pharmaceutically acceptable salt thereof, or a pharmaceutical composition comprising the compound, to a patient in need of treatment. A method of treating a pruritic condition comprises the administration of a therapeutically effective amount of a compound of the present invention, or a pharmaceutically acceptable salt thereof, or a pharmaceutical composition comprising the compound, to a patient in need of treatment. A method of treating a cough condition comprises the administration of a therapeutically effective amount of a compound of the present invention, or a pharmaceutically acceptable salt thereof, or a pharmaceutical composition comprising the compound, to a patient in need of treatment. Other medical uses of the compounds of the present invention are described herein.

The term "pain condition" as used herein includes, but are not limited to, acute pain, peri-operative pain, pre-operative pain, post-operative pain, neuropathic pain, post herpetic neuralgia, trigeminal neuralgia, diabetic neuropathy, chronic lower back pain, phantom limb pain, chronic pelvic pain, vulvodynia, complex regional pain syndrome and related neuralgias, pain associated with cancer and chemotherapy, pain associated with HIV, and HIV treatment-induced neuropathy, nerve injury, root avulsions, painful traumatic mononeuropathy, painful polyneuropathy, erythromyelalgia, paroxysmal extreme pain disorder, small fiber neuropathy, burning mouth syndrome, central pain syndromes (potentially caused by virtually any lesion at any level of the nervous system), postsurgical pain syndromes (e.g., post mastectomy syndrome, post thoracotomy syndrome, stump pain)), bone and joint pain (osteoarthritis), repetitive motion pain, dental pain, myofascial pain (muscular injury, fibromyalgia), perioperative pain (general surgery, gynecological), chronic pain, dysmennorhea, pain associated with angina, inflammatory pain of varied origins (e.g. osteoarthritis, rheumatoid arthritis, rheumatic disease, teno-synovitis and gout), shoulder tendonitis or bursitis, gouty arthritis, and aolymyalgia rheumatica, primary hyperalgesia, secondary hyperalgesia, primary allodynia, secondary allodynia, or other pain caused by central sensitization, complex regional pain syndrome, chronic arthritic pain and related neuralgias acute pain, migraine, migraine headache, headache pain, cluster headache, non-vascular headache, traumatic nerve injury, nerve compression or entrapment, and neuroma pain, The term "pruritic condition" or "pruritic disorder" as used herein includes, but is not limited to, conditions with an unpleasant sensation that provokes the desire to scratch, such as chronic itch.

The term "cough condition" or "cough disorder" as used herein includes, but is not limited to, chronic cough, neuropathic cough or cough due to neurological conditions.

Treatment of a disease, disorder or condition mediated by $Na_v1.8$ sodium ion channel activity or $Na_v1.8$ receptors refers to the administration of the compounds of the present invention to a subject with the disease, disorder or condition. One outcome of treatment may be reducing the disease, disorder or condition mediated by $Na_v1.8$ sodium ion channel activity or $Na_v1.8$ receptors. Another outcome of treatment may be alleviating the disease, disorder or condition mediated by $Na_v1.8$ sodium ion channel activity or $Na_v1.8$ receptors. Another outcome of treatment may be ameliorating the disease, disorder or condition mediated by $Na_v1.8$ sodium ion channel activity or $Na_v1.8$ receptors. Another outcome of treatment may be suppressing the disease, disorder or condition mediated by $Na_v1.8$ sodium ion channel activity or $Na_v1.8$ receptors. Another outcome of treatment may be managing the disease, disorder or condition mediated by $Na_v1.8$ sodium ion channel activity or $Na_v1.8$ receptors.

Another outcome of treatment may be preventing the disease, disorder or condition mediated by $Na_v1.8$ sodium ion channel activity or $Na_v1.8$ receptors.

Prevention of the disease, disorder or condition mediated by $Na_v1.8$ sodium ion channel activity or $Na_v1.8$ receptors refers to the administration of the compounds of the present invention to a subject at risk of the disease, disorder or condition. One outcome of prevention may be reducing the disease, disorder or condition mediated by $Na_v1.8$ sodium ion channel activity or $Na_v1.8$ receptors in a subject at risk of the disease, disorder or condition. Another outcome of prevention may be suppressing the disease, disorder or condition mediated by $Na_v1.8$ sodium ion channel activity or $Na_v1.8$ receptors in a subject at risk of the disease, disorder or condition. Another outcome of prevention may be ameliorating the disease, disorder or condition mediated by $Na_v1.8$ sodium ion channel activity or $Na_v1.8$ receptors in a subject at risk of the disease, disorder or condition. Another outcome of prevention may be alleviating the disease, disorder or condition mediated by $Na_v1.8$ sodium ion channel activity or $Na_v1.8$ receptors in a subject at risk of the disease, disorder or condition. Another outcome of prevention may be managing the disease, disorder or condition mediated by $Na_v1.8$ sodium ion channel activity or $Na_v1.8$ receptors in a subject at risk of the disease, disorder or condition.

One outcome of treatment may be reducing the amount of pain experienced by a subject relative to that subject's pain immediately before the administration of the compounds of the present invention. Another outcome of treatment may be alleviating the amount of pain experienced by a subject relative to that subject's pain immediately before the administration of the compounds of the present invention. Another outcome of treatment may be ameliorating the amount of pain experienced by a subject relative to that subject's pain immediately before the administration of the compounds of the present invention. Another outcome of treatment may be suppressing the amount of pain experienced by a subject relative to that subject's pain immediately before the administration of the compounds of the present invention. Another outcome of treatment may be managing the amount of pain experienced by a subject relative to that subject's pain immediately before the administration of the compounds of the present invention. Another outcome of treatment may be ameliorating the amount of pain experienced by a subject relative to that subject's pain immediately before the administration of the compounds of the present invention.

Another outcome of treatment may be preventing further pain experienced by a subject after the administration of the compounds of the present invention.

Prevention of pain refers to the administration of the compounds of the present invention to reduce the pain of a subject at risk of pain. Prevention includes, but is not limited to, the administration to a subject prior to surgery or other expected painful event. One outcome of prevention may be reducing pain in a subject at risk of pain. Another outcome of prevention may be suppressing pain in a subject at risk of pain. Another outcome of prevention may be ameliorating pain in a subject at risk of pain. Another outcome of prevention may be alleviating pain in a subject at risk of pain. Another outcome of prevention may be managing pain in a subject at risk of pain.

The terms "administration of" and or "administering a" compound should be understood to mean providing a compound of the invention or a prodrug of a compound of the invention to the individual or mammal in need of treatment.

The administration of the compound of structural formula I in order to practice the present methods of therapy is carried out by administering an effective amount of the compound of structural formula I to the mammal in need of such treatment or prophylaxis. The need for a prophylactic administration according to the methods of the present invention is determined via the use of well known risk factors. The effective amount of an individual compound is determined, in the final analysis, by the physician or veterinarian in charge of the case, but depends on factors such as the exact disease to be treated, the severity of the disease and other diseases or conditions from which the patient suffers, the chosen route of administration other drugs and treatments which the patient may concomitantly require, and other factors in the physician's judgment.

The usefulness of the present compounds in these diseases or disorders may be demonstrated in animal disease models that have been reported in the literature.

Administration and Dose Ranges

Any suitable route of administration may be employed for providing a mammal, especially a human, with an effective dose of a compound of the present invention. For example, oral, intravenous, infusion, subcutaneous, transcutaneous, intramuscular, intradermal, transmucosal, intramucosal, rectal, topical, parenteral, ocular, pulmonary, nasal, and the like may be employed. Dosage forms include tablets, troches, dispersions, suspensions, solutions, capsules, creams, ointments, aerosols, and the like. Preferably compounds of the present invention are administered orally.

In the treatment or prevention of disorders, diseases and/or conditions which require inhibition of $Na_v1.8$ sodium ion channel activity, a suitable dosage level will generally be about 0.0001 to 500 mg per kg patient body weight per day which can be administered in single or multiple doses. In one embodiment, a suitable dosage level may be about 0.001 to 500 mg per kg patient body weight per day. In another embodiment, a suitable dosage level may be about 0.001 to about 250 mg/kg per day. In another embodiment, a suitable dosage level may be about 0.01 to about 250 mg/kg per day. In another embodiment, a suitable dosage level may be about 0.1 to about 100 mg/kg per day. In another embodiment, a suitable dosage level may be about 0.05 to 100 mg/kg per day. In another embodiment, a suitable dosage level may be about 0.1 to 50 mg/kg per day. In another embodiment, a suitable dosage level may be about 0.05 to 0.5 mg/kg per day. In another embodiment, a suitable dosage level may be about 0.5 to 5 mg/kg per day. In another embodiment, a suitable dosage level may be about 5 to 50 mg/kg per day. For oral administration, the compositions are preferably provided in the form of tablets containing 0.01 to 1000 mg of the active ingredient, particularly 0.01, 0.025, 0.05, 0.075, 0.1, 0.25, 0.5, 0.75, 1.0, 2.5, 5.0, 7.5, 10.0, 15.0, 20.0, 25.0, 50.0, 75.0, 100.0, 150.0, 200.0, 250.0, 300.0, 400.0, 500.0, 600.0, 750.0, 800.0, 900.0, and 1000.0 mg of the active ingredient for the symptomatic adjustment of the dosage to the patient to be treated. The compounds may be administered on a regimen of 1 to 8 times per day; preferably, 1 to 4 times a day; more preferably once or twice per day. This dosage regimen may be adjusted to provide the optimal therapeutic response.

It will be understood, however, that the specific dose level and frequency of dosage for any particular patient may be varied and will depend upon a variety of factors including the activity of the specific compound employed, the metabolic stability and length of action of that compound, the age, body weight, general health, sex, diet, mode and time of administration, rate of excretion, drug combination, the severity of the particular condition, and the host undergoing therapy.

The compounds of this invention may be used in pharmaceutical compositions comprising (a) the compound(s) or pharmaceutically acceptable salts thereof, and (b) a pharmaceutically acceptable carrier. The compounds of this invention may be used in pharmaceutical compositions that include one or more other active pharmaceutical ingredients. The compounds of this invention may also be used in pharmaceutical compositions in which the compound of the present invention or a pharmaceutically acceptable salt thereof is the only active ingredient.

The term "composition," as in pharmaceutical composition, is intended to encompass a product comprising the active ingredient(s), and the inert ingredient(s) that make up the carrier, as well as any product which results, directly or indirectly, from combination, complexation or aggregation of any two or more of the ingredients, or from dissociation of one or more of the ingredients, or from other types of reactions or interactions of one or more of the ingredients.

Accordingly, the pharmaceutical compositions of the present invention encompass any composition made by admixing a compound of the present invention and a pharmaceutically acceptable carrier.

Compounds of the present invention may be used in combination with other drugs that may also be useful in the treatment or amelioration of the diseases or conditions for which compounds of the present invention are useful. Such other drugs may be administered, by a route and in an amount commonly used therefor, contemporaneously or sequentially with a compound of the present invention. In the treatment of patients who have pain conditions, pruritic conditions and cough conditions, more than one drug is commonly administered. The compounds of this invention may generally be administered to a patient who is already taking one or more other drugs for these conditions. Often the compounds will be administered to a patient who is already being treated with one or more anti-pain compounds when the patient's pain is not adequately responding to treatment.

The combination therapy also includes therapies in which the compound of the present invention and one or more other drugs are administered on different overlapping schedules. It is also contemplated that when used in combination with one or more other active ingredients, the compound of the present invention and the other active ingredients may be used in lower doses than when each is used singly. Accordingly, the pharmaceutical compositions of the present invention include those that contain one or more other active ingredients, in addition to a compound of the present invention.

Examples of other active ingredients that may be administered in combination with a compound of the present invention, and either administered separately or in the same pharmaceutical composition, include but are not limited to:
  (i) an opioid agonist;
  (ii) an opioid antagonist;
  (iii) a calcium channel antagonist;
  (iv) a NMDA receptor agonist;
  (v) a NMDA receptor antagonist;
  (vi) a COX-2 selective inhibitor;
  (vii) a NSAID (non-steroidal anti-inflammatory drug);
  (viii) an analgesic;
  (ix) a sodium channel inhibitor;
  (x) an anti-NGF antibody;
  (xi) a $Na_v1.7$ inhibitor;
  (xii) a HCN inhibitor;
  (xiii) a TRPV1 antagonist;
  (xiv) a $Na_v1.7$ biological; and
  (xv) a $Na_v1.8$ biological; and
pharmaceutically acceptable salts thereof.

In another embodiment of the present invention, the pharmaceutical composition comprises:
  (1) a compound of Claim 1 or a pharmaceutically acceptable salt thereof;
  (2) one or more compounds, or pharmaceutically acceptable salts thereof, selected from the group consisting of:
    (i) an opioid agonist;
    (ii) an opioid antagonist;
    (iii) a calcium channel antagonist;
    (iv) a NMDA receptor agonist;
    (v) a NMDA receptor antagonist;
    (vi) a COX-2 selective inhibitor;
    (vii) a NSAID (non-steroidal anti-inflammatory drug);
    (viii) an analgesic;
    (ix) a sodium channel inhibitor;
    (x) an anti-NGF antibody;
    (xi) a $Na_v1.7$ inhibitor;
    (xii) a HCN inhibitor;
    (xiii) a TRPV1 antagonist;
    (xiv) a $Na_v1.7$ biological; and
    (xv) a $Na_v1.8$ biological; and
  pharmaceutically acceptable salts thereof, and
  (3) a pharmaceutically acceptable carrier.

A Nav 1.7 biological means a protein, including, but not limited to, antibodies, nanobodies and peptides, that inhibits the function of the Nav1.7 channel. A Nav 1.8 biological means a protein, including, but not limited to, antibodies, nanobodies and peptides, that inhibits the function of the Nav1.8 channel.

Specific compounds of use in combination with a compound of the present invention include: sodium channel inhibitors, including but not limited to, lidocaine including the lidocaine patch; tricyclic antidepressants including, but not limited to, amitriptyline; and SRI/NRI drugs, including but not limited to, duloxetine.

Suitable opioid agonists include, but are not limited to, codeine, fentanyl, hydrocodone, hydromorphone, levorphanol, meperidine, methadone, morphine, oxycodone, oxymorphone, buprenorphine, butorphanol, dezocine, nalbuphine, pentazocine, and tramadol.

Suitable opioid antagonists include, but are not limited to, naltrexone and naloxone.

Suitable calcium channel antagonists include, but are not limited to, Amlodipine, Diltiazem, Felodipine, gabapentin, Isradipine, Nicardipine, Nifedipine, Nisoldipine, pregabalin, Verapamil, and ziconitide.

Suitable NMDA receptor antagonists include, but are not limited to, ketamine, methadone, memantine, amantadine, and dextromethorphan.

Suitable COX-2 inhibitors include, but are not limited to, celecoxib, etoricoxib and parecoxib.

Suitable NSAIDs or non-steroidal anti-inflammatory drugs include, but are not limited to, aspirin, diclofenac, diflunisal, etodolac, fenoprofin, flurbiprofen, ibuprofen, indomethacin, ketoprofen, meclofenamic acid, mefenamic acid, meloxicam, naproxen, naproxen sodium, oxaprozin, piroxicam, sulindac, and tolmetin.

Suitable analgesics include, but are not limited to, acetaminophen and duloxetine.

The above combinations include combinations of a compound of the present invention not only with one other active compound, but also with two or more other active compounds. Non-limiting examples include combinations of compounds with two or more active compounds selected from: opioid agonists; opioid antagonists; calcium channel antagonists; NMDA receptor agonists; NMDA receptor antagonists; COX-2 selective inhibitors; NSAIDs (non-steroidal anti-inflammatory drugs); and an analgesic.

The compounds of the present invention, or a pharmaceutically acceptable salt thereof, may also be used in combination with spinal cord stimulation therapy and cutaneous stimulation therapy.

The present invention also provides a method for the treatment or prevention of a $Na_v1.8$ sodium ion channel activity mediated disease, disorder or condition, which method comprises administration to a patient in need of such treatment or at risk of developing a $Na_v1.8$ sodium ion channel activity mediated disease with a therapeutically effective amount of a $Na_v1.8$ sodium ion channel activity inhibitor and an amount of one or more active ingredients, such that together they give effective relief.

In a further aspect of the present invention, there is provided a pharmaceutical composition comprising a $Na_v1.8$ sodium ion channel activity inhibitor and one or more active ingredients, together with at least one pharmaceutically acceptable carrier or excipient.

Thus, according to a further aspect of the present invention there is provided the use of a $Na_v1.8$ sodium ion channel activity inhibitor and one or more active ingredients for the manufacture of a medicament for the treatment or prevention of a $Na_v1.8$ sodium ion channel activity mediated disease, disorder or condition. In a further or alternative aspect of the present invention, there is therefore provided a product comprising a $Na_v1.8$ sodium ion channel activity inhibitor and one or more active ingredients as a combined preparation for simultaneous, separate or sequential use in the treatment or prevention of a $Na_v1.8$ sodium ion channel activity mediated disease, disorder or condition. Such a combined preparation may be, for example, in the form of a twin pack.

It will be appreciated that for the treatment or prevention of pain conditions, pruritic conditions and cough conditions, a compound of the present invention may be used in conjunction with another pharmaceutical agent effective to treat that disease, disorder or condition.

The present invention also provides a method for the treatment or prevention of pain conditions, pruritic conditions and cough conditions, which method comprises administration to a patient in need of such treatment an amount of a compound of the present invention and an amount of another pharmaceutical agent effective to threat that disorder, disease or condition, such that together they give effective relief.

The present invention also provides a method for the treatment or prevention of pain conditions, pruritic conditions and cough conditions, which method comprises administration to a patient in need of such treatment an amount of a compound of the present invention and an amount of another pharmaceutical agent useful in treating that particular condition, disorder or disease, such that together they give effective relief.

The term "therapeutically effective amount" means the amount the compound of structural formula I that will elicit the biological or medical response of a cell, tissue, system, animal or human that is being sought by the researcher, veterinarian, medical doctor or other clinician, which includes alleviation of the symptoms of the disorder being treated. The novel methods of treatment of this invention are for disorders known to those skilled in the art. The term "mammal" includes humans, and companion animals such as dogs and cats.

The weight ratio of the compound of the Formula I to the second active ingredient may be varied and will depend upon the effective dose of each ingredient. Generally, an effective dose of each will be used. Thus, for example, when a compound of the Formula I is combined with a COX-2 inhibitor the weight ratio of the compound of the Formula I to the COX-2 inhibitor will generally range from about 1000:1 to about 1:1000, preferably about 200:1 to about 1:200. Combinations of a compound of the Formula I and other active ingredients will generally also be within the aforementioned range, but in each case, an effective dose of each active ingredient should be used.

Methods of Synthesis

The following reaction schemes and Examples illustrate methods which may be employed for the synthesis of the compounds of structural formula I described in this invention. These reaction schemes and Examples are provided to illustrate the invention and are not to be construed as limiting the invention in any manner. All substituents are as defined above unless indicated otherwise. Several strategies based upon synthetic transformations known in the literature of organic synthesis may be employed for the preparation of the compounds of structural formula I. The scope of the invention is defined by the appended claims.

Instrumentation

Reverse phase chromatography was carried out on a Gilson GX-281 equipped with a column selected from the following: Phenomenex Synergi C18 (150 mm×30 mm×4 micron), YMC-Actus Pro C18 (150 mm×30 mm×5 micron), Xtimate C18 (150 mm×25 mm×5 micron), Boston Green ODS (150 mm×30 mm×5 micron), XSELECT C18 (150 mm×30 mm×5 micron), and Waters XSELECT C18 (150 mm×30 mm×5 micron). Conditions included either high pH (0-100% acetonitrile/water eluent comprising 0.1% v/v 10 mM NH4CO3 or 0.05% NH4OH) or low pH (0-95% acetonitrile/water eluent comprising 0.1% v/v TFA) and are noted for some examples.

SFC chiral resolution was carried out on a Sepiate Prep. SFC 100, Multigram II (MG II), THAR80 prep. SFC, or a Waters SFC (80, 200, or 350) using the following conditions: Chiral Method A: AD-H column, 20% EtOH (1.0% $NH_3 \cdot H_2O$); Chiral Method B: AD-3 column, 5-40% EtOH (0.05% DEA)/$CO_2$; Chiral Method C: IG column, 25% EtOH (1.0% $NH_3 \cdot H_2O$); Chiral Method D: AD column, 45% EtOH (0.1% $NH_3 \cdot H_2O$)/$CO_2$; Chiral Method E: AS column, 35% EtOH (1.0% $NH_3 \cdot H_2O$); Chiral Method F: Phenomenex-Amylose-1, 30% EtOH (0.1% $NH_3 \cdot H_2O$)/$CO_2$; Chiral Method G: Phenomenex-Amylose-1, 40% MeOH (0.1% $NH_3 \cdot H_2O$)/$CO_2$; Chiral Method H: IC-3 column, 5-40% MeOH (0.05% DEA)/$CO_2$; Chiral Method I: AD column, 30% EtOH (0.1% $NH_3 \cdot H_2O$)/$CO_2$; Chiral Method J: AD column, 20% EtOH (0.1% $NH_3 \cdot H_2O$)/$CO_2$; Chiral Method K: AD-H column, 40% MeOH (0.1% DEA)/$CO_2$; Chiral Method L: AD-H column, 35% MeOH/$CO_2$; Chiral Method M: AD-H column, 35% EtOH/$CO_2$; Chiral Method N: OJ-H column, 30% MeOH/$CO_2$; Chiral Method 0: AD-H column, 35% iPrOH/$CO_2$; Chiral Method P: AD-H column, 20% MeOH (0.1% DEA)/$CO_2$; Chiral Method Q: AD-H column, 30% MeOH/$CO_2$; Chiral Method R: AD-H column, 50% MeOH/$CO_2$; Chiral Method S: AD-H column, 30% MeOH (0.1% DEA)/$CO_2$; Chiral Method T: AD-H column, 20% MeOH/$CO_2$; Chiral Method U: AD-H column, 10% EtOH/

CO₂; Chiral Method V: AD-H column, 40% EtOH/CO₂; Chiral Method W: WO-H column, 25% MeOH/CO₂; Chiral Method X: WO-H column, 35% EtOH/CO₂; Chiral Method Y: Phenomenex-Amylose-1, 45% EtOH (0.05% DEA)/CO₂; Chiral Method Z: Lux Cellulose-2 column, 40% EtOH (0.05% DEA)/CO₂; Chiral Method AA: OD column, 15% EtOH (0.05% DEA)/CO₂; Chiral Method AB: OD column, 5-40% EtOH (0.05% DEA)/CO₂; Chiral Method AC: OJ-H column, 15% EtOH (0.1% NH₃·H₂O)/CO₂; Chiral Method AD: Whelk-01 (S,S) column, 30% MeOH/CO₂; Chiral Method AE: AD-H column, 10% MeOH/CO₂; Chiral Method AF: AD-H column, 15% MeOH/CO₂; Chiral Method AG: AD-H column, 30% EtOH (0.2% DIPA)/CO₂; Chiral Method AH: OJ-H column, 25% MeOH/CO₂; and Chiral Method AI: AD column, 30% EtOH/CO₂. LC/MS determinations were carried out on a Waters Classing Aquity system equipped with TUV and MS detectors and a Waters SQD mass spectrometer, a Shimadzu 20 UV 254 and 220 nM with Shimadzu 2010 or 2020 mass spectrometer, or an Agilent 1200 HPLC quipped with DAD/ELSD and G6110 MSD using one of the following conditions: 1) Ascentis Express C18 (3×50 mm) 2.7 μm column using mobile phase containing A: 0.05% TFA in water and B: 0.05% TFA in acetonitrile with a gradient from 90:10 (A:B) to 5:95 (A:B) over 6 min at a flow rate of 1.8 mL/min, UV detection at 210 nm; 2) Aquity BEH C18, (1.0×50 mm) 1.7 μm column using mobile phase containing A: 0.05% TFA in water and B: 0.05% TFA in acetonitrile with a gradient from 90:10 (A:B) to 5:95 (A:B) over 2 min at a flow rate of 0.3 mL/min, UV detection at 215 nm; 3) Agilent YMC J'Sphere H-80 (3×50 mm) 5 μm column using mobile phase containing A: 0.1% TFA in water and B: acetonitrile with a gradient from 95:5 (A:B) to 0:100 (A:B) over 3.6 min and 0:100 (A:B) for 0.4 min at a flow rate of 1.4 mL/min, UV detection at 254 and 220 nm and Agilent 1100 quadrupole mass spectrometer; and 4) an Agilent TC-C18 (2.1×50 mm) 5 μm column using mobile phase containing A: 0.0375% TFA in water and B: 0.01875% TFA in acetonitrile with a gradient from 90:10 (A:B) for 0.4 min to 90:10 to 0:100 (A:B) over 3 min and 10:90 (A:B) for 0.6 min at a flow rate of 0.8 mL/min, UV detection at 254 and 220 nm and Agilent 6110 quadrupole mass spectrometer.

Proton or ¹H NMR was acquired using a Varian Unity-Inova 400 MHz NMR spectrometer equipped with a Varian 400 ATB PFG 5 mm, Nalorac DBG 400-5 or a Nalorac IDG 400-5 probe, a Varian-400 MHz MR spectrometer equipped with an Auto X ID PFG Probe 5 mm, a Varian 400 MHz VNMRS spectrometer equipped with a PFG 4Nuc Probe 5 mm, or a Bruker AvanceIII 500 MHz spectrometer equipped with a PABBO Probe 5 mm in accordance with standard analytical techniques, unless specified otherwise, and results of spectral analysis are reported. Chemical shift (δ) values are reported in delta (δ) units, parts per million (ppm). Chemical shifts for ¹H NMR spectra are given relative to signals for residual non-deuterated solvent (CDCl₃ referenced at δ 7.26 ppm; DMSO d-6 referenced at δ 2.50 ppm and CD₃OD referenced at δ 3.31 ppm). Multiples are reported by the following abbreviations: s=singlet, d=doublet, t=triplet, q=quartet, dd=doublet of doublets, m=multiplet or overlap of nonequivalent resonances. Coupling constants (J) are reported in Hertz (Hz).

Abbreviations

AcOH or is acetic acid; aq. is aqueous; Boc is tert-butoxycarbonyl; BH₃ DMS is borane dimethylsulfide; Calc'd is calculated; CDI is 1,1'-carbonyldiimidazole, DAST is diethylaminosulfur trifluoride; DCE is dichloroethane; DCM is dichloromethane; DEA is diethanolamine; DIBAL or DIBAL-H is diisobutylaluminum hydride; DIEA is diisopropylamine; DMA is dimethylacetamide; DMAP is 4-dimethylamino-pyridine; DMF is dimethylformamide; DMSO is dimethylsulfoxide; dppf is 1,1'-bis(diphenyl-phosphino)ferrocene; EDC is 1-ethyl-3-(3-dimethylaminopropyl)carbodiimide; Et₂O is diethyl ether; EtOAc is ethyl acetate; EtOH is ethanol; g is grams; h or hr(s) is hour(s); HATU is 1-[bis(dimethylamino)-methylene]-1H-1,2,3-triazolo[4,5-b]pyridinium-3-oxidehexafluoro-phosphate; Hex is hexanes; HOAt is 1-Hydroxy-7-azabenzotriazole; HPLC is high-performance liquid chromatography; IPA is isopropyl alcohol; iPrMgCl is isopropylmagnesium chloride; iPrMgCl-LiCl is isopropylmagnesium chloride lithium chloride complex; L is liter; LC/MS is liquid chromatography/mass spectrometry; LRMS is low resolution mass spectrometry; M is molar; Me is methyl; MeOH is methanol; mg is milligrams; mL is milliliter; mmol is millimolar; n-BuLi is n-butyllithium; NH₄OAc is ammonium acetate; NMO is 4-Methylmorpholine N-oxide; NMP is N-methylpyrrolidone; MeCN is acetonitrile; MTBE is methyl tert-butyl ether; PCC is pyridinium chlorochromate; Pd/C is palladium on carbon; Pd(dppf)Cl₂ is [1,1'-bis(diphenyl-phosphino)-ferrocene]dichloropalladium(II); Pd(PPh₃)₄ is tetrakis(triphenylphosphine)-palladium(0); PE is petroleum ether; PG is protecting group; prep is preparative; rt or RT is room temperature; sat. is saturated; SFC is Supercritical Fluid Chromatography; T₃P® is 2,4,6-Tripropyl-1,3,5,2,4,6-trioxatriphosphorinane-2,4,6-trioxide; TBAF is tetra-n-butylammonium fluoride; tBuXPhos Pd G3 is [(2-Di-tert-butylphosphino-2',4',6'-triisopropyl-1,1'-biphenyl)-2-(2'-amino-1,1'-biphenyl)] palladium(II) methanesulfonate; SCX is strong cation exchange; TEA is triethylamine; TFA is trifluoroacetic acid; THF is tetrahydrofuran; Ti(OEt)₄ is titanium (IV) ethoxide; Ti(OiPr)₄ is titanium (IV) isopropoxide; TMS Diazomethane is trimethylsilyl diazomethane; and UV is ultraviolet.

As illustrated in Scheme A, in general, compounds of the invention can be prepared by condensation between an appropriately functionalized aldehyde A-1 and tert-butanesulfinamide, utilizing dehydrating agents such as Ti(OEt)₄ or Ti(OiPr)₄, to afford intermediate A-2. Intermediate A-2 can then be reacted with a variety of organometallic nucleophiles A-3 to give intermediate A-4, which can be deprotected under acidic conditions to give amines of formula A-5. Amine A-5 can then be brought together with materials of oxazolidinone A-6, utilizing amide coupling conditions (Z=OH) or nucleophilic displacement reactions (Z=Cl) to deliver compounds of formula A-7. In some embodiments, a protecting group, such as Boc, may need to be removed throughout the course of synthesis. Aldehydes of type A-1 and organometallics of type A-3 are commercially available or may be synthesized from appropriate intermediates.

Scheme A

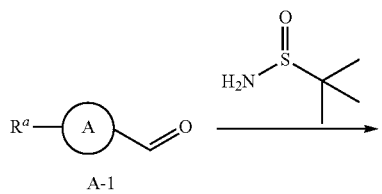

A-1

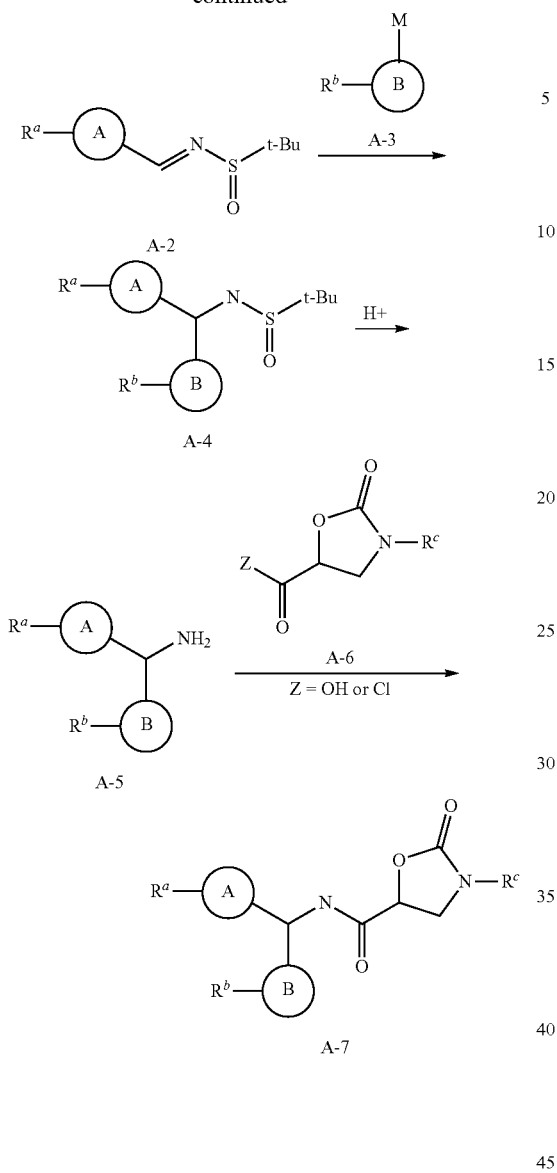
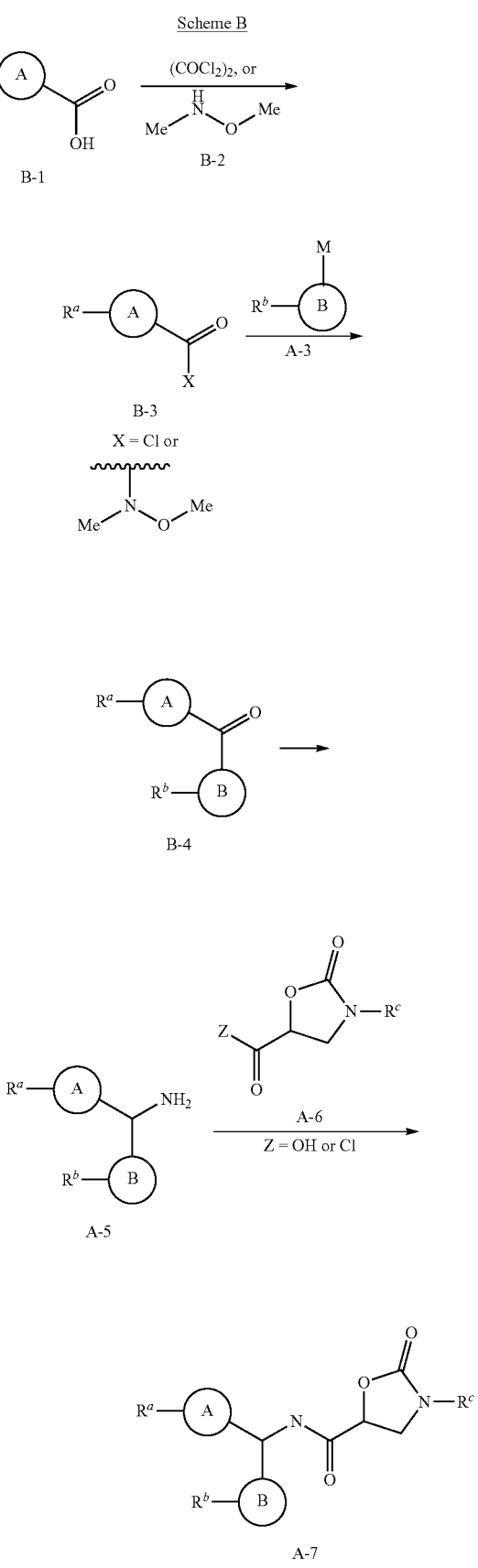

As illustrated in Scheme B, in general, compounds of the invention can be prepared by activation of appropriately functionalized carboxylic acid B-1 with either (COCl)$_2$ or amide coupling with amine B-2 to give intermediates of B-3. These intermediates are then suitable to for reaction with a variety of organometallic nucleophiles A-3 to give intermediate B-4. Intermediate B-4 can then undergo reductive amination reaction in the presence of an amine source and reductant to yield intermediates of A-5. In some cases, tert-butanesulfinamide was used as the amine source and would require deprotection (in an acidic environment) following reductive amination. Amine A-5 can then be brought together with materials of oxazolidinone A-6, utilizing amide coupling conditions (Z=OH) or nucleophilic displacement reactions (Z=Cl) to deliver compounds of formula A-7. In some embodiments, a protecting group, such as Boc, may need to be removed throughout the course of synthesis. Carboxylic acid of type B-1 and organometallics of type A-3 are commercially available or may be synthesized from appropriate intermediates.

INTERMEDIATES

Intermediate 1

N-methoxy-N-methylbicyclo[2.2.1]heptane-1-carboxamide

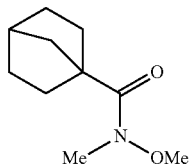 [SMILES: CON(C)C(=O)C12CCC(CC1)C2]

To a mixture of bicyclo[2.2.1]heptane-1-carboxylic acid (0.20 g, 1.4 mmol) in DCM (12 mL) was added CDI (0.23 g, 1.4 mmol) and the mixture was stirred at rt for 1 h. Then N,O-dimethylhydroxylamine hydrochloride (0.15 g, 1.6 mmol) and TEA (0.21 mL, 1.4 mmol) were added, and the mixture was stirred at rt for 16 h, followed by concentrating in vacuo. The resulting residue was purified by silica gel chromatography (0-30% EtOAc:PE) to give the title compound.

Intermediate 2

N-methoxy-N-methyl-3-(trifluoromethyl)bicyclo[1.1.1]pentane-1-carboxamide

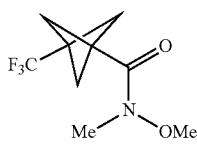 [SMILES: CON(C)C(=O)C12CC(C(F)(F)F)(C1)C2]

The title compound was synthesized in a similar manner to that of intermediate 1, starting from 3-(trifluoromethyl)bicyclo[1.1.1]pentane-1-carboxylic acid.

Intermediate 3

(R)—N-((3-chloro-4-fluorophenyl)(5-chloropyridin-3-yl)methyl)-2-methylpropane-2-sulfinamide

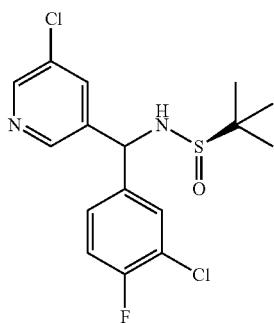 [SMILES: CC(C)(C)[S@@](=O)NC(c1cncc(Cl)c1)c1ccc(F)c(Cl)c1]

Step 1: (R)—N-(3-chloro-4-fluorobenzylidene)-2-methylpropane-2-sulfinamide. To a mixture of 3-chloro-4-fluorobenzaldehyde (4.0 g, 25 mmol) and (R)-2-methylpropane-2-sulfinamide (4.6 g, 38 mmol) in THF (50 mL) was added Ti(OEt)$_4$ (17 g, 76 mmol). The mixture was stirred at 50° C. for 12 h, then water was added and the mixture was filtered. The filtrate was extracted with EtOAc, washed with brine, dried over Na$_2$SO$_4$, filtered and concentrated in vacuo. The resulting residue was purified by silica gel chromatography (0-25% EtOAc:PE) to give the title compound.

Step 2: (R)—N-((3-chloro-4-fluorophenyl)(5-chloropyridin-3-yl)methyl)-2-methylpropane-2-sulfinamide. To a solution of 3-bromo-5-chloropyridine (0.40 g, 2.1 mmol) in THF (10 mL) was added n-BuLi (0.92 mL, 2.3 mmol) at −70° C. The reaction mixture was stirred at −70° C. for 30 min, then a solution of (R)—N-(3-chloro-4-fluorobenzylidene)-2-methylpropane-2-sulfinamide (0.50 g, 1.9 mmol) in THF (5 mL) was added. The reaction mixture was stirred at −70° C. for 2 h. Then the mixture was quenched by saturated NH$_4$Cl and extracted with EtOAc. The combined organic layers were dried over Na$_2$SO$_4$, filtered and concentrated in vacuo. The resulting residue was purified by silica gel chromatography (0-50% EtOAc:PE) to give the title compound.

Intermediate 4

N-methoxy-N-methyl-1-(2,2,2-trifluoroethyl)-1H-pyrazole-4-carboxamide

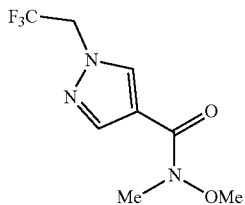 [SMILES: CON(C)C(=O)c1cnn(CC(F)(F)F)c1]

Step 1: ethyl 1-(2,2,2-trifluoroethyl)-1H-pyrazole-4-carboxylate. To a mixture of methyl 1H-pyrazole-4-carboxylate (1.0 g, 7.1 mmol) and K$_2$CO$_3$ (2.0 g, 14 mmol) in MeCN (10 mL) was added 2,2,2-trifluoroethyl trifluoromethanesulfonate (2.5 g, 11 mmol). The resulting mixture was stirred at 80° C. for 18 h. Then water was added, and the mixture was extracted with EtOAc. The combined organic layers were washed with brine, dried over Na$_2$SO$_4$, filtered and concentrated in vacuo. The crude product was purified by silica gel chromatography (35% EtOAc:PE) to give the title compound.

Step 2: 1-(2,2,2-trifluoroethyl)-1H-pyrazole-4-carboxylic acid. To a mixture of ethyl 1-(2,2,2-trifluoroethyl)-1H-pyrazole-4-carboxylate (1.4 g, 6.3 mmol) in ethanol (3 mL) and water (3 mL) was added NaOH (0.50 g, 13 mmol) at 20° C. The resulting mixture was stirred at 80° C. for 30 min. Then the mixture was concentrated in vacuo, diluted with EtOAc, and washed with HCl (0.5 M). The organic layer was dried over Na$_2$SO$_4$, filtered and concentrated in vacuo to give the title compound.

Step 3: N-methoxy-N-methyl-1-(2,2,2-trifluoroethyl)-1H-pyrazole-4-carboxamide. To a solution of 1-(2,2,2-trifluoroethyl)-1H-pyrazole-4-carboxylic acid (1.1 g, 5.7 mmol) in DMF (1 mL) was added TEA (1.6 mL, 11 mmol) and HATU (3.2 g, 8.5 mmol), followed by N,O-dimethylhydroxylamine hydrochloride (0.66 g, 6.8 mmol). The reaction was stirred at rt for 10 h, then diluted with water and extracted with EtOAc. The combined organic layers were washed with brine, dried over Na$_2$SO$_4$, filtered and concentrated in vacuo. The crude product was purified by silica gel chromatography (31% EtOAc:PE) to give the title compound.

Intermediate 5

(R)—N-((3-chloro-4-fluorophenyl)(5-chloropyridin-3-yl)methyl)-2-methylpropane-2-sulfinamide

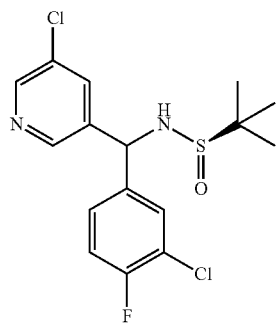 [SMILES: CC(C)(C)[S@@](=O)NC(c1cncc(Cl)c1)c1ccc(F)c(Cl)c1]

The title compound was prepared in a similar manner to that of intermediate 3 utilizing 2-bromo-5-chloropyridine.

Intermediate 6

6-(difluoromethyl)-5-fluoropicolinaldehyde

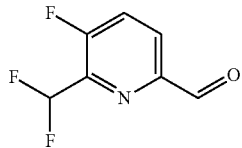 [SMILES: O=Cc1ccc(F)c(C(F)F)n1]

Step 1: 6-chloro-2-(difluoromethyl)-3-fluoropyridine. To a solution of 6-chloro-3-fluoropicolinaldehyde (2.0 g, 12 mmol) in CHCl$_3$ (35 mL) was slowly added DAST (5.0 mL, 7.6 mmol) at 0° C., and the mixture was degassed and backfilled with N$_2$ (three times). The mixture was stirred at rt for 12 h, then quenched with water and extracted with DCM. The combined organic layers were concentrated in vacuo to give the title compound.

Step 2: 2-(difluoromethyl)-3-fluoro-6-vinylpyridine. To a mixture of 6-chloro-2-(difluoro-methyl)-3-fluoropyridine (2.2 g, 12 mmol), potassium trifluoro(vinyl)borate (3.2 g, 24 mmol) and K$_2$CO$_3$ (3.4 g, 24 mmol) in THF (25 mL) and water (0.1 mL) was added Pd(dppf)Cl$_2$ (0.89 g, 1.2 mmol). The mixture was stirred at 80° C. for 12 h. Then the mixture was filtered, and the filtrate was concentrated in vacuo to give the title compound.

Step 3: 6-(difluoromethyl)-5-fluoropicolinaldehyde. A mixture of 2-(difluoromethyl)-3-fluoro-6-vinylpyridine (1.8 g crude), NMO (2.4 g, 21 mmol) and OsO$_4$ (0.033 mL, 0.10 mmol) in THF (25 mL) and water (5 mL). The mixture was stirred at rt for 2 h, then NaIO$_4$ (11 g, 52 mmol) was added to the mixture and stirred at rt for additional 2 h. Then the mixture was diluted with water, and the mixture was extracted with EtOAc. The combined organic layers were washed with brine, dried over Na$_2$SO$_4$, filtered and concentrated in vacuo to give the title compound.

Intermediate 7

(4-chlorophenyl)(2-(trifluoromethyl)-1H-imidazol-5-yl)methanamine 2,2,2-trifluoroacetate

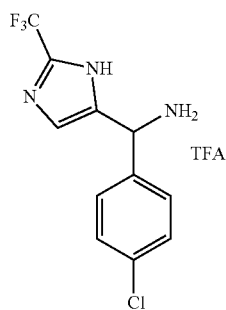 [SMILES: NC(c1ccc(Cl)cc1)c1cnc(C(F)(F)F)[nH]1]

Step 1: 2-(4-chlorophenyl)-2-(1,3-dioxoisoindolin-2-yl)acetic acid. To a solution of 2-amino-2-(4-chlorophenyl)acetic acid (3.0 g, 16 mmol) was added AcOH (42 mL) and pyridine (28 mL). The mixture was stirred at 120° C. for 10 h. Then the reaction solution was filtered, diluted with water and extracted with EtOAc. The combined organic layers were washed with brine, dried over Na$_2$SO$_4$, filtered and concentrated in vacuo. The resulting residue was purified by silica gel chromatography (0-15% DCM:MeOH) to give the title compound.

Step 2: 2-(3-bromo-1-(4-chlorophenyl)-2-oxopropyl)isoindoline-1,3-dione. To a solution of 2-(4-chlorophenyl)-2-(1,3-dioxoisoindolin-2-yl)acetic acid (1.0 g, 3.2 mmol) in DCM (15 mL) was added (COCl)$_2$ (0.80 g, 6.3 mmol). The mixture was stirred at 16° C. for 11 h, then concentrated in vacuo before being taken up in DCM (15 mL). Then (diazomethyl) trimethylsilane (6.3 mL, 13 mmol) was added at −20° C. The reaction mixture was stirred at 16° C. for 2 h, then cooled to −20° C. before hydrogen bromide (3.0 mL, 3.2 mmol) was added dropwise. The mixture was stirred at 16° C. for 2 h, then quenched with saturated NaHCO$_3$ solution at 0° C., and extracted with EtOAc. The combined organic layers were dried over Na$_2$SO$_4$, filtered, and the filtrate was concentrated in vacuo to give the title compound.

Step 3: 2-((4-chlorophenyl)(2-(trifluoromethyl)-1H-imidazol-4-yl)methyl)isoindoline-1,3-dione. To a solution of 2-(3-bromo-1-(4-chlorophenyl)-2-oxopropyl)isoindoline-1, 3-dione (1.0 g crude) and NaHCO$_3$(0.40 g, 4.8 mmol) in THF (10 mL) was added 2,2,2-trifluoroacetimidamide (0.27 g, 2.4 mmol). The mixture was stirred at 60° C. for 11 h, then diluted with water and extracted with EtOAc. The combined organic layers were dried over Na$_2$SO$_4$, filtered and the filtrate was concentrated in vacuo. The resulting residue was purified by preparative silica gel TLC (25% EtOAc:PE) to give the title compound.

Step 4: (4-chlorophenyl)(2-(trifluoromethyl)-1H-imidazol-5-yl)methanamine 2,2,2 trifluoroacetate. To a solution of 2-((4-chlorophenyl)(2-(trifluoromethyl)-1H-imidazol-4-yl)methyl)isoindoline-1,3-dione (0.20 g, 0.49 mmol) in EtOH (3 mL) was added N$_2$H$_4$·H$_2$O (74 mg, 1.5 mmol). The mixture was stirred at 16° C. for 11 h, then diluted with water and MeCN, and concentrated in vacuo. The resulting residue was reverse phase HPLC (80:20 to 50:50; water (0.1% TFA):MeCN (0.1% TFA)), followed by lyophilization to give the title compound.

Intermediate 8

(3-chloro-4-fluorophenyl)(1-methyl-3-(trifluoromethyl)-1H-pyrazol-5-yl)methanamine hydrochloride

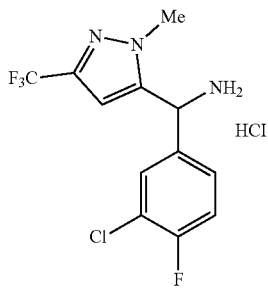

Step 1: N-methoxy-N,1-dimethyl-3-(trifluoromethyl)-1H-pyrazole-5-carboxamide. To a solution of 1-methyl-3-(trifluoromethyl)-1H-pyrazole-5-carboxylic acid (0.40 g, 2.1 mmol) and DIEA (1.1 mL, 6.2 mmol) in DMF (15 mL) was added HATU (1.6 g, 4.1 mmol) at 0° C. for 10 min. Then N,O-dimethylhydroxylamine hydrochloride (0.30 g, 3.1 mmol) was added, and the resulting mixture was stirred at rt for 2 h. The reaction mixture was quenched with water and extracted with EtOAc. The combined organic layers were washed with brine, dried over $Na_2SO_4$, filtered and concentrated in vacuo. The resulting residue was purified by silica gel chromatography (37% EtOAc:PE) to give the title compound.

Step 2: (3-chloro-4-fluorophenyl)(1-methyl-3-(trifluoromethyl)-1H-pyrazol-5-yl)methanone. To a stirred solution of 4-bromo-2-chloro-1-fluorobenzene (1.3 g, 6.3 mmol) in THF (8 mL) was added iPrMgCl (2.8 mL, 5.7 mmol, 2 M in THF) at 0° C. The mixture was warmed to rt and stirred 1 h. Then N-methoxy-N,1-dimethyl-3-(trifluoromethyl)-1H-pyrazole-5-carboxamide (0.45 g, 1.9 mmol) in THF (3 mL) was added. The reaction was stirred at 0° C. for 30 min, then the temperature was slowly warmed to rt and stirred for another 2 h. The reaction was quenched with saturated $NH_4Cl$ and extracted with EtOAc. The combined organic layers were washed with brine, dried over $Na_2SO_4$, filtered and concentrated in vacuo. The resulting residue was purified by preparative silica gel TLC (10% EtOAc:PE) to give the title compound.

Step 3: (R)—N-((3-chloro-4-fluorophenyl)(1-methyl-3-(trifluoromethyl)-1H-pyrazol-5-yl)methyl)-2-methylpropane-2-sulfinamide. To a microwave tube charged with (3-chloro-4-fluorophenyl)(1-methyl-3-(trifluoromethyl)-1H-pyrazol-5-yl)methanone (0.20 g, 0.65 mmol), (R)-2-methylpropane-2-sulfinamide (0.16 g, 1.3 mmol) in toluene (3 mL) was added Ti(OEt)$_4$ (0.27 mL, 1.3 mmol). The mixture was heated via microwave irradiation at 105° C. for 30 min. Then THF (3 mL) and water (0.01 mL) were added, and the mixture was cooled to −78° C. NaBH$_4$ (44 mg, 1.2 mmol) was added to the mixture, which was stirred at −78° C. for 30 minutes, then gradually warmed to 0° C. over 30 minutes and kept at 0° C. for 30 minutes. Then the mixture was quenched by the addition of saturated NaHCO$_3$ and extracted with EtOAc. The combined organic layers were washed with brine, dried over $Na_2SO_4$ and concentrated in vacuo. The resulting residue was purified by preparative silica gel TLC (50% EtOAc:PE) to give the title compound.

Step 4. (3-chloro-4-fluorophenyl)(1-methyl-3-(trifluoromethyl)-1H-pyrazol-5-yl)methanamine hydrochloride. To a solution of (R)—N-((3-chloro-4-fluorophenyl)(1-methyl-3-(trifluoromethyl)-1H-pyrazol-5-yl)methyl)-2-methylpropane-2-sulfinamide (0.30 g, 0.73 mmol) in MeOH (2 mL) was added HCl (0.18 mL, 0.73 mmol, 4 N in MeOH). The mixture was stirred at rt for 1 hour, then concentrated in vacuo to give the title compound.

Intermediate 9

(3-chloro-4-fluorophenyl)(1-methyl-5-(trifluoromethyl)-1H-pyrazol-3-yl)methanamine hydrochloride

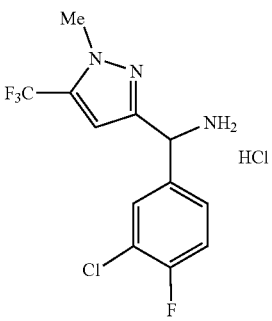 [SMILES: Cn1nc(C(N)c2ccc(F)c(Cl)c2)cc1C(F)(F)F ; Cl]

Step 1: (3-chloro-4-fluorophenyl)(1-methyl-5-(trifluoromethyl)-1H-pyrazol-3-yl)methanone. To a solution of (3-chloro-4-fluorophenyl)(5-(trifluoromethyl)-1H-pyrazol-3-yl)methanone (0.20 g, 0.68 mmol, prepared in step 2 of Example 5A and 5B) and $K_2CO_3$ (0.19 g, 1.4 mmol) in DMF was added iodomethane (0.19 g, 1.4 mmol). The mixture was stirred at rt for 1 hour, then diluted with water and extracted with EtOAc. The combined organic layers were washed with brine, dried over $Na_2SO_4$, filtered and concentrated in vacuo. The resulting residue was purified by reverse phase HPLC (20:80 to 0:100 water (0.1% TFA):MeCN (0.1% TFA)), followed by lyophilization to give the title compound (second eluted peak).

Step 2: (3-chloro-4-fluorophenyl)(1-methyl-5-(trifluoromethyl)-1H-pyrazol-3-yl)methanamine hydrochloride. The title compound was synthesized in a similar manner to that of Intermediate 8 starting from (3-chloro-4-fluorophenyl)(1-methyl-5-(trifluoromethyl)-1H-pyrazol-3-yl)methanone.

Intermediate 10

5-chloro-6-(trifluoromethyl)picolinaldehyde

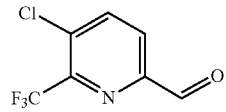

The title compound was synthesized in a similar manner to that of intermediate 6, starting from 3,6-dichloro-2-(trifluoromethyl)pyridine.

Intermediate 11

(5-chloro-6-(trifluoromethyl)pyridin-2-yl)(4,4-difluorocyclohexyl)methanamine hydrochloride

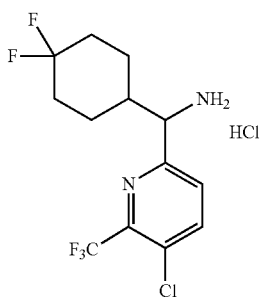 [SMILES: NC(c1ccc(Cl)c(C(F)(F)F)n1)C1CCC(F)(F)CC1 ; Cl]

Step 1: (5-chloro-6-(trifluoromethyl)pyridin-2-yl)(4,4-difluorocyclohexyl)methanone. To a solution of 5-chloro-6-(trifluoromethyl)picolinaldehyde (0.35 g, 1.7 mmol, intermediate 10), and N'-(4,4-difluorocyclohexylidene)-4-methylbenzenesulfonohydrazide (1.0 g, 3.3 mmol) in 1,4-dioxane (15 mL) was added $Cs_2CO_3$ (1.1 g, 3.3 mmol). The reaction was heated to 100° C. for 12 h, then filtered. The filtrate was concentrated in vacuo to give a residue, which was purified by silica gel chromatography (30% EtOAc:PE) to give the title compound.

Step 2: (5-chloro-6-(trifluoromethyl)pyridin-2-yl)(4,4-difluorocyclohexyl)methanamine hydrochloride. The title compound was synthesized in a similar manner to that of intermediate 8 starting from (5-chloro-6-(trifluoromethyl)pyridin-2-yl)(4,4-difluorocyclohexyl)methanone.

Intermediate 12

2-(trifluoromethyl)oxazole-4-carboxylic Acid

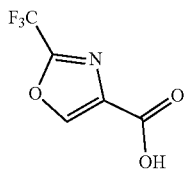

Step 1: ethyl 2-(trifluoromethyl)oxazole-4-carboxylate. To a stirred solution of ethyl 2-bromooxazole-4-carboxylate (0.50 g, 2.3 mmol) in DMF (5.0 mL) were added CuI (0.87 g, 4.6 mmol) and methyl 2,2-difluoro-2-(fluorosulfonyl)acetate (0.87 g, 4.6 mmol). The reaction was stirred at 80° C. for 12 h. Then the mixture was diluted with MTBE, filtered through a Celite® pad, and washed with MTBE. The filtrate was washed with water, brine, dried over $Na_2SO_4$, filtered and concentrated in vacuo. The resulting residue was purified by prep. silica gel TLC (20% EtOAc:PE) to give the title compound.

Step 2: 2-(trifluoromethyl)oxazole-4-carboxylic acid. To a stirred solution of ethyl 2-(trifluoromethyl)oxazole-4-carboxylate (0.20 g, 0.96 mmol) in DCM (8 mL) was added DIBAL-H (2.4 mL, 2.4 mmol) at −78° C. The mixture was stirred at −78° C. for 5 h, then quenched with saturated $NH_4Cl$ and extracted with DCM. The organic layers were dried over $Na_2SO_4$ and filtered to give the title compound as a solution in DCM.

Intermediate 13

(3-chloro-4-fluorophenyl)(5-fluoro-6-(trifluoromethyl)pyridin-2-yl)methanamine

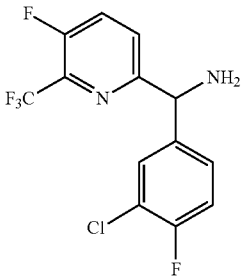 [SMILES: NC(c1ccc(F)c(Cl)c1)c1ccc(F)c(C(F)(F)F)n1]

Step 1: 5-fluoro-N-methoxy-N-methyl-6-(trifluoromethyl)picolinamide. A solution of 6-chloro-3-fluoro-2-(trifluoromethyl)pyridine (0.75 g, 3.8 mmol), TEA (2.1 mL, 15 mmol), N,O-dimethylhydroxylamine, HCl (1.1 g, 11 mmol), and Pd(dppf)Cl$_2$ (0.28 g, 0.38 mmol) in DMF (30 mL) was degassed with 3×N$_2$, followed by 3×CO (80 psi)), and then left exposed to 80 psi of CO and heated to 80° C. for 12 hours. The mixture was diluted with saturated NH$_4$Cl and extracted with EtOAc. The combined organic layers were washed with saturated NaHCO$_3$, brine, dried over Na$_2$SO$_4$, filtered and concentrated in vacuo. The resulting crude material was used in the next step without further purification.

Step 2: (3-chloro-4-fluorophenyl)(5-fluoro-6-(trifluoromethyl)pyridin-2-yl)methanamine. The title compound was prepared in a similar manner to that of Examples 1A and 1B starting from 5-fluoro-N-methoxy-N-methyl-6-(trifluoromethyl)picolinamide (from Step 1).

Intermediate 14

1,1-bis(4-chlorophenyl)ethan-1-amine

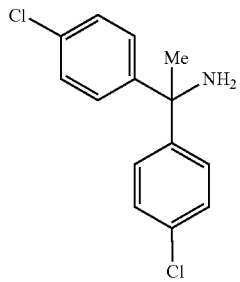 [SMILES: CC(N)(c1ccc(Cl)cc1)c1ccc(Cl)cc1]

Step 1: N-(bis(4-chlorophenyl)methylene)-2-methylpropane-2-sulfinamide. Bis(4-chlorophenyl)methanone (0.10 g, 0.40 mmol) and 2-methylpropane-2-sulfinamide (0.053 g, 0.44 mmol) were taken up in toluene (2 mL), and then Ti(OiPr)$_4$ (0.24 mL, 0.80 mmol) was added. This mixture was allowed to stir for 2 hours, then diluted with brine, filtered through sand and extracted with EtOAc. The combined organic layers were washed with saturated NH₄Cl, brine, dried over Na₂SO₄, filtered, and concentrated in vacuo to give the title compound.

Step 2: N-(1,1-bis(4-chlorophenyl)ethyl)-2-methylpropane-2-sulfinamide. N-(bis(4-chloro-phenyl)methylene)-2-methylpropane-2-sulfinamide (0.14 g, 0.40 mmol) was taken up in THF (2 mL), and then methyllithium (0.53 mL, 0.80 mmol, in THF) was added at −78° C. The mixture was stirred for 1 hour at −78° C., then allowed to warm to rt. The mixture was then diluted with sat. NH₄Cl, filtered through a Celite® pad, nd concentrated in vacuo to give the title compound.

Step 3: 1,1-bis(4-chlorophenyl)ethan-1-amine. N-(1,1-bis(4-chlorophenyl)ethyl)-2-methyl-propane-2-sulfinamide (0.15 g, 0.4 mmol) was taken up in EtOAc (4 mL) and HCl (gas) was bubbled through solution for 15 seconds until saturated. Then the mixture was concentrated in vacuo. The resulting material was then taken up in MeOH and loaded onto a SCX column flushing with MeOH, then eluted with 15 mL of NH₃ (7 N in MeOH), followed by concentrating in vacuo to give the title compound.

Intermediate 15

N-(3-cyano-4-fluorobenzylidene)-2-methylpropane-2-sulfinamide

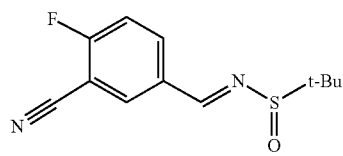 [SMILES: CC(C)(C)S(=O)/N=C/c1ccc(F)c(C#N)c1]

The title compound was prepared in a similar manner to that in intermediate 14, starting from 2-fluoro-5-formylbenzonitrile.

Intermediate 16

(4-chlorophenyl)(1-(2,2,2-trifluoroethyl)piperidin-4-yl)methanamine

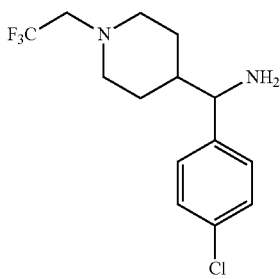 [SMILES: NC(c1ccc(Cl)cc1)C1CCN(CC(F)(F)F)CC1]

Step 1: N-methoxy-N-methyl-1-(2,2,2-trifluoroethyl)piperidine-4-carboxamide. 1-(2,2,2-trifluoroethyl)piperidine-4-carboxylic acid (0.50 g, 2.4 mmol) and N,O-dimethylhydroxylamine, HCl (0.28 g, 2.8 mmol) were taken up in DCM (15 mL), then HOAt (0.42 g, 3.1 mmol) was added, followed by EDC (0.54 g, 2.8 mmol) and DIEA (1.5 mL, 8.5 mmol). The mixture was stirred overnight, then concentrated in vacuo. The resulting residue was purified by mass directed reverse phase HPLC to give the title compound.

Step 2: (4-chlorophenyl)(1-(2,2,2-trifluoroethyl)piperidin-4-yl)methanamine. The title compound was prepared in a similar manner to that of Examples 1A and 1B starting from N-methoxy-N-methyl-1-(2,2,2-trifluoroethyl)piperidine-4-carboxamide.

Intermediate 17

(3-chloro-4-fluorophenyl)(1-(2,2,2-trifluoroethyl)pyrrolidin-3-yl)methanamine

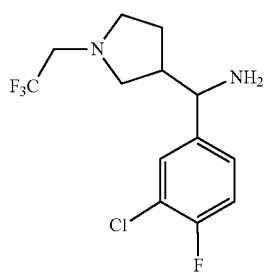 [SMILES: NC(c1ccc(F)c(Cl)c1)C1CCN(CC(F)(F)F)C1]

The title compound was prepared in a similar manner to that of intermediate 16 starting from 1-(2,2,2-trifluoroethyl)pyrrolidine-3-carboxylic acid.

Intermediate 18

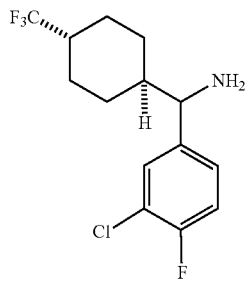 [SMILES: NC(c1ccc(F)c(Cl)c1)[C@H]1CC[C@H](C(F)(F)F)CC1]

Step 1: (3-chloro-4-fluorophenyl)(trans-4-(trifluoromethyl)cyclohexyl)methanone. To a solution of trans-4-(trifluoromethyl)cyclohexanecarboxylic acid (0.57 g, 2.9 mmol) in DCM (5 mL) at 0° C. were added (COCl)₂ (3.6 mL, 7.2 mmol, 2 M in DCM) and one drop of DMF. The mixture was warmed to rt and stirred for 4 hours, then heated to 40° C. and stirred for 30 minutes. The mixture was then concentrated in vacuo to give a residue, which was dissolved in THF (4 mL, solution A). In a separate flask, CuCN (0.65 g, 7.3 mmol) was suspended in THF (4 mL) and cooled to 0° C., followed by the addition of 3-chloro-4-fluorophenylmagnesium bromide (12 mL, 5.8 mmol, 0.5 M in THF). The mixture was stirred at 0° C. for 1 hour, then Solution A was added, and the reaction mixture was stirred at 0° C. for 4 hours. The reaction was then quenched with saturated NH₄Cl and extracted with EtOAc. The combined organic layers were dried over Na₂SO₄, filtered and concentrated in vacuo to give the the title compound.

Step 2: (3-chloro-4-fluorophenyl)(trans-4-(trifluoromethyl)cyclohexyl)methanamine. The title compound was prepared in a similar manner to that of examples 1A and 1B starting from (3-chloro-4-fluorophenyl)(trans-4-(trifluoromethyl)cyclohexyl)methanone.

Intermediate 19

(4-chlorophenyl)(6-(2,2,2-trifluoroethoxy)pyridazin-3-yl)methanone

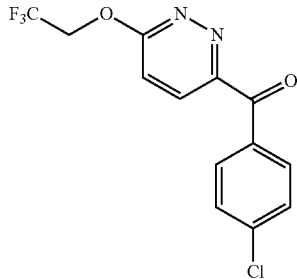 [SMILES: O=C(c1ccc(Cl)cc1)c1ccc(OCC(F)(F)F)nn1]

Step 1: N-methoxy-N-methyl-6-(2,2,2-trifluoroethoxy)pyridazine-3-carboxamide. The title compound was prepared in a similar manner to that of Examples 2A and 2B starting from 6-(2,2,2-trifluoroethoxy)pyridazine-3-carboxylic acid.

Step 2: (4-chlorophenyl)(6-(2,2,2-trifluoroethoxy)pyridazin-3-yl)methanone. The title compound was prepared in a similar manner to that of Examples 1A and 1B starting from N-methoxy-N-methyl-6-(2,2,2-trifluoroethoxy)pyridazine-3-carboxamide.

Intermediate 20

(3-chloro-2,4-difluorophenyl)((trans)-6,6-difluorobicyclo[3.1.0]hexan-3-yl)methanamine

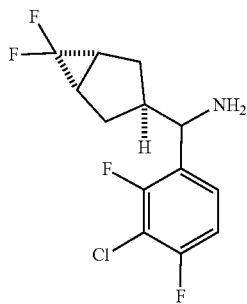 [SMILES: NC(c1ccc(F)c(Cl)c1F)[C@@H]1C[C@@H]2[C@H](C1)C2(F)F]

The title compound was prepared in a similar manner to that of Intermediate 18 starting from (trans)-6,6-difluorobicyclo[3.1.0]hexane-3-carboxylic acid.

Intermediate 21

(R)—N-((5-chloro-6-(trifluoromethyl)pyridin-3-yl)methylene)-2-methylpropane-2-sulfinamide

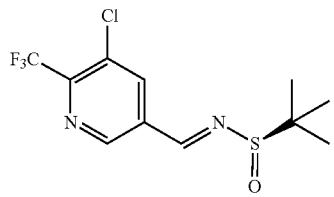 [SMILES: CC(C)(C)[S@@](=O)/N=C/c1cnc(C(F)(F)F)c(Cl)c1]

Step 1: 3-chloro-2-(trifluoromethyl)-5-vinylpyridine. A solution of 3,5-dichloro-2-(trifluoro-methyl)pyridine (5.0 g, 23 mmol) and vinylboronic acid pinacol ester (4.3 mL, 26 mmol) in EtOH (8 mL) and toluene (8 mL) was purged with $N_2$ for 10 min, then $Na_2CO_3$ (7.4 g, 69 mmol), water (1 mL) and $Pd(Ph_3P)_4$ (1.3 g, 1.2 mmol) were added. The mixture was heated to 70° C. and stirred for 3 days. Then the reaction was quenched with water and extracted with $Et_2O$. The combined organic layers were dried over $Na_2SO_4$, filtered and concentrated in vacuo. The resulting residue was purified by silica gel chromatography (0-25% EtOAc:hexane) to give the title compound.

Step 2: 5-chloro-6-(trifluoromethyl)nicotinaldehyde. The title compound was prepared in a similar manner to that of intermediate 6, starting from 3-chloro-2-(trifluoromethyl)-5-vinylpyridine.

Step 2: (R)—N-((5-chloro-6-(trifluoromethyl)pyridin-3-yl)methylene)-2-methylpropane-2-sulfinamide. The title compound was prepared in a similar manner to that of intermediate 3, starting from 5-chloro-6-(trifluoromethyl)nicotinaldehyde.

EXAMPLES

Example 1A and 1B (S)—N—((R)-(3-chloro-4-fluorophenyl)(5-fluoro-6-(2,2,2-trifluoroethoxy)pyridin-2-yl)methyl)-2-oxooxazolidine-5-carboxamide and (S)—N—((S)-(3-chloro-4-fluorophenyl)(5-fluoro-6-(2,2,2-trifluoroethoxy)pyridin-2-yl)methyl)-2-oxooxazolidine-5-carboxamide

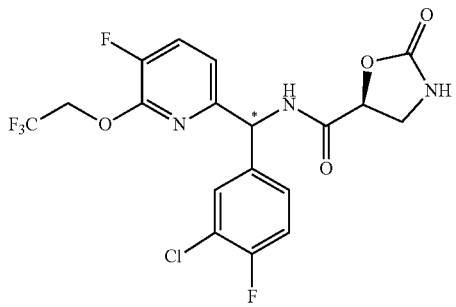 [SMILES: O=C1NC[C@@H](C(=O)NC(c2ccc(F)c(Cl)c2)c2ccc(F)c(OCC(F)(F)F)n2)O1]

Step 1: 6-chloro-5-fluoro-N-methoxy-N-methylpicolinamide. To a mixture of 6-chloro-5-fluoropicolinic acid (5.0 g, 28 mmol) in DCM (20 mL) was added CDI (5.5 g, 34 mmol). The mixture was stirred for 1 h. Then N,O-dimethylhydroxylamine hydrochloride (3.3 g, 34 mmol) and TEA (12 mL, 85 mmol) were added. The mixture was stirred at rt for 16 h, then diluted with water and extracted with DCM. The combined organic layers were washed with brine, dried over $Na_2SO_4$, filtered and concentrated in vacuo. The resulting residue was purified by silica gel chromatography (0-30% EtOAc:PE) to give the title compound.

Step 2: 5-fluoro-N-methoxy-N-methyl-6-(2,2,2-trifluoroethoxy)picolinamide. To a mixture of 6-chloro-5-fluoro-N-methoxy-N-methylpicolinamide (3.0 g, 14 mmol), tBuXPhos Pd G3 (1.0 g, 1.4 mmol) and $Cs_2CO_3$ (9.4 g, 29 mmol) in toluene (20 mL) was added 2,2,2-trifluoro (1.1 g, 11 mmol). The mixture was stirred at 80° C. for 16 h. Then the mixture was filtered, and the filtrate was concentrated in vacuo. The resulting residue was purified by silica gel chromatography (0-30% EtOAc:PE) to give the title compound.

Step 3: (3-chloro-4-fluorophenyl)(5-fluoro-6-(2,2,2-trifluoroethoxy)pyridin-2-yl)methanone. To a solution of 4-bromo-2-chloro-1-fluorobenzene (2.4 g, 12 mmol) in THF (5 mL) was added iPrMgCl (6.5 mL, 8.5 mmol) at 0° C. The mixture was stirred at rt for 1 h. Then a solution of 5-fluoro-N-methoxy-N-methyl-6-(2,2,2-trifluoroethoxy)picolinamide (1.5 g, 5.3 mmol) in THF (5 mL) was added. The resulting mixture was stirred at rt for 16 h, followed by the addition of saturated $NH_4Cl$. The mixture was extracted with EtOAc, and the combined organic layers were dried under $Na_2SO_4$, filtered and concentrated in vacuo. The resulting residue was purified by silica gel chromatography (0-30% EtOAc:PE) to give the title compound.

Step 4: (3-chloro-4-fluorophenyl)(5-fluoro-6-(2,2,2-trifluoroethoxy)pyridin-2-yl)methanamine. $NH_4OAc$ (0.99 g, 13 mmol) and $NaBH_3CN$ (80 mg, 1.3 mmol) were added to a solution of (3-chloro-4-fluorophenyl)(5-fluoro-6-(2,2,2-trifluoroethoxy)pyridin-2-yl)methanone (0.30 g, 0.85 mmol) in EtOH (5 mL) in a 30 mL microwave vial. The mixture was stirred and heated at 130° C. for 10 min in a microwave reactor. Then the reaction mixture was concentrated in vacuo and treated with 2 N NaOH until pH >10. The mixture was then extracted with EtOAc. The organic layer was separated, dried over $Na_2SO_4$, filtered, and concentrated in vacuo. The resulting residue was purified by silica gel chromatography (0-30% EtOAc:PE) to give the title compound.

Step 5: (S)—N—((R and S)-(3-chloro-4-fluorophenyl)(5-fluoro-6-(2,2,2-trifluoroethoxy)pyridin-2-yl)methyl)-2-oxooxazolidine-5-carboxamide. To a solution of (3-chloro-4-fluorophenyl)(5-fluoro-6-(2,2,2-trifluoroethoxy)pyridin-2-yl)methanamine (0.15 g, 0.42 mmol), TEA (86 mg, 0.85 mmol) and (S)-2-oxooxazolidine-5-carboxylic acid (67 mg, 0.51 mmol) in DMF (2 mL) was added $T_3P®$ (0.27 g, 0.85 mmol) and the mixture was stirred at 16° C. for 1 h. The residue was purified by reverse phase HPLC (62:38 to 42:58; water(0.1% TFA):MeCN(0.1% TFA), followed by lyophilization to give the title compound.

Step 6: (S)—N—((R or S)-(3-chloro-4-fluorophenyl)(5-fluoro-6-(2,2,2-trifluoroethoxy)pyridin-2-yl)methyl)-2-oxooxazolidine-5-carboxamide. (S)—N—((R and S)-(3-chloro-4-fluorophenyl)(5-fluoro-6-(2,2,2-trifluoroethoxy)pyridin-2-yl)methyl)-2-oxooxazolidine-5-carboxamide was separated by chiral-SFC (method A), to give the title compounds: first eluted diastereomer 1A (S)—N—((R or S)-(3-chloro-4-fluorophenyl)(5-fluoro-6-(2,2,2-trifluoroethoxy)pyridin-2-yl)methyl)-2-oxooxazolidine-5-carboxamide and second eluted diastereomer 1B (S)—N—((R or S)-(3-chloro-4-fluorophenyl)(5-fluoro-6-(2,2,2-trifluoroethoxy)pyridin-2-yl)methyl)-2-oxo-oxazolidine-5-carboxamide.

Diastereomer 1A: LRMS m/z (M+H): calculated 466.1, observed 466.0. $^1$H NMR (500 MHz, $CD_3OD$) δ 7.59 (dd, J=8.0, 9.5 Hz, 1H), 7.53 (dd, J=2.0, 7.0 Hz, 1H), 7.30-7.36 (m, 1H), 7.22 (t, J=8.5 Hz, 1H), 7a.07 (dd, J=2.5, 8.0 Hz, 1H), 6.17 (s, 1H), 5.13 (dd, J=5.0, 9.5 Hz, 1H), 4.90-4.96 (m, 2H), 3.85 (t, J=9.5 Hz, 1H), 3.65 (dd, J=5.0, 9.0 Hz, 1H). Diastereomer 1B: LRMS m/z (M+H): calculated 466.1, observed 466.0. $^1$H NMR (500 MHz, $CD_3OD$) δ 7.59 (t, J=9.0 Hz, 1H), 7.49 (d, J=7.0 Hz, 1H), 7.31 (br s, 1H), 7.21 (t, J=8.5 Hz, 1H), 7.10 (dd, J=2.5, 8.0 Hz, 1H), 6.15 (s, 1H), 5.12 (dd, J=5.5, 9.5 Hz, 1H), 4.93-5.03 (m, 2H), 3.85 (t, J=9.5 Hz, 1H), 3.59 (dd, J=5.5, 9.0 Hz, 1H).

Examples 2A and 2B (S)—N—((R)-(5-chloro-6-(trifluoromethyl)pyridin-2-yl)(4-chlorophenyl)methyl)-2-oxooxazolidine-5-carboxamide and (S)—N—((S)-(5-chloro-6-(trifluoromethyl)pyridin-2-yl)(4-chlorophenyl)methyl)-2-oxooxazolidine-5-carboxamide

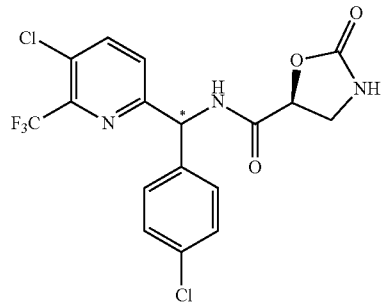 [SMILES: O=C1NC[C@@H](C(=O)NC(c2ccc(Cl)cc2)c2ccc(Cl)c(C(F)(F)F)n2)O1]

Step 1: 5-chloro-N-methoxy-N-methyl-6-(trifluoromethyl)picolinamide. To a mixture of 5-chloro-6-(trifluoromethyl)picolinic acid (0.30 g, 1.3 mmol), N,O-dimethylhydroxylamine hydrochloride (0.16 g, 1.6 mmol) and DIEA (0.70 mL, 4.0 mmol) in DCM (15 mL) was added HATU (0.61 g, 1.6 mmol) at 0° C. The mixture was stirred at rt for 12 h. Then the solvent was removed in vacuo and the residue was purified by silica gel chromatography (10-50% EtOAc:PE) to give the title compound.

Step 2: (5-chloro-6-(trifluoromethyl)pyridin-2-yl)(4-chlorophenyl)methanone. To a mixture of 5-chloro-N-methoxy-N-methyl-6-(trifluoromethyl)picolinamide (0.32 g, 1.1 mmol) in THF (10 mL) was added (4-chlorophenyl)magnesium bromide (2.1 mL, 2.1 mmol, 1 M in THF) at 0° C. The mixture was stirred at rt for 3.5 h, then diluted with water and extracted with EtOAc. The combined organic layers were washed with brine, dried over $Na_2SO_4$, filtered and concentrated in vacuo. The resulting residue was purified by silica gel chromatography (0-30% EtOAc:PE) to give the title compound.

Step 3: (5-chloro-6-(trifluoromethyl)pyridin-2-yl)(4-chlorophenyl)methanamine. To a mixture of (5-chloro-6-(trifluoromethyl)pyridin-2-yl)(4-chlorophenyl)methanone (0.33 g, 0.88 mmol), and $NH_4OAc$ (1.0 g, 13 mmol) in EtOH (8 mL) was added $NaCNBH_3$ (83 mg, 1.3 mmol). The mixture was stirred under microwave irradiation at 130° C. for 10 min. Then the mixture was concentrated in vacuo and the residue was purified by prep. silica gel TLC (1:30 MeOH:DCM) to give the title compound.

Step 4: (S)—N—((R and S)-(5-chloro-6-(trifluoromethyl)pyridin-2-yl)(4-chlorophenyl)methyl)-2-oxooxazolidine-5- carboxamide. To a mixture of (5-chloro-6-(trifluoromethyl)pyridin-2-yl)(4-chlorophenyl)methanamine (0.11 g, 0.31 mmol) and DIEA (0.27 mL, 1.5 mmol) in DCM (2 mL) was slowly added a solution of (S)-2-oxooxazolidine-5-carbonyl chloride (0.23 g, 1.5 mmol) in DCM (1 mL) at 0° C. The mixture was stirred at rt for 10 minutes. Then mixture was concentrated in vacuo and the residue was purified by reverse phase HPLC (63:37 to 33:67; water(0.1% TFA): MeCN(0.1% TFA), followed by lyophilization to give the title compound.

Step 5: (S)—N—((R or S)-(5-chloro-6-(trifluoromethyl)pyridin-2-yl)(4-chlorophenyl)methyl)-2-oxooxazolidine-5-carboxamide. (S)—N—((R and S)-(5-chloro-6-(trifluoromethyl)pyridin-2-yl)(4-chlorophenyl)methyl)-2-oxooxazolidine-5-carboxamide was subjected to chiral-SFC (method B) to give the title compounds: first eluted diastereomer 2A (S)—N—((R or S)-(5-chloro-6-(trifluoromethyl)pyridin-2-yl)(4-chlorophenyl)methyl)-2-oxooxazolidine-5-carboxamide, and second eluted diastereomer 2B (S)—N—((R or S)-(5-chloro-6-(trifluoromethyl)pyridin-2-yl)(4-chlorophenyl)methyl)-2-oxooxazolidine-5-carboxamide.

Diastereomer 2A: LRMS m/z (M+H): calculated 434.1, observed 434.0. $^1$H NMR (DMSO-$d_6$, 500 MHz) δ 9.21 (d, J=7.6 Hz, 1H), 8.27 (d, J=8.5 Hz, 1H), 7.80 (d, J=8.4 Hz, 1H), 7.74 (s, 1H), 7.47-7.43 (m, 2H), 7.40-7.36 (m, 2H), 6.27 (d, J=7.6 Hz, 1H), 5.09 (dd, J=9.5, 5.6 Hz, 1H), 3.73 (t, J=9.2 Hz, 1H), 3.40 (dd, J=8.5, 6.0 Hz, 1H). Diastereomer 2B: LRMS m/z (M+H): calculated 434.1, observed 434.0. $^1$H NMR (DMSO-$d_6$, 500 MHz) δ 9.24 (d, J=7.8 Hz, 1H), 8.30 (d, J=8.5 Hz, 1H), 7.82 (d, J=8.4 Hz, 1H), 7.75 (s, 1H), 7.47-7.41 (m, 2H), 7.40-7.35 (m, 2H), 6.27 (d, J=7.8 Hz, 1H), 5.08 (dd, J=9.4, 6.0 Hz, 1H), 3.72 (t, J=9.2 Hz, 1H), 3.40 (dd, J=8.8, 6.2 Hz, 1H).

TABLE 1

The compounds of Examples 3A-4B were prepared according to a synthetic procedure similar to the synthetic procedure for Examples 2A and 2B.

| Example | Structure | Name | Calc'd [M + H]+ | Observed [M + H]+ | Conditions |
|---|---|---|---|---|---|
| 3A | | (S)-N-((R or S)-bicyclo[2.2.1]heptan-1-yl(4-chlorophenyl)methyl)-2-oxooxazolidine-5-carboxamide | 349.1 | 349.2 | Chiral method B, Peak 1 |
| 3B | | (S)-N-((R or S)-bicyclo[2.2.1]heptan-1-yl(4-chlorophenyl)methyl)-2-oxooxazolidine-5-carboxamide | 349.1 | 349.2 | Chiral method B, Peak 2 |
| 4A | | (S)-N-((R or S)-(4-chlorophenyl)(3-(trifluoromethyl)bicyclo[1.1.1]pentan-1-yl)methyl)-2-oxooxazolidine-5-carboxamide | 389.1 | 388.9 | Chiral method B, Peak 1 |

TABLE 1-continued

The compounds of Examples 3A-4B were prepared according to a synthetic procedure similar to the synthetic procedure for Examples 2A and 2B.

| Example | Structure | Name | Calc'd [M + H]⁺ | Observed [M + H]⁺ | Conditions |
|---------|-----------|------|-----------------|-------------------|------------|
| 4B | | (S)-N-((R or S)-(4-chlorophenyl)(3-(trifluoromethyl)bicyclo[1.1.1]pentan-1-yl)methyl)-2-oxooxazolidine-5-carboxamide | 389.1 | 388.9 | Chiral method B, Peak 2 |

Examples 5A and 5B (S)—N—((R)-(3-chloro-4-fluorophenyl)(5-(trifluoromethyl)-1H-pyrazol-3-yl)methyl)-2-oxooxazolidine-5-carboxamide and (S)—N—((S)-(3-chloro-4-fluorophenyl)(5-(trifluoromethyl)-1H-pyrazol-3-yl)methyl)-2-oxooxazolidine-5-carboxamide

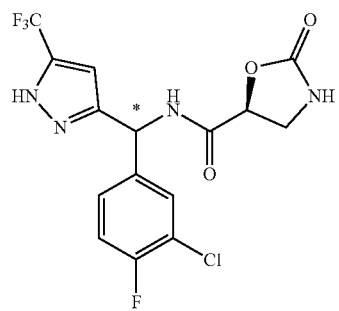 [SMILES: O=C1NC[C@@H](C(=O)NC(c2ccc(F)c(Cl)c2)c2cc(C(F)(F)F)[nH]n2)O1]

Step 1: N-methoxy-N-methyl-5-(trifluoromethyl)-1H-pyrazole-3-carboxamide. To a solution of 5-(trifluoromethyl)-1H-pyrazole-3-carboxylic acid (1.5 g, 8.3 mmol) in DMF (30 mL) was added DIEA (4.4 mL, 25 mmol) and HATU (6.3 g, 17 mmol) at 0° C. The mixture was stirred for 0.5 h, then N,O-dimethylhydroxylamine hydrochloride (1.2 g, 12 mmol) was added, and the resulting mixture was stirred at rt for another 2 h. Then water was added, and the mixture was extracted with EtOAc. The combined organic layers were washed with brine, dried over Na₂SO₄, filtered and the solvent was evaporated in vacuo. The resulting crude product was purified by silica gel chromatography (10-100% EtOAc:PE) to give the title compound.

Step 2: (3-chloro-4-fluorophenyl)(5-(trifluoromethyl)-1H-pyrazol-3-yl)methanone. To mixture of N-methoxy-N-methyl-5-(trifluoromethyl)-1H-pyrazole-3-carboxamide (0.60 g, 2.7 mmol) in THF (3 mL) was added (3-chloro-4-fluorophenyl)magnesium bromide (13 mL, 13 mmol, 1 M in THF). The mixture was stirred at 0° C. for 2 h, then aqueous NH₄Cl was added and the mixture was extracted with EtOAc. The combined organic layers were washed with brine, dried over Na₂SO₄, filtered and the solvent was evaporated in vacuo to give to give the title compound.

Step 3: (R)—N-((3-chloro-4-fluorophenyl)(5-(trifluoromethyl)-1H-pyrazol-3-yl)methyl)-2-methylpropane-2-sulfinamide. To a microwave tube charged with (3-chloro-4-fluorophenyl)(5-(trifluoromethyl)-1H-pyrazol-3-yl)methanone (0.40 g, 1.4 mmol), (R)-2-methylpropane-2-sulfinamide (0.25 g, 2.0 mmol) in toluene (3 mL) was added Ti(OEt)₄ (0.56 mL, 2.7 mmol). The mixture was heated via microwave irradiation at 105° C. for 30 min and then cooled to rt. The mixture was then taken up in THF (5 mL) and water (0.01 mL) and cooled to −78° C. Then NaBH₄ (57 mg, 1.5 mmol) was added. The mixture was stirred at −78° C. for 1 h, then gradually warmed to 0° C. over 1 h and stirred at 0° C. for 1 h. The mixture was then allowed to warm to rt. Aqueous NaHCO₃ was added, and the mixture was extracted with EtOAc. The combined organic layers were washed with brine, dried over Na₂SO₄, filtered, and the solvent was evaporated in vacuo. The resulting residue was purified by preparative silica gel TLC (50% EtOAc:PE) to give the title compound.

Step 4: (3-chloro-4-fluorophenyl)(5-(trifluoromethyl)-1H-pyrazol-3-yl)methanamine hydrochloride. To a mixture of (R)—N-((3-chloro-4-fluorophenyl)(5-(trifluoromethyl)-1H-pyrazol-3-yl)methyl)-2-methylpropane-2-sulfinamide (0.30 g, 0.75 mmol) in MeOH (1 mL) was added HCl (3.0 mL, 12 mmol, 4 M in MeOH). The resulting mixture was stirred at rt for 1 h, then concentrated in vacuo to give the title compound.

Step 5: (S)—N—((R and S)-(3-chloro-4-fluorophenyl)(5-(trifluoromethyl)-1H-pyrazol-3-yl)methyl)-2-oxooxazolidine-5-carboxamide. To a mixture of (3-chloro-4-fluorophenyl)(5-(trifluoromethyl)-1H-pyrazol-3-yl)methanamine hydrochloride (1.2 g crude), (S)-2-oxooxazolidine-5-carboxylic acid (0.57 g, 4.4 mmol) and DIEA (1.9 mL, 11 mmol) in DMF (15 mL) was added T₃P® (4.6 g, 7.3 mmol, 50% in EtOAc) at 0° C. The resulting mixture was stirred at rt for 1 h. The residue was purified by reverse phase HPLC (75:25 to 45:55; water(0.1% TFA):MeCN(0.1% TFA), followed by lyophilization to give the title compound.

Step 6: (S)—N—((R or S)-(3-chloro-4-fluorophenyl)(5-(trifluoromethyl)-1H-pyrazol-3-yl)methyl)-2-oxooxazolidine-5-carboxamide. (S)—N—((R or S)-(3-chloro-4-fluorophenyl)(5-(trifluoromethyl)-1H-pyrazol-3-yl)methyl)-2-oxooxazolidine-5-carboxamide was separated by chiral-SFC (method C) to give the title compounds: first eluted diastereomer 5A (S)—N—((R or S)-(3-chloro-4-fluorophenyl)(5-(trifluoromethyl)-1H-pyrazol-3-yl)methyl)-2- oxooxazolidine-5-carboxamide, and second eluted diastereomer 5B (S)—N—((R or S)-(3-chloro-4-fluorophenyl)(5-(trifluoromethyl)-1H-pyrazol-3-yl)methyl)-2-oxooxazolidine-5-carboxamide. Diastereomer 5A: LRMS m/z (M+H): calculated 407.1, observed, 407.1. $^1$H NMR (400 MHz, CD$_3$OD) δ 7.49-7.53 (m, 1H), 7.31-7.36 (m, 1H), 7.24-7.30 (m, 1H), 6.43 (s, 1H), 6.39 (s, 1H), 5.08-5.12 (m, 1H), 3.85 (t, J=9.2 Hz, 1H), 3.63-3.67 (m, 1H). Diastereomer 5B: LRMS m/z (M+H): calculated 407.1, observed 406.9. $^1$H NMR (400 MHz, CD$_3$OD) δ 7.49-7.53 (m, 1H), 7.30-7.35 (m, 1H), 7.24-7.30 (m, 1H), 6.42 (s, 1H), 6.38 (s, 1H), 5.08-5.12 (m, 1H), 3.84 (t, J=9.2 Hz, 1H), 3.63-3.67 (m, 1H).

Example 6A (cis or trans)-N-(bis(4-chlorophenyl)methyl)-4-methyl-2-oxoxazolidine-5-carboxamide

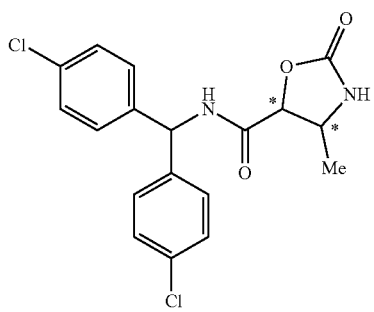 [SMILES: CC1NC(=O)OC1C(=O)NC(c1ccc(Cl)cc1)c1ccc(Cl)cc1]

Step 1: lithium 3-((tert-butoxycarbonyl)amino)-2-hydroxybutanoate. A mixture of methyl 3-((tert-butoxycarbonyl)amino)-2-hydroxybutanoate (0.35 g, 1.5 mmol) and LiOH·H$_2$O (0.13 g, 3.0 mmol) in MeOH (5 mL) and water (1 mL) was stirred at rt for 12 h. Then solvent was removed in vacuo to give the title compound.

Step 2: 6A1 tert-butyl ((cis or trans)-4-((bis(4-chlorophenyl)methyl)amino)-3-hydroxy-4-oxobutan-2-yl)carbamate and 6B1 tert-butyl ((cis or trans)-4-((bis(4-chlorophenyl)methyl)amino)-3-hydroxy-4-oxobutan-2-yl)carbamate. To a solution of lithium 3-((tert-butoxycarbonyl)amino)-2-hydroxybutanoate (0.34 g, 1.5 mmol), DIEA (0.76 mL, 4.3 mmol) and bis (4-chlorophenyl)methanamine (0.40 g, 1.6 mmol) in DMF (5 mL) was added HATU (0.66 g, 1.7 mmol) at 0° C. The mixture was stirred at rt for 12 h, then water was added, and the mixture was extracted with EtOAc. The combined organic layers were washed with brine, dried over Na$_2$SO$_4$, filtered and concentrated in vacuo. The resulting residue was purified by reverse phase HPLC (51:49 to 36:64; water(0.1% TFA):MeCN(0.1% TFA), followed by lyophilization to give the title compounds: first eluted diastereomer 6A1 tert-butyl ((cis or trans)-4-((bis(4-chlorophenyl)methyl)amino)-3-hydroxy-4-oxobutan-2-yl)carbamate, and second eluted diastereomer 6B1 tert-butyl ((cis or trans)-4-((bis(4-chlorophenyl)methyl)amino)-3-hydroxy-4-oxobutan-2-yl)carbamate.

Step 3: 6A2 (cis or trans)-3-amino-N-(bis(4-chlorophenyl)methyl)-2-hydroxybutanamide hydrochloride. A solution of tert-butyl ((cis or trans)-4-((bis(4-chlorophenyl)methyl)amino)-3-hydroxy-4-oxobutan-2-yl)carbamate (6A1, 40 mg, 0.088 mmol) in HCl (1.0 mL, 4.0 mmol, 4 N in EtOAc) was stirred at rt for 5 h. Then mixture was concentrated in vacuo to give the title compound.

Step 4: (cis or trans)-N-(bis(4-chlorophenyl)methyl)-4-methyl-2-oxooxazolidine-5-carboxamide. To a solution of 6A2 (cis or trans)-3-amino-N-(bis(4-chlorophenyl)methyl)-2-hydroxybutanamide hydrochloride (30 mg crude) and TEA (0.036 mL, 0.26 mmol) in THF (1 mL) was added CDI (15 mg, 0.093 mmol). The mixture was stirred at rt for 1 h, and then stirred at 80° C. for 1.5 h. The mixture was concentrated in vacuo, and the resulting residue was purified by reverse phase HPLC (61:39 to 41:59; water(0.1% TFA):MeCN(0.1% TFA), followed by lyophilization to give the title compound. LRMS m/z (M+Na): calculated 401.0, observed 401.1. $^1$H NMR (500 MHz, CD$_3$CN) δ 7.59-7.63 (m, 1H), 7.37-7.43 (m, 4H), 7.26-7.32 (m, 4H), 6.20 (d, J=8.0 Hz, 1H), 5.99 (s, 1H), 4.51 (d, J=6.0 Hz, 1H), 3.89-3.94 (m, 1H), 1.35 (d, J=6.0 Hz, 3H).

Example 6B (cis or trans)-N-(bis(4-chlorophenyl)methyl)-4-methyl-2-oxoxazolidine-5-carboxamide

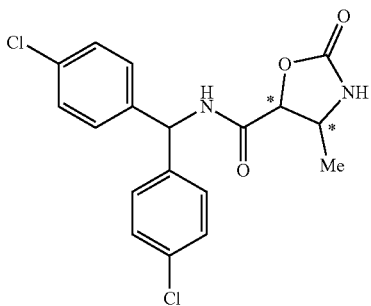 [SMILES: CC1NC(=O)OC1C(=O)NC(c1ccc(Cl)cc1)c1ccc(Cl)cc1]

Step 1: 6B2 (cis or trans)-3-amino-N-(bis(4-chlorophenyl)methyl)-2-hydroxybutanamide hydrochloride. A solution of 6B1 tert-butyl ((cis or trans)-4-((bis(4-chlorophenyl)methyl)amino)-3-hydroxy-4-oxobutan-2-yl)carbamate (0.10 g, 0.22 mmol) (prepared in step 2 of example 6A) in HCl (3.0 mL, 12 mmol, 4 N in EtOAc) was stirred at rt for 5 h. Then the mixture was concentrated in vacuo to give the title compound.

Step 2: (cis or trans)-N-(bis(4-chlorophenyl)methyl)-4-methyl-2-oxooxazolidine-5-carboxamide. To a solution of 6B2 (cis or trans)-3-amino-N-(bis(4-chlorophenyl)methyl)-2-hydroxybutanamide hydrochloride (70 mg crude) and TEA (0.083 mL, 0.59 mmol) in THF (1 mL) was added CDI (70 mg, 0.43 mmol). The mixture was stirred at rt for 1 h, and then stirred at 80° C. for 1.5 h. Then the mixture was concentrated in vacuo and purified by reverse phase HPLC (61:39 to 41:59; water(0.1% TFA):MeCN(0.1% TFA), followed by lyophilization to give the title compound. LRMS m/z (M+Na): calculated 379.1, observed 379.0. $^1$H NMR (500 MHz, CD$_3$CN) δ 7.59-7.63 (m, 1H), 7.37-7.43 (m, 4H), 7.26-7.32 (m, 4H), 6.20 (d, J=8.0 Hz, 1H), 5.99 (s, 1H), 4.51 (d, J=6.0 Hz, 1H), 3.89-3.94 (m, 1H), 1.35 (d, J=6.0 Hz, 3H).

Examples 7A and 7B (R)—N-(bis(4-chlorophenyl)methyl)-5-methyl-2-oxooxazolidine-5-carboxamide and (S)—N-(bis(4-chlorophenyl)methyl)-5-methyl-2-oxooxazolidine-5-carboxamide

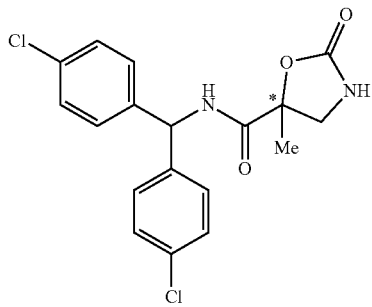 [SMILES: CC1(C(=O)NC(c2ccc(Cl)cc2)c2ccc(Cl)cc2)CNC(=O)O1]

Step 1: methyl 3-amino-2-hydroxy-2-methylpropanoate. To a solution of methyl 2-hydroxy-2-methyl-3-nitropropanoate (16 g, 96 mmol) in AcOH (50 mL) was added zinc (62 g, 0.96 mol). The mixture was stirred at 30° C. for 2 h, then filtered. The filtrate was concentrated in vacuo to give the title compound.

Step 2: methyl 3-acetyl-5-methyl-2-oxooxazolidine-5-carboxylate. To a solution of methyl 3-amino-2-hydroxy-2-methylpropanoate (10 g, 38 mmol) in MeCN (20 mL) was added CDI (9.1 g, 56 mmol). The mixture was stirred at 80° C. for 12 h, then acidified with 3 N HCl until pH=4, and extracted with EtOAc. The combined organic layers were washed with brine and NaHCO$_3$, dried over Na$_2$SO$_4$, filtered and concentrated in vacuo to give the title compound.

Step 3: 5-methyl-2-oxooxazolidine-5-carboxylic acid. To a solution of methyl 3-acetyl-5-methyl-2-oxooxazolidine-5-carboxylate (2.2 g, 11 mmol) in THF (10 mL) and MeOH (5 mL) was added LiOH (0.79 g, 33 mmol) in water (5 mL). The reaction mixture was stirred at rt for 10 h, then acidified with 3 N HCl until pH=2, and concentrated in vacuo to give the title compound.

Step 4: 5-methyl-2-oxooxazolidine-5-carbonyl chloride. A solution of 5-methyl-2-oxooxazolidine-5-carboxylic acid (0.10 g, 0.69 mmol) in SOCl$_2$ (3.0 mL, 0.69 mmol) was stirred at 80° C. for 1 h. Then the solvent was removed in vacuo to give the title compound.

Step 5: (R and S)—N-(bis(4-chlorophenyl)methyl)-5-methyl-2-oxooxazolidine-5-carboxamide. To a solution of 5-methyl-2-oxooxazolidine-5-carbonyl chloride (0.11 g crude) and DMAP (8 mg, 0.07 mmol) in DCM (5 mL) was added bis(4-chlorophenyl)methanamine (0.26 g, 1.0 mmol). The mixture was stirred at rt for 12 h. The residue was purified by reverse phase HPLC (58:42 to 28:72; water (0.1% TFA):MeCN(0.1% TFA), followed by lyophilization to give the title compound.

Step 6: (R or S)—N-(bis(4-chlorophenyl)methyl)-5-methyl-2-oxooxazolidine-5-carboxamide. The mixture of compounds (R and S)—N-(bis(4-chlorophenyl)methyl)-5-methyl-2-oxooxazolidine-5-carboxamide was separated by chiral-SFC (method D) to give the title compounds: first eluted enantiomer 7A (R or S)—N-(bis(4-chlorophenyl)methyl)-5-methyl-2-oxooxazolidine-5-carboxamide, and second eluted enantiomer 7B (R or S)—N-(bis(4-chlorophenyl)methyl)-5-methyl-2-oxooxazolidine-5-carboxamide. Enantiomer 7A: LRMS m/z (M+H): calculated 401.0, observed 401.1. $^1$H NMR (400 MHz, CD$_3$OD) δ 7.31-7.40 (m, 4H), 7.18-7.29 (m, 4H), 6.22 (s, 1H), 3.85 (d, J=9.6 Hz, 1H), 3.45 (d, J=9.6 Hz, 1H), 1.63 (s, 3H). Enantiomer 7B: LRMS m/z (M+H): calculated 401.0, observed 401.1. $^1$H NMR (400 MHz, CD$_3$OD) δ 7.30-7.41 (m, 4H), 7.18-7.29 (m, 4H), 6.22 (s, 1H), 3.85 (d, J=9.2 Hz, 1H), 3.45 (d, J=9.2 Hz, 1H), 1.62 (s, 3H).

Examples 8A and 8B (S)—N—((R)-2-(3-chloro-4-fluorophenoxy)-1-(3-chloro-4-fluorophenyl)ethyl)-2-oxooxazolidine-5-carboxamide and (S)—N—((S)-2-(3-chloro-4-fluorophenoxy)-1-(3-chloro-4-fluorophenyl)ethyl)-2-oxooxazolidine-5-carboxamide

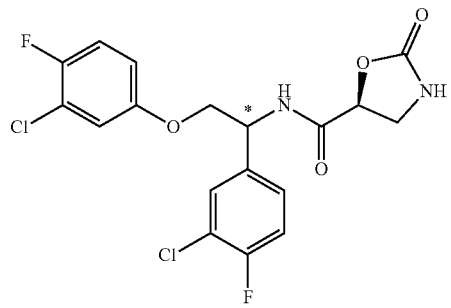 [SMILES: O=C1NC[C@@H](C(=O)NC(COc2ccc(F)c(Cl)c2)c2ccc(F)c(Cl)c2)O1]

Step 1: 2-bromo-1-(3-chloro-4-fluorophenyl)ethan-1-one. A mixture of 3-chloro-4-fluorobenzoic acid (5.0 g, 29 mmol) in SOCl$_2$ (30 mL) was stirred at 90° C. for 2 h. The solvent was evaporated in vacuo. The resulting residue was dissolved in DCM (50 mL) and cooled to 0° C. prior to the addition of TMS-Diazomethane (43 mL, 86 mmol). The reaction mixture was warmed to rt, stirred 3 h and cooled again to 0° C. Then HBr (20 mL, 0.12 mol) was carefully added, and the reaction was stirred for 30 min, followed by the addition of solid Na$_2$CO$_3$ to neutralize the excess acid. Then aqueous NaHCO$_3$ was added, and the mixture was extracted with DCM. The combined organic layers were washed with brine, dried over Na$_2$SO$_4$, filtered, and the solvent was evaporated in vacuo. The resulting crude product was purified by silica gel chromatography (0-100% EtOAc:PE) to give the title compound.

Step 2. 2-(3-chloro-4-fluorophenoxy)-1-(3-chloro-4-fluorophenyl)ethan-1-one. To a mixture of 2-bromo-1-(3-chloro-4-fluorophenyl)ethan-1-one (0.21 g, 0.82 mmol) and 3-chloro-4-fluorophenol (0.10 g, 0.68 mmol) in MeCN (3 mL) was added K$_2$CO$_3$ (0.19 g, 1.4 mmol). The resulting mixture was stirred at 15° C. for 8 h. Then the reaction mixture was diluted with water and extracted with EtOAc. The combined organic layers were washed with brine, dried over Na$_2$SO$_4$, filtered, and the solvent was concentrated in vacuo. The resulting residue was purified by preparative silica gel TLC (10% EtOAc:PE) to give the title compound.

Step 3: 2-(3-chloro-4-fluorophenoxy)-1-(3-chloro-4-fluorophenyl)ethan-1-amine. NH$_4$OAc (0.44 g, 5.7 mmol) and NaBH$_3$CN (36 mg, 0.57 mmol) were added to a solution of 2-(3-chloro-4-fluorophenoxy)-1-(3-chloro-4-fluorophenyl)ethan-1-one (0.12 g, 0.38 mmol) in EtOH (3 mL) in a 40 mL microwave vial. The mixture was stirred at 130° C. for 10 min in a microwave reactor. Then the reaction mixture was concentrated to remove most of the EtOH, treated with 2 N NaOH until pH >10, and extracted with EtOAc. The organic layer was separated, dried over Na$_2$SO$_4$, filtered, and concentrated in vacuo to give the title compound.

Step 4: (S)—N—((R and S)-2-(3-chloro-4-fluorophenoxy)-1-(3-chloro-4-fluorophenyl)ethyl)-2-oxooxazolidine-5-carboxamide. To a mixture of 2-(3-chloro-4-fluorophenoxy)-1-(3-chloro-4-fluorophenyl)ethan-1-amine (0.12 g crude), (S)-2-oxooxazolidine-5-carboxylic acid (74 mg, 0.57 mmol) and DIEA (0.20 mL, 1.1 mmol) in DMF (2 mL) was added T$_3$P® (0.48 g, 0.75 mmol) at 0° C. The resulting mixture was stirred at 15° C. for 1 h. The residue was purified by reverse phase HPLC on (55:45 to 25:75 water (0.1% TFA):MeCN(0.1% TFA)), followed by lyophilization to give the title compound.

Step 5: (S)—N—((R or S)-2-(3-chloro-4-fluorophenoxy)-1-(3-chloro-4-fluorophenyl)ethyl)-2-oxooxazolidine-5-carboxamide. (S)—N—((R and S)-2-(3-chloro-4-fluorophenoxy)-1-(3-chloro-4-fluorophenyl)ethyl)-2-oxooxazolidine-5-carboxamide was separated by chiral-SFC (method E) to give the title compounds: first eluted diastereomer 8A (S)—N—((R or S)-2-(3-chloro-4-fluorophenoxy)-1-(3-chloro-4-fluorophenyl)ethyl)-2-oxooxazolidine-5-carboxamide, and second eluted diastereomer 8B (S)—N—((R or S)-2-(3-chloro-4-fluorophenoxy)-1-(3-chloro-4-fluorophenyl)ethyl)-2-oxooxazolidine-5-carboxamide. Diastereomer 8A: LRMS m/z (M+H): calculated 431.0, observed 431.0. $^1$H NMR (500 MHz, CD$_3$OD) δ 7.56 (dd, J=2.0, 7.0 Hz, 1H), 7.37-7.41 (m, 1H), 7.24 (t, J=9.0 Hz, 1H), 7.14 (t, J=9.0 Hz, 1H), 7.07 (dd, J=3.0, 6.0 Hz, 1H), 6.87-6.91 (m, 1H), 5.32-5.38 (m, 1H), 5.10 (dd, J=6.0, 9.5 Hz, 1H), 4.20-4.31 (m, 2H), 3.84 (t, J=9.5 Hz, 1H), 3.59 (dd, J=6.0, 9.0 Hz, 1H). Diastereomer 8B: LRMS m/z (M+H): calculated 431.0, observed 431.1. $^1$H NMR (500 MHz, CD$_3$OD) δ 7.59 (dd, J=2.0, 7.0 Hz, 1H), 7.37-7.41 (m, 1H), 7.25 (t, J=9.0 Hz, 1H), 7.13 (t, J=9.0 Hz, 1H), 7.06 (dd, J=3.0, 6.0 Hz, 1H), 6.87-6.90 (m, 1H), 5.35 (t, J=6.5 Hz, 1H), 5.08 (dd, J=6.0, 9.5 Hz, 1H), 4.26 (d, J=6.5 Hz, 2H), 3.85 (t, J=9.5 Hz, 1H), 3.62 (dd, J=6.0, 9.0 Hz, 1H).

Examples 9A, 9B, 9C and 9D (S)—N—((R)-(3-chloro-2,4-difluorophenyl)((2S,5R)-5-(trifluoromethyl)tetrahydro-2H-pyran-2-yl)methyl)-2-oxooxazolidine-4-carboxamide, (S)—N—((R)-(3-chloro-2,4-difluorophenyl)((2R,5S)-5-(trifluoromethyl)tetrahydro-2H-pyran-2-yl)methyl)-2-oxooxazolidine-4-carboxamide, (S)—N—((S)-(3-chloro-2,4-difluorophenyl)((2S,5R)-5-(trifluoromethyl)tetrahydro-2H-pyran-2-yl)methyl)-2-oxooxazolidine-4-carboxamide and (S)—N—((S)-(3-chloro-2,4-difluorophenyl)((2R,5S)-5-(trifluoromethyl)tetrahydro-2H-pyran-2-yl)methyl)-2-oxooxazolidine-4-carboxamide

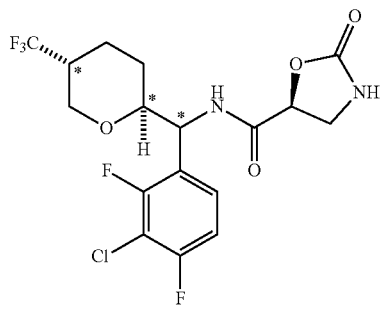 [SMILES: O=C1NC[C@@H](C(=O)NC(c2ccc(F)c(Cl)c2F)[C@@H]2CC[C@@H](C(F)(F)F)CO2)O1]

Step 1: 6-((benzyloxy)methyl)tetrahydro-2H-pyran-3-ol. To a solution of 2-((benzyloxy)methyl)-3,4-dihydro-2H-pyran (6.0 g, 38 mmol) in THF (80 mL) was added BH$_3$·DMS (5.1 mL, 54 mmol) at 0° C. The mixture was stirred at 18° C. for 2 h, then cooled to 0° C., followed by the addition of NaOAc (3.2 g, 38 mmol). Then H$_2$O$_2$ (13 g, 0.12 mol) was added, and the mixture was stirred at 18° C. for 12 h. The mixture was diluted with water and extracted with EtOAc. The combined organic layers were washed with saturated Na$_2$SO$_3$, dried over Na$_2$SO$_4$, filtered, and the filtrate was concentrated in vacuo to give the title compound.

Step 2: 6-((benzyloxy)methyl)dihydro-2H-pyran-3(4H)-one. To a solution of 6-((benzyl-oxy)methyl)tetrahydro-2H-pyran-3-ol (5.0 g crude) in DCM (100 mL) was added PCC (9.7 g, 45 mmol) at 0° C. The mixture was stirred at 18° C. for 10 h, then filtered. The filtrate was diluted with water and extracted with EtOAc. The combined organic layers were washed with brine, dried over Na$_2$SO$_4$, filtered, and concentrated in vacuo. The resulting residue was purified by silica gel chromatography (0-20% EtOAc:PE) to give the title compound.

Step 3: 6-((benzyloxy)methyl)-3-(trifluoromethyl)tetrahydro-2H-pyran-3-ol. To a solution of 6-((benzyloxy)methyl)dihydro-2H-pyran-3(4H)-one (3.0 g, 14 mmol) and trimethyl(trifluoro-methyl)silane (4.8 g, 34 mmol) in THF (80 mL) was added TBAF (29 mL, 29 mmol) dropwise at 0° C. The mixture was stirred at 18° C. for 18 h, then a HCl solution (34 mL, 0.20 mol, 6 M) was added. The mixture was stirred at 18° C. for 2 h, and then filtered. The filtrate was diluted with water and extracted with EtOAc. The combined organic layers were washed with brine, dried over Na$_2$SO$_4$, filtered, and the filtrate was concentrated in vacuo. The resulting residue was purified by silica gel chromatography (0-30% EtOAc:PE) to afford the title compound.

Step 4: 2-((benzyloxy)methyl)-5-(trifluoromethyl)-3,4-dihydro-2H-pyran. To a solution of 6-((benzyloxy)methyl)-3-(trifluoromethyl)tetrahydro-2H-pyran-3-ol (1.2 g, 4.1 mmol), N,N-dimethylpyridin-4-amine (0.20 g, 1.7 mmol) and pyridine (11 g, 0.14 mol) in THF (50 mL) was added sulfurous dichloride (4.9 g, 41 mmol). The reaction mixture was heated to reflux at 80° C. for 24 h, then cooled to 0° C. in an ice bath, followed by the dropwise addition of TEA (10 g, 0.10 mol) over 5 min. Then water was added over 2 min, and the mixture was extracted with EtOAc. The combined organic layers were concentrated in vacuo and washed with brine, dried with Na$_2$SO$_4$, filtered and the filtrate was condensed in vacuo. The resulting residue was purified by silica gel chromatography (0-5% EtOAc:PE) to afford the title compound.

Step 5: (trans)-2-((benzyloxy)methyl)-5-(trifluoromethyl)tetrahydro-2H-pyran. To a solution of 2-((benzyloxy)methyl)-5-(trifluoromethyl)-3,4-dihydro-2H-pyran (1.8 g, 6.6 mmol) in MeOH (20 mL) was added Pd/C (0.70 g). The mixture was stirred at 18° C. for 16 h under an atmosphere of H$_2$ (30 psi). Then the mixture was filtered, and the filtrate was concentrated in vacuo. The resulting residue purified by silica gel chromatography (0-5% EtOAc:PE) to give the title compound.

Step 6: ((trans)-5-(trifluoromethyl)tetrahydro-2H-pyran-2-yl)methanol. To a solution of (trans)-2-((benzyloxy)methyl)-5-(trifluoromethyl)tetrahydro-2H-pyran (0.50 g, 1.8 mmol) in MeOH (12 mL) was added Pd/C (0.19 g). The mixture was stirred at rt for 16 h under the atmosphere of $H_2$ (30 psi). Then mixture was filtered, and concentrated in vacuo to afford the title compound.

Step 7: (trans)-5-(trifluoromethyl)tetrahydro-2H-pyran-2-carbaldehyde. To a solution of oxalyl dichloride (1.0 g, 8.2 mmol) in DCM (10 mL) was added (methylsulfinyl)methane (0.21 g, 2.7 mmol) at −70° C. The mixture was stirred at −70° C. for 30 min, then ((trans)-5-(trifluoromethyl)-tetrahydro-2H-pyran-2-yl)methanol (0.50 g crude) in DCM (20 mL) was added dropwise. The mixture was stirred at −70° C. for 2 h, then TEA (2.8 g, 27 mmol) was added. The mixture was stirred at −70° C. for 30 min, and stirred at rt for 1 h. Then the mixture was diluted with water (20 mL), and extracted with DCM (2×20 mL). The combined organic layers were washed with brine, dried over $Na_2SO_4$, filtered and the filtrate was concentrated in vacuo to give the title compound.

Step 8: (R)-2-methyl-N—((E)-((trans)-5-(trifluoromethyl)tetrahydro-2H-pyran-2-yl)methylene)-propane-2-sulfinamide. To a solution of (trans)-5-(trifluoromethyl)tetrahydro-2H-pyran-2-carbaldehyde (0.40 g crude) in THF (15 mL) was added (R)-2-methylpropane-2-sulfinamide (0.53 g, 4.4 mmol) and Ti(OEt)$_4$ (1.0 g, 4.4 mmol). The mixture was stirred at 55° C. for 2 h. Then brine was added, and the mixture was filtered. The filtrate was diluted with water, extracted with EtOAc and washed with brine. The combined organic layers were dried with $Na_2SO_4$ and concentrated in vacuo. The resulting residue was purified by preparative silica gel TLC (20% EtOAc:PE) to give the title compound.

Step 9: (R)—N-((3-chloro-2,4-difluorophenyl)((trans)-5-(trifluoromethyl)tetrahydro-2H-pyran-2-yl)methyl)-2-methylpropane-2-sulfinamide. To a solution of 1-bromo-3-chloro-2,4-difluorobenzene (0.16 g, 0.70 mmol) in THF (5 mL) was added iPrMgCl (72 mg, 0.70 mmol) at 0° C. The mixture was stirred at rt for 6 h. Then (R)-2-methyl-N-((E)-((trans)-5-(trifluoromethyl)-tetrahydro-2H-pyran-2-yl)methylene)propane-2-sulfinamide (0.20 g, 0.70 mmol) in THF (5 mL) was added. The mixture was stirred at rt for 6 h, then sat. $NH_4Cl$ was added, and the mixture was diluted with water and extracted with EtOAc. The combined organic layers were washed with brine, dried with $Na_2SO_4$, filtered and concentrated in vacuo. The resulting residue was purified by prep. silica gel TLC (25% EtOAc:PE) to give the title compound.

Step 10: (3-chloro-2,4-difluorophenyl)((trans)-5-(trifluoromethyl)tetrahydro-2H-pyran-2-yl)methanamine hydrochloride. To a solution of (R)—N-((3-chloro-2,4-difluorophenyl)((trans)-5-(trifluoromethyl)tetrahydro-2H-pyran-2-yl)methyl)-2-methylpropane-2-sulfinamide (0.16 g, 0.37 mmol) in MeOH (2 mL) was added HCl (2.0 mL, 8.0 mmol, 4 N in MeOH). The mixture was stirred at rt for 11 h. The mixture was concentrated to afford title compound.

Step 11: (S)—N—((R and S)-(3-chloro-2,4-difluorophenyl)((2S,5R and 2R,5S)-5-(trifluoro-methyl)tetrahydro-2H-pyran-2-yl)methyl)-2-oxoimidazolidine-4-carboxamide. To a solution of (3-chloro-2,4-difluorophenyl)((trans)-5-(trifluoromethyl)tetrahydro-2H-pyran-2-yl)methanamine hydrochloride (50 mg, 0.15 mmol) in DMF (3 mL) was added (S)-2-oxooxazolidine-5-carboxylic acid (40 mg, 0.30 mmol), TEA (31 mg, 0.30 mmol) and $T_3P$® (0.19 g, 0.30 mmol, 50% in EtOAc). The mixture was stirred at rt for 2 h. Then the mixture was purified by reverse phase HPLC (60:40 to 30:70 water(0.1% TFA):MeCN(0.1% TFA) to give the title compound.

Step 12: (S)—N—((R or S)-(3-chloro-2,4-difluorophenyl)((2S,5R or 2R,5S)-5-(trifluoro-methyl)tetrahydro-2H-pyran-2-yl)methyl)-2-oxoimidazolidine-4-carboxamide.

The mixture of compounds from Step 11: (S)—N—((R and S)-(3-chloro-2,4-difluorophenyl)((2S,5R and 2R,5S)-5-(trifluoromethyl)tetrahydro-2H-pyran-2-yl)methyl)-2-oxoimidazolidine-4-carboxamide was separated by chiral-SFC (method A) to give the title compounds: first eluted diastereomer 9A (S)—N—((R or S)-(3-chloro-2,4-difluorophenyl)((2S,5R or 2R,5S)-5-(trifluoromethyl)tetrahydro-2H-pyran-2-yl)methyl)-2-oxoimidazolidine-4-carboxamide, second eluted diastereomer 9B (S)—N—((R or S)-(3-chloro-2,4-difluorophenyl)((2S,5R or 2R,5S)-5-(trifluoromethyl)tetrahydro-2H-pyran-2-yl)methyl)-2-oxoimidazolidine-4-carboxamide, third eluted diastereomer 9C (S)—N—((R or S)-(3-chloro-2,4-difluorophenyl)((2S,5R or 2R,5S)-5-(trifluoromethyl)tetrahydro-2H-pyran-2-yl)methyl)-2-oxoimidazolidine-4-carboxamide, and fourth eluted diastereomer 9D (S)—N—((R or S)-(3-chloro-2,4-difluorophenyl)((2S,5R or 2R,5S)-5-(trifluoromethyl)tetrahydro-2H-pyran-2-yl)methyl)-2-oxoimidazolidine-4-carboxamide. Diastereomer 9A: LRMS m/z (M+H): calculated 443.1, observed 443.0. 1H NMR (400 MHz, CD$_3$OD) δ 7.38-7.45 (m, 1H), 7.09-7.17 (m, 1H), 5.18 (d, J=5.6 Hz, 1H), 5.04-5.08 (m, 1H), 4.14-4.18 (m, 1H), 3.82 (t, J=9.2 Hz, 1H), 3.65-3.69 (m, 1H), 3.58-3.61 (m, 1H), 3.43 (t, J=11.2 Hz, 1H), 2.44-2.53 (m, 1H), 2.00-2.13 (m, 1H), 1.45-1.64 (m, 3H). Diastereomer 9B: LRMS m/z (M+H): calculated 443.1, observed 443.0. $^1$H NMR (400 MHz, CD$_3$OD) δ 7.36-7.47 (m, 1H), 7.08-7.03 (m, 1H), 5.24 (d, J 6.0 Hz, 1H), 5.01-5.04 (m, 1H), 4.05-4.14 (m, 1H), 3.80 (t, J=9.2 Hz, 1H), 3.70-3.74 (m, 1H), 3.55-3.59 (m, 1H), 3.42 (t, J=11.2 Hz, 1H), 2.30-2.47 (m, 1H), 2.04-2.08 (m, 1H), 1.88-1.92 (m, 1H), 1.62-1.69 (m, 1H), 1.17-1.33 (m, 1H). Diastereomer 9C: LRMS m/z (M+H): calculated 443.1, observed 443.0. $^1$H NMR (400 MHz, CD$_3$OD) δ 7.32-7.45 (m, 1H), 7.06-7.14 (m, 1H), 5.25 (d, J 5.6 Hz, 1H), 5.06-5.09 (m, 1H), 4.09-4.13 (m, 1H), 3.81 (t, J=9.2 Hz, 1H), 3.70-3.74 (m, 1H), 3.51-3.55 (m, 1H), 3.42 (t, J=11.2 Hz, 1H), 2.32-2.43 (m, 1H), 2.05-2.09 (m, 1H), 1.98-1.92 (m, 1H), 1.60-1.69 (m, 1H), 1.10-1.27 (m, 1H). Diastereomer 9D: LRMS m/z (M+H): calculated 443.1, observed 443.0. $^1$H NMR (400 MHz, CD$_3$OD) δ 7.34-7.40 (m, 1H), 7.09-7.14 (m, 1H), 5.17 (d, J 6.0 Hz, 1H), 5.07-5.11 (m, 1H), 4.13-4.17 (m, 1H), 3.81 (t, J=9.2 Hz, 1H), 3.64-3.73 (m, 1H), 3.52-3.55 (m, 1H), 3.43 (t, J=11.2 Hz, 1H), 2.43-2.52 (m, 1H), 2.04-2.08 (m, 1H), 1.46-1.66 (m, 3H).

TABLE 2

The compounds of Examples 10-18B were prepared according to a synthetic procedure similar to the synthetic procedure for Examples 9A, 9B, 9C and 9D.

| Example | Structure | Name | Calc'd [M + H]⁺ | Observed [M + H]⁺ | Conditions |
| --- | --- | --- | --- | --- | --- |
| 10 | | (S)-N-(bis(3-chloro-4-fluorophenyl)methyl)-2-oxooxazolidine-5-carboxamide | 401.0 | 401.1 | Meso structure |
| 11A | | (S)-N-((R or S)-(4-chlorophenyl)(2-(trifluoromethyl)pyrimidin-4-yl)methyl)-2-oxooxazolidine-5-carboxamide | 401.1 | 401.1 | Chiral method F, Peak 1 |
| 11B | | (S)-N-((R or S)-(4-chlorophenyl)(2-(trifluoromethyl)pyrimidin-4-yl)methyl)-2-oxooxazolidine-5-carboxamide | 401.1 | 401.1 | Chiral method F, Peak 2 |
| 12A | | (S)-N-((R or S)-(4-chlorophenyl)(4-(trifluoromethyl)thiazol-2-yl)methyl)-2-oxooxazolidine-5-carboxamide | 406.0 | 406.1 | Chiral method G, Peak 1 |

TABLE 2-continued

*The compounds of Examples 10-18B were prepared according to a synthetic procedure similar to the synthetic procedure for Examples 9A, 9B, 9C and 9D.*

| Example | Structure | Name | Calc'd [M + H]+ | Observed [M + H]+ | Conditions |
|---|---|---|---|---|---|
| 12B | | (S)-N-((R or S)-(4-chlorophenyl)(4-(trifluoromethyl)thiazol-2-yl)methyl)-2-oxooxazolidine-5-carboxamide | 406.0 | 406.0 | Chiral method G, Peak 2 |
| 13A | | (S)-N-((R or S)-(3-chloro-4-fluorophenyl)(5-chloropyridin-3-yl)methyl)-2-oxooxazolidine-5-carboxamide | 384.0 | 384.1 | Chiral method H, Peak 1 |
| 13B | | (S)-N-((R or S)-(3-chloro-4-fluorophenyl)(5-chloropyridin-3-yl)methyl)-2-oxooxazolidine-5-carboxamide | 384.0 | 384.1 | Chiral method H, Peak 2 |
| 14A | | (S)-N-((R or S)-(3-chloro-4-fluorophenyl)(5-chloropyridin-2-yl)methyl)-2-oxooxazolidine-5-carboxamide | 384.0 | 384.0 | Chiral method H, Peak 1 |

TABLE 2-continued

*The compounds of Examples 10-18B were prepared according to a synthetic procedure similar to the synthetic procedure for Examples 9A, 9B, 9C and 9D.*

| Example | Structure | Name | Calc'd [M + H]+ | Observed [M + H]+ | Conditions |
|---|---|---|---|---|---|
| 14B | | (S)-N-((R or S)-(3-chloro-4-fluorophenyl)(5-chloropyridin-2-yl)methyl)-2-oxooxazolidine-5-carboxamide | 384.0 | 384.0 | Chiral method H, Peak 2 |
| 15A | | (S)-N-((R or S)-(4-chlorophenyl)(1H-indazol-3-yl)methyl)-2-oxooxazolidine-5-carboxamide | 371.1 | 371.1 | Reverse phase HPLC (65:35 to 35:65 water (0.1% TFA): MeCN (0.1% TFA)), Peak 1 |
| 15B | | (S)-N-((R or S)-(4-chlorophenyl)(1H-indazol-3-yl)methyl)-2-oxooxazolidine-5-carboxamide | 371.1 | 371.1 | Reverse phase HPLC (65:35 to 35:65 water (0.1% TFA): MeCN (0.1% TFA)), Peak 2 |
| 16A | | (S)-N-((R and S)-(4-chlorophenyl)(6-(difluoromethyl)-5-fluoropyridin-2-yl)methyl)-2-oxooxazolidine-5-carboxamide | 400.1 | 400.0 | Chiral method I, Peak 1 |

TABLE 2-continued

*The compounds of Examples 10-18B were prepared according to a synthetic procedure similar to the synthetic procedure for Examples 9A, 9B, 9C and 9D.*

| Example | Structure | Name | Calc'd [M + H]+ | Observed [M + H]+ | Conditions |
|---|---|---|---|---|---|
| 16B | | (S)-N-((R and S)-(4-chlorophenyl)(6-(difluoromethyl)-5-fluoropyridin-2-yl)methyl)-2-oxooxazolidine-5-carboxamide | 400.1 | 400.0 | Chiral method I, Peak 2 |
| 17A | | (S)-N-((R or S)-(4-chlorophenyl)(2-(trifluoromethyl)-1H-imidazol-4-yl)methyl)-2-oxooxazolidine-5-carboxamide | 389.1 | 389.0 | Reverse phase HPLC (83:17 to 53:47, water(0.1% TFA):MeCN (0.1% TFA)), Peak 1 |
| 17B | | (S)-N-((R or S)-(4-chlorophenyl)(2-(trifluoromethyl)-1H-imidazol-4-yl)methyl)-2-oxooxazolidine-5-carboxamide | 389.1 | 389.0 | Reverse phase HPLC (83:17 to 53:47, water(0.1% TFA):MeCN (0.1% TFA)), Peak 2 |
| 18A | | (S)-N-((R or S)-(4-chlorophenyl)(2-(trifluoromethyl)oxazol-4-yl)methyl)-2-oxooxazolidine-5-carboxamide | 390.0 | 390.1 | Chiral method J, Peak 1 |

TABLE 2-continued

The compounds of Examples 10-18B were prepared according to a synthetic procedure similar to the synthetic procedure for Examples 9A, 9B, 9C and 9D.

| Example | Structure | Name | Calc'd [M + H]+ | Observed [M + H]+ | Conditions |
|---|---|---|---|---|---|
| 18B | (structure) | (S)-N-((R or S)-(4-chlorophenyl)(2-(trifluoromethyl)oxazol-4-yl)methyl)-2-oxooxazolidine-5-carboxamide | 390.0 | 390.0 | Chiral method J, Peak 2 |

Examples 19A and 19B (S)—N—((R)-(3-chloro-4-fluorophenyl)(4-chlorophenyl)methyl)-2-oxooxazolidine-5-carboxamide and (S)—N—((S)-(3-chloro-4-fluorophenyl)(4-chlorophenyl)methyl)-2-oxooxazolidine-5-carboxamide

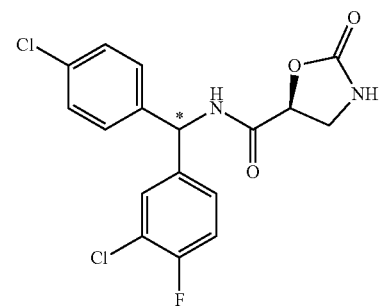 [SMILES: O=C1NC[C@@H](C(=O)NC(c2ccc(Cl)cc2)c2ccc(F)c(Cl)c2)O1]

Step 1: (S)—N—((R and S)-(3-chloro-4-fluorophenyl)(4-chlorophenyl)methyl)-2-oxooxazolidine-5-carboxamide. (S)-2-oxooxazolidine-5-carboxylic acid (72 mg, 0.55 mmol), (3-chloro-4-fluorophenyl)(4-chlorophenyl)methanamine, HCl (0.20 g, 0.66 mmol) and HATU (0.25 g, 0.66 mmol) were taken up in DMSO (4.5 mL) and then N-methylmorpholine (0.22 mL, 2.0 mmol) was added. The reaction mixture was stirred for 2 hours, then purified by mass directed reverse phase HPLC to give the title compound.

Step 2: (S)—N—((R or S)-(3-chloro-4-fluorophenyl)(4-chlorophenyl)methyl)-2-oxooxazolidine-5-carboxamide. (S)—N—((R and S)-(3-chloro-4-fluorophenyl)(4-chlorophenyl)methyl)-2-oxo-oxazolidine-5-carboxamide was separated by chiral-SFC (method K) to give the title compounds: first eluted diastereomer 19A (S)—N—((R or S)-(3-chloro-4-fluorophenyl)(4-chlorophenyl)methyl)-2-oxooxazolidine-5-carboxamide, and second eluted diastereomer 19B (S)—N—((R or S)-(3-chloro-4-fluorophenyl)(4-chlorophenyl)methyl)-2-oxooxazolidine-5-carboxamide. Diastereomer 19A: LRMS m/z (M+H): calculated 383.0, observed 383.3. $^1$H NMR (600 MHz, DMSO-$d_6$) δ 9.25 (d, J=8.3 Hz, 1H), 7.72 (s, 1H), 7.57 (d, J=7.0 Hz, 1H), 7.43 (d, J=7.3 Hz, 2H), 7.40 (d, J=8.6 Hz, 1H), 7.33 (d, J=7.8 Hz, 3H), 6.20 (d, J=8.7 Hz, 1H), 5.06-5.01 (m, 1H), 3.70 (t, J=9.2 Hz, 1H), 3.43-3.38 (m, 1H). Diastereomer 19B: LRMS m/z (M+H): calculated 383.0, observed 383.3. $^1$H NMR (600 MHz, DMSO-$d_6$) δ 9.24 (d, J=8.0 Hz, 1H), 7.72 (s, 1H), 7.55 (d, J=7.2 Hz, 1H), 7.45-7.39 (m, 3H), 7.36-7.30 (m, 3H), 6.20 (d, J=8.3 Hz, 1H), 5.06-5.01 (m, 1H), 3.70 (t, J=9.0 Hz, 1H), 3.39 (t, J=7.1 Hz, 1H).

TABLE 3

The compounds of Examples 20-43B were prepared according to a synthetic procedure similar to the synthetic procedure for Examples 19A and 19B.

| Example | Structure | Name | Calc'd [M + H]+ | Observed [M + H]+ | Conditions |
|---|---|---|---|---|---|
| 20 | (structure) | (5S)-N-((3,5-dichlorophenyl)(phenyl)methyl)-2-oxooxazolidine-5-carboxamide | 365.0 | 365.1 | Not Resolved |

TABLE 3-continued

The compounds of Examples 20-43B were prepared according to a synthetic procedure similar to the synthetic procedure for Examples 19A and 19B.

| Example | Structure | Name | Calc'd [M + H]+ | Observed [M + H]+ | Conditions |
|---|---|---|---|---|---|
| 21 | | (5S)-N-((adamantan-2-yl)(phenyl)methyl)-2-oxooxazolidine-5-carboxamide | 355.2 | 355.3 | Not Resolved |
| 22A | | (S)-N-((R or S)-(4-chlorophenyl)(6-methoxypyridin-3-yl)methyl)-2-oxooxazolidine-5-carboxamide | 362.1 | 362.2 | Chiral method L, Peak 1 |
| 22B | | (S)-N-((R or S)-(4-chlorophenyl)(6-methoxypyridin-3-yl)methyl)-2-oxooxazolidine-5-carboxamide | 362.1 | 362.2 | Chiral method L, Peak 2 |
| 23A | | (S)-N-((R or S)-(4-chlorophenyl)(5-fluoropyridin-2-yl)methyl)-2-oxooxazolidine-5-carboxamide | 350.1 | 350.2 | Chiral method M, Peak 1 |
| 23B | | (S)-N-((R or S)-(4-chlorophenyl)(5-fluoropyridin-2-yl)methyl)-2-oxooxazolidine-5-carboxamide | 350.1 | 350.2 | Chiral method M, Peak 2 |

TABLE 3-continued

The compounds of Examples 20-43B were prepared according to a synthetic procedure similar to the synthetic procedure for Examples 19A and 19B.

| Example | Structure | Name | Calc'd [M + H]+ | Observed [M + H]+ | Conditions |
|---|---|---|---|---|---|
| 24 | | (5S)-N-((4-chlorophenyl)(thiophen-2-yl)methyl)-2-oxooxazolidine-5-carboxamide | 337.0 | 337.0 | Not Resolved |
| 25A | | (S)-N-((R or S)-(3,4-dichlorophenyl)(phenyl)methyl)-2-oxooxazolidine-5-carboxamide | 365.0 | 365.3 | Chiral method L, Peak 1 |
| 25B | | (S)-N-((R or S)-(3,4-dichlorophenyl)(phenyl)methyl)-2-oxooxazolidine-5-carboxamide | 365.0 | 365.3 | Chiral method L, Peak 2 |
| 26A | | (5S)-N-((R or S)-(3-chlorophenyl)((cis or trans)-2-phenylcyclopropyl)methyl)-2-oxooxazolidine-5-carboxamide | 371.1 | 371.2 | Chiral method N, Peak 1 |
| 26B | | (5S)-N-((R or S)-(3-chlorophenyl)((cis or trans)-2-phenylcyclopropyl)methyl)-2-oxooxazolidine-5-carboxamide | 371.1 | 371.2 | Chiral method N, Peak 2 |

TABLE 3-continued

The compounds of Examples 20-43B were prepared according to a synthetic procedure similar to the synthetic procedure for Examples 19A and 19B.

| Example | Structure | Name | Calc'd [M + H]+ | Observed [M + H]+ | Conditions |
| --- | --- | --- | --- | --- | --- |
| 27 | | (5S)-N-((4-chlorophenyl)(3-(methylsulfonyl)phenyl)methyl)-2-oxooxazolidine-5-carboxamide | 409.1 | 409.2 | Not Resolved |
| 28A | | (S)-N-((R or S)-(5-chloro-2-methoxyphenyl)(3-chlorophenyl)methyl)-2-oxooxazolidine-5-carboxamide | 395.0 | 395.2 | Chiral method O, Peak 1 |
| 28B | | (S)-N-((R or S)-(5-chloro-2-methoxyphenyl)(3-chlorophenyl)methyl)-2-oxooxazolidine-5-carboxamide | 395.0 | 395.2 | Chiral method O, Peak 2 |
| 29A | | (S)-N-((R or S)-(4-chlorophenyl)(2,3-difluorophenyl)methyl)-2-oxooxazolidine-5-carboxamide | 367.1 | 367.2 | Chiral method P, Peak 1 |
| 29B | | (S)-N-((R or S)-(4-chlorophenyl)(2,3-difluorophenyl)methyl)-2-oxooxazolidine-5-carboxamide | 367.1 | 367.2 | Chiral method P, Peak 2 |

TABLE 3-continued

*The compounds of Examples 20-43B were prepared according to a synthetic procedure similar to the synthetic procedure for Examples 19A and 19B.*

| Example | Structure | Name | Calc'd [M + H]+ | Observed [M + H]+ | Conditions |
|---|---|---|---|---|---|
| 30 | | (5S)-N-((4-chlorophenyl)(naphthalen-1-yl)methyl)-2-oxooxazolidine-5-carboxamide | 381.1 | 381.1 | Not Resolved |
| 31 | | (5S)-N-((4-chlorophenyl)(naphthalen-2-yl)methyl)-2-oxooxazolidine-5-carboxamide | 381.1 | 381.1 | Not Resolved |
| 32A | | (S)-N-((R or S)-(4-chlorophenyl)(3-isopropylphenyl)methyl)-2-oxooxazolidine-5-carboxamide | 373.1 | 373.3 | Chiral method Q, Peak 1 |
| 32B | | (S)-N-((R or S)-(4-chlorophenyl)(3-isopropylphenyl)methyl)-2-oxooxazolidine-5-carboxamide | 373.1 | 373.3 | Chiral method Q, Peak 2 |

TABLE 3-continued

The compounds of Examples 20-43B were prepared according to a synthetic procedure similar to the synthetic procedure for Examples 19A and 19B.

| Example | Structure | Name | Calc'd [M + H]+ | Observed [M + H]+ | Conditions |
|---|---|---|---|---|---|
| 33A | | (S)-N-((R or S)-(4-chlorophenyl)(3-cyclopropylphenyl)methyl)-2-oxooxazolidine-5-carboxamide | 371.1 | 371.3 | Chiral method Q, Peak 1 |
| 33B | | (S)-N-((R or S)-(4-chlorophenyl)(3-cyclopropylphenyl)methyl)-2-oxooxazolidine-5-carboxamide | 371.1 | 371.3 | Chiral method Q, Peak 2 |
| 34 | | (5S)-N-(4-chlorophenyl)(2-(trifluoromethyl)pyridin-4-yl)methyl)-2-oxooxazolidine-5-carboxamide | 400.1 | 400.2 | Not resolved |
| 35A | | (S)-N-((R or S)-(4-chloro-3-(trifluoromethyl)phenyl)(4-chlorophenyl)methyl)-2-oxooxazolidine-5-carboxamide | 432.0 | 432.0 | Chiral method R, Peak 1 |

TABLE 3-continued

The compounds of Examples 20-43B were prepared according to a synthetic procedure similar to the synthetic procedure for Examples 19A and 19B.

| Example | Structure | Name | Calc'd [M + H]+ | Observed [M + H]+ | Conditions |
|---|---|---|---|---|---|
| 35B | | (S)-N-((R or S)-(4-chloro-3-(trifluoromethyl)phenyl)(4-chlorophenyl)methyl)-2-oxooxazolidine-5-carboxamide | 432.0 | 432.0 | Chiral method R, Peak 2 |
| 36 | | (5S)-N-((4-chlorophenyl)(6-(difluoromethoxy)pyridin-3-yl)methyl)-2-oxooxazolidine-5-carboxamide | 398.1 | 398.2 | Not Resolved |
| 37A | | (S)-N-((R or S)-(4-chlorophenyl)(5-(trifluoromethyl)pyridin-2-yl)methyl)-2-oxooxazolidine-5-carboxamide | 400.1 | 400.2 | Chiral method S, Peak 1 |
| 37B | | (S)-N-((R or S)-(4-chlorophenyl)(5-(trifluoromethyl)pyridin-2-yl)methyl)-2-oxooxazolidine-5-carboxamide | 400.1 | 400.2 | Chiral method S, Peak 2 |

TABLE 3-continued

The compounds of Examples 20-43B were prepared according to a synthetic procedure similar to the synthetic procedure for Examples 19A and 19B.

| Example | Structure | Name | Calc'd [M + H]+ | Observed [M + H]+ | Conditions |
|---|---|---|---|---|---|
| 38 | | (5S)-N-((3-chloro-4-fluorophenyl)(5-fluoro-6-(trifluoromethyl)pyridin-2-yl)methyl)-2-oxooxazolidine-5-carboxamide | 436.0 | 436.2 | Not Resolved |
| 39A | | (S)-N-((R or S)-(4-(tert-butyl)thiazol-2-yl)(4-chlorophenyl)methyl)-2-oxooxazolidine-5-carboxamide | 394.1 | 394.2 | Chiral method S, Peak 1 |
| 39B | | (S)-N-((R or S)-(4-(tert-butyl)thiazol-2-yl)(4-chlorophenyl)methyl)-2-oxooxazolidine-5-carboxamide | 394.1 | 394.2 | Chiral method S, Peak 2 |
| 40 | | (5S)-N-((4-chlorophenyl)(4-(trifluoromethyl)-1H-imidazol-2-yl)methyl)-2-oxooxazolidine-5-carboxamide | 389.1 | 389.1 | Not Resolved |

TABLE 3-continued

*The compounds of Examples 20-43B were prepared according to a synthetic procedure similar to the synthetic procedure for Examples 19A and 19B.*

| Example | Name | Calc'd [M + H]⁺ | Observed [M + H]⁺ | Conditions |
|---|---|---|---|---|
| 41 | (S)-N-(1,1-bis(4-chlorophenyl)ethyl)-2-oxooxazolidine-5-carboxamide | 379.1 | 379.3 | Not Resolved |
| 42A | (S)-N-((R or S)-(4-chlorophenyl)(1-(2,2,2-trifluoroethyl)piperidin-4-yl)methyl)-2-oxooxazolidine-5-carboxamide | 420.1 | 420.3 | Reverse phase HPLC (95:5 to 5:95 water(0.1% TFA):MeCN (0.1% TFA), Peak 1 |
| 42B | (S)-N-((R or S)-(4-chlorophenyl)(1-(2,2,2-trifluoroethyl)piperidin-4-yl)methyl)-2-oxooxazolidine-5-carboxamide | 420.1 | 420.3 | Reverse phase HPLC (95:5 to 5:95 water(0.1% TFA):MeCN (0.1% TFA), Peak 2 |
| 43A | (S)-N-((R or S)-(3-chloro-4-fluorophenyl)((R or S)-1-(2,2,2-trifluoroethyl)pyrrolidin-3-yl)methyl)-2-oxooxazolidine-5-carboxamide | 424.1 | 424.2 | Reverse phase HPLC (95:5 to 5:95 water(0.1% TFA):MeCN (0.1% TFA), Peak 1 (mixture of 2) |

TABLE 3-continued

The compounds of Examples 20-43B were prepared according to a synthetic procedure similar to the synthetic procedure for Examples 19A and 19B.

| Example | Structure | Name | Calc'd [M + H]+ | Observed [M + H]+ | Conditions |
|---------|-----------|------|-----------------|-------------------|------------|
| 43B | (structure shown) | (S)-N-((R or S)-(3-chloro-4-fluorophenyl)((R or S)-1-(2,2,2-trifluoroethyl)pyrrolidin-3-yl)methyl)-2-oxooxazolidine-5-carboxamide | 424.1 | 424.2 | Reverse phase HPLC (95:5 to 5:95 water(0.1% TFA):MeCN (0.1% TFA), Peak 2 (mixture of 2) |

Examples 44A and 44B (S)—N—((R)-(3-chloro-4-fluorophenyl)(2-(trifluoromethyl)thiazol-4-yl)methyl)-2-oxooxazolidine-S-carboxamide and (S)—N—((S)-(3-chloro-4-fluorophenyl)(2-(trifluoromethyl)thiazol-4-yl)methyl)-2-oxooxazolidine-5-carboxamide

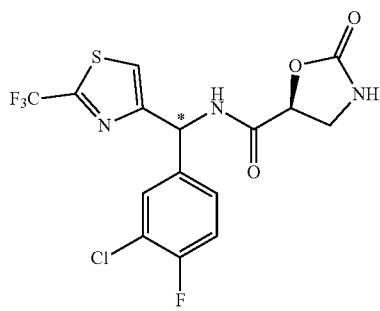 [SMILES: O=C1NC[C@@H](C(=O)NC(c2ccc(F)c(Cl)c2)c2csc(C(F)(F)F)n2)O1]

Step 1: (S)-2-methyl-N-((2-(trifluoromethyl)thiazol-4-yl)methylene)propane-2-sulfinamide. 2-(trifluoromethyl)thiazole-4-carbaldehyde (3.0 g, 17 mmol) and (S)-2-methylpropane-2-sulfinamide (2.0 g, 17 mmol) were taken up in THF (83 mL), and then Ti(OiPr)₄ (9.8 mL, 33 mmol) was added. This mixture was stirred for 2 hours, then diluted with brine, filtered through sand and extracted with EtOAc. The combined organic layers were washed with saturated NH₄Cl, brine, dried over Na₂SO₄, filtered, and concentrated in vacuo to give the title compound.

Step 2: (S)—N-((3-chloro-4-fluorophenyl)(2-(trifluoromethyl)thiazol-4-yl)methyl)-2-methyl-propane-2-sulfinamide. (S)-2-methyl-N-((2-(trifluoromethyl)thiazol-4-yl)methylene)propane-2-sulfinamide (0.85 g, 3.0 mmol) was taken up in toluene (60 mL), and then (3-chloro-4-fluorophenyl)magnesium bromide (1.4 g, 6.0 mmol) was added. This mixture was stirred for 2 hours, then diluted with aq. NH₄Cl, filtered through Celite® and concentrated in vacuo to give the title compound.

Step 3: (3-chloro-4-fluorophenyl)(2-(trifluoromethyl)thiazol-4-yl)methanamine. A solution of (S)—N-((3-chloro-4-fluorophenyl)(2-(trifluoromethyl)thiazol-4-yl)methyl)-2-methylpropane-2-sulfinamide (1.2 g, 3.0 mmol) in EtOAc (30 mL) was cooled to 0° C. and then HCl gas was bubbled through the solution for 15 seconds (until saturated). Then the mixture was concentrated in vacuo. The resulting residue was taken up in MeOH and loaded on to a SCX column, which was washed with MeOH. The product was eluted by flushing with NH₄ (7 N in MeOH), and the eluent was concentrated in vacuo to give the title compound.

Step 4: (S)—N—((R and S)-(3-chloro-4-fluorophenyl)(2-(trifluoromethyl)thiazol-4-yl)methyl)-2-oxooxazolidine-5-carboxamide. (S)-2-oxooxazolidine-5-carboxylic acid (0.13 g, 1.0 mmol), (3-chloro-4-fluorophenyl)(2-(trifluoromethyl)thiazol-4-yl)methanamine (0.31 g, 1.0 mmol) and HATU (0.38 g, 1.0 mmol) were taken up in DMSO (3.5 mL) and then N-Methylmorpholine (0.33 mL, 3.0 mmol) was added. The mixture was stirred for 10 h at rt. The mixture was then purified by reverse phase HPLC (75:25 to 35:65; water (0.1% TFA):MeCN(0.1% TFA)), followed by lyophilization to give the title compound.

Step 5: (S)—N—((R or S)-(3-chloro-4-fluorophenyl)(2-(trifluoromethyl)thiazol-4-yl)methyl)-2-oxooxazolidine-5-carboxamide. (S)—N—((R and S)-(3-chloro-4-fluorophenyl)(2-(trifluoro-methyl)thiazol-4-yl)methyl)-2-oxooxazolidine-5-carboxamide was separated by chiral SFC (method T) to give the title compounds: first eluted diastereomer 44A (S)—N—((R or S)-(3-chloro-4-fluorophenyl)(2-(trifluoromethyl)thiazol-4-yl)methyl)-2-oxooxazolidine-5-carboxamide, and second eluted diastereomer 44B (S)—N—((R or S)-(3-chloro-4-fluorophenyl)(2-(trifluoromethyl)thiazol-4-yl)methyl)-2-oxooxazolidine-5-carboxamide. Diastereomer 44A: LRMS m/z (M+H): calculated 424.0, observed 424.0. ¹H NMR (500 MHz, DMSO-d₆) δ 9.36 (d, J=8.3 Hz, 1H), 7.96 (s, 1H), 7.72 (s, 1H), 7.65 (dd, J=7.1, 1.8 Hz, 1H), 7.48-7.38 (m, 2H), 6.39 (d, J=8.3 Hz, 1H), 5.06 (dd, J=9.4, 5.9 Hz, 1H), 3.71 (t, J=9.2 Hz, 1H), 3.38 (dd, J=8.7, 6.2 Hz, 1H). Diastereomer 44B: LRMS m/z (M+H): calculated 424.0, observed 424.0. ¹H NMR (500 MHz, DMSO-d₆) δ 9.37 (d, J=8.4 Hz, 1H), 7.97 (s, 1H), 7.72 (s, 1H), 7.68-7.64 (m, 1H), 7.46-7.37 (m, 2H), 6.40 (d, J=8.3 Hz, 1H), 5.05 (dd, J=9.4, 6.0 Hz, 1H), 3.70 (t, J=9.2 Hz, 1H), 3.39 (dd, J=8.7, 6.2 Hz, 1H).

TABLE 4

The compounds of Examples 45-49B were prepared according to a synthetic procedure similar to the synthetic procedure for Examples 44A and 44B.

| Example | Structure | Name | Calc'd [M + H]+ | Observed [M + H]+ | Conditions |
| --- | --- | --- | --- | --- | --- |
| 45 | | (5S)-N-((4-chlorophenyl)(cyclo-heptyl)methyl)-2-oxooxazolidine-5-carboxamide | 351.1 | 351.3 | Not Resolved |
| 46A | | (S)-N-((R or S)-(4-chloro-3-methylphenyl)(4-chlorophenyl)methyl)-2-oxooxazolidine-5-carboxamide | 379.1 | 379.2 | Chiral method Q, Peak 1 |
| 46B | | (S)-N-((R or S)-(4-chloro-3-methylphenyl)(4-chlorophenyl)methyl)-2-oxooxazolidine-5-carboxamide | 379.1 | 379.3 | Chiral method Q, Peak 2 |
| 47A | | (S)-N-((R or S)-(4-chloro-2-(trifluoromethoxy)phenyl)(4-chlorophenyl)methyl)-2-oxooxazolidine-5-carboxamide | 449.0 | 449.3 | Chiral method U, Peak 1 |

TABLE 4-continued

The compounds of Examples 45-49B were prepared according to a synthetic procedure similar to the synthetic procedure for Examples 44A and 44B.

| Example | Structure | Name | Calc'd [M + H]⁺ | Observed [M + H]⁺ | Conditions |
|---------|-----------|------|-----------------|-------------------|------------|
| 47B | | (S)-N-((R or S)-(4-chloro-2-(trifluoromethoxy)phenyl)(4-chlorophenyl)methyl)-2-oxooxazolidine-5-carboxamide | 449.0 | 449.3 | Chiral method U, Peak 2 |
| 48A | | (S)-N-((R or S)-(3-chloro-4-fluorophenyl)(4-(difluoromethoxy)phenyl)methyl)-2-oxooxazolidine-5-carboxamide | 415.1 | 415.3 | Chiral method Q, Peak 1 |
| 48B | | (S)-N-((R or S)-(3-chloro-4-fluorophenyl)(4-(difluoromethoxy)phenyl)methyl)-2-oxooxazolidine-5-carboxamide | 415.1 | 15.3 | Chiral method Q, Peak 2 |
| 49A | | (S)-N-((R or S)-(3-chloro-4-fluorophenyl)(6-(trifluoromethyl)pyridin-2-yl)methyl)-2-oxooxazolidine-5-carboxamide | 418.1 | 418.2 | Chiral method V, Peak 1 |

TABLE 4-continued

The compounds of Examples 45-49B were prepared according to a synthetic procedure similar to the synthetic procedure for Examples 44A and 44B.

| Example | Structure | Name | Calc'd [M + H]+ | Observed [M + H]+ | Conditions |
|---|---|---|---|---|---|
| 49B | | (S)-N-((R or S)-(3-chloro-4-fluorophenyl)(6-(trifluoromethyl)pyridin-2-yl)methyl)-2-oxooxazolidine-5-carboxamide | 418.1 | 418.1 | Chiral method V, Peak 2 |

Examples 50A and 50B (S)—N—((R)-(3-chloro-2,4-difluorophenyl)(6-(2,2,2-trifluoroethoxy)pyridin-3-yl)methyl)-2-oxooxazolidine-5-carboxamide and (S)—N—((S)-(3-chloro-2,4-difluorophenyl)(6-(2,2,2-trifluoroethoxy)pyridin-3-yl)methyl)-2-oxooxazolidine-5-carboxamide

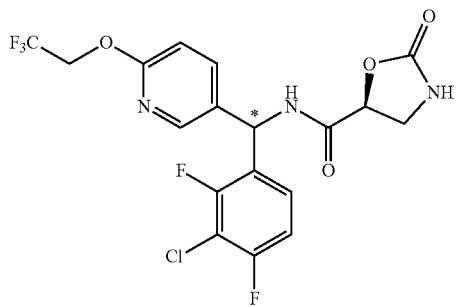 [SMILES: O=C1NC[C@@H](C(=O)NC(c2ccc(OCC(F)(F)F)nc2)c2ccc(F)c(Cl)c2F)O1]

Step 1: 2-methyl-N-(((6-(2,2,2-trifluoroethoxy)pyridin-3-yl)methylene)propane-2-sulfinamide. To a solution of 6-(2,2,2-trifluoroethoxy)nicotinaldehyde (2.0 g, 9.6 mmol) and 2-methylpropane-2-sulfinamide (1.2 g, 1.0 mmol) in DCM (8 mL) was added Ti(OiPr)$_4$ (6.0 mL, 20 mmol). The mixture was stirred at rt for 20 hours, then water and EtOAc were added. The mixture was stirred at rt for 20 min, then filtered through a pad of the Celite®. The organic layer was separated, dried over Na$_2$SO$_4$, filtered and concentrated in vacuo to give the title compound.

Step 2: N-((3-chloro-2,4-difluorophenyl)(6-(2,2,2-trifluoroethoxy)pyridin-3-yl)methyl)-2-methyl propane-2-sulfinamide. 1-Bromo-3-chloro-2,4-difluorobenzene (0.28 g, 1.2 mmol) was dissolved in THF, followed by addition of iPrMgCl-LiCl complex (0.94 mL, 1.2 mmol, 1.3 M in THF). The mixture was stirred at rt for 5 hours and then 2-methyl-N-((6-(2,2,2-trifluoroethoxy)pyridin-3-yl)methylene)propane-2-sulfinamide (0.20 g, 0.65 mmol) was added in one portion. The mixture was stirred at rt for 20 hours, then quenched with saturated NH$_4$Cl and extracted with Et$_2$O. The separated organic phase was dried over Na$_2$SO$_4$, filtered and concentrated in vacuo to give the title compound.

Step 3: (3-chloro-2,4-difluorophenyl)(6-(2,2,2-trifluoroethoxy)pyridin-3-yl)methanamine hydrochloride. To a solution of N-((3-chloro-2,4-difluorophenyl)(6-(2,2,2-trifluoroethoxy)-pyridin-3-yl)methyl)-2-methylpropane-2-sulfinamide (0.30 g, 0.65 mmol) in DCM (2 mL) and MeOH (1 mL) was added HCl (2.0 mL, 8.0 mmol, 4.0 M in 1,4-dioxane). The mixture was stirred at rt for 2 h and then concentrated in vacuo. The resulting residue was treated with Et$_2$O, filtered to collect the solid. After washing with extra Et$_2$O, the solid was dried in vacuo to give the title compound.

Step 4: (S)—N—((R and S)-(3-chloro-2,4-difluorophenyl)(6-(2,2,2-trifluoroethoxy)pyridin-3-yl)methyl)-2-oxooxazolidine-5-carboxamide. To a solution of (3-chloro-2,4-difluorophenyl)(6-(2,2,2-trifluoroethoxy)pyridin-3-yl)methanamine hydrochloride (68 mg, 0.18 mmol) in pyridine (3 mL) was added (S)-2-oxooxazolidine-5-carboxylic acid (34 mg, 0.26 mmol) and EDC (54 mg, 0.35 mmol). The mixture was stirred at rt overnight and then concentrated in vacuo. The resulting residue was purified by silica gel chromatography (0-3% MeOH:DCM) to give the title compound.

Step 5: (S)—N—((R or S)-(3-chloro-2,4-difluorophenyl)(6-(2,2,2-trifluoroethoxy)pyridin-3-yl)methyl)-2-oxooxazolidine-5-carboxamide. (S)—N—((R and S)-(3-chloro-2,4-difluorophenyl)(6-(2,2,2-trifluoroethoxy)pyridin-3-yl)methyl)-2-oxooxazolidine-5-carboxamide was separated by chiral-SFC (method Q) to give the title compounds: first eluted diastereomer 50A (S)—N—((R or S)-(3-chloro-2,4-difluorophenyl)(6-(2,2,2-trifluoroethoxy)pyridin-3-yl)methyl)-2-oxo-oxazolidine-5-carboxamide, and second eluted diastereomer 50B (S)—N—((R or S)-(3-chloro-2,4-difluorophenyl)(6-(2,2,2-trifluoroethoxy)pyridin-3-yl)methyl)-2-oxooxazolidine-5-carboxamide. Diastereomer 50A: LRMS m/z (M+H): calculated 466.1, observed 466.4. $^1$H NMR (500 MHz, Chloroform-d) δ 8.01 (s, 1H), 7.54 (d, J=8.1 Hz, 1H), 7.51-7.44 (m, 1H), 7.16 (q, J=8.1 Hz, 1H), 7.02 (t, J=8.3 Hz, 1H), 6.86 (d, J=8.6 Hz, 1H), 6.43 (d, J=8.1 Hz, 1H), 5.78 (s, 1H), 5.02 (dd, J=9.6, 5.7 Hz, 1H), 4.74 (q, J=8.5 Hz, 2H), 3.93 (t, J=9.4 Hz, 1H), 3.79 (dd, J=9.0, 5.8 Hz, 1H). Diastereomer 50B: LRMS m/z (M+H): calculated 466.1, observed 466.4. $^1$H NMR (500 MHz, Chloroform-d) δ 8.02 (d, J=2.0 Hz, 1H), 7.51 (d, J=8.6 Hz, 1H), 7.48-7.29 (m, 1H), 7.13 (q, J=7.1, 6.4 Hz, 1H), 7.02 (t, J=8.4 Hz, 1H), 6.88 (d, J=8.6 Hz, 1H), 6.43 (d, J=8.1 Hz, 1H), 5.08-5.01 (m, 1H), 4.75 (q, J=8.5 Hz, 2H), 3.98-3.91 (m, 1H), 3.79-3.72 (m, 1H).

TABLE 5

The compounds of Examples 51A-54B below were prepared according to a synthetic procedure similar to the synthetic procedure for Examples 50A and 50B.

| Example | Structure | Name | Calc'd [M + H]⁺ | Observed [M + H]⁺ | Conditions |
|---|---|---|---|---|---|
| 51A | | (S)-N-((R or S)-(3-chloro-4-(trifluoro-methoxy)phenyl)(2-(trifluoromethyl)oxazol-4-yl)methyl)-2-oxooxazolidine-5-carboxamide | 474.0 | 474.4 | Chiral method W, Peak 1 |
| 51B | | (S)-N-((R or S)-(3-chloro-4-(trifluoro-methoxy)phenyl)(2-(trifluoromethyl)oxazol-4-yl)methyl)-2-oxooxazolidine-5-carboxamide | 474.0 | 474.4 | Chiral method W, Peak 2 |
| 52A | | (S)-N-((R or S)-(3-chloro-4-(trifluoromethoxy)phenyl)(2-(trifluoromethyl)pyrimidin-4-yl)methyl)-2-oxooxazolidine-5-carboxamide | 485.0 | 485.4 | Chiral method X, Peak 1 |
| 52B | | (S)-N-((R or S)-(3-chloro-4-(trifluoromethoxy)phenyl)(2-(trifluoromethyl)pyrimidin-4-yl)methyl)-2-oxooxazolidine-5-carboxamide | 485.0 | 485.4 | Chiral method X, Peak 2 |

TABLE 5-continued

The compounds of Examples 51A-54B below were prepared according to a synthetic procedure similar to the synthetic procedure for Examples 50A and 50B.

| Example | Structure | Name | Calc'd [M + H]+ | Observed [M + H]+ | Conditions |
| --- | --- | --- | --- | --- | --- |
| 53A | | (S)-N-((R or S)-(3-chloro-4-(trifluoro-methoxy)phenyl)(1-(trifluoromethyl)-1H-pyrazol-4-yl)methyl)-2-oxooxazolidine-5-carboxamide | 473.0 | 473.4 | Chiral method X, Peak 1 |
| 53B | | (S)-N-((R or S)-(3-chloro-4-(trifluoro-methoxy)phenyl)(1-(trifluoromethyl)-1H-pyrazol-4-yl)methyl)-2-oxooxazolidine-5-carboxamide | 473.0 | 473.4 | Chiral method X, Peak 2 |
| 54A | | (S)-N-((R or S)-(3-chloro-4-cyano-phenyl)(5-chloro-6-(trifluoromethyl)pyridin-3-yl)methyl)-2-oxooxazolidine-5-carboxamide | 459.0 | 459.4 | Chiral method L, Peak 1 |
| 54B | | (S)-N-((R or S)-(3-chloro-4-cyano-phenyl)(5-chloro-6-(trifluoromethyl)pyridin-3-yl)methyl)-2-oxooxazolidine-5-carboxamide | 459.0 | 459.4 | Chiral method L, Peak 2 |

Examples 55A and 55B (S)—N—((R)-(4-chloro-2-methoxyphenyl)(4-fluorophenyl)methyl)-2-oxooxazolidine-5-carboxamide and (S)—N—((S)-(4-chloro-2-methoxyphenyl)(4-fluorophenyl)methyl)-2-oxooxazolidine-5-carboxamide

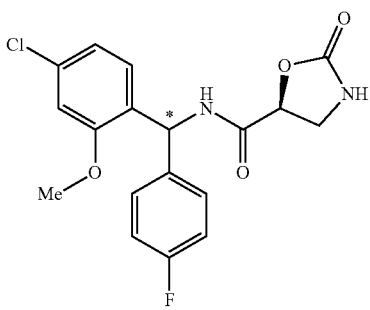 [SMILES: COc1cc(Cl)ccc1C(NC(=O)[C@@H]1CNC(=O)O1)c1ccc(F)cc1]

Step 1: N-(4-chloro-2-methoxybenzylidene)-2-methylpropane-2-sulfinamide. A mixture of 4-chloro-2-methoxybenzaldehyde (1.6 g, 9.4 mmol), 2-methylpropane-2-sulfinamide (1.4 g, 11 mmol) and $Cs_2CO_3$ (9.2 g, 28 mmol) in DCM (20 mL) was stirred at rt for 12 h. Then the mixture was diluted with EtOAc, washed with brine, filtered and concentrated in vacuo to give the title compound.

Step 2: N-((4-chloro-2-methoxyphenyl)(4-fluorophenyl)methyl)-2-methylpropane-2-sulfinamide. To a mixture of N-(4-chloro-2-methoxybenzylidene)-2-methylpropane-2-sulfinamide (1.5 g, 5.5 mmol) in THF (10 mL) was added (4-fluorophenyl)magnesium bromide (5.5 mL, 11 mmol) at 0° C. The resulting mixture was stirred at 0° C. for 30 min. Then aqueous $NH_4Cl$ was added, and the mixture was extracted with DCM. The combined organic layers were washed with brine, dried over $Na_2SO_4$, filtered and concentrated in vacuo. The resulting residue was purified by preparative silica gel TLC (33% EtOAc:PE) to give the title compound.

Step 3: (4-chloro-2-methoxyphenyl)(4-fluorophenyl)methanamine hydrochloride. To a mixture of N-((4-chloro-2-methoxyphenyl)(4-fluorophenyl)methyl)-2-methylpropane-2-sulfinamide (1.8 g, 4.9 mmol) in MeOH (15 mL) was added HCl (10 mL, 20 mmol, 2 N in MeOH) dropwise. The resulting mixture was stirred at rt for 1 h, then concentrated in vacuo to give the title compound.

Step 4: (S)—N—((R and S)-(4-chloro-2-methoxyphenyl)(4-fluorophenyl)methyl)-2-oxooxazolidine-5-carboxamide. To a mixture of (4-chloro-2-methoxyphenyl)(4-fluorophenyl)methanamine hydrochloride (0.10 g crude) and (S)-2-oxooxazolidine-5-carboxylic acid (59 mg, 0.45 mmol) in pyridine (2 mL) was added $POCl_3$ (0.10 mL, 1.1 mmol) at 0° C. The resulting mixture was stirred at rt for 1 h, then extracted with EtOAc. The combined organic layers were washed with brine, dried over $Na_2SO_4$, filtered and concentrated in vacuo. The resulting residue was purified by reverse phase HPLC (63:37 to 43:57 water (0.1% TFA):MeCN (0.1% TFA)), followed by lyophilization to give the title compound.

Step 5: (S)—N—((R or S)-(4-chloro-2-methoxyphenyl)(4-fluorophenyl)methyl)-2-oxooxazolidine-5-carboxamide. (S)—N—((R and S)-(4-chloro-2-methoxyphenyl)(4-fluorophenyl)methyl)-2-oxooxazolidine-5-carboxamide was separated by SFC (method Y)) to give the title compounds: first eluted diastereomer 55A (S)—N—((R or S)-(4-chloro-2-methoxyphenyl)(4-fluorophenyl)methyl)-2-oxooxazolidine-5-carboxamide, and second eluted diastereomer 55B (S)—N—((R or S)-(4-chloro-2-methoxyphenyl)(4-fluorophenyl)methyl)-2-oxooxazolidine-5-carboxamide. Diastereomer 55A: LRMS m/z (M+Na): calculated 401.1, observed 401.1. $^1$H NMR (400 MHz, $CD_3OD$) δ 7.17-7.24 (m, 3H), 6.94-7.06 (m, 4H), 6.40 (s, 1H), 5.08 (dd, J=5.6, 9.6 Hz, 1H), 3.84 (t, J=9.6 Hz, 1H), 3.79 (s, 3H), 3.62 (dd, J=5.6, 9.2 Hz, 1H). Diastereomer 55B: LRMS m/z (M+Na): calculated 401.1, observed 401.1. $^1$H NMR (400 MHz, $CD_3OD$) δ 7.22 (dd, J=5.2, 8.4 Hz, 2H), 7.17 (d, J=7.6 Hz, 1H), 7.00-7.07 (m, 3H), 6.96 (dd, J=1.6, 8.4 Hz, 1H), 6.39 (s, 1H), 5.10 (dd, J=5.6, 9.6 Hz, 1H), 3.83 (t, J=9.43 Hz, 1H), 3.78 (s, 3H), 3.61 (dd, J=5.6, 9.21 Hz, 1H).

Examples 56A and 56B (S)—N—((R)-(4-chlorophenyl)(cuban-1-yl)methyl)-2-oxooxazolidine-5-carboxamide and (S)—N—((S)-(4-chlorophenyl)(cuban-1-yl)methyl)-2-oxooxazolidine-5-carboxamide

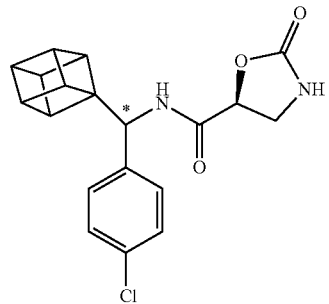 [SMILES: O=C1NC[C@@H](C(=O)NC(c2ccc(Cl)cc2)C23C4C5C6C4C2C6C53)O1]

Step 1: N-methoxy-N-methylcubane-1-carboxamide. To a mixture of cubane-1-carboxylic acid (0.13 g, 0.88 mmol) in DCM (5 mL) was added CDI (0.14 g, 0.88 mmol). The mixture was stirred at rt for 1 h, then N,O-dimethylhydroxylamine hydrochloride (94 mg, 0.96 mmol) and TEA (0.24 mL, 1.8 mmol) were added. The mixture was then concentrated in vacuo, and the resulting residue was purified by silica gel chromatography (25% EtOAc:PE) to give the title compound.

Step 2: (4-chlorophenyl)(cuban-1-yl)methanone. To a mixture of N-methoxy-N-methylcubane-1-carboxamide (140 mg crude) in THF (5 mL) was added (4-chlorophenyl)magnesium bromide (1.5 mL, 1.5 mmol, 1 M in THF) at 0° C. The mixture was stirred at rt for 2 h, then diluted with saturated $NH_4Cl$ and extracted with EtOAc. The combined organic layers were washed with brine, dried over $Na_2SO_4$, filtered and concentrated in vacuo. The resulting residue was purified by silica gel chromatography (0-2% EtOAc:PE) to give the title compound.

Step 3: (4-chlorophenyl)(cuban-1-yl)methanamine. To a mixture of (4-chlorophenyl)(cuban-1-yl)methanone (0.12 g, 0.47 mmol), and $NH_4OAc$ (0.55 g, 7.1 mmol) in EtOH (5 mL) was added $NaCNBH_3$ (45 mg, 0.71 mmol). The mixture was stirred under microwave irradiation at 130° C. for 10 min. Then the mixture was concentrated in vacuo, and the resulting residue was purified by preparative silica gel TLC (10% MeOH:DCM) to give the title compound.

Step 4: (S)—N—((R and S)-(4-chlorophenyl)(cuban-1-yl)methyl)-2-oxooxazolidine-5-carboxamide. To a mixture of (4-chlorophenyl)(cuban-1-yl)methanamine (0.10 g, 0.41 mmol), (S)-2-oxooxazolidine-5-carboxylic acid (0.12 g, 0.62 mmol) and DIEA (0.22 mL, 1.2 mmol) in DMF (4 mL) was added T$_3$P® (0.39 g, 0.62 mmol, 50% DMF solution). The mixture was stirred at 40° C. for 1 h, then concentrated in vacuo. The residue was purified by reverse phase HPLC (58:42 to 28:72 water (0.1% TFA):MeCN(0.1% TFA)), followed by lyophilization to give the title compound.

Step 5: (S)—N—((R or S)-(4-chlorophenyl)(cuban-1-yl)methyl)-2-oxooxazolidine-5-carboxamide. (S)—N—((R and S)-(4-chlorophenyl)(cuban-1-yl)methyl)-2-oxooxazolidine-5-carboxamide was separated by chiral-SFC (method Z) to give the title compounds: first eluted diastereomer 56A (S)—N—((R or S)-(4-chlorophenyl)(cuban-1-yl)methyl)-2-oxooxazolidine-5-carboxamide, and second eluted diastereomer 56B (S)—N—((R or S)-(4-chlorophenyl)(cuban-1-yl)methyl)-2-oxooxazolidine-5-carboxamide. Diastereomer 56A: LRMS m/z (M+H): calculated 357.1, observed 357.1. $^1$H NMR (DMSO-d$_6$, 400 MHz) δ 8.72 (d, J=8.6 Hz, 1H), 7.68 (s, 1H), 7.42-7.36 (m, 2H), 7.34-7.28 (m, 2H), 5.08 (d, J=8.6 Hz, 1H), 4.99 (dd, J=9.4, 5.9 Hz, 1H), 3.94 (tdd, J=7.2, 4.9, 2.5 Hz, 1H), 3.85 (dd, J=4.1, 2.2 Hz, 3H), 3.82-3.76 (m, 2H), 3.82-3.75 (m, 1H), 3.66 (t, J=9.0 Hz, 1H), 3.29 (dd, J=8.6, 6.3 Hz, 1H). Diastereomer 56B: LRMS m/z (M+H): calculated 357.1, observed 357.1. $^1$H NMR (DMSO-d$_6$, 400 MHz) δ 8.73 (d, J=9.0 Hz, 1H), 7.69 (s, 1H), 7.44-7.38 (m, 2H), 7.35-7.27 (m, 2H), 5.09 (d, J=8.6 Hz, 1H), 5.01 (dd, J=9.4, 5.9 Hz, 1H), 3.94 (td, J=5.0, 2.4 Hz, 1H), 3.85 (dd, J=4.5, 2.2 Hz, 3H), 3.82-3.75 (m, 3H), 3.70 (t, J=9.0 Hz, 1H), 3.36-3.35 (m, 1H).

TABLE 6

The compounds of Examples 57A-63B were prepared according to a synthetic procedure similar to the synthetic procedure for Examples 56A and 56B.

| Example | Structure | Name | Calc'd [M + H]$^+$ | Observed [M + H]$^+$ | Conditions |
|---|---|---|---|---|---|
| 57A | | (S)-N-((R or S)-(4-chlorophenyl)((R or S)-3,3-difluorocyclopentyl)methyl)-2-oxooxazolidine-5-carboxamide | 359.1 | 359.0 | Chiral method B, Peak 1 |
| 57B | | (S)-N-((R or S)-(4-chlorophenyl)((R or S)-3,3-difluorocyclopentyl)methyl)-2-oxooxazolidine-5-carboxamide | 359.1 | 359.0 | Chiral method B, Peak 2 |
| 57C | | (S)-N-((R or S)-(4-chlorophenyl)((R or S)-3,3-difluorocyclopentyl)methyl)-2-oxooxazolidine-5-carboxamide | 359.1 | 359.0 | Chiral method B, Peak 3 |

TABLE 6-continued

The compounds of Examples 57A-63B were prepared according to a synthetic procedure similar to the synthetic procedure for Examples 56A and 56B.

| Example | Structure | Name | Calc'd [M + H]+ | Observed [M + H]+ | Conditions |
|---------|-----------|------|-----------------|-------------------|------------|
| 57D | | (S)-N-((R or S)-(4-chlorophenyl)((R or S)-3,3-difluorocyclopentyl)methyl)-2-oxooxazolidine-5-carboxamide | 359.1 | 359.0 | Chiral method B, Peak 4 |
| 58A | | (S)-N-((R or S)-(3-chloro-4-fluorophenyl)(2-methoxypyridin-3-yl)methyl)-2-oxooxazolidine-5-carboxamide | 380.1 | 380.1 | Chiral method B, Peak 1 |
| 58B | | (S)-N-((R or S)-(3-chloro-4-fluorophenyl)(2-methoxypyridin-3-yl)methyl)-2-oxooxazolidine-5-carboxamide | 380.1 | 380.1 | Chiral method B, Peak 2 |
| 59A | | (S)-N-((R or S)-(3-chloro-4-fluorophenyl)(1-(2,2,2-trifluoroethyl)-1H-pyrazol-4-yl)methyl)-2-oxooxazolidine-5-carboxamide | 421.1 | 421.1 | Chiral method AA, Peak 1 |
| 59B | | (S)-N-((R or S)-(3-chloro-4-fluorophenyl)(1-(2,2,2-trifluoroethyl)-1H-pyrazol-4-yl)methyl)-2-oxooxazolidine-5-carboxamide | 421.1 | 421.1 | Chiral method AA, Peak 2 |

TABLE 6-continued

The compounds of Examples 57A-63B were prepared according to a synthetic procedure similar to the synthetic procedure for Examples 56A and 56B.

| Example | Structure | Name | Calc'd [M + H]⁺ | Observed [M + H]⁺ | Conditions |
|---|---|---|---|---|---|
| 60A | 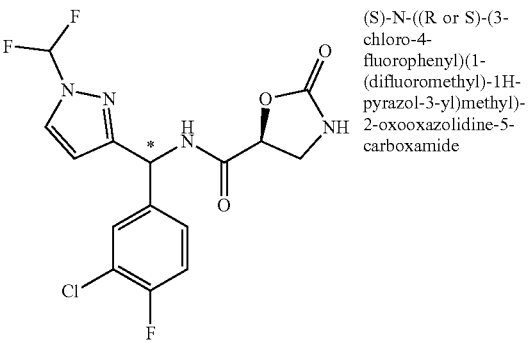 | (S)-N-((R or S)-(3-chloro-4-fluorophenyl)(1-(difluoromethyl)-1H-pyrazol-3-yl)methyl)-2-oxooxazolidine-5-carboxamide | 389.1 | 389.1 | Chiral method AB, Peak 1 |
| 60B | 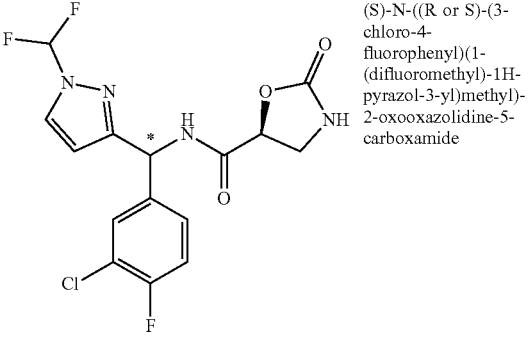 | (S)-N-((R or S)-(3-chloro-4-fluorophenyl)(1-(difluoromethyl)-1H-pyrazol-3-yl)methyl)-2-oxooxazolidine-5-carboxamide | 389.1 | 389.1 | Chiral method AB, Peak 2 |
| 61A | 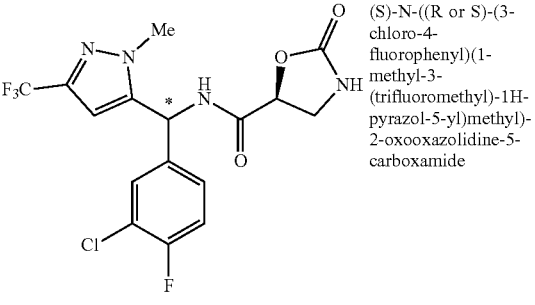 | (S)-N-((R or S)-(3-chloro-4-fluorophenyl)(1-methyl-3-(trifluoromethyl)-1H-pyrazol-5-yl)methyl)-2-oxooxazolidine-5-carboxamide | 421.1 | 421.0 | Chiral method AC, Peak 1 |
| 61B | 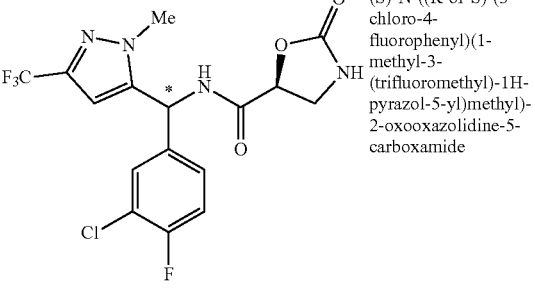 | (S)-N-((R or S)-(3-chloro-4-fluorophenyl)(1-methyl-3-(trifluoromethyl)-1H-pyrazol-5-yl)methyl)-2-oxooxazolidine-5-carboxamide | 421.1 | 421.1 | Chiral method AC, Peak 2 |

TABLE 6-continued

The compounds of Examples 57A-63B were prepared according to a synthetic procedure similar to the synthetic procedure for Examples 56A and 56B.

| Example | Structure | Name | Calc'd [M + H]⁺ | Observed [M + H]⁺ | Conditions |
|---|---|---|---|---|---|
| 62A | | (S)-N-((R or S)-(3-chloro-4-fluorophenyl)(1-methyl-5-(trifluoromethyl)-1H-pyrazol-3-yl)methyl)-2-oxooxazolidine-5-carboxamide | 421.1 | 421.0 | Chiral method AC, Peak 1 |
| 62B | | (S)-N-((R or S)-(3-chloro-4-fluorophenyl)(1-methyl-5-(trifluoromethyl)-1H-pyrazol-3-yl)methyl)-2-oxooxazolidine-5-carboxamide | 421.1 | 421.0 | Chiral method AC, Peak 2 |
| 63A | | (S)-N-((R or S)-(5-chloro-6-(trifluoromethyl)pyridin-2-yl)(4,4-difluorocyclohexyl)methyl)-2-oxooxazolidine-5-carboxamide | 442.1 | 442.1 | Chiral method I, Peak 1 |
| 63B | | (S)-N-((R or S)-(5-chloro-6-(trifluoromethyl)pyridin-2-yl)(4,4-difluorocyclohexyl)methyl)-2-oxooxazolidine-5-carboxamide | 442.1 | 442.1 | Chiral method I, Peak 2 |

Example 64

(5S)-2-oxo-N-((6-(trifluoromethyl)pyridin-3-yl)(2-(trifluoromethyl)thiazol-4-yl)methyl)oxazolidine-5-carboxamide

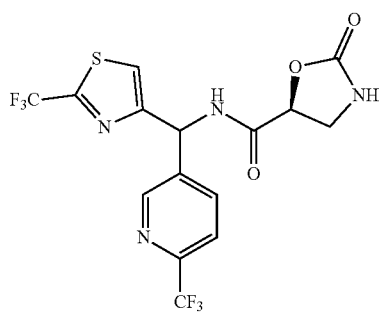 [SMILES: O=C1NC[C@@H](C(=O)NC(c2ccc(C(F)(F)F)nc2)c2csc(C(F)(F)F)n2)O1]

Step 1: (S)-2-methyl-N-((2-(trifluoromethyl)thiazol-4-yl)methylene)propane-2-sulfinamide. 2-(trifluoromethyl)thiazole-4-carbaldehyde (3.0 g, 17 mmol) and (S)-2-methylpropane-2-sulfinamide (2.0 g, 17 mmol) were taken up in THF (83 mL), and then Ti(OiPr)$_4$ (9.8 mL, 33 mmol) was added. This mixture was stirred for 2 hours. Then the mixture was diluted with brine, filtered through sand and extracted with EtOAc. The combined organic layers were washed with sat. NH$_4$Cl, brine, dried over Na$_2$SO$_4$, filtered, and concentrated in vacuo to give title compound.

Step 2: (S)-2-methyl-N-((6-(trifluoromethyl)pyridin-3-yl)(2-(trifluoromethyl)thiazol-4-yl)methyl)propane-2-sulfinamide. A solution of 5-bromo-2-(trifluoromethyl)pyridine (0.45 g, 2.0 mmol) in THF (10 mL) was cooled to −78° C. To this solution was added n-BuLi (0.88 mL, 2.1 mmol) slowly over 5 min. After an additional 15 min, this solution was slowly added to a mixture of (S)-2-methyl-N-((2-(trifluoromethyl)thiazol-4-yl)methylene)propane-2-sulfinamide (0.28 g, 1.0 mmol) in THF (10 mL) at −78° C. After stirring for 1 h, the reaction was quenched with sat. NH$_4$Cl and stirred for 10 min. The mixture was then filtered through a pad of Celite® and concentrated in vacuo. The resulting residue was purified by reverse phase HPLC (75:25 to 5:95; water (0.1% TFA):MeCN(0.1% TFA)), followed by lyophilization to give title compound.

Step 3: (6-(trifluoromethyl)pyridin-3-yl)(2-(trifluoromethyl)thiazol-4-yl)methanamine. (S)-2-methyl-N-((6-(trifluoromethyl)pyridin-3-yl)(2-(trifluoromethyl)thiazol-4-yl)methyl)propane-2-sulfinamide (0.43 g, 1.0 mmol) was dissolved in EtOAc (20 mL) and HCl (gas) was bubbled through until saturated. Then the mixture was concentrated in vacuo to give title compound.

Step 4: (5S)-2-oxo-N-((6-(trifluoromethyl)pyridin-3-yl)(2-(trifluoromethyl)thiazol-4-yl)methyl)-oxazolidine-5-carboxamide. (S)-2-oxooxazolidine-5-carboxylic acid (10 mg, 0.08 mmol), (6-(trifluoromethyl)pyridin-3-yl)(2-(trifluoromethyl)thiazol-4-yl)methanamine (26 mg, 0.080 mmol) and HATU (30 mg, 0.080 mmol) were dissolved in DMSO (0.53 mL), and then 4-methylmorpholine (18 µl, 0.16 mmol) was added. The mixture was stirred for 2 h at rt, then filtered and purified by mass directed reverse phase HPLC to give the title compound. LRMS m/z (M+H): calculated 441.0, observed 441.1. $^1$H NMR (500 MHz, DMSO-d$_6$) δ 9.54 (d, J=8.0 Hz, 1H), 8.80 (s, 1H), 8.07 (dd, J=8.3, 1.7 Hz, 1H), 8.04 (s, 1H), 7.96 (d, J=8.3 Hz, 1H), 7.74 (s, 1H), 6.55 (d, J=8.0 Hz, 1H), 5.07 (dd, J=9.5, 6.0 Hz, 1H), 3.71 (t, J=9.2 Hz, 1H), 3.47-3.45 (m, 1H).

Examples 65A and 65B (S)—N—((R)-1-(3-chloro-2,4-difluorophenyl)-3-(4-chlorophenyl)propyl)-2-oxooxazolidine-5-carboxamide and (S)—N—((S)-1-(3-chloro-2,4-difluorophenyl)-3-(4-chlorophenyl)propyl)-2-oxooxazolidine-5-carboxamide

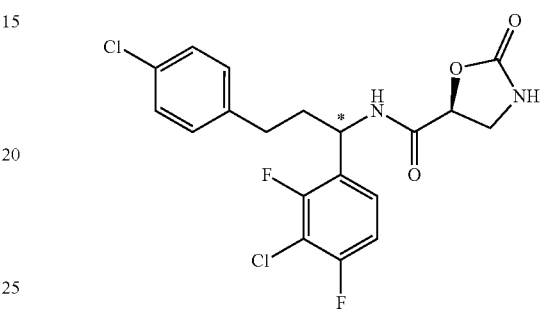

Step 1: N-(3-chloro-2,4-difluorobenzylidene)-2-methylpropane-2-sulfinamide. To a flask containing 3-chloro-2,4-difluorobenzaldehyde (3.0 g, 17 mmol) and 2-methylpropane-2-sulfinamide (2.5 g, 20 mmol) in THF (50 mL) was added Ti(OEt)$_4$ (10 mL, 34 mmol) at rt. After stirring for 16 h at rt, the reaction mixture was cooled to 0° C., and then quenched with sat. NH$_4$Cl. Then the mixture was suspended in EtOAc and filtered. The organic layer was separated, washed with sat. NH$_4$Cl, followed by sat. NaHCO$_3$, followed by water, and then brine. The organic layer was dried over Na$_2$SO$_4$, filtered and concentrated in vacuo. The resulting residue was purified by silica gel chromatography (0-60% EtOAc:hex) to give title compound.

Step 2: N-(1-(3-chloro-2,4-difluorophenyl)-3-(4-chlorophenyl)propyl)-2-methylpropane-2-sulfinamide. To a vial containing N-(3-chloro-2,4-difluorobenzylidene)-2-methylpropane-2-sulfinamide (0.40 g, 1.4 mmol) was added THF (6 mL), followed by the addition of 4-chlorophenethylmagnesium bromide (6.0 mL, 3.0 mmol) at rt. The reaction mixture was quenched with sat. NaHCO$_3$ and EtOAc and stirred for an additional 20 minutes. Then Celite® was added, and the mixture was stirred for 10 minutes before being filtered through Celite®. The filtrate was then concentrated in vacuo to give the title compound.

Step 3: 1-(3-chloro-2,4-difluorophenyl)-3-(4-chlorophenyl)propan-1-amine hydrochloride. To a vial containing N-(1-(3-chloro-2,4-difluorophenyl)-3-(4-chlorophenyl)propyl)-2-methylpropane-2-sulfinamide (0.59 g, 1.4 mmol) was added DCM (2 mL) and MeOH (2 mL), followed by the addition of a sat. solution of HCl (8.0 mL, 32 mmol, 4 M in EtOAc). After stirring for 2 h, the reaction mixture was diluted with DCM and concentrated in vacuo. The resulting residue was then purified by reverse phase HPLC (90:10 to 80:20; water (0.1% TFA):MeCN (0.1% TFA)), followed by lyophilization. The resulting residue was then dissolved in MeOH/DCM, treated with HCl (6.0 mL, 18 mmol, 3 N in MeOH), and concentrated to yield the title compound.

Step 4: (S)—N—((R and S)-1-(3-chloro-2,4-difluorophenyl)-3-(4-chlorophenyl)propyl)-2-oxooxazolidine-5-carboxamide. To a vial containing 1-(3-chloro-2,4-difluorophenyl)-3-(4-chlorophenyl)propan-1-amine hydrochloride (0.11 g, 0.30 mmol) and (S)-2-oxooxazolidine-5-carboxylic acid (0.11 g, 0.87 mmol) was added EDC (71 mg, 0.37 mmol), and HOBT (57 mg, 0.42 mmol), followed by DMF (2 mL) and DIEA (75 μL, 0.43 mmol). The reaction mixture was stirred at rt, then diluted with water. The mixture was then purified by reverse phase HPLC (90:10 to 0:100 water (0.1% TFA):MeCN(0.1% TFA)), followed by lyophilization to give the title compound.

Step 5: (S)—N—((R or S)-1-(3-chloro-2,4-difluorophenyl)-3-(4-chlorophenyl)propyl)-2-oxooxazolidine-5-carboxamide. (S)—N—((R and S)-1-(3-chloro-2,4-difluorophenyl)-3-(4-chlorophenyl)propyl)-2-oxooxazolidine-5-carboxamide was separated by chiral SFC (method AD) to give the title compounds: first eluted diastereomer 65A (S)—N—((R or S)-1-(3-chloro-2,4-difluorophenyl)-3-(4-chlorophenyl)propyl)-2-oxooxazolidine-5-carboxamide, and second eluted diastereomer 65B (S)—N—((R or S)-1-(3-chloro-2,4-difluorophenyl)-3-(4-chlorophenyl)propyl)-2-oxooxazolidine-5-carboxamide. Diastereomer 65A: LRMS m/z (M+H): calculated 429.1, observed 429.2. $^1$H NMR (500 MHz, DMSO-$d_6$) δ 8.96 (d, J=7.9 Hz, 1H), 7.71 (s, 1H), 7.41 (q, J=8.3 Hz, 1H), 7.34-7.28 (m, 3H), 7.20 (d, J=8.4 Hz, 2H), 5.02-4.94 (m, 2H), 3.73-3.64 (m, 1H), 3.62-3.54 (m, 1H), 3.38-3.29 (m, 1H), 2.71-2.60 (m, 1H), 2.17-2.03 (m, 1H), 2.03-1.88 (m, 1H). Diastereomer 65B: LRMS m/z (M+H): calculated 429.1, observed 429.2. $^1$H NMR (500 MHz, DMSO-$d_6$) δ 8.94 (d, J=8.1 Hz, 1H), 7.76 (s, 1H), 7.48 (q, J=8.4 Hz, 1H), 7.36-7.28 (m, 3H), 7.20 (d, J=8.4 Hz, 2H), 5.03-4.92 (m, 2H), 3.68 (t, J=9.2 Hz, 1H), 3.43-3.36 (m, 1H), 2.70-2.60 (m, 1H), 2.19-2.06 (m, 1H), 2.06-1.87 (m, 1H).

TABLE 7

The compounds of Examples 66-69 were prepared according to a synthetic procedure similar to the synthetic procedure for Examples 65A and 65B.

| Example | Structure | Name | Calc'd [M + H]$^+$ | Observed [M + H]$^+$ | Conditions |
|---|---|---|---|---|---|
| 66 | | (5S)-N-(1-(3-chloro-4-fluorophenyl)-2-((6-(trifluoromethyl)pyridin-3-yl)oxy)ethyl)-2-oxooxazolidine-5-carboxamide | 448.1 | 448.1 | Not Resolved |
| 67 | | (S)-N-(1-(3-chloro-2,4-difluorophenyl)-2-cyclohexylethyl)-2-oxooxazolidine-5-carboxamide | 387.1 | 387.3 | Not Resolved |
| 68 | | (5S)-N-(2-(4-chlorophenyl)-1-(4-(trifluoromethoxy)phenyl)ethyl)-2-oxooxazolidine-5-carboxamide | 429.1 | 429.0 | Not Resolved |

TABLE 7-continued

The compounds of Examples 66-69 were prepared according to a synthetic procedure similar to the synthetic procedure for Examples 65A and 65B.

| Example | Structure | Name | Calc'd [M + H]+ | Observed [M + H]+ | Conditions |
|---|---|---|---|---|---|
| 69 | | (S)-N-((R or S)-(3-chloro-4-fluorophenyl)(3-cyano-4-fluorophenyl)methyl)-2-oxooxazolidine-5-carboxamide | 392.1 | 392.1 | Chiral method Q, Peak 1 |

Example 70

(S)—N—((R or S)-(3-chloro-2,4-difluorophenyl)((trans)-3-(trifluoromethyl)cyclobutyl)methyl)-2-oxooxazolidine-5-carboxamide

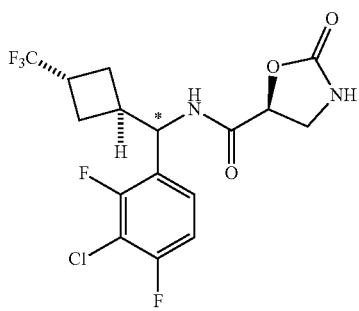 [SMILES: O=C1NC[C@@H](C(=O)NC(c2ccc(F)c(Cl)c2F)[C@H]2C[C@H](C(F)(F)F)C2)O1]

Step 1: (3-chloro-2,4-difluorophenyl)(trans-3-(trifluoromethyl)cyclobutyl)methanone. To a solution of trans-3-(trifluoromethyl)cyclobutane-1-carboxylic acid (1.0 g, 5.9 mmol) in DCM (15 mL) at 0° C. was added (COCl)$_2$ (3.6 mL, 7.1 mmol, 2.0 M in DCM) and one drop of DMF. The mixture was warmed to rt and stirred at rt for 4 hours. Then the mixture was concentrated in vacuo. The resulting residue was dissolved in THF (6 mL; Solution A). In a separate flask, a solution of 2-chloro-1,3-difluoro-4-iodobenzene (2.4 g, 8.9 mmol) in THF (20 mL) was cooled to −20° C., followed by the addition of iPrMgCl-LiCl complex (6.9 mL, 8.9 mmol, 1.3 M in THF). The mixture was stirred at −20° C. for 2 hours, then warmed to 0° C. CuCN (1.1 g, 12 mmol) was added, and the mixture was stirred at 0° C. for 30 minutes. Then solution A was added, and the mixture was stirred at 0° C. for 2 hours, and then stirred at rt for 1 hour. The mixture was partitioned between EtOAc and sat. NH$_4$Cl, and filtered through a pad of the Celite®. The organic layer was separated, dried over Na$_2$SO$_4$, filtered and concentrated in vacuo to give the title compound.

Step 2: (R)—N-((3-chloro-2,4-difluorophenyl)(trans-3-(trifluoromethyl)cyclobutyl)methylene)-2-methylpropane-2-sulfinamide. A microwave tube was charged with (3-chloro-2,4-difluorophenyl)(trans-3-(trifluoromethyl)cyclobutyl)methanone (1.7 g, 5.7 mmol), (R)-2-methylpropane-2-sulfinamide (1.0 g, 8.5 mmol) and Ti(OEt)$_4$ (10 mL, 11 mmol). The mixture was microwaved at 105° C. for 1 hour and then cooled to rt. The mixture was then was poured into water and EtOAc, and stirred for 10 minutes, followed by filtration through a pad of the Celite®. The organic layer was separated, dried over Na$_2$SO$_4$, filtered and concentrated in vacuo to give the title compound.

Step 3: (R)—N-((3-chloro-2,4-difluorophenyl)(trans-3-(trifluoromethyl)cyclobutyl)methyl)-2-methylpropane-2-sulfinamide. To a solution of (R)—N-((3-chloro-2,4-difluorophenyl)(trans-3-(trifluoromethyl)cyclobutyl)methylene)-2-methylpropane-2-sulfinamide (2.2 g, 5.5 mmol) in THF (10 mL) and MeOH (2 mL) at 0° C. was added NaBH$_4$ (0.21 g, 5.5 mmol). The mixture was stirred at 0° C. for 1 h, then warmed to rt for 1 hour. The mixture was partitioned between EtOAc and saturated NaHCO$_3$. The organic layer was separated, dried over Na$_2$SO$_4$, filtered and concentrated in vacuo. The resulting residue was purified by silica gel chromatography (0-40% EtOAc:hex) to give a mixture, which was separated by chiral-SFC (method AE) to give the title compound (first eluted isomer).

Step 4: (3-chloro-2,4-difluorophenyl)(trans-3-(trifluoromethyl)cyclobutyl)methanamine hydrochloride. A solution of (R)—N-((3-chloro-2,4-difluorophenyl)(trans-3-(trifluoromethyl)-cyclobutyl) methyl)-2-methyl propane-2-sulfinamide (first eluted isomer; 0.12 g, 0.31 mmol) in DCM (1 mL) was cooled to 0° C., and then HCl (1.0 mL, 4.0 mmol, 4.0 M in 1,4-dioxane) was added. The mixture was stirred at 0° C. for 2 h and then concentrated in vacuo. The resulting residue was washed with Et$_2$O and filtered to give the title compound.

Step 5: (S)—N—((R or S)-(3-chloro-2,4-difluorophenyl)((trans)-3-(trifluoromethyl)cyclobutyl)-methyl)-2-oxooxazolidine-5-carboxamide. To a solution of (3-chloro-2,4-difluorophenyl)(trans-3-(trifluoromethyl)cyclobutyl) methanamine hydrochloride (74 mg, 0.22 mmol) and (S)-2-oxooxazolidine-5-carboxylic acid (37 mg, 0.29 mmol) in pyridine (3 mL) was added EDC (68 mg, 0.44 mmol). The mixture was heated to 60° C. and stirred overnight. Then the mixture was concentrated in vacuo. The resulting residue was taken up in MeOH, stirred for 5 min and filtered to collect the solid. The solid which was washed with MeOH and concentrated in vacuo to give the title compound. LRMS m/z (M+H): calculated 413.1, observed 413.4. $^1$H NMR (500 MHz, DMSO-d$_6$) δ 8.79 (d, J=8.1 Hz, 1H), 7.73 (s, 1H), 7.51-7.43 (m, 1H), 7.35-7.30 (m, 1H), 5.16 (dd, J=10.7, 8.2 Hz, 1H), 4.92 (dd, J=9.4, 5.9 Hz, 1H), 3.66 (t, J=9.2 Hz, 1H), 3.31 (dd, J=8.8, 6.0 Hz, 1H), 3.20-3.07 (m, 1H), 2.96-2.80 (m, 1H), 2.24-2.08 (m, 2H), 2.02-183 (m, 2H)

TABLE 8

The compounds of Examples 71A-74B were prepared according to a synthetic procedure similar to the synthetic procedure for Example 70.

| Example | Structure | Name | Calc'd [M + H]+ | Observed [M + H]+ | Conditions |
|---|---|---|---|---|---|
| 71A | | (S)-N-((R or S)-(3-chloro-2,4-difluorophenyl)(2-(2,2,2-trifluoroethoxy)thiazol-5-yl)methyl)-2-oxooxazolidine-5-carboxamide | 472.0 | 472.4 | Step 6: Chiral method AF, Peak 1 |
| 71B | | (S)-N-((R or S)-(3-chloro-2,4-difluorophenyl)(2-(2,2,2-trifluoroethoxy)thiazol-5-yl)methyl)-2-oxooxazolidine-5-carboxamide | 472.0 | 472.4 | Step 6: Chiral method AF, Peak 2 |
| 72A | | (S)-N-((R or S)-(3-chloro-4-fluorophenyl)((trans)-4-(trifluoromethyl)cyclohexyl)methyl)-2-oxooxazolidine-5-carboxamide | 423.0 | 423.4 | Step 6: Chiral method AG, Peak 1 |
| 72B | | (S)-N-((R or S)-(3-chloro-4-fluorophenyl)((trans)-4-(trifluoromethyl)cyclohexyl)methyl)-2-oxooxazolidine-5-carboxamide | 423.1 | 423.4 | Step 6: Chiral method AG, Peak 2 |

TABLE 8-continued

The compounds of Examples 71A-74B were prepared according to a synthetic procedure similar to the synthetic procedure for Example 70.

| Example | Structure | Name | Calc'd [M + H]+ | Observed [M + H]+ | Conditions |
|---------|-----------|------|-----------------|-------------------|------------|
| 73A | | (S)-N-((R or S)-(4-chlorophenyl)(6-(2,2,2-trifluoroethoxy)pyridazin-3-yl)methyl)-2-oxooxazolidine-5-carboxamide | 431.1 | 431.3 | Step 6: Chiral method AH, Peak 1 |
| 73B | | (S)-N-((R or S)-(4-chlorophenyl)(6-(2,2,2-trifluoroethoxy)pyridazin-3-yl)methyl)-2-oxooxazolidine-5-carboxamide | 431.1 | 431.3 | Step 6: Chiral method AH, Peak 2 |
| 74A | | (S)-N-((R or S)-(3-chloro-2,4-difluorophenyl)((trans)-6,6-difluorobicyclo[3.1.0]hexan-3-yl)methyl)-2-oxooxazolidine-5-carboxamide | 407.1 | 407.3 | Step 6: Chiral method AI, Peak 1 |
| 74B | | (S)-N-((R or S)-(3-chloro-2,4-difluorophenyl)((trans)-6,6-difluorobicyclo[3.1.0]hexan-3-yl)methyl)-2-oxooxazolidine-5-carboxamide | 407.1 | 407.2 | Step 6: Chiral method AI, Peak 2 |

Example of a Pharmaceutical Composition

As a specific embodiment of an oral pharmaceutical composition, a 100 mg potency tablet is composed of 100 mg of any one of the Examples, 268 mg microcrystalline cellulose, 20 mg of croscarmellose sodium, and 4 mg of magnesium stearate. The active, microcrystalline cellulose, and croscarmellose are blended first. The mixture is then lubricated by magnesium stearate and pressed into tablets.

Biological Assays

Qube® Assay Experimental Procedure

Compounds were tested on human Nav1.8 and Nav1.5 channels stably expressed in human embryo kidney (HEK) 293 cells. Sodium current measurements on Qube® were conducted as follows: automated 384-well patch-clamp assays on the Qube® platform (Sophion Biosciences) were used to measure the inhibition of sodium flow through human Nav1.8 and Nav1.5 channels. Whole-cell voltage-clamp recordings were performed in QChips® (Sophion Biosciences) at room temperature. Nav1.8 current measurements on Qube® were obtained as follows: Nav1.8 currents were elicited with a 10 second 1 Hertz (Hz) pulse train from a holding potential of −90 millivolts (mV), delivered to the cells once per minute in the control condition (DMSO only) and after compound addition. The 1 hertz pulse train stimulation consisted of ten test pulses to 10 millivolt (mV) for 20 milliseconds (ms), each of which was followed by a 980 millisecond repolarization to −67 millivolts. At the end of the 10 second pulse train stimulation, a 5 second hyperpolarization step to −100 millivolt (mV) was used to recover Nav1.8 from fast inactivation. The peak currents elicited by the $1^{st}$ and $10^{th}$ test pulses were used to determine $IC_{50}$ values for resting inhibition and inactivated state inhibition. Nav1.5 current measurements on Qube® were obtained as follows: Nav1.5 currents were elicited with a 20 second 3 Hertz pulse train in the control condition (DMSO only) and after compound addition. The pulse train consisted of sixty 20 millisecond test pulses to 0 millivolt from a holding potential of −80 millivolt (mV). The average peak currents elicited by the last 3 test pulses were used to determine $IC_{50}$ values for Nav1.5 inhibition.

The following buffers were used for the Qube® recordings: External buffer for Nav1.8 Qube® recording: 150 NaCl, 2 $CaCl_2$), 5 KCl, 1 Mg $Cl_2$, 10 HEPES, 12 Dextrose; External buffer for Qube® Nav1.5 recording: 120 N-Methyl-D-Glucamine, 40 NaCl, 1 KCl, 2.7 $CaCl_2$), 5 HEPES, 0.5 $MgCl_2$; and Internal buffer for Qube® recording: 120 CsF, 30 CsCl, 10 EGTA, 5 HEPES, 5 NaF, 2 $MgCl_2$.

For all Qube® experiments offline analysis was used to determine percent inhibition as a function of drug concentration. $IC_{50}$ values were determined by filling to the Hill equation.

The compounds of the present invention have $Na_v1.8$ $IC_{50}$ values in the Qube® Assay of less than 25 micromolar. Preferred compounds of the present invention have $Na_v1.8$ $IC_{50}$ values in the Qube® Assay of less than 5 micromolar. More preferred compounds of the present invention have Nav1.8 $IC_{50}$ values in the Qube® Assay of less than 1 micromolar. Specific $IC_{50}$ values of the compounds of Examples 1A-74B in the Qube® Assay are listed in Table I.

TABLE I

IC50 values (nM) for Examples in the Nav1.8 Qube ® Assay

| Example | $IC_{50}$ (nM) |
|---|---|
| 1A | 46 |
| 1B | 4.0 |
| 2A | 0.6 |
| 2B | 30 |
| 3A | 133 |
| 3B | 1460 |
| 4A | 28 |
| 4B | 312 |
| 5A | 4.8 |
| 5B | 265 |
| 6A | 442 |
| 6B | 1520 |
| 7A | 14900 |
| 7B | 2030 |
| 8A | 40 |
| 8B | 4.6 |
| 9A | 7.3 |
| 9B | 9.5 |
| 9C | 356 |
| 9D | 2420 |
| 10 | 0.7 |
| 11A | 23 |
| 11B | 399 |
| 12A | 16 |
| 12B | 323 |
| 13A | 573 |
| 13B | 190 |
| 14A | 21 |
| 14B | 34 |
| 15A | 57 |
| 15B | 58 |
| 16A | 239 |
| 16B | 3.3 |
| 17A | 593 |
| 17B | 10600 |
| 18A | 31 |
| 18B | 272 |
| 19A | 0.9 |
| 19B | 2.4 |
| 20 | 32 |
| 21 | 293 |
| 22A | 130 |
| 22B | 314 |
| 23A | 1350 |
| 23B | 233 |
| 24 | 144 |
| 25A | 2.7 |
| 25B | 14 |
| 26A | 326 |
| 26B | 70 |
| 27 | 705 |
| 28A | 21 |
| 28B | 8.4 |
| 29A | 14 |
| 29B | 74 |
| 30 | 2.4 |
| 31 | 3.9 |
| 32A | 5.0 |
| 32B | 12 |
| 33A | 4.8 |
| 33B | 9.4 |
| 34 | 94 |
| 35A | 0.4 |
| 35B | 3.8 |
| 36 | 69 |
| 37A | 113 |
| 37B | 26 |
| 38 | 2.1 |
| 39A | 5.1 |
| 39B | 64 |
| 40 | 397 |
| 41 | 378 |
| 42A | 936 |
| 42B | 272 |
| 43A | 1760 |
| 43B | 807 |
| 44A | 4.6 |
| 44B | 17 |
| 45 | 87 |
| 46A | 0.6 |
| 46B | 1.8 |
| 47A | 1.6 |
| 47B | 17 |
| 48A | 2.7 |
| 48B | 6.8 |
| 49A | 8.8 |
| 49B | 54 |
| 50A | 1.6 |
| 50B | 48 |
| 51A | 5.3 |
| 51B | 3.7 |
| 52A | 7.9 |
| 52B | 13 |
| 53A | 22 |
| 53B | 1.2 |
| 54A | 1.7 |
| 54B | 7.2 |
| 55A | 19 |
| 55B | 4.7 |

143
TABLE I-continued

IC50 values (nM) for Examples in the Nav1.8 Qube ® Assay

| Example | IC$_{50}$ (nM) |
|---|---|
| 56A | 229 |
| 56B | 289 |
| 57A | 3450 |
| 57B | 5720 |
| 57C | 903 |
| 57D | 1160 |
| 58A | 12 |
| 58B | 24 |
| 59A | 171 |
| 59B | 693 |
| 60A | 231 |
| 60B | 124 |
| 61A | 4.6 |
| 61B | 231 |
| 62A | 39 |
| 62B | 11 |
| 63A | 12 |
| 63B | 574 |
| 64 | 129 |
| 65A | 94 |
| 65B | 11 |
| 66 | 268 |
| 67 | 21 |
| 68 | 246 |
| 69 | 16 |
| 70 | 5.4 |
| 71A | 3.0 |
| 71A | 11 |
| 72A | 3.0 |
| 72A | 39 |
| 73A | 964 |
| 73B | 80 |
| 74A | 11 |
| 74B | 389 |

The scope of the claims should not be limited by the preferred embodiments set forth in the examples, but should be given the broadest interpretation consistent with the description as a whole. While the invention has been described and illustrated with reference to certain particular embodiments thereof, those skilled in the art will appreciate that various adaptations, changes, modifications, substitutions, deletions, or additions of procedures and protocols may be made without departing from the scope of the invention. For example, effective dosages other than the particular dosages as set forth herein above may be applicable as a consequence of variations in responsiveness of the mammal being treated for any of the indications with the compounds of the invention indicated above. The specific pharmacological responses observed may vary according to and depending upon the particular active compounds selected or whether there are present pharmaceutical carriers, as well as the type of formulation and mode of administration employed, and such expected variations or differences in the results are contemplated in accordance with the objects and practices of the present invention.

144

What is claimed is:
1. A compound of structural Formula I:

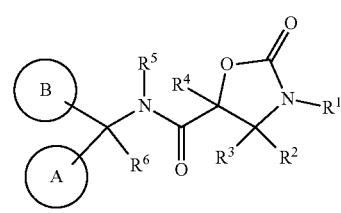

or a pharmaceutically acceptable salt thereof, wherein one of A and B is selected from:
  1) aryl, and
  2) heteroaryl,
wherein aryl and heteroaryl are unsubstituted or substituted with one to five substituents selected from R$^a$, and the other of A and B is selected from:
  1) aryl
  2) heteroaryl,
  3) C$_{1-6}$alkyl-aryl,
  4) —C$_{3-8}$cycloalkyl-aryl,
  5) —C$_{2-8}$cycloheteroalkyl-aryl,
  6) —C$_{1-6}$alkyl-heteroaryl,
  7) —C$_{3-8}$cycloalkyl-heteroaryl,
  8) —C$_{2-8}$cycloheteroalkyl-heteroaryl,
  9) —C$_{1-6}$alkyl-O-aryl,
  10) —C$_{1-6}$alkyl-O-heteroaryl,
  11) C$_{3-12}$cycloalkyl,
  12) C$_{2-12}$cycloheteroalkyl,
  13) —C$_{1-6}$alkyl-C$_{3-12}$cycloalkyl,
  14) —C$_{1-6}$alkyl-C$_{2-12}$cycloheteroalkyl,
  15) —C$_{1-6}$alkyl-O—C$_{3-12}$cycloalkyl,
  16) —C$_{1-6}$alkyl-O—C$_{2-12}$cycloheteroalkyl,
  17) —C$_{0-6}$alkyl-aryl fused to a C$_{4-6}$cycloalkyl or C$_{4-6}$cycloheteroalkyl containing 1-3 heteroatoms independently selected from O, S and N(R$^h$)$_2$,
  18) —C$_{0-6}$alkyl-aryl fused to a C$_{4-6}$cycloalkenyl or C$_{4-6}$cycloheteroalkenyl containing 1-3 heteroatoms independently selected from O, S and N(R$^h$)$_2$,
  19) —C$_{0-6}$alkyl-heteroaryl fused to C$_{4-6}$cycloalkyl or C$_{4-6}$cycloheteroalkyl containing 1-3 heteroatoms independently selected from O, S and N(R$^h$)$_2$, and
  20) —C$_{0-6}$alkyl-heteroaryl fused to C$_{4-6}$cycloalkenyl or C$_{4-6}$cycloheteroalkenyl containing 1-3 heteroatoms independently selected from O, S and N(R$^h$)$_2$,
wherein alkyl, cycloalkyl, cycloheteroalkyl, cycloalkenyl, aryl and heteroaryl are unsubstituted or substituted with one to five substituents selected from R$^b$;
R$^1$ is selected from the group consisting of:
  1) hydrogen,
  2) —C$_{1-6}$alkyl,
  3) —C$_{3-6}$alkenyl,
  4) —C$_{3-6}$alkynyl,
  5) —C$_{3-10}$cycloalkyl,
  6) —C$_{2-10}$cycloheteroalkyl,
  7) —C$_{1-6}$alkyl-O—C$_{1-6}$alkyl-,
  8) —(CH$_2$)$_s$(O)R$^j$,
  9) —(CH$_2$)$_s$C(O)NR$^e$R$^j$,
  10) —(CH$_2$)$_n$NR$^e$C(O)R$^j$,
  11) —(CH$_2$)$_n$NR$^e$C(O)OR$^j$,
  12) —(CH$_2$)$_n$NR$^e$C(O)N(R$^e$)$_2$,
  13) —(CH$_2$)$_n$NR$^e$C(O)NR$_e$R$^j$,
  14) —(CH$_2$)$_n$NR$^e$S(O)$_m$R$^j$,
  15) —(CH$_2$)$_n$NR$^e$S(O)$_m$N(R$^e$)$_2$,
  16) —(CH$_2$)$_n$NR$^e$S(O)$_m$NR$^e$R$^j$, and
  17) —(CH$_2$)$_n$NR$^e$R$^j$, wherein each CH$_2$, alkyl, alkenyl, alkynyl, cycloalkyl and cycloheteroalkyl is unsubstituted or substituted with one to five substituents selected from R$^c$;

R$^2$ is selected from the group consisting of:
1) hydrogen,
2) —C$_{1-6}$alkyl,
3) —C$_{2-6}$alkenyl,
4) —C$_{2-6}$alkynyl,
5) —C$_{3-10}$cycloalkyl,
6) —C$_{2-10}$cycloheteroalkyl,
7) —C$_{1-6}$alkyl-O—C$_{1-6}$alkyl-,
8) —(CH$_2$)$_S$C(O)R$^j$j
9) —(CH$_2$)$_S$C(O)NR$^e$R$^j$,
10) —(CH$_2$)$_S$NR$^e$C(O)R$^j$,
11) —(CH$_2$)$_S$NR$^e$C(O)OR$^j$,
12) —(CH$_2$)$_S$NR$^e$C(O)N(R$^e$)$_2$,
13) —(CH$_2$)$_S$NR$^e$C(O)NR$^e$R$^j$,
14) —(CH$_2$)$_S$NR$^e$S(O)$_m$R$^j$,
15) —(CH$_2$)$_S$NR$^e$S(O)$_m$N(R$^e$)$_2$,
16) —(CH$_2$)$_S$NR$^e$S(O)$_m$NR$^e$R$^j$, and
17) —(CH$_2$)$_S$NR$^e$R$^j$, wherein each CH$_2$, alkyl, alkenyl, alkynyl, cycloalkyl, and cycloheteroalkyl is unsubstituted or substituted with one to five substituents selected from R$^f$, and
wherein R$^2$ and R$^3$ and the carbon atom they are connected to can form a —C$_{3-5}$cycloalkyl ring, or wherein R$^2$ and R$^4$ and the carbon atoms they are connected to can form a —C$_{3-5}$cycloalkyl ring;

R$^3$ is selected from the group consisting of:
1) hydrogen,
2) —C$_{1-6}$alkyl,
3) —C$_{2-6}$alkenyl,
4) —C$_{2-6}$alkynyl,
5) —C$_{3-10}$cycloalkyl,
6) —C$_{2-10}$cycloheteroalkyl,
7) —C$_{1-6}$alkyl-O—C$_{1-6}$alkyl-,
8) —(CH$_2$)$_S$C(O)R$^j$,
9) —(CH$_2$)$_S$C(O)NR$^e$R$^j$,
10) —(CH$_2$)$_S$NR$^e$C(O)R$^j$,
11) —(CH$_2$)$_S$NR$^e$C(O)OR$^j$,
12) —(CH$_2$)$_S$NR$^e$C(O)N(R$^e$)$_2$,
13) —(CH$_2$)$_S$NR$^e$C(O)NR$^e$R$^j$,
14) —(CH$_2$)$_S$NR$^e$S(O)$_m$R$^j$,
15) —(CH$_2$)$_S$NR$^e$S(O)$_m$N(R$^e$)$_2$,
16) —(CH$_2$)$_S$NR$^e$S(O)$_m$NR$^e$R$^j$, and
17) —(CH$_2$)$_S$NR$^e$R$^j$, wherein each CH$_2$, alkyl, alkenyl, alkynyl, cycloalkyl, and cycloheteroalkyl is unsubstituted or substituted with one to five substituents selected from R$^g$;

R$^4$ is selected from the group consisting of:
1) hydrogen, and
2) —C$_{1-6}$alkyl, wherein each alkyl is unsubstituted or substituted with one to five substituents selected from halogen;

R$^5$ is selected from the group consisting of:
1) hydrogen, and
2) C$_{1-6}$alkyl;

R$^6$ is selected from the group consisting of:
1) hydrogen,
2) —C$_{1-6}$alkyl,
3) —C$_{2-6}$alkenyl, and
4) —C$_{2-6}$alkynyl, wherein each alkyl, alkenyl and alkynyl is unsubstituted or substituted with one to five substituents selected from halogen;

each R$^a$ is independently selected from the group consisting of:
1) —CF$_3$,
2) —OCF$_3$,
3) —CHF$_2$,
4) —OCHF$_2$,
5) —CH$_2$CF$_3$,
6) —OCH$_2$CF$_3$,
7) —CF$_2$CH$_3$;
8) CN,
9) oxo,
10) halogen,
11) —S(O)$_2$C$_{1-6}$alkyl,
12) —C$_{1-6}$alkyl,
13) —C$_{2-6}$alkenyl,
14) —C$_{2-6}$alkynyl,
15) —C$_{3-6}$cycloalkyl,
16) —C$_{2-6}$cycloheteroalkyl,
17) aryl,
18) heteroaryl,
19) —C$_{1-6}$alkyl-aryl,
20) —C$_{1-6}$alkyl-heteroaryl,
21) —C$_{1-6}$alkyl-C$_{3-6}$cycloalkyl,
22) —C$_{1-6}$alkyl-C$_{2-6}$cycloheteroalkyl,
23) —C$_{2-6}$alkenyl-C$_{3-6}$cycloalkyl,
24) —C$_{2-6}$alkenyl-C$_{2-6}$cycloheteroalkyl,
21) —C$_{2-6}$alkenyl-aryl,
22) —C$_{2-6}$alkenyl-heteroaryl,
27) —C$_{2-6}$alkynyl-C$_{3-6}$cycloalkyl,
23) —C$_{2-6}$alkynyl-C$_{2-6}$cycloheteroalkyl,
24) —C$_{2-6}$alkynyl-aryl,
25) —C$_{2-6}$alkynyl-heteroaryl,
26) —OH,
27) —(CH$_2$)$_p$—OC$_{1-6}$alkyl,
28) —(CH$_2$)$_p$—OC$_{2-6}$alkenyl,
29) —(CH$_2$)$_p$—OC$_{2-6}$alkynyl,
30) —(CH$_2$)$_p$—OC$_{3-6}$cycloalkyl,
31) —(CH$_2$)$_p$—OC$_{2-6}$heterocycloalkyl,
32) —(CH$_2$)$_p$—O-aryl,
33) —(CH$_2$)$_p$—O-heteroaryl,
34) —OC$_{1-6}$alkyl-C$_{3-6}$cycloalkyl,
40) —OC$_{1-6}$alkyl-C$_{2-6}$heterocycloalkyl,
41) —OC$_{1-6}$alkyl-aryl,
42) —OC$_{1-6}$alkyl-heteroaryl,
43) —S(O)$_m$R$^j$,
44) —C$_{1-6}$alkyl-S(O)$_m$R$^j$,
45) —N(R$^k$)$_2$, and
46) —NR$^k$R$^L$, wherein each R$^a$ is unsubstituted or substituted with one to six substituents selected from halogen, CF$_3$, OH, —C$_{1-6}$alkyl, and —OC$_{1-6}$alkyl;

each R$^b$ is independently selected from the group consisting of:
1) —CF$_3$,
2) —OCF$_3$,
3) —CHF$_2$,
4) —OCHF$_2$,
5) —CH$_2$CF$_3$,
6) —OCH$_2$CF$_3$,
7) —CF$_2$CH$_3$;
8) CN,
9) oxo,
10) halogen,
11) —S(O) 2C$_{1-6}$alkyl,
12) —C$_{1-6}$alkyl,
13) —C$_{2-6}$alkenyl,
14) —C$_{2-6}$alkynyl,
15) —O—C$_{1-6}$alkyl,
16) —C$_{3-6}$cycloalkyl, 17) —O—$C_{3-6}$cycloalkyl,
18) —$C_{2-6}$cycloheteroalkyl,
19) aryl,
20) heteroaryl,
21) —$C_{1-6}$alkyl-aryl,
22) —$C_{1-6}$alkyl-heteroaryl,
23) —$C_{1-6}$alkyl-$C_{3-6}$cycloalkyl,
24) —$C_{1-6}$alkyl-$C_{2-6}$cycloheteroalkyl,
21) —$C_{2-6}$alkenyl-$C_{3-6}$cycloalkyl,
22) —$C_{2-6}$alkenyl-$C_{2-6}$cycloheteroalkyl,
27) —$C_{2-6}$alkenyl-aryl,
23) —$C_{2-6}$alkenyl-heteroaryl,
24) —$C_{2-6}$alkynyl-$C_{3-6}$cycloalkyl,
25) —$C_{2-6}$alkynyl-$C_{2-6}$cycloheteroalkyl,
26) —$C_{2-6}$alkynyl-aryl,
27) —$C_{2-6}$alkynyl-heteroaryl, 33) —OH,
28) —$(CH_2)_q$—$OC_{1-6}$alkyl,
29) —$(CH_2)_q$—$OC_{2-6}$alkenyl,
30) —$(CH_2)_q$—$OC_{2-6}$alkynyl,
31) —$(CH_2)_q$—$OC_{3-6}$cycloalkyl,
32) —$(CH_2)_q$—$OC_{2-6}$heterocycloalkyl,
33) —$(CH_2)_q$—O-aryl,
34) —$(CH_2)_q$—O-heteroaryl,
40) —$OC_{1-6}$alkyl-$C_{3-6}$cycloalkyl,
41) —$OC_{1-6}$alkyl-$C_{2-6}$heterocycloalkyl,
42) —$OC_{1-6}$alkyl-aryl,
43) —$OC_{1-6}$alkyl-heteroaryl,
44) —$S(O)_mR^j$,
45) —$C_{1-6}$alkyl-$S(O)_mR^j$,
46) —$C(O)R^d$, and
47) —$NR^kR^L$,
wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl;
$R^c$ is selected from:
1) —$C_{1-6}$alkyl,
2) OH,
3) halogen, and
4) —$OC_{1-6}$alkyl,
wherein alkyl can be unsubstituted or substituted with one to three halogens;
$R^d$ is selected from:
1) hydrogen,
2) $C_{1-6}$alkyl,
3) $C_{3-6}$cycloalkyl,
4) aryl, and
5) heteroaryl;
$R^e$ is selected from:
1) hydrogen, and
2) $C_{1-6}$alkyl;
$R^f$ is selected from:
1) —$C_{1-6}$alkyl,
2) OH,
3) halogen, and
4) —$OC_{1-6}$alkyl,
wherein alkyl can be unsubstituted or substituted with one to three halogens;
$R^g$ is selected from:
1) —$C_{1-6}$alkyl,
2) OH,
3) halogen, and
4) —$OC_{1-6}$alkyl,
wherein alkyl can be unsubstituted or substituted with one to three halogens;
$R^h$ is selected from:
1) hydrogen, and
2) $C_{1-6}$alkyl;
$R^i$ is selected from:
1) hydrogen,
2) $C_{1-6}$alkyl,
3) $C_{3-6}$cycloalkyl,
4) aryl, and
5) heteroaryl;
$R^j$ is selected from:
1) hydrogen,
2) $C_{1-6}$alkyl,
3) $C_{3-6}$alkenyl,
4) $C_{3-6}$alkynyl,
5) $C_{3-6}$cycloalkyl,
6) $C_{2-5}$cycloheteroalkyl,
7) aryl, and
8) heteroaryl;
$R^k$ is selected from:
1) hydrogen, and
2) $C_{1-6}$alkyl;
$R^L$ is selected from:
1) hydrogen,
2) $C_{1-6}$alkyl,
3) $C_{3-6}$cycloalkyl,
4) aryl, and
5) heteroaryl;
m is independently selected from 0 to 2;
n is independently selected from 2 to 6;
p is independently selected from 0 to 3;
q is independently selected from 0 to 3;
r is independently selected from 0 to 2; and
s is independently selected from 0 to 6.

2. The compound according to claim 1 wherein A is selected from the group consisting of
1) aryl, and
2) heteroaryl,
wherein each aryl and heteroaryl is unsubstituted or substituted with one to five substituents selected from $R^a$; or a pharmaceutically acceptable salt thereof.

3. The compound according to claim 1 wherein A is selected from the group consisting of:
1) phenyl, and
2) pyridine,
wherein each phenyl and pyridine is unsubstituted or substituted with one to five substituents selected from $R^a$; or a pharmaceutically acceptable salt thereof.

4. The compound according to claim 1 wherein B is independently selected from the group consisting of:
1) aryl,
2) heteroaryl,
3) —$C_{1-6}$alkyl-aryl,
4) —$C_{3-8}$cycloalkyl-aryl,
5) —$C_{2-8}$cycloheteroalkyl-aryl,
6) —$C_{1-6}$alkyl-heteroaryl,
7) —$C_{3-8}$cycloalkyl-heteroaryl,
8) —$C_{2-8}$cycloheteroalkyl-heteroaryl,
9) —$C_{1-6}$alkyl-O-aryl,
10) —$C_{1-6}$alkyl-O-heteroaryl,
11) $C_{3-12}$cycloalkyl,
12) $C_{2-12}$cycloheteroalkyl,
13) —$C_{1-6}$alkyl-$C_{3-12}$cycloalkyl,
14) —$C_{1-6}$alkyl-$C_{2-12}$cycloheteroalkyl,
15) —$C_{1-6}$alkyl-O—$C_{3-12}$cycloalkyl,
16) —$C_{1-6}$alkyl-O—$C_{2-12}$cycloheteroalkyl, 17) —C$_{0-6}$alkyl-aryl fused to a C$_{4-6}$cycloalkyl or C$_{4-6}$cycloheteroalkyl containing 1-3 heteroatoms independently selected from O, S and N(R$^h$)$_2$,
18) —C$_{0-6}$alkyl-aryl fused to a C$_{4-6}$cycloalkenyl or C$_{4-6}$cycloheteroalkenyl containing 1-3 heteroatoms independently selected from O, S and N(R$^h$)$_2$,
19) —C$_{0-6}$alkyl-heteroaryl fused to C$_{4-6}$cycloalkyl or C$_{4-6}$cycloheteroalkyl containing 1-3 heteroatoms independently selected from O, S and N(R$^h$)$_2$, and
20) —C$_{0-6}$alkyl-heteroaryl fused to C$_{4-6}$cycloalkenyl or C$_{4-6}$cycloheteroalkenyl containing 1-3 heteroatoms independently selected from O, S and N(R$^h$)$_2$, wherein alkyl, cycloalkyl, cycloheteroalkyl, cycloalkenyl, aryl and heteroaryl are unsubstituted or substituted with one to five substituents selected from R$^b$;
or a pharmaceutically acceptable salt thereof.

5. The compound according to claim 1 wherein B is independently selected from the group consisting of:
1) aryl,
2) heteroaryl,
3) —C$_{1-6}$alkyl-aryl,
4) —C$_{1-6}$alkyl-O-aryl,
5) —C$_{1-6}$alkyl-O-heteroaryl,
6) C$_{3-12}$cycloalkyl,
7) C$_{2-12}$cycloheteroalkyl, and
8) —C$_{1-6}$alkyl-C$_{3-12}$cycloalkyl, wherein alkyl, cycloalkyl, cycloheteroalkyl, aryl and heteroaryl are unsubstituted or substituted with one to five substituents selected from R$^b$; or a pharmaceutically acceptable salt thereof.

6. The compound according to claim 1 wherein B is independently selected from the group consisting of:
1) phenyl,
2) naphthalene,
3) pyridine,
4) pyrazole,
5) thiazole,
6) pyrimidine,
7) pyridazine,
8) imidazole,
9) oxazole,
10) indazole,
11) thiophene,
12) —CH$_2$-phenyl,
13) —(CH$_2$)$_2$-phenyl,
14) —CH$_2$—O-phenyl,
15) —CH$_2$—O-pyridine,
16) adamantane,
17) cubane,
18) cyclopropane,
19) cyclobutane,
20) cyclopentane,
21) cyclohexane,
22) cycloheptane,
23) bicyclo[2.2.1]-heptane,
24) bicyclo[3.1.0]hexane,
25) bicyclo[1.1.1]pentane,
26) piperidine,
27) pyrrolidine,
28) tetrahydropyran, and
29) —CH$_2$-cyclohexane, wherein B is unsubstituted or substituted with one to five substituents selected from R$^b$;
or a pharmaceutically acceptable salt thereof.

7. The compound according to claim 1 wherein B is independently selected from the group consisting of:
1) aryl, and
2) heteroaryl,
wherein aryl and heteroaryl are unsubstituted or substituted with one to five substituents selected from R$^b$; or a pharmaceutically acceptable salt thereof.

8. The compound according to claim 1 wherein B is independently selected from the group consisting of:
1) phenyl,
2) pyridine,
3) pyrazole, and
4) thiazole,
wherein aryl and heteroaryl are unsubstituted or substituted with one to five substituents selected from R$^b$; or a pharmaceutically acceptable salt thereof.

9. The compound according to claim 1 wherein R$^5$ is hydrogen; or a pharmaceutically acceptable salt thereof.

10. The compound according to claim 1 wherein
R$^1$ is selected from the group consisting of
1) hydrogen, and
2) —C$_{1-6}$alkyl,
wherein each alkyl is unsubstituted or substituted with one to five substituents selected from R$^c$;
R$^2$ is selected from the group consisting of
1) hydrogen, and
2) —C$_{1-6}$alkyl,
wherein each alkyl is unsubstituted or substituted with one to five substituents selected from R$^f$;
R$^3$ is selected from the group consisting of
1) hydrogen, and
2) —C$_{1-6}$alkyl,
wherein each alkyl is unsubstituted or substituted with one to five substituents selected from R$^g$; and
R$^6$ is selected from the group consisting of
1) hydrogen, and
2) —C$_{1-6}$alkyl,
wherein each alkyl is unsubstituted or substituted with one to five substituents selected from halogen; or a pharmaceutically acceptable salt thereof.

11. The compound according to claim 1 wherein R$^1$, R$^2$, R$^3$, R$^4$, and R$^6$ are hydrogen; or a pharmaceutically acceptable salt thereof.

12. The compound according to claim 1 wherein each R$^a$ is independently selected from the group consisting of:
1) —CF$_3$,
2) —OCF$_3$,
3) —CHF$_2$,
4) —OCHF$_2$,
5) —CH$_2$CF$_3$,
6) —OCH$_2$CF$_3$,
7) —CF$_2$CH$_3$,
8) CN,
9) halogen, and
10) —C$_{1-6}$alkyl,
wherein each R$^a$ is unsubstituted or substituted with one to six substituents selected from halogen, CF$_3$, OH, —C$_{1-6}$alkyl, and —OC$_{1-6}$alkyl; or a pharmaceutically acceptable salt thereof.

13. The compound according to claim 1 wherein each R$^a$ is independently selected from the group consisting of:
1) —CF$_3$,
2) —OCF$_3$,
3) CN, and
4) halogen;
or a pharmaceutically acceptable salt thereof.

14. The compound according to claim 1 wherein each $R^b$ is independently selected from the group consisting of:
1) —$CF_3$,
2) —$OCF_3$,
3) —$CHF_2$,
4) —$OCHF_2$,
5) —$CH_2CF_3$,
6) —$OCH_2CF_3$,
7) CN,
8) halogen,
9) —$S(O)_2C_{1-6}$alkyl,
10) —$C_{1-6}$alkyl,
11) —O—$C_{1-6}$alkyl,
12) —$C_{3-6}$cycloalkyl, and
13) aryl,
wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl;
or a pharmaceutically acceptable salt thereof.

15. The compound according to claim 1 wherein each $R^b$ is independently selected from the group consisting of:
1) —$CF_3$,
2) —$OCH_2CF_3$, and
3) halogen;
or a pharmaceutically acceptable salt thereof.

16. The compound according to claim 1 wherein
A is selected from the group consisting of:
1) aryl, and
2) heteroaryl,
wherein each aryl and heteroaryl is unsubstituted or substituted with one to five substituents selected from $R^a$;
B is independently selected from the group consisting of:
1) aryl,
2) heteroaryl,
3) —$C_{1-6}$alkyl-aryl,
4) —$C_{1-6}$alkyl-O-aryl,
5) —$C_{1-6}$alkyl-O-heteroaryl,
6) $C_{3-12}$cycloalkyl,
7) $C_{2-12}$cycloheteroalkyl, and
8) —$C_{1-6}$alkyl-$C_{3-12}$cycloalkyl,
wherein alkyl, cycloalkyl, cycloheteroalkyl, aryl and heteroaryl are unsubstituted or substituted with one to five substituents selected from $R^b$;
$R^1$ is selected from the group consisting of
1) hydrogen, and
2) —$C_{1-6}$alkyl,
wherein each alkyl is unsubstituted or substituted with one to five substituents selected from $R^c$;
$R^2$ is selected from the group consisting of
1) hydrogen, and
2) —$C_{1-6}$alkyl,
wherein each alkyl is unsubstituted or substituted with one to five substituents selected from $R^f$;
$R^3$ is selected from the group consisting of
1) hydrogen, and
2) —$C_{1-6}$alkyl,
wherein each alkyl is unsubstituted or substituted with one to five substituents selected from $R^g$; and
$R^4$ is selected from the group consisting of
1) hydrogen, and
2) —$C_{1-6}$alkyl,
wherein each alkyl is unsubstituted or substituted with one to five substituents selected from halogen;

$R^5$ is hydrogen;
$R^6$ is selected from the group consisting of
1) hydrogen, and
2) —$C_{1-6}$alkyl,
wherein each alkyl is unsubstituted or substituted with one to five substituents selected from halogen;
each $R^a$ is independently selected from the group consisting of:
1) —$CF_3$,
2) —$OCF_3$,
3) —$CHF_2$,
4) —$OCHF_2$,
5) —$CH_2CF_3$,
6) —$OCH_2CF_3$,
7) —$CF_2CH_3$,
8) CN,
9) halogen, and
10) —$C_{1-6}$alkyl,
wherein each $R^a$ is unsubstituted or substituted with one to six substituents selected from halogen, $CF_3$, OH, —$C_{1-6}$alkyl, and —$OC_{1-6}$alkyl;
each $R^b$ is independently selected from the group consisting of:
1) —$CF_3$,
2) —$OCF_3$,
3) —$CHF_2$,
4) —$OCHF_2$,
5) —$CH_2CF_3$,
6) —$OCH_2CF_3$,
7) CN,
8) halogen,
9) —$S(O)_2C_{1-6}$alkyl,
10) —$C_{1-6}$alkyl,
11) —O—$C_{1-6}$alkyl,
12) —$C_{3-6}$cycloalkyl, and
13) aryl,
wherein each $R^b$ is unsubstituted or substituted with one to six substituents selected from halogen, $CF_3$, $OCF_3$, CN, $CH_2CF_3$, $CF_2CH_3$, —$C_{1-6}$alkyl, and —$OC_{1-6}$alkyl;
or a pharmaceutically acceptable salt thereof.

17. The compound according to claim 1 wherein
A is selected from the group consisting of:
1) aryl, and
2) heteroaryl,
wherein each aryl and heteroaryl is unsubstituted or substituted with one to five substituents selected from $R^a$;
B is independently selected from the group consisting of:
1) aryl, and
2) heteroaryl,
wherein aryl and heteroaryl are unsubstituted or substituted with one to five substituents selected from $R^b$;
$R^1$, $R^2$, $R^3$, $R^4$, $R^5$, and $R^6$ are hydrogen;
each $R^a$ is independently selected from the group consisting of:
1) —$CF_3$,
2) —$OCF_3$,
3) CN, and
4) halogen;
each $R^b$ is independently selected from the group consisting of:
1) —$CF_3$,
2) —$OCH_2CF_3$, and
3) halogen;
or a pharmaceutically acceptable salt thereof.

18. The compound according to claim 1 selected from:
1) (S)—N—((R)-(3-chloro-4-fluorophenyl)(5-fluoro-6-(2,2,2-trifluoroethoxy)pyridin-2-yl)methyl)-2-oxooxazolidine-5-carboxamide;
2) (S)—N—((S)-(3-chloro-4-fluorophenyl)(5-fluoro-6-(2,2,2-trifluoroethoxy)pyridin-2-yl)methyl)-2-oxooxazolidine-5-carboxamide;
3) (S)—N—((R)-(5-chloro-6-(trifluoromethyl)pyridin-2-yl)(4-chlorophenyl)methyl)-2-oxooxazolidine-5-carboxamide;
4) (S)—N—((S)-(5-chloro-6-(trifluoromethyl)pyridin-2-yl)(4-chlorophenyl)methyl)-2-oxooxazolidine-5-carboxamide;
5) (S)—N—((R)-bicyclo[2.2.1]heptan-1-yl(4-chlorophenyl)methyl)-2-oxooxazolidine-5-carboxamide;
6) (S)—N—((S)-bicyclo[2.2.1]heptan-1-yl(4-chlorophenyl)methyl)-2-oxooxazolidine-5-carboxamide;
7) (S)—N—((R)-(4-chlorophenyl)(3-(trifluoromethyl)bicyclo[1.1.1]pentan-1-yl)methyl)-2-oxooxazolidine-5-carboxamide;
8) (S)—N—((S)-(4-chlorophenyl)(3-(trifluoromethyl)bicyclo[1.1.1]pentan-1-yl)methyl)-2-oxooxazolidine-5-carboxamide;
9) (S)—N—((R)-(3-chloro-4-fluorophenyl)(5-(trifluoromethyl)-1H-pyrazol-3-yl)methyl)-2-oxooxazolidine-5-carboxamide;
10) (S)—N—((S)-(3-chloro-4-fluorophenyl)(5-(trifluoromethyl)-1H-pyrazol-3-yl)methyl)-2-oxooxazolidine-5-carboxamide;
11) (cis)-N-(bis(4-chlorophenyl)methyl)-4-methyl-2-oxooxazolidine-5-carboxamide;
12) (trans)-N-(bis(4-chlorophenyl)methyl)-4-methyl-2-oxooxazolidine-5-carboxamide;
13) (R)—N-(bis(4-chlorophenyl)methyl)-5-methyl-2-oxooxazolidine-5-carboxamide;
14) (S)—N-(bis(4-chlorophenyl)methyl)-5-methyl-2-oxooxazolidine-5-carboxamide;
15) (S)—N—((R)-2-(3-chloro-4-fluorophenoxy)-1-(3-chloro-4-fluorophenyl)ethyl)-2-oxo-oxazolidine-5-carboxamide;
16) (S)—N—((S)-2-(3-chloro-4-fluorophenoxy)-1-(3-chloro-4-fluorophenyl)ethyl)-2-oxo-oxazolidine-5-carboxamide;
17) (S)—N—((R)-(3-chloro-2,4-difluorophenyl)((2S,5R)-5-(trifluoromethyl)tetrahydro-2H-pyran-2-yl)methyl)-2-oxooxazolidine-4-carboxamide;
18) (S)—N—((R)-(3-chloro-2,4-difluorophenyl)((2R,5S)-5-(trifluoromethyl)tetrahydro-2H-pyran-2-yl)methyl)-2-oxooxazolidine-4-carboxamide;
19) (S)—N—((S)-(3-chloro-2,4-difluorophenyl)((2S,5R)-5-(trifluoromethyl)tetrahydro-2H-pyran-2-yl)methyl)-2-oxooxazolidine-4-carboxamide;
20) (S)—N—((S)-(3-chloro-2,4-difluorophenyl)((2R,5S)-5-(trifluoromethyl)tetrahydro-2H-pyran-2-yl)methyl)-2-oxooxazolidine-4-carboxamide;
21) (S)—N-(bis(3-chloro-4-fluorophenyl)methyl)-2-oxooxazolidine-5-carboxamide;
22) (S)—N—((R)-(4-chlorophenyl)(2-(trifluoromethyl)pyrimidin-4-yl)methyl)-2-oxo-oxazolidine-5-carboxamide;
23) (S)—N—((S)-(4-chlorophenyl)(2-(trifluoromethyl)pyrimidin-4-yl)methyl)-2-oxo-oxazolidine-5-carboxamide;
24) (S)—N—((R)-(4-chlorophenyl)(4-(trifluoromethyl)thiazol-2-yl)methyl)-2-oxo-oxazolidine-5-carboxamide;
25) (S)—N—((S)-(4-chlorophenyl)(4-(trifluoromethyl)thiazol-2-yl)methyl)-2-oxo-oxazolidine-5-carboxamide;
26) (S)—N—((R)-(3-chloro-4-fluorophenyl)(5-chloropyridin-3-yl)methyl)-2-oxo-oxazolidine-5-carboxamide;
27) (S)—N—((S)-(3-chloro-4-fluorophenyl)(5-chloropyridin-3-yl)methyl)-2-oxo-oxazolidine-5-carboxamide;
28) (S)—N—((R)-(4-chlorophenyl)(1H-indazol-3-yl)methyl)-2-oxooxazolidine-5-carboxamide;
29) (S)—N—((S)-(4-chlorophenyl)(1H-indazol-3-yl)methyl)-2-oxooxazolidine-5-carboxamide;
30) (S)—N—((R)-(4-chlorophenyl)(6-(difluoromethyl)-5-fluoropyridin-2-yl)methyl)-2-oxooxazolidine-5-carboxamide;
31) (S)—N—((S)-(4-chlorophenyl)(6-(difluoromethyl)-5-fluoropyridin-2-yl)methyl)-2-oxooxazolidine-5-carboxamide;
32) (S)—N—((R)-(4-chlorophenyl)(2-(trifluoromethyl)-1H-imidazol-4-yl)methyl)-2-oxo-oxazolidine-5-carboxamide;
33) (S)—N—((S)-(4-chlorophenyl)(2-(trifluoromethyl)-1H-imidazol-4-yl)methyl)-2-oxo-oxazolidine-5-carboxamide;
34) (S)—N—((R)-(4-chlorophenyl)(2-(trifluoromethyl)oxazol-4-yl)methyl)-2-oxo-oxazolidine-5-carboxamide;
35) (S)—N—((S)-(4-chlorophenyl)(2-(trifluoromethyl)oxazol-4-yl)methyl)-2-oxo-oxazolidine-5-carboxamide;
36) (S)—N—((R)-(3-chloro-4-fluorophenyl)(4-chlorophenyl)methyl)-2-oxooxazolidine-5-carboxamide;
37) (S)—N—((S)-(3-chloro-4-fluorophenyl)(4-chlorophenyl)methyl)-2-oxooxazolidine-5-carboxamide;
38) (5S)—N-((3,5-dichlorophenyl)(phenyl)methyl)-2-oxooxazolidine-5-carboxamide;
39) (5S)—N-((adamantan-2-yl)(phenyl)methyl)-2-oxooxazolidine-5-carboxamide;
40) (S)—N—((R)-(4-chlorophenyl)(6-methoxypyridin-3-yl)methyl)-2-oxooxazolidine-5-carboxamide;
41) (S)—N—((S)-(4-chlorophenyl)(6-methoxypyridin-3-yl)methyl)-2-oxooxazolidine-5-carboxamide;
42) (S)—N—((R)-(4-chlorophenyl)(5-fluoropyridin-2-yl)methyl)-2-oxooxazolidine-5-carboxamide;
43) (S)—N—((S)-(4-chlorophenyl)(5-fluoropyridin-2-yl)methyl)-2-oxooxazolidine-5-carboxamide;
44) (5S)—N-((4-chlorophenyl)(thiophen-2-yl)methyl)-2-oxooxazolidine-5-carboxamide;
45) (S)—N—((R)-(3,4-dichlorophenyl)(phenyl)methyl)-2-oxooxazolidine-5-carboxamide;
46) (S)—N—((S)-(3,4-dichlorophenyl)(phenyl)methyl)-2-oxooxazolidine-5-carboxamide;
47) (5S)—N—((R)-(3-chlorophenyl)((cis)-2-phenylcyclopropyl)methyl)-2-oxooxazolidine-5-carboxamide;
48) (5S)—N—((R)-(3-chlorophenyl)((trans)-2-phenylcyclopropyl)methyl)-2-oxooxazolidine-5-carboxamide;
49) (5S)—N—((S)-(3-chlorophenyl)((cis)-2-phenylcyclopropyl)methyl)-2-oxooxazolidine-5-carboxamide;
50) (5S)—N—((S)-(3-chlorophenyl)((trans)-2-phenylcyclopropyl)methyl)-2-oxooxazolidine-5-carboxamide;
51) (5S)—N-((4-chlorophenyl)(3-(methylsulfonyl)phenyl)methyl)-2-oxooxazolidine-5-carboxamide;
52) (S)—N—((R)-(5-chloro-2-methoxyphenyl)(3-chlorophenyl)methyl)-2-oxooxazolidine-5-carboxamide;
53) (S)—N—((S)-(5-chloro-2-methoxyphenyl)(3-chlorophenyl)methyl)-2-oxooxazolidine-5-carboxamide;

54) (S)—N—((R)-(4-chlorophenyl)(2,3-difluorophenyl)methyl)-2-oxooxazolidine-5-carboxamide;
55) (S)—N—((S)-(4-chlorophenyl)(2,3-difluorophenyl)methyl)-2-oxooxazolidine-5-carboxamide;
56) (5S)—N-((4-chlorophenyl)(naphthalen-1-yl)methyl)-2-oxooxazolidine-5-carboxamide;
57) (5S)—N-((4-chlorophenyl)(naphthalen-2-yl)methyl)-2-oxooxazolidine-5-carboxamide;
58) (S)—N—((R)-(4-chlorophenyl)(3-isopropylphenyl)methyl)-2-oxooxazolidine-5-carboxamide;
59) (S)—N—((S)-(4-chlorophenyl)(3-isopropylphenyl)methyl)-2-oxooxazolidine-5-carboxamide;
60) (S)—N—((R)-(4-chlorophenyl)(3-cyclopropylphenyl)methyl)-2-oxooxazolidine-5-carboxamide;
61) (S)—N—((S)-(4-chlorophenyl)(3-cyclopropylphenyl)methyl)-2-oxooxazolidine-5-carboxamide;
62) (5S)—N-((4-chlorophenyl)(2-(trifluoromethyl)pyridin-4-yl)methyl)-2-oxooxazolidine-5-carboxamide;
63) (S)—N—((R)-(4-chloro-3-(trifluoromethyl)phenyl)(4-chlorophenyl)methyl)-2-oxooxazolidine-5-carboxamide;
64) (S)—N—((S)-(4-chloro-3-(trifluoromethyl)phenyl)(4-chlorophenyl)methyl)-2-oxooxazolidine-5-carboxamide;
65) (5S)—N-((4-chlorophenyl)(6-(difluoromethoxy)pyridin-3-yl)methyl)-2-oxooxazolidine-5-carboxamide;
66) (S)—N—((R)-(4-chlorophenyl)(5-(trifluoromethyl)pyridin-2-yl)methyl)-2-oxo-oxazolidine-5-carboxamide;
67) (S)—N—((S)-(4-chlorophenyl)(5-(trifluoromethyl)pyridin-2-yl)methyl)-2-oxo-oxazolidine-5-carboxamide;
68) (5S)—N-((3-chloro-4-fluorophenyl)(5-fluoro-6-(trifluoromethyl)pyridin-2-yl)methyl)-2-oxooxazolidine-5-carboxamide;
69) (S)—N—((R)-(4-(tert-butyl)thiazol-2-yl)(4-chlorophenyl)methyl)-2-oxooxazolidine-5-carboxamide;
70) (S)—N—((S)-(4-(tert-butyl)thiazol-2-yl)(4-chlorophenyl)methyl)-2-oxooxazolidine-5-carboxamide;
71) (5S)—N-((4-chlorophenyl)(4-(trifluoromethyl)-1H-imidazol-2-yl)methyl)-2-oxo-oxazolidine-5-carboxamide;
72) (S)—N-(1,1-bis(4-chlorophenyl)ethyl)-2-oxooxazolidine-5-carboxamide;
73) (S)—N—((R)-(4-chlorophenyl)(1-(2,2,2-trifluoroethyl)piperidin-4-yl)methyl)-2-oxooxazolidine-5-carboxamide;
74) (S)—N—((S)-(4-chlorophenyl)(1-(2,2,2-trifluoroethyl)piperidin-4-yl)methyl)-2-oxo-oxazolidine-5-carboxamide;
75) (S)—N—((R)-(3-chloro-4-fluorophenyl)((R)-1-(2,2,2-trifluoroethyl)pyrrolidin-3-yl)methyl)-2-oxooxazolidine-5-carboxamide;
76) (S)—N—((R)-(3-chloro-4-fluorophenyl)((S)-1-(2,2,2-trifluoroethyl)pyrrolidin-3-yl)methyl)-2-oxooxazolidine-5-carboxamide;
77) (S)—N—((S)-(3-chloro-4-fluorophenyl)((R)-1-(2,2,2-trifluoroethyl)pyrrolidin-3-yl)methyl)-2-oxooxazolidine-5-carboxamide;
78) (S)—N—((S)-(3-chloro-4-fluorophenyl)((S)-1-(2,2,2-trifluoroethyl)pyrrolidin-3-yl)methyl)-2-oxooxazolidine-5-carboxamide;
79) (S)—N—((R)-(3-chloro-4-fluorophenyl)(2-(trifluoromethyl)thiazol-4-yl)methyl)-2-oxooxazolidine-5-carboxamide;
80) (S)—N—((S)-(3-chloro-4-fluorophenyl)(2-(trifluoromethyl)thiazol-4-yl)methyl)-2-oxooxazolidine-5-carboxamide;
81) (5S)—N-((4-chlorophenyl)(cycloheptyl)methyl)-2-oxooxazolidine-5-carboxamide;
82) (S)—N—((R)-(4-chloro-3-methylphenyl)(4-chlorophenyl)methyl)-2-oxooxazolidine-5-carboxamide;
83) (S)—N—((S)-(4-chloro-3-methylphenyl)(4-chlorophenyl)methyl)-2-oxooxazolidine-5-carboxamide;
84) (S)—N—((R)-(4-chloro-2-(trifluoromethoxy)phenyl)(4-chlorophenyl)methyl)-2-oxooxazolidine-5-carboxamide;
85) (S)—N—((S)-(4-chloro-2-(trifluoromethoxy)phenyl)(4-chlorophenyl)methyl)-2-oxo-oxazolidine-5-carboxamide;
86) (S)—N—((R)-(3-chloro-4-fluorophenyl)(4-(difluoromethoxy)phenyl)methyl)-2-oxo-oxazolidine-5-carboxamide;
87) (S)—N—((S)-(3-chloro-4-fluorophenyl)(4-(difluoromethoxy)phenyl)methyl)-2-oxo-oxazolidine-5-carboxamide;
88) (S)—N—((R)-(3-chloro-4-fluorophenyl)(6-(trifluoromethyl)pyridin-2-yl)methyl)-2-oxooxazolidine-5-carboxamide;
89) (S)—N—((S)-(3-chloro-4-fluorophenyl)(6-(trifluoromethyl)pyridin-2-yl)methyl)-2-oxooxazolidine-5-carboxamide;
90) (S)—N—((R)-(3-chloro-2,4-difluorophenyl)(6-(2,2,2-trifluoroethoxy)pyridin-3-yl)methyl)-2-oxooxazolidine-5-carboxamide;
91) (S)—N—((S)-(3-chloro-2,4-difluorophenyl)(6-(2,2,2-trifluoroethoxy)pyridin-3-yl)methyl)-2-oxooxazolidine-5-carboxamide;
92) (S)—N—((R)-(3-chloro-4-(trifluoro-methoxy)phenyl)(2-(trifluoromethyl)oxazol-4-yl)methyl)-2-oxooxazolidine-5-carboxamide;
93) (S)—N—((S)-(3-chloro-4-(trifluoro-methoxy)phenyl)(2-(trifluoromethyl)oxazol-4-yl)methyl)-2-oxooxazolidine-5-carboxamide;
94) (S)—N—((R)-(3-chloro-4-(trifluoromethoxy)phenyl)(2-(trifluoro-methyl)pyrimidin-4-yl)methyl)-2-oxooxazolidine-5-carboxamide;
95) (S)—N—((S)-(3-chloro-4-(trifluoromethoxy)phenyl)(2-(trifluoro-methyl)pyrimidin-4-yl)methyl)-2-oxooxazolidine-5-carboxamide;
96) (S)—N—((R)-(3-chloro-4-(trifluoro-methoxy)phenyl)(1-(trifluoromethyl)-1H-pyrazol-4-yl)methyl)-2-oxooxazolidine-5-carboxamide;
97) (S)—N—((S)-(3-chloro-4-(trifluoro-methoxy)phenyl)(1-(trifluoromethyl)-1H-pyrazol-4-yl)methyl)-2-oxooxazolidine-5-carboxamide;
98) (S)—N—((R)-(3-chloro-4-cyano-phenyl)(5-chloro-6-(trifluoromethyl)pyridin-3-yl)methyl)-2-oxooxazolidine-5-carboxamide;
99) (S)—N—((S)-(3-chloro-4-cyano-phenyl)(5-chloro-6-(trifluoromethyl)pyridin-3-yl)methyl)-2-oxooxazolidine-5-carboxamide;
100) (S)—N—((R)-(4-chloro-2-methoxyphenyl)(4-fluorophenyl)methyl)-2-oxooxazolidine-5-carboxamide;
101) (S)—N—((S)-(4-chloro-2-methoxyphenyl)(4-fluorophenyl)methyl)-2-oxooxazolidine-5-carboxamide;
102) (S)—N—((R)-(4-chlorophenyl)(cuban-1-yl)methyl)-2-oxooxazolidine-5-carboxamide;
103) (S)—N—((S)-(4-chlorophenyl)(cuban-1-yl)methyl)-2-oxooxazolidine-5-carboxamide;
104) (S)—N—((R)-(4-chlorophenyl)((R)-3,3-difluorocyclopentyl)methyl)-2-oxo-oxazolidine-5-carboxamide;

105) (S)—N—((R)-(4-chlorophenyl)((S)-3,3-difluorocyclopentyl)methyl)-2-oxo-oxazolidine-5-carboxamide;
106) (S)—N—((S)-(4-chlorophenyl)((R)-3,3-difluorocyclopentyl)methyl)-2-oxo-oxazolidine-5-carboxamide;
107) (S)—N—((S)-(4-chlorophenyl)((S)-3,3-difluorocyclopentyl)methyl)-2-oxo-oxazolidine-5-carboxamide;
108) (S)—N—((R)-(3-chloro-4-fluorophenyl)(2-methoxypyridin-3-yl)methyl)-2-oxo-oxazolidine-5-carboxamide;
109) (S)—N—((S)-(3-chloro-4-fluorophenyl)(2-methoxypyridin-3-yl)methyl)-2-oxooxazolidine-5-carboxamide;
110) (S)—N—((R)-(3-chloro-4-fluorophenyl)(1-(2,2,2-trifluoroethyl)-1H-pyrazol-4-yl)methyl)-2-oxooxazolidine-5-carboxamide;
111) (S)—N—((S)-(3-chloro-4-fluorophenyl)(1-(2,2,2-trifluoroethyl)-1H-pyrazol-4-yl)methyl)-2-oxooxazolidine-5-carboxamide;
112) (S)—N—((R)-(3-chloro-4-fluorophenyl)(1-(difluoromethyl)-1H-pyrazol-3-yl)methyl)-2-oxooxazolidine-5-carboxamide;
113) (S)—N—((S)-(3-chloro-4-fluorophenyl)(1-(difluoromethyl)-1H-pyrazol-3-yl)methyl)-2-oxooxazolidine-5-carboxamide;
114) (S)—N—((R)-(3-chloro-4-fluorophenyl)(1-methyl-3-(trifluoromethyl)-1H-pyrazol-5-yl)methyl)-2-oxooxazolidine-5-carboxamide;
115) (S)—N—((S)-(3-chloro-4-fluorophenyl)(1-methyl-3-(trifluoromethyl)-1H-pyrazol-5-yl)methyl)-2-oxooxazolidine-5-carboxamide;
116) (S)—N—((R)-(3-chloro-4-fluorophenyl)(1-methyl-5-(trifluoromethyl)-1H-pyrazol-3-yl)methyl)-2-oxooxazolidine-5-carboxamide;
117) (S)—N—((S)-(3-chloro-4-fluorophenyl)(1-methyl-5-(trifluoromethyl)-1H-pyrazol-3-yl)methyl)-2-oxooxazolidine-5-carboxamide;
118) (S)—N—((R)-(5-chloro-6-(trifluoromethyl)pyridin-2-yl)(4,4-difluoro-cyclohexyl)-methyl)-2-oxooxazolidine-5-carboxamide;
119) (S)—N—((S)-(5-chloro-6-(trifluoromethyl)pyridin-2-yl)(4,4-difluoro-cyclohexyl)-methyl)-2-oxooxazolidine-5-carboxamide;
120) (5S)-2-oxo-N-((6-(trifluoromethyl)pyridin-3-yl)(2-(trifluoromethyl)thiazol-4-yl)methyl)-oxazolidine-5-carboxamide;
121) (S)—N—((R)-1-(3-chloro-2,4-difluorophenyl)-3-(4-chlorophenyl)propyl)-2-oxooxazolidine-5-carboxamide;
122) (S)—N—((S)-1-(3-chloro-2,4-difluorophenyl)-3-(4-chlorophenyl)propyl)-2-oxooxazolidine-5-carboxamide;
123) (5S)—N-(1-(3-chloro-4-fluorophenyl)-2-((6-(trifluoromethyl)pyridin-3-yl)oxy)ethyl)-2-oxooxazolidine-5-carboxamide;
124) (S)—N-(1-(3-chloro-2,4-difluorophenyl)-2-cyclohexylmethyl)-2-oxooxazolidine-5-carboxamide;
125) (5S)—N-(2-(4-chlorophenyl)-1-(4-(trifluoromethoxy)phenyl)ethyl)-2-oxooxazolidine-5-carboxamide;
126) (S)—N—((R)-(3-chloro-4-fluorophenyl)(3-cyano-4-fluorophenyl)methyl)-2-oxo-oxazolidine-5-carboxamide;
127) (S)—N—((S)-(3-chloro-2,4-difluorophenyl)((trans)-3-(trifluoromethyl)-cyclobutyl)-methyl)-2-oxooxazolidine-5-carboxamide;
128) (S)—N—((R)-(3-chloro-2,4-difluorophenyl)(2-(2,2,2-trifluoroethoxy)thiazol-5-yl)methyl)-2-oxooxazolidine-5-carboxamide;
129) (S)—N—((S)-(3-chloro-2,4-difluorophenyl)(2-(2,2,2-trifluoroethoxy)thiazol-5-yl)methyl)-2-oxooxazolidine-5-carboxamide;
130) (S)—N—((R)-(3-chloro-4-fluorophenyl)((trans)-4-(trifluoromethyl)cyclohexyl)methyl)-2-oxooxazolidine-5-carboxamide;
131) (S)—N—((S)-(3-chloro-4-fluorophenyl)((trans)-4-(trifluoromethyl)cyclohexyl)methyl)-2-oxooxazolidine-5-carboxamide;
132) (S)—N—((R)-(4-chlorophenyl)(6-(2,2,2-trifluoroethoxy)pyridazin-3-yl)methyl)-2-oxooxazolidine-5-carboxamide;
133) (S)—N—((S)-(4-chlorophenyl)(6-(2,2,2-trifluoroethoxy)pyridazin-3-yl)methyl)-2-oxooxazolidine-5-carboxamide;
134) (S)—N—((R)-(3-chloro-2,4-difluorophenyl)((trans)-6,6-difluorobicyclo[3.1.0]hexan-3-yl)methyl)-2-oxooxazolidine-5-carboxamide; and
135) (S)—N—((S)-(3-chloro-2,4-difluorophenyl)((trans)-6,6-difluorobicyclo[3.1.0]hexan-3-yl)methyl)-2-oxooxazolidine-5-carboxamide;
or a pharmaceutically acceptable salt thereof.

19. The compound according to claim 1 selected from:
1) (S)—N—((R)-(3-chloro-4-fluorophenyl)(5-(trifluoromethyl)-1H-pyrazol-3-yl)methyl)-2-oxooxazolidine-5-carboxamide;
2) (S)—N—((S)-(3-chloro-4-fluorophenyl)(5-(trifluoromethyl)-1H-pyrazol-3-yl)methyl)-2-oxooxazolidine-5-carboxamide;
3) (S)—N—((R)-(3-chloro-4-fluorophenyl)(4-chlorophenyl)methyl)-2-oxooxazolidine-5-carboxamide;
4) (S)—N—((S)-(3-chloro-4-fluorophenyl)(4-chlorophenyl)methyl)-2-oxooxazolidine-5-carboxamide;
5) (S)—N—((R)-(3-chloro-4-fluorophenyl)(2-(trifluoromethyl)thiazol-4-yl)methyl)-2-oxo-oxazolidine-5-carboxamide;
6) (S)—N—((S)-(3-chloro-4-fluorophenyl)(2-(trifluoromethyl)thiazol-4-yl)methyl)-2-oxooxazolidine-5-carboxamide;
7) (S)—N—((R)-(3-chloro-2,4-difluorophenyl)(6-(2,2,2-trifluoroethoxy)pyridin-3-yl)methyl)-2-oxooxazolidine-5-carboxamide;
8) (S)—N—((S)-(3-chloro-2,4-difluorophenyl)(6-(2,2,2-trifluoroethoxy)pyridin-3-yl)methyl)-2-oxooxazolidine-5-carboxamide;
9) (S)—N—((R)-(3-chloro-2,4-difluorophenyl)((trans)-3-(trifluoromethyl)-cyclobutyl)-methyl)-2-oxooxazolidine-5-carboxamide; and
10) (S)—N—((S)-(3-chloro-2,4-difluorophenyl)((trans)-3-(trifluoromethyl)-cyclobutyl)-methyl)-2-oxooxazolidine-5-carboxamide;
or a pharmaceutically acceptable salt thereof.

20. A pharmaceutical composition comprising a compound of claim 1, or a pharmaceutically acceptable salt thereof, and a pharmaceutically acceptable carrier.

21. A compound according to claim 1, or a pharmaceutically acceptable salt thereof, for use in therapy.

22. A method of treating a disorder, condition or disease that is responsive to the inhibition of $Na_v1.8$ channel activity in a patient in need thereof comprising administration of a therapeutically effective amount of a compound according to claim 1, or a pharmaceutically acceptable salt thereof, wherein the disorder is selected from:

pain disorder, a cough disorder, an acute itch disorder or chronic itch disorder.

23. The method of claim 22 wherein the disorder is a pain disorder.

24. The method of claim 23, wherein the pain disorder is selected from: acute pain, inflammatory pain, or neuropathic pain.

25. The compound according to claim 1 which is: (S)—N—((R)-(3-chloro-4-fluorophenyl)(5-(trifluoromethyl)-1H-pyrazol-3-yl)methyl)-2-oxooxazolidine-5-carboxamide; or a pharmaceutically acceptable salt thereof.

26. The compound according to claim 1 which is: (S)—N—((S)-(3-chloro-4-fluorophenyl)(5-(trifluoromethyl)-1H-pyrazol-3-yl)methyl)-2-oxooxazolidine-5-carboxamide; or a pharmaceutically acceptable salt thereof.

27. The compound according to claim 1 which is: (S)—N—((R)-(3-chloro-4-fluorophenyl)(4-chlorophenyl)methyl)-2-oxooxazolidine-5-carboxamide; or a pharmaceutically acceptable salt thereof.

28. The compound according to claim 1 which is: (S)—N—((S)-(3-chloro-4-fluorophenyl)(4-chlorophenyl)methyl)-2-oxooxazolidine-5-carboxamide; or a pharmaceutically acceptable salt thereof.

29. The compound according to claim 1 which is: (S)—N—((R)-(3-chloro-4-fluorophenyl)(2-(trifluoromethyl)thiazol-4-yl)methyl)-2-oxo-oxazolidine-5-carboxamide; or a pharmaceutically acceptable salt thereof.

30. The compound according to claim 1 which is: (S)—N—((S)-(3-chloro-4-fluorophenyl)(2-(trifluoromethyl)thiazol-4-yl)methyl)-2-oxooxazolidine-5-carboxamide; or a pharmaceutically acceptable salt thereof.

31. The compound according to claim 1 which is: (S)—N—((R)-(3-chloro-2,4-difluorophenyl)(6-(2,2,2-trifluoroethoxy)pyridin-3-yl)methyl)-2-oxooxazolidine-5-carboxamide; or a pharmaceutically acceptable salt thereof.

32. The compound according to claim 1 which is: (S)—N—((S)-(3-chloro-2,4-difluorophenyl)(6-(2,2,2-trifluoroethoxy)pyridin-3-yl)methyl)-2-oxooxazolidine-5-carboxamide; or a pharmaceutically acceptable salt thereof.

33. The compound according to claim 1 which is: (S)—N—((R)-(3-chloro-2,4-difluorophenyl)((trans)-3-(trifluoromethyl)-cyclobutyl)-methyl)-2-oxooxazolidine-5-carboxamide; or a pharmaceutically acceptable salt thereof.

34. The compound according to claim 1 which is: (S)—N—((S)-(3-chloro-2,4-difluorophenyl)((trans)-3-(trifluoromethyl)-cyclobutyl)-methyl)-2-oxooxazolidine-5-carboxamide; or a pharmaceutically acceptable salt thereof.

* * * * *